United States Patent
Fatehi et al.

(10) Patent No.: US 11,572,678 B1
(45) Date of Patent: *Feb. 7, 2023

(54) AUTOMATIC SEISMIC WAVE DETECTOR AND VALVE CONTROLLER

(71) Applicants: Mohammad Taghi Fatehi, Irvine, CA (US); Parham Reza Fatehi, Irvine, CA (US); Keyvan Fatehi, Irvine, CA (US)

(72) Inventors: Mohammad Taghi Fatehi, Irvine, CA (US); Parham Reza Fatehi, Irvine, CA (US); Keyvan Fatehi, Irvine, CA (US)

( * ) Notice: Subject to any disclaimer, the term of this patent is extended or adjusted under 35 U.S.C. 154(b) by 136 days.

This patent is subject to a terminal disclaimer.

(21) Appl. No.: 17/124,437

(22) Filed: Dec. 16, 2020

Related U.S. Application Data

(63) Continuation of application No. 16/734,297, filed on Jan. 3, 2020, now Pat. No. 10,876,277.

(60) Provisional application No. 62/851,637, filed on May 22, 2019, provisional application No. 62/788,723, filed on Jan. 4, 2019.

(51) Int. Cl.
```
E03B 7/07      (2006.01)
F16K 17/36     (2006.01)
H04W 4/90      (2018.01)
G01V 1/00      (2006.01)
```

(52) U.S. Cl.
CPC .............. *E03B 7/071* (2013.01); *F16K 17/36* (2013.01); *H04W 4/90* (2018.02); *G01V 1/008* (2013.01)

(58) Field of Classification Search
CPC ........... E03B 7/071; F16K 17/36; H04W 4/90
See application file for complete search history.

(56) References Cited

U.S. PATENT DOCUMENTS

| | | |
|---|---|---|
| 4,841,287 A | 6/1989 | Flig et al. |
| 5,209,454 A | 5/1993 | Engdahl et al. |
| 5,307,699 A | 5/1994 | Engdahl et al. |
| 5,489,889 A | 2/1996 | Kambouris et al. |
| 5,742,235 A | 4/1998 | Miche |

(Continued)

OTHER PUBLICATIONS

U.S. Appl. No. 16/920,729, filed Jul. 5, 2020, Mohammad T Fatehi, et al.

(Continued)

*Primary Examiner* — Mohammad Ali
*Assistant Examiner* — Vincent W Chang
(74) *Attorney, Agent, or Firm* — Makoui Law, PC; Ali Makoui

(57) ABSTRACT

A valve controller device for controlling a set of one or more solenoid valves is provided. The valve controller comprises an accelerometer for making acceleration measurements in three directions comprising acceleration measurements in a vertical direction. The valve controller comprises a processing unit that determines the arrival of seismic P-waves when the ratio of vibrations' power in the vertical direction with respect to a sum of the vibrations' power in the three directions exceeds a first threshold. The processing unit then determines the arrival of seismic S-waves when the vector sum of the vibrations' power in the three directions exceeds a second threshold. The processing unit then determines the arrival of seismic surface waves when the vector sum of the vibrations' power in the three directions exceeds a third threshold. The processing unit then sends one or more signals to close the set of solenoid valves.

20 Claims, 71 Drawing Sheets

(56) References Cited

U.S. PATENT DOCUMENTS

| | | | |
|---|---|---|---|
| 5,787,917 | A | 8/1998 | Park et al. |
| 6,170,509 | B1 | 1/2001 | Karta |
| 6,311,714 | B1 | 11/2001 | Watanabe |
| 6,374,850 | B1 | 4/2002 | Timm |
| 6,661,346 | B1 | 12/2003 | Wood et al. |
| 6,789,560 | B1 | 9/2004 | Sibley et al. |
| 6,909,375 | B2 | 6/2005 | Diaz-Lopez |
| 6,968,852 | B1 | 11/2005 | Sibley |
| 7,346,432 | B2 | 3/2008 | Matsymiya et al. |
| 7,375,646 | B1 | 5/2008 | Diaz-Lopez |
| 7,598,884 | B2 | 10/2009 | Lachenit et al. |
| 7,918,239 | B1 | 4/2011 | Ikegaya et al. |
| 8,039,988 | B2 | 10/2011 | Tamowsky |
| 9,057,453 | B2 | 6/2015 | Pitchford et al. |
| 9,645,584 | B2 | 5/2017 | Kucera et al. |
| 10,520,103 | B1 | 12/2019 | Fatehi et al. |
| 10,718,442 | B1 | 7/2020 | Fatehi et al. |
| 10,876,277 | B1 | 12/2020 | Fatehi et al. |
| 2007/0279239 | A1 | 12/2007 | Lachenit et al. |
| 2012/0043091 | A1* | 2/2012 | Leahy .................... G01V 1/282 166/369 |
| 2012/0056711 | A1* | 3/2012 | Hanrahan ................ G05B 9/02 340/3.4 |
| 2013/0307350 | A1* | 11/2013 | Ogden ..................... F17D 5/00 307/119 |
| 2013/0328688 | A1 | 12/2013 | Price et al. |
| 2014/0244050 | A1* | 8/2014 | Barkay .................... F17D 5/00 700/282 |
| 2014/0249756 | A1* | 9/2014 | Hsu ........................ G08B 21/10 702/15 |
| 2014/0264111 | A1 | 9/2014 | Porter et al. |
| 2016/0187505 | A1 | 6/2016 | Chiang et al. |

OTHER PUBLICATIONS

U.S. Appl. No. 17/115,763, filed Dec. 8, 2020, Mohammad T Fatehi, et al.
Portions of prosecution history of U.S. Appl. No. 16/734,297, Dec. 9, 2020, Mohammad T Fatehi, et al.
Portions of prosecution history of U.S. Appl. No. 16/920,729, Nov. 7, 2020, Mohammad T Fatehi, et al.
Portions of prosecution history of U.S. Appl. No. 17/115,763, Dec. 17, 2002, Mohammad T Fatehi, et al.
U.S. Appl. No. 16/724,378, filed Dec. 23, 2019, Mohammad T Fatehi, et al.
Portions of prosecution history of U.S. Appl. No. 16/420,156, Nov. 26, 2018, Mohammad T Fatehi, et al.
Portions of prosecution history of U.S. Appl. No. 16/420,157, Dec. 11, 2019, Mohammad T Fatehi, et al.
Wu, Yih-Min, et al., "Magnitude Estimation using the First three Seconds P-Wave Amplitude in Earthquake Early Warning", Geographical Research Letters, vol. 33, L16312, Aug. 2006, pp. 1-4.
Giovanna Monari "Understanding Resolution in Optical and Magnetic Encoders", Electronic Design, Jun. 2013, pp. 1-5.
Prasad L V, Narashimha, et al., "Analysis of Magnitude for Earthquake Detection using Primary Waves and Secondary Waves," IEEE 2013 International Conference on Human Computer Interactions (ICHCI), Aug. 2013, pp. 1-6.
Sherki, Yogesh, et al., "Design of Real time Sensor System for Detection and Processing of Seismic Waves for Earthquake Early Warning System", 2015 International Conference on Power and Advanced Control Engineering (ICPACE) Aug. 2015, pp. 285-289.
Kaur, Komalpreet, et al., "Detection and Identification of Seismic P-Waves using Artificial Neural Networks", Proceedings of International Joint Conference on Neural Networks, Aug. 2013, pp. 2949-2954.
Singh, Rajat Deep, et al., "Seismic Early Warning Alert System", 2014 International Conference on Signal Processing and Integrated Networks (SPIN), Feb. 2014, pp. 601-605.
Ross, Z. E., et al., "Automatic Picking of Direct P, S Seismic Phases and Fault Zone Head Waves," Geophysical Journal International (2014) 199, Oct. 2014, pp. 368-381.
Wang, James D B, "IMU General Introduction," slideshare.net, Apr. 4, 2017, pp. 6-7 and 10-11.
Wang, James D B, "IMU General Introduction," slideshare.net, Apr. 4, 2017, pp. 12-13 and 50-52.
Wang, James D B, "IMU Fusion Algorithm for Pose Estimation (mCube Invited Talk) 2018," slideshare.net, Nov. 2018, pp. 1 and 4-7.
Author Unknown, "BNO080 Data Sheet", Hillcrest Labs, Oct. 2017, pp. 1-57.
Saddam, "Earthquake Detector Alarm using Arduino," Jun. 2017, Circuit Design, pp. 1-18.

* cited by examiner

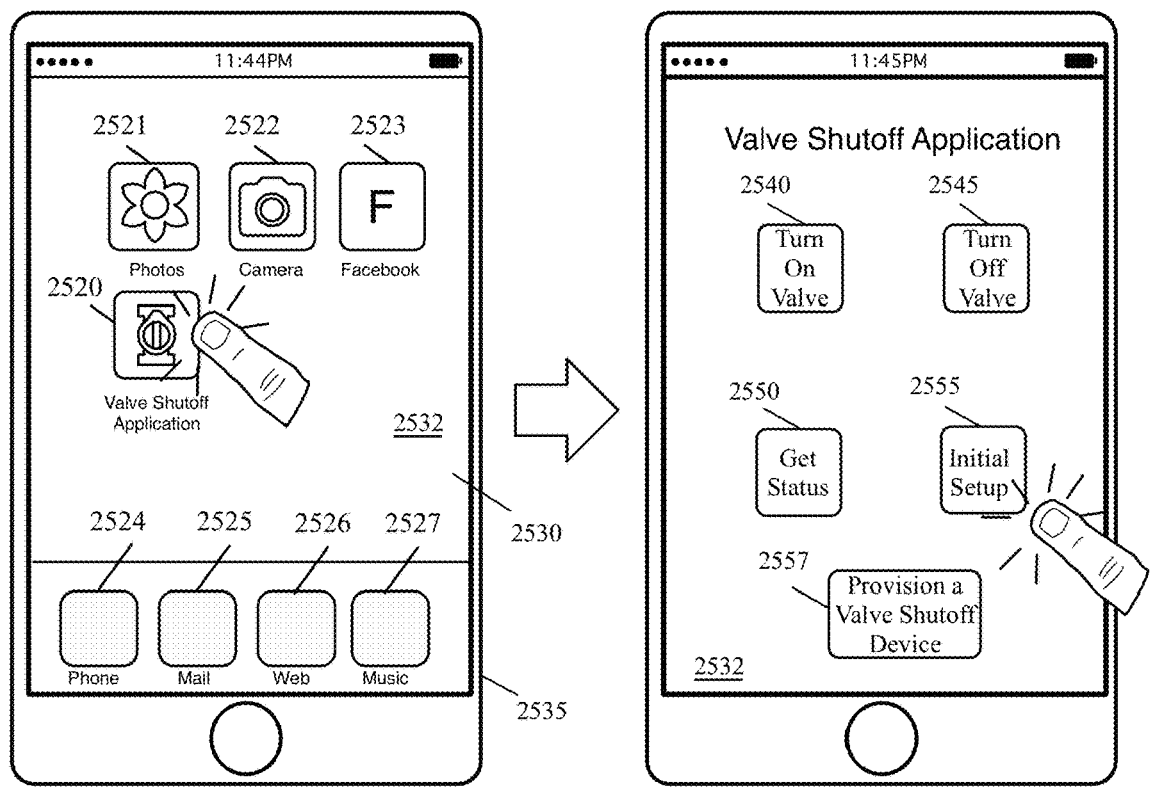
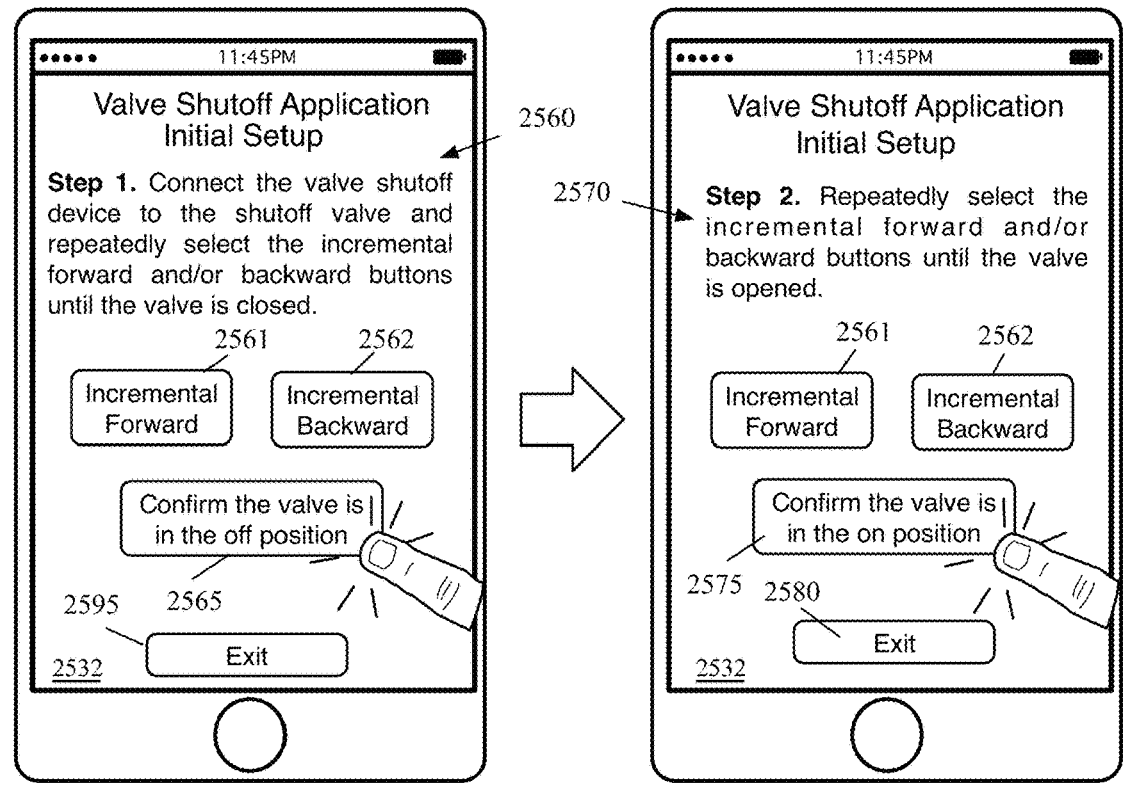
Fig. 25

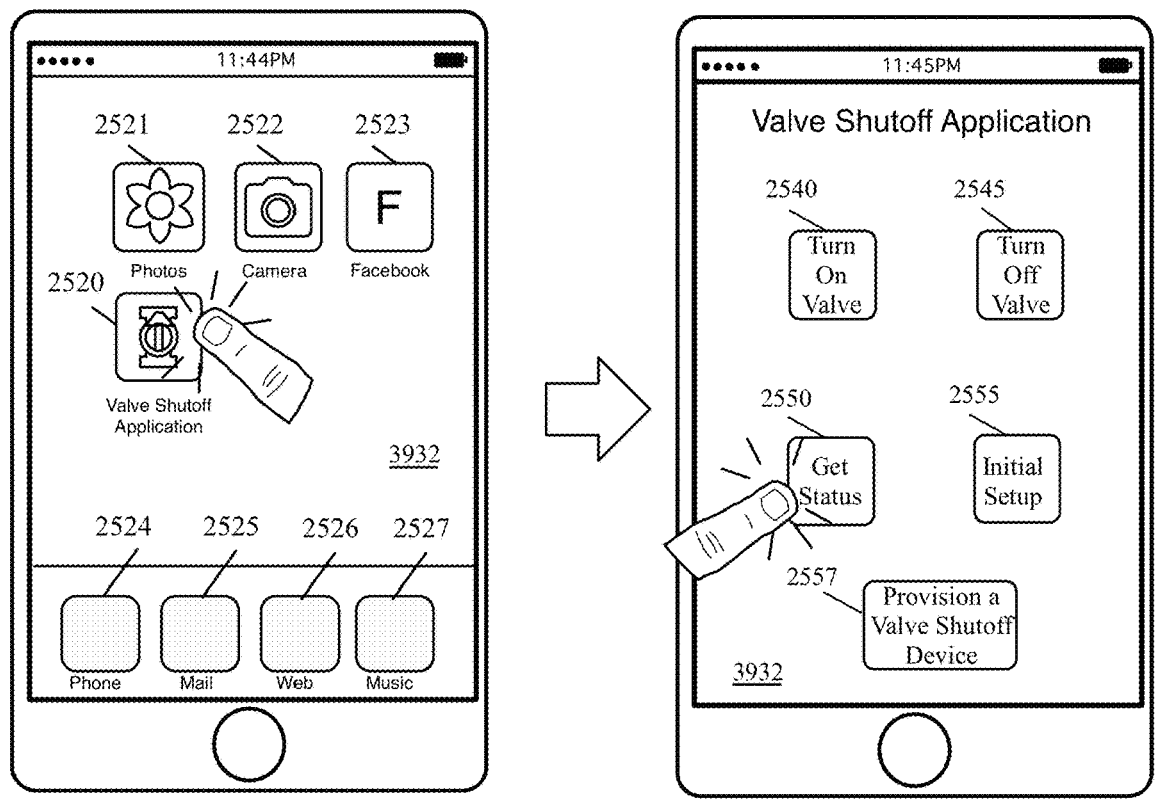
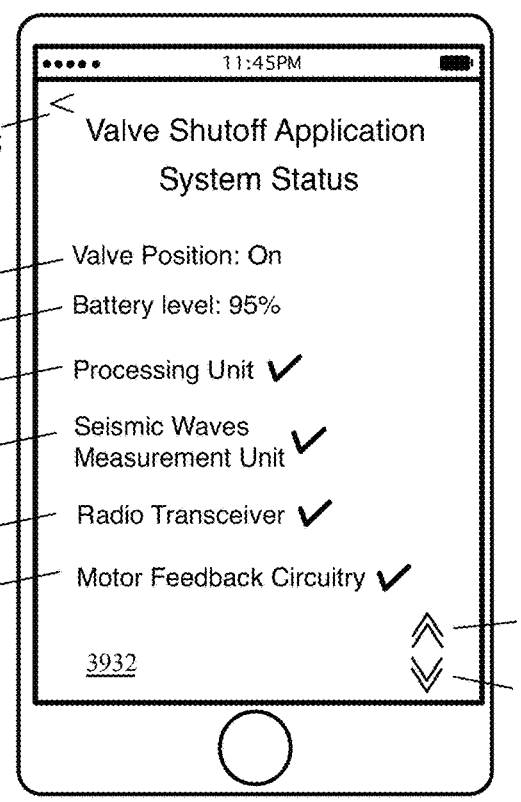
Fig. 39

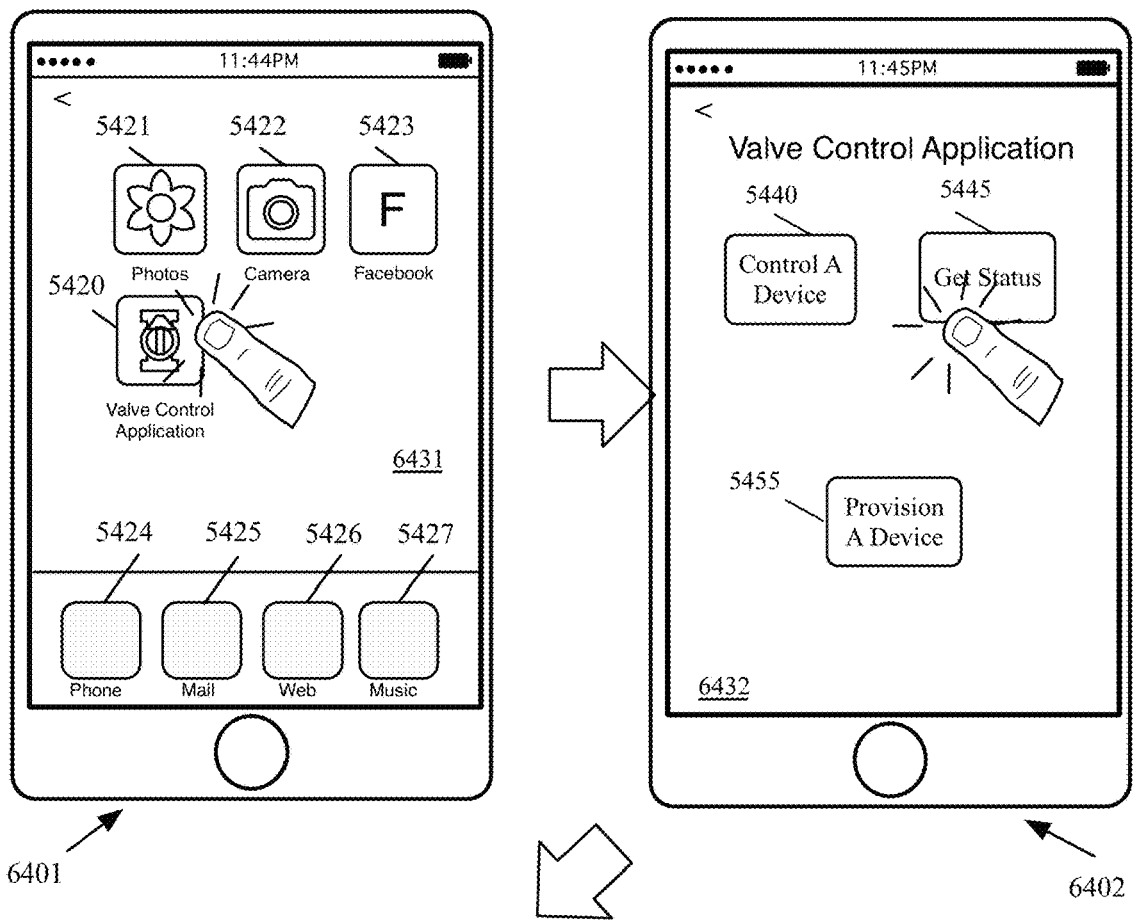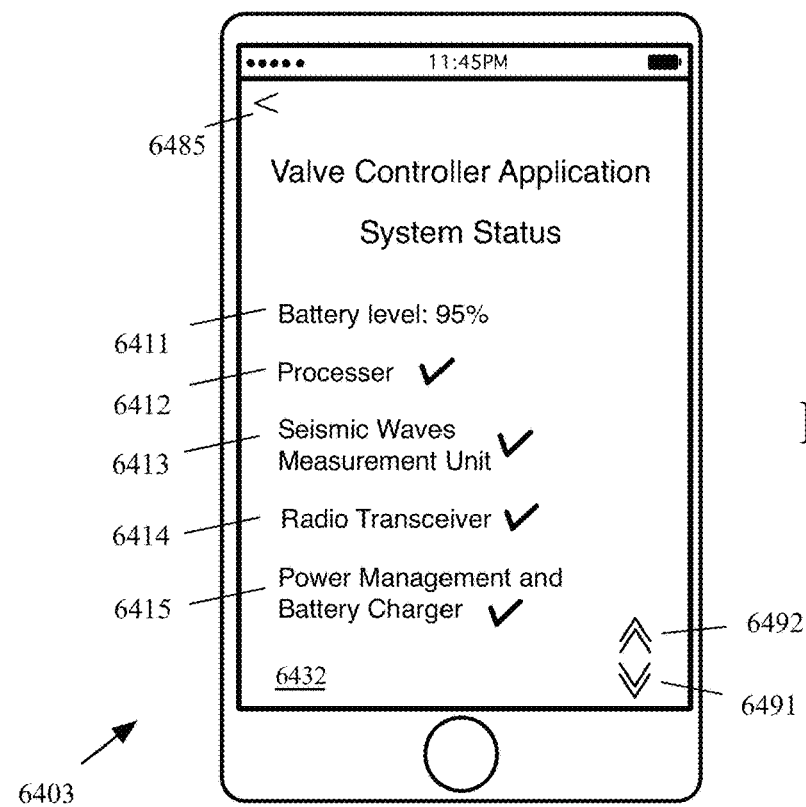
Fig. 64

US 11,572,678 B1

AUTOMATIC SEISMIC WAVE DETECTOR AND VALVE CONTROLLER

CLAIM OF BENEFIT TO PRIOR APPLICATIONS

This application is a continuation application of U.S. patent application Ser. No. 16/734,297, filed Jan. 3, 2020. U.S. patent application Ser. No. 16/734,297 claims the benefit of U.S. Provisional Patent Application Ser. No. 62/788,723, filed on Jan. 4, 2019 and U.S. Provisional Patent Application Ser. No. 62/851,637, filed on May 22, 2019. The contents of U.S. patent application Ser. No. 16/734,297, U.S. Provisional Patent Application No. 62/788,723, and U.S. Provisional Patent Application No. 62/851,637 are hereby incorporated by reference.

BACKGROUND

Automatic shut off valves have been used to shut off the gas supply to a structure during an earthquake. The shutoff of the flow of gas from pipes that may be ruptured during an earthquake prevents a fire or explosion due to a gas leak caused by the earthquake.

The automatic shut off valves are typically installed in a gas flow line. The existing automatic shut off valves use mechanical mechanisms to sense the shock and vibrations of an earthquake. Some of the automatic shut off valves use a metal ball which is displaced by the force of an earthquake from its normal rest position to cause the valve to close.

Other automatic shut off valves use a pivoted flapper arm that is held in open position (i.e., out of the line of the gas flow) by a holding magnet embedded in it. When the magnetic attractive force is reduced (e.g., an electromagnet may be activated after an earthquake, which opposes the field of the holding magnet), the pivoted flapper arm swings down by gravity into the closed position and a flapper seal element seals the valve seat. The flapper arm may also be released by a ball that normally rests in a cavity above the flapper's magnet to keep the flapper up and the valve open. The ball moves away from its resting position by the force of an earthquake causing the flapper to be released to close the valve.

BRIEF DESCRIPTION OF THE DRAWINGS

The various embodiments of the present retrofit automatic seismic wave detector and valve shutoff device now will be discussed in detail with an emphasis on highlighting the advantageous features. These embodiments depict the novel and non-obvious retrofit automatic seismic wave detector and valve shutoff device shown in the accompanying drawings, which are for illustrative purposes only. These drawings include the following figures, in which like numerals indicate like parts:

FIG. 25 is a schematic front view of a client device that may include an application program for identifying the position of the rotor shaft when the valve is on or off, according to various aspects of the present disclosure;

FIG. 39 is a schematic front view of a client device that may include an application program for displaying health and status data collected by a shutoff valve on or off, according to various aspects of the present disclosure;

FIG. 64 is a schematic front view of a client device that may include an application program for displaying health and status data collected by a controller valve on or off, according to various aspects of the present disclosure.

DETAILED DESCRIPTION

Figure 1A:
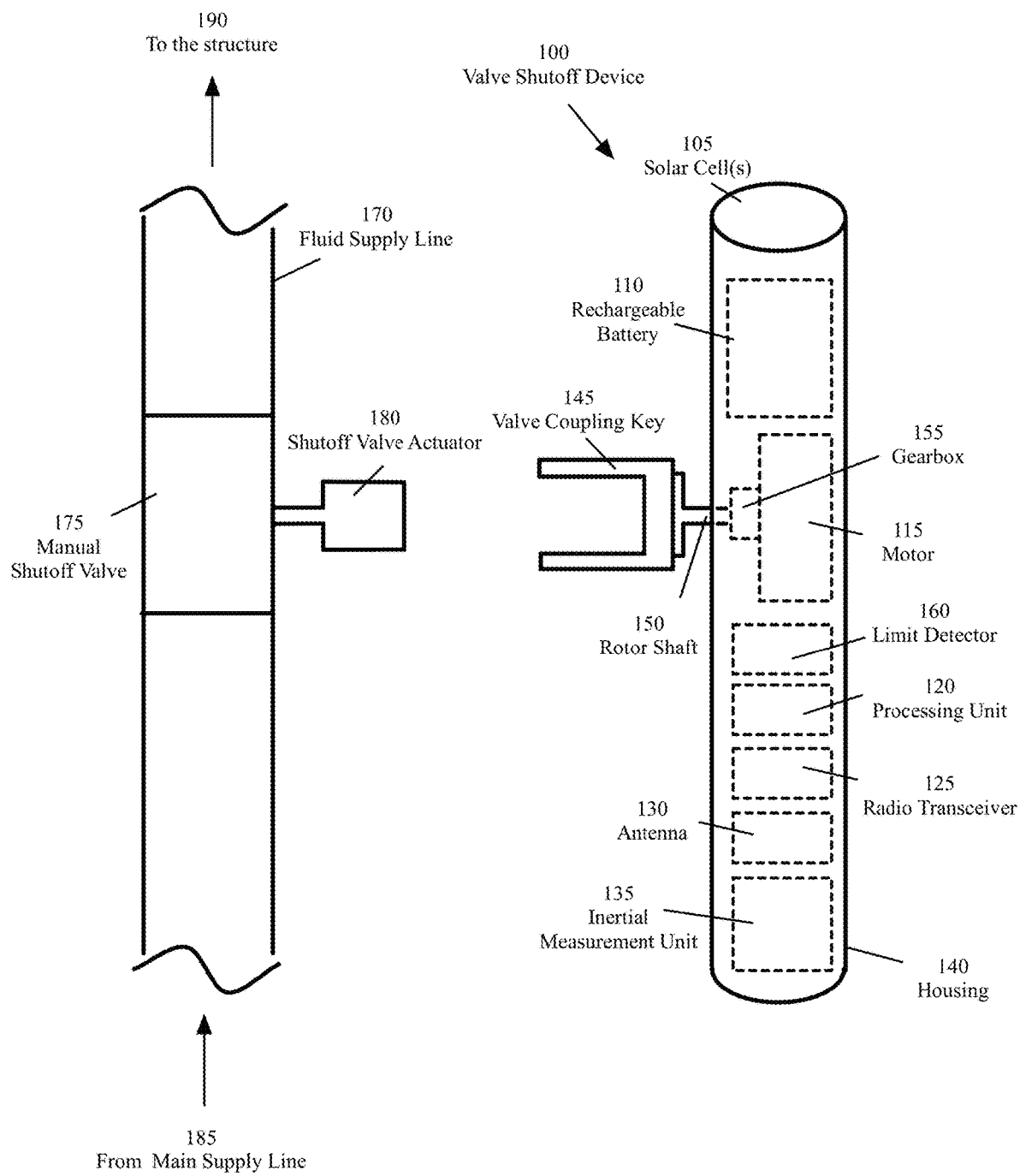
FIG. 1A is a schematic front view of an automatic valve shutoff device prior to installation on a fluid supply line's shutoff valve, according to various aspects of the present disclosure.

One aspect of the present embodiments includes the realization that the existing automatic shutoff valves use a mechanical component such as a ball or mass to detect movements related to seismic activities. Such systems require to be installed in a flat area and the ball may move due to vibration resulted from activities such as passing a vehicle or any other man-made vibrations that are unrelated to seismic activities.

The existing shutoff valves are typically installed inline to the fluid supply line and may require the expertise of an expert installer to cut the fluid pipe open and install the automatic valve shutoff device inline the fluid pipe. The use of a mechanical component to detect seismic activity may only approximately determine the intensity of the seismic waves. The exiting automatic valve shutoff devices do not include transceivers, cannot be remotely controlled, and do not provide health status and data to external devices.

The present embodiments, as described in detail below, solve the above-mentioned problems by providing an automatic valve controller device that may include one or more inertial measurement units or sensors to measure parameters related to seismic waves such as the primary, secondary, and surface waves caused by an earthquake. The valve controller device may include a processing unit to receive the measured seismic wave's parameters and use an algorithm to identify and determine the intensity of the seismic activities. The valve controller device may, therefore, determine the precise intensity of the seismic activities using the measured parameters of the seismic waves instead of using mechanical means to determine ground movements. The valve controller device, in some embodiments, may close one or more valves and/or one or more electrical circuit breakers when the valve controller device determines that the occurrence of an earthquake exceeding a certain magnitude intensity is imminent.

The algorithm, in some embodiments, may be a multistate algorithm that may determine the eminent arrival of an earthquake by detecting different types of seismic waves. The detection (or the lack of detection) of each type of seismic wave may change the state of the algorithm. The processing unit may use an algorithm that distinguishes the seismic waves from man-made vibrations. The processing unit may band filter the parameters measured by the inertial measurement unit to limit these parameters to one or more frequency bands associated with seismic waves. The processing unit, by eliminating the parameters associated with frequencies outside the seismic waves' frequency bands, eliminates the possibility of false positives caused by vibrations unrelated to the seismic activities triggering the closure of one or more shutoff valves.

In addition to, or in lieu of, using the algorithm to detect seismic waves, the valve controller device, in some embodiments, may receive information regarding the occurrence of earthquakes from one or more external electronic devices such as cloud/backend server(s). For example, the external device may be associated with the United States Geological Survey (USGS), an academic institution (e.g., a university that works together with USGS), etc., that may have access to sensors in many different areas. The external device may have detected an earthquake and may have sent signals to the valve controller devices in certain areas that may be affected by the earthquake in order for the valve controller devices to close the associated valve(s) and/or to open the associated circuit breaker(s).

In response to receiving of such signals, the controller device may turn off the valve(s) and/or the electrical circuit breaker(s) if the controller device verifies the authenticity of the external electronic device. Since the electronic signals travel faster than the seismic waves, if the server and/or the sensors that detect the earthquake are closer to the earthquake epicenter than the valve controller device, the valve controller device may receive the signal(s) from the server before the arrival of the seismic waves to the location where these valve controller device is installed.

The valve controller devices of some embodiments may, therefore, provide the technical advantage of using two separate methods of detecting earthquakes. The first method is that the valve controller device may use an algorithm to detect an earthquake. The second method is to receive a signal from a server that may have access to the sensors that may be closer to the earthquake epicenter and may have detected the occurrence of the earthquake prior to the arrival of the seismic waves to the location where the valve controller deice is installed. The first method may be useful when the valve controller device is close to the epicenter of the earthquake and/or when there may be no communication with the outside networks (e.g., either due to the damage to the communication infrastructure by the earthquake or if the valve controller device is in a remote location without a reliable connection to an outside network).

The processing unit, in some embodiments, may collect health status and data from different components of the valve controller device. The valve controller device may include a transceiver and an antenna. The processing unit may send the health and status data to one or more external devices such as one or more authorized client devices or one or more authorized cloud or backend servers. The processing unit may turn on or off the shutoff valve(s) in response to signals received from the authorized external devices. The valve controller device may, therefore, operate as an Internet of Things (IoT) device.

In some of the present embodiments, the valve controller device may be a valve shutoff device that is installed as a retrofit device to engage and automatically rotate the manual shutoff valve of a fluid supply line without a need for cutting the fluid supply line open and installing the automatic shutoff valve inside the fluid supply line. The valve shutoff device may include a motor that may rotate a rotor shaft and a coupling key that is connected to the manual shutoff valve. The processing unit may send one or more signals to start of stop the motor to rotate the rotor shaft, the coupling key, and the manual shutoff valve in order to open or close the shutoff valve.

In some of the present embodiments, the valve controller device may control one or more solenoid valves and/or one or more electrical circuit breakers. The processing unit may determine the occurrence and the intensity of different types of seismic waves and may send one or more signals to close one or more solenoid valve(s) and/or to open the circuit breaker(s). The valve controller device, in some embodiments, may control a circuit breaker with an associated relay. The valve controller device, in some embodiments, may be connected to the solenoid valves and/or the relay(s) through low voltage wires.

In the embodiments that one valve controller device is used to control only one solenoid valve, the valve controller device and the solenoid valve may be included in the same enclosure. In the embodiments that one valve controller device is used to control only relay, the valve controller device and the relay may be included in the same enclosure.

In some embodiments, the valve controller device may include a transmitter and may wirelessly send the signals to one or more valve-unit controllers that each has a receiver. Each valve-unit controller may be connected to a corresponding solenoid valve by wires (or the valve-unit controller may be incorporated in the valve). The valve-unit controller may receive the signals from the valve controller device to close the corresponding solenoid valve and may send one or more signals to the solenoid valve to close the solenoid valve.

The remaining detailed description describes the present embodiments with reference to the drawings. In the drawings, reference numbers label elements of the present embodiments. These reference numbers are reproduced below in connection with the discussion of the corresponding drawing features.

I. Retrofit Valve Shutoff Devices

Figure 1B:
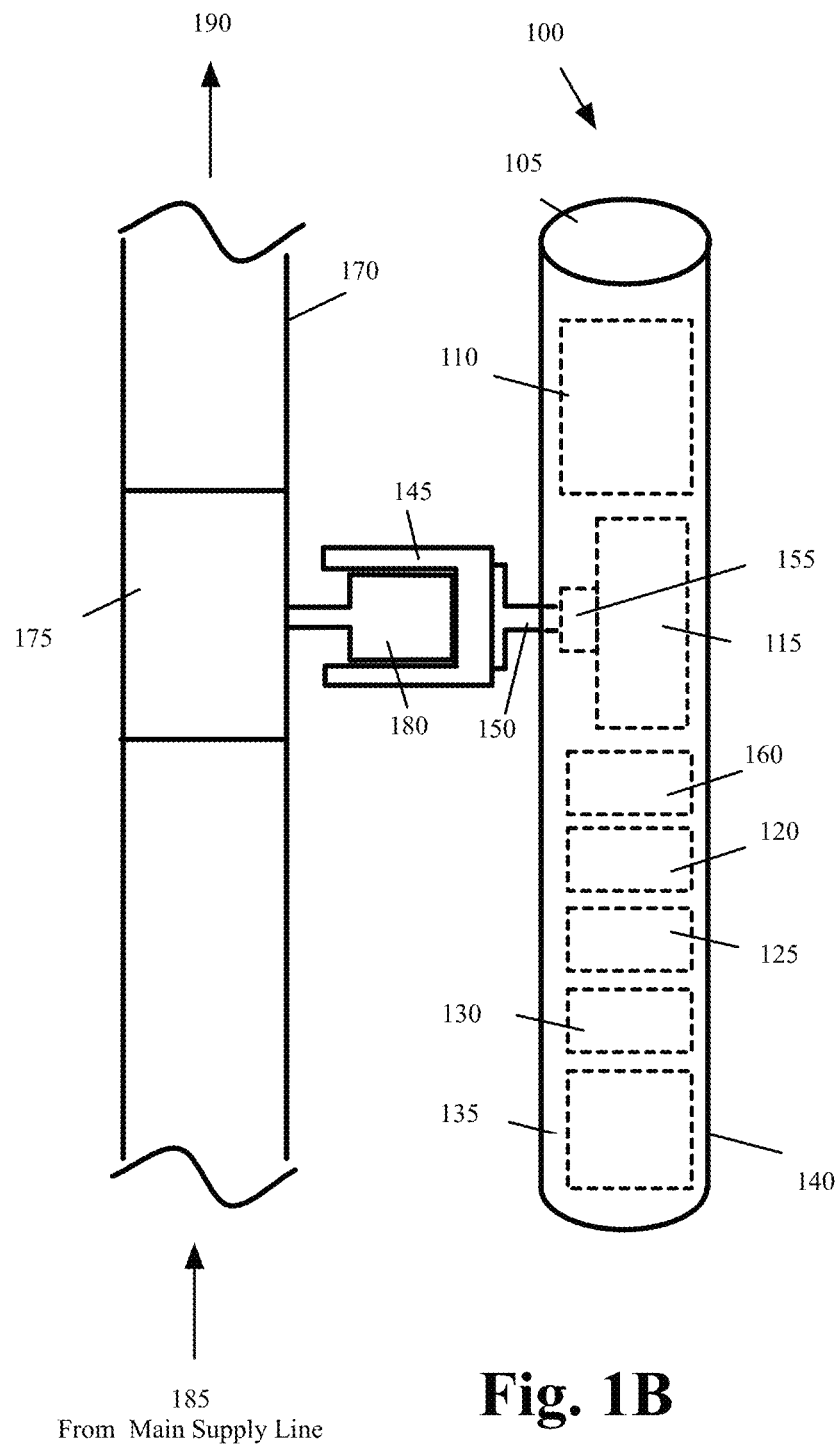
FIG. 1B is a schematic front view of the automatic valve shutoff device of FIG. 1A after installation on the fluid supply line's shutoff valve, according to various aspects of the present disclosure.

Some of the present embodiments provide an automatic valve shutoff device that is externally installed as a retrofit over an existing manual fluid supply line shutoff valve. FIG. 1A is a schematic front view of an automatic valve shutoff device prior to installation on a fluid supply line's shutoff valve, according to various aspects of the present disclosure. FIG. 1B is a schematic front view of the automatic valve shutoff device of FIG. 1A after installation on the fluid supply line's shutoff valve, according to various aspects of the present disclosure.

With reference to FIGS. 1A and 1B, the valve shutoff device 100 may include one or more solar cells 105, a rechargeable battery 110, a motor 115, a processing unit 120, a radio transceiver 125, an antenna 130, an inertial measurement unit (IMU) 135, a housing 140, a valve coupling key 145, a rotor shaft 150, a gearbox 155, and a limit detector 160. Although the motor 115, the gearbox 155, and the rotor shaft 150 are shown as separate components, in some of the present embodiments, the rotor shaft 150 and the gearbox 155 may be an integral part of the motor 115. The gearbox 155 may include one or more gears for transferring the rotational movement of the rotor shaft 150 to the valve coupling key 145.

The valve shutoff device 100 may be used as a retrofit device to automatically turn off an existing manual shutoff valve 175 of a fluid supply line 170. Examples of the fluid supply line 170 may include, without limitations, gas supply lines, liquid water supply lines, water vapor supply lines, fuel or other petroleum-derived supply lines, etc. The fluid supply line 170 may receive fluid from a main supply line (as shown by 185) and may supply the fluid (as shown by 190) to a structure such as a residential or commercial building.

The fluid supply line 170 may include a manual shutoff valve 175. The manual shutoff valve 175 may be, for example and without limitations, a ball valve or a gate valve. The manual shutoff valve 175 may include a shutoff valve actuator 180 (for example and without limitations, a lever, a handle, a handwheel, etc.) that is intended for a human to manually turn off or turn on the fluid supply through the fluid supply line. As described herein, the automatic valve shutoff device 100 of some of the present embodiments engages with the shutoff valve actuator 180 of the manual shutoff valve 175 and automatically rotates the shutoff valve actuator 180 when seismic activities exceed a threshold or when the automatic valve shutoff device 100 receives a signal from an external electronic device such as a client device or a server to turn the shutoff valve 175 on or off.

Figure 2:
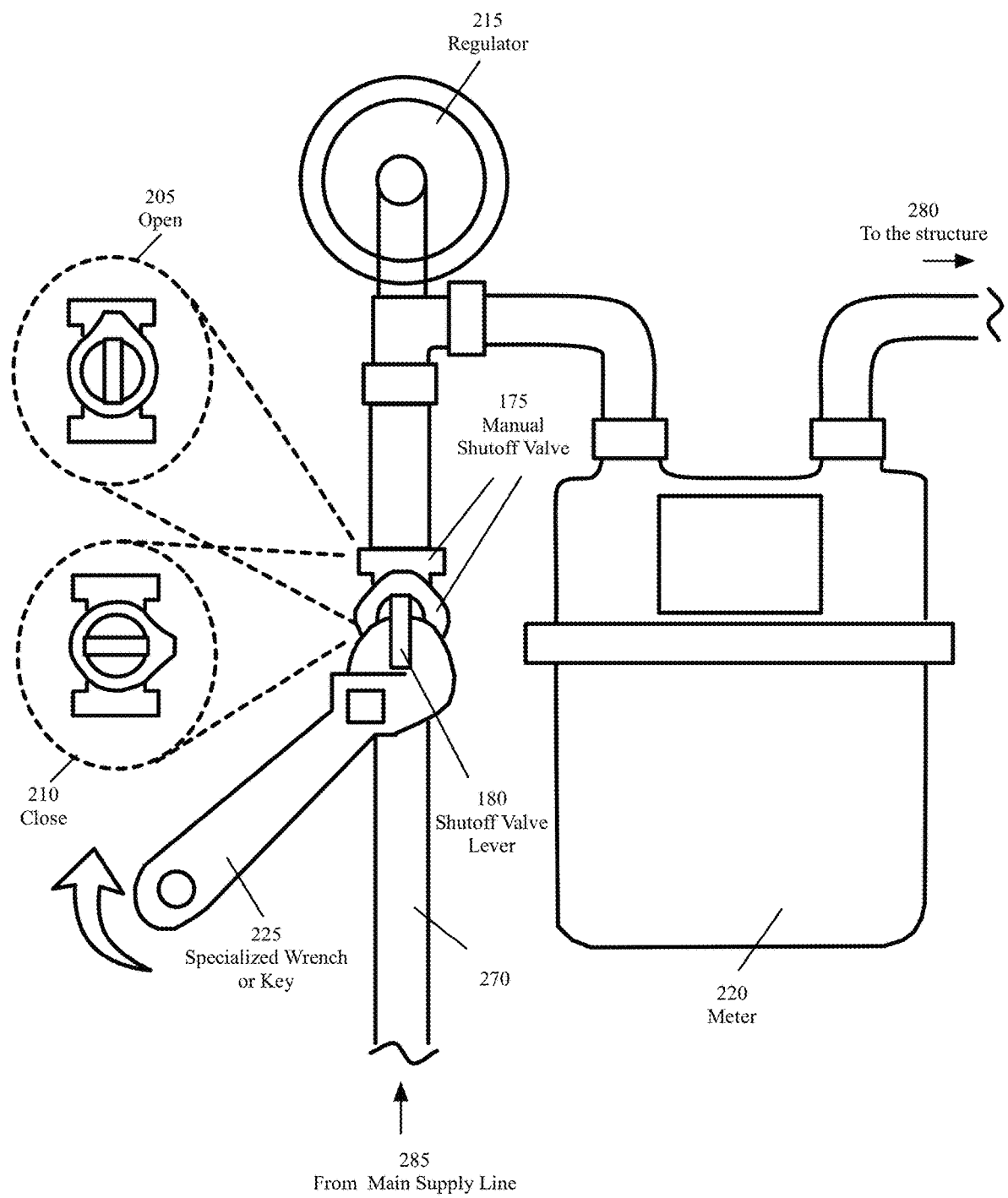
FIG. 2 is a functional diagram showing the manual closing of a gas shutoff valve, according to prior art.

FIG. 2 is a functional diagram showing the manual closing of a gas shutoff valve, according to prior art. With reference to FIG. 2, the fluid, in this example gas, is delivered through the pipe 270 from a main supply line to a structure (as shown by the arrows 285 and 280, respectively). The gas delivery system may include a meter 220 to determine the amount of gas delivered and a regulator 215 to deliver a steady flow of gas downstream from the main supply line to the structure.

With further reference to FIG. 2, the manual shutoff valve 175 includes a shutoff valve actuator 180 (in this example a lever). A specialized wrench or key 225 may be used to turn the actuator 180 by a human to close (as shown by 210) or open (as shown by 205) the manual shutoff valve 175. Some shutoff valve actuators may only turn by one quarter turn (i.e., by 90 degrees) in one direction to close the valve and by one quarter turn in the opposite direction to open the valve. Other shutoff valves may freely rotate. In either case, typically when the shutoff valve actuator 180 is parallel to the pipe 270 (as shown by 205) the gas flows through the pipe 270 and when the shutoff valve actuator 180 is perpendicular to the pipe 270 (as shown by 210) the gas stops flowing through the pipe 270. A water shutoff valve may operate similar to the gas shutoff valve of FIG. 2 or may include a gate valve with a handwheel (as described below with reference to FIG. 8) or a ball valve with a handle (as described below with reference to FIG. 10).

As described herein, in some of the present embodiments, the valve shutoff device (e.g., the valve shutoff device 100 of FIGS. 1A-1B) is installed as a retrofit device on the manual shutoff valve 175 to automatically shut off the fluid supply based on different criteria such as, for example and without limitations, detection of seismic waves, receiving a signal (or command) from a client device (e.g., a client device of a person associated with the structure that receive fluid from the fluid supply line 170), receiving a signal (or command) from a sever (e.g., a server associated with a government or business entity that provide the fluid to the fluid supply line 170 or a server associated with emergency responders such as firefighters, civil defense, etc.).

In the example of FIGS. 1A and 1B, the manual shutoff valve 175 includes a shutoff valve actuator 180 that may be turned to close the supply of the fluid in the fluid supply line 170. Example of a shutoff valve actuator 180 may include, without limitations, a lever, handle, a handwheel, etc. In some of the present embodiments, the shutoff valve actuator 180 may rotate by a limited angle (e.g., by 90 degrees from on to off or open to close and vice versa). In these embodiments, a mechanical stop may prevent the actuator 180 from turning any further. In some embodiments, the shutoff valve actuator 180 may be free rotating without a mechanical stop. For example, after each turn by 90 degrees, the actuator may turn the manual shutoff valve 175 from a position that fully closes the fluid supply to a position that fully opens the fluid supply in the fluid supply line 170.

With reference to FIG. 1B, the valve shutoff device 100 may be installed over the fluid supply line 170 such that the valve coupling key 145 is engaged with the shutoff valve actuator 180. As shown, the valve shutoff device 100 is externally installed as a retrofit without a need to cutoff the fluid supply line 170. The valve shutoff device 100 may be installed without the need to turn off the fluid supply and/or without the need to cut the fluid supply line 170.

In the example of FIGS. 1A-1B, the shutoff valve actuator 180 is a lever. In other embodiments, the shutoff valve actuator 180 may not be a lever. For example, a gate valve may have a handwheel to open and close the valve, or a ball valve may have a handle to open and close the valve. In these embodiments, the valve shutoff device 100 may have different types of valve coupling keys to match the shutoff mechanism of the manual shutoff valve. In some of the present embodiments, the valve coupling key may be replaceable to allow different types of valve coupling keys to be connected to the rotor shaft 150 in order to turn different shutoff valves actuators. Further examples of different types of valve coupling keys are described below with reference to FIGS. 7A-7C, 9A-9C, and 11A-11C.

With further reference to FIGS. 1A-1B, the rechargeable battery 110 may provide power to the motor 115, the limit detector 160, the processing unit 120, the radio transceiver 125, and/or the IMU 135. The solar cell(s) 105 may use solar or ambient light to recharge the rechargeable battery 110. In some of the present embodiments, in addition to, or in lieu of, the solar cell(s) 105, the rechargeable battery 110 may be rechargeable through a wired connection to an electric power outlet such as, without any limitations, a household electric power outlet. In these embodiments, the housing 140 may include a socket (not shown) for attaching a power plug to the valve shutoff device 100 to recharge the battery 110.

The rechargeable battery 110, in some embodiments, may be replaceable. As described below with reference to FIGS. 36-39, some embodiments may determine the health status of different components of the valve shutoff device 100, including the rechargeable battery 110, and may send one or more signals to one or more external devices.

The valve shutoff device 100 in some of the present embodiments is compatible with IoT and performs as an IoT device. The valve shutoff device 100 may receive signals and commands from external electronic devices to turn the fluid supply line's shutoff valve 175 on or off and/or to provide health status and data. The valve shutoff device 100 may provide health status and/or data on a pull basis (e.g., after receiving a request from an authorized external device) and/or on a push basis (e.g., on a periodic basis and/or after an event such as major seismic activity, a health check failure, a low battery level, etc., is detected). As described below with reference to FIG. 40, the valve shutoff device 100 may include a set of status lights and/or a display to provide the health status of different components of the valve shutoff device 100.

The motor 115 may be used to rotate the rotor shaft 150 through the gearbox 155. The motor may include, without any limitations, a continuous rotation motor or a motor with position control. Examples of a continuous rotation motor include, without limitations, a motor that, when starts rotating, requires an external signal/command to stop, a servomotor with its internal servomechanism bypassed, etc. Examples of a motor with position control include, without limitations, a servomotor with internal servomechanism, a stepper (or step) motor, etc. The motors with position control may receive one or more signals/commands to turn a rotor shaft by a specific number of turns or angular degrees and include internal circuitry to stop after the rotor shaft is turned by the specified number of turns or angular degrees.

With continued reference to FIGS. 1A-1B, the processing unit 120 may determine whether or not to rotate the rotor shaft 150 to turn the shutoff valve 175 on or off. Examples of the processing unit 120 may include, without any limitations, a processor such as a microprocessor, a controller, a microcontroller, a central processing unit or CPU, etc.

The IMU 135 may include one or more sensors. The IMU 135 may include an accelerometer (e.g., a three-dimensional (3D) accelerometer), a magnetometer (e.g., a 3D magnetometer), and/or a gyroscope (e.g., a 3D gyroscope) and may measure one or more parameters of mechanical (vibration) waves that may allow the computation of the seismic waves such as, without limitations, primary waves (P-waves), secondary waves (S-waves), and surface waves. The seismic waves may be caused, for example and without limitations, by an earthquake, an explosion, a ground movement (e.g., a landslide or an avalanche), etc.

The IMU 135, in some of the present embodiments, may include one or more micro electro-mechanical system (MEMS) sensors and may be a single chip. In other embodiments, the accelerometer and the magnetometer may be in different chips (e.g., different MEMS chips) instead of a single chip.

The IMU 135 may send the measured parameters to the processing unit 120. The processing unit 120 may use the seismic wave parameters and one or more algorithms to determine the intensity of the seismic waves. If the processing unit 120 determines that the intensity of the seismic waves is above a threshold (e.g., and without any limitations when the seismic waves are above a threshold that may be caused by an earthquake of greater than 5.2-5.4 on Richter scale that many municipalities require the gas supply to residential properties to be shutoff), the processing unit 120 may send one or more signals (or commands) to the motor 115 to rotate the rotor shaft 150 (e.g., through the gearbox 155) to turn the valve coupling key 145 that is engaged with the shutoff valve actuator 180 (as shown in FIG. 1B) in order to close the shutoff valve 175.

The processing unit 120 may use other criteria to close/turn off/shutoff (or open/turn on) the manual shutoff valve 175. For example, the radio transceiver 125 may receive one or more signals (or commands) through the antenna 130 from an external electronic device such a client device or a server to close (or open) the manual shutoff valve 175. The radio transceiver 125 may send the signal(s)/command(s) to the processing unit 120. The processing unit 120, in some of the present embodiments, may determine whether the sender of the signal(s)/command(s) is authorized to request the shutoff valve 175 to be closed (or opened). When the processing unit 120 determines that the sender is authorized, the processing unit 120 may send one or more signals/commands to the motor 115 to rotate the rotor shaft 150.

The limit detector 160 is a sensor that may provide a feedback to the processing unit 120 to determine whether the shutoff valve 175 is closed (or opened). The examples of the limit detector may include, without any limitations, a force or torque sensor external to the motor, a sensor for measuring the electric current used by the motor, a rotary position encoder sensor such as an optical or a magnetic position encoder. Servomotors may include an internal servomechanism (or sensor), such as a potentiometer, that may function as a limit detector.

With further reference to FIGS. 1A-1B, the radio transceiver 125 and the antenna 130 may receive data, commands, signals, and/or requests for status and data from electronic devices external to the valve shutoff device 100 and may pass the received data, commands, signals, and/or requests for status and data to the processing unit 120. The radio transceiver 125 and the antenna 130 may receive status and data from the processing unit and may transmit them to one or more electronic devices external to the valve shutoff device 100.

The radio transceiver 125 may be a cellular radio transceiver, a Bluetooth transceiver, a Bluetooth low energy (BLE) transceiver, an RFID transceiver, a Wi-Fi transceiver, etc. Although the example of FIGS. 1A-1B shows the processing unit 120, the radio transceiver 125, and the antenna 130 as separate units, in some of the present embodiments, the processing unit 120, the radio transceiver 125, and the antenna 130 may be on a single "system on a chip" integrated circuit (IC). In some of the present embodiments, the processing unit 120, the radio transceiver 125, the antenna 13, and the IMU (e.g., the accelerometer, the magnetometer, and/or the gyroscope) may be a single "system in package" (SIP). The SIP may include one or more ICs enclosed in a single carrier package. One or more of the ICs may include firmware to perform computationally intensive operations, such as coordinate rotation operations, using one or more predefined functions.

In some of the present embodiments, the processing unit 120 may receive and/or store data and health status from different components of the valve shutoff device 100. For example, and without any limitations, the processing unit 120 may receive the current position of the shutoff valve 180 (e.g., open, close, partially open, etc.), the level of voltage generated by the battery 110, the health status of the IMU 135, the health status of the radio transceiver 125, the health status of the limit detector 160, the health status of the solar cell(s) 105, etc. The processing unit 120 may transmit the data and the health status through the radio transceiver 125 to one or more external devices either upon request or as a push transfer.

In some of the present embodiments, the valve shutoff device 100 may include a GPS component (not shown). The GPS may be used to determine the location of the valve shutoff device and may be sent to one or more electronic devices, for example, along with the measurements of the seismic activities.

The valve shutoff device 100 may include a housing 140 with a hollow interior to cover, for example, one or more of the rechargeable battery 100, the motor 115, the gearbox 155, the limit detector 160, the processing unit 120, the radio transceiver 125, the IMU 135, etc. The housing 140 may be weatherproof or weather resistant to protect the components inside. The housing may be made of material such as, without any limitations, polyvinyl chloride (PVC), vinyl, plastic, metal, etc. The housing, in some of the present embodiments, may be in the shape of a pipe or a cylinder. The housing, in some of the present embodiments, may have one or more flat sides, may have an arbitrary shape, etc.

Figure 3:
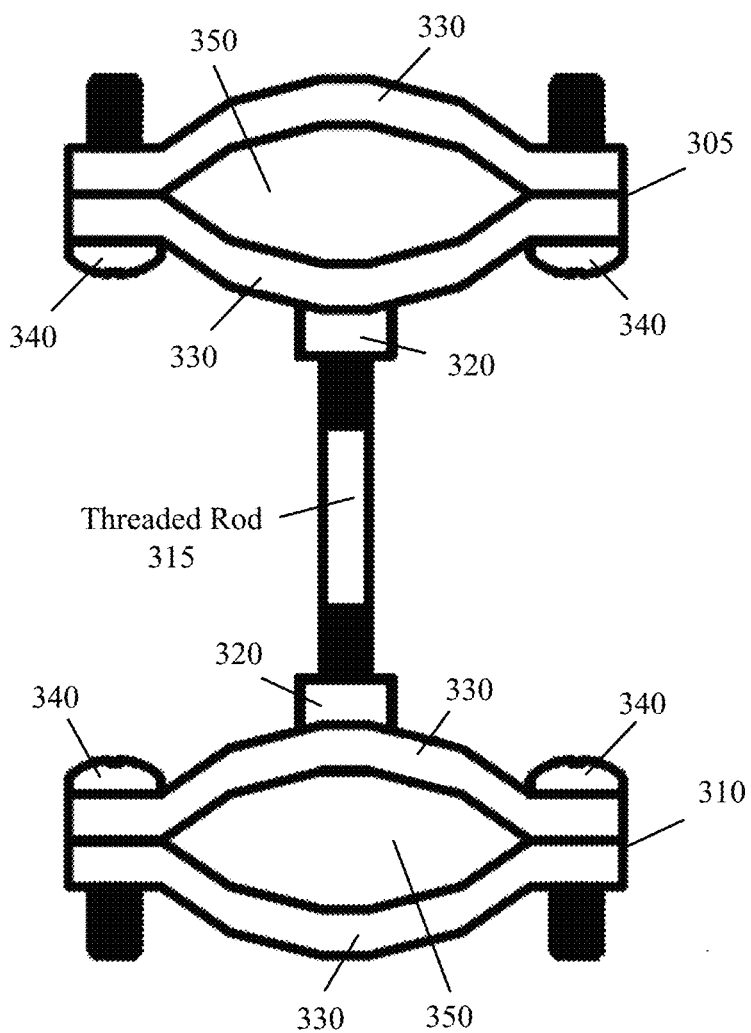
FIG. 3 is a schematic front view of a pair of clamps that are used to tie an automatic valve shutoff device as a retrofit on a fluid supply line, according to various aspects of the present disclosure.

Different embodiments may use different methods to attach/tie the valve shutoff device 100 to the fluid supply line 170 in order to keep the valve coupling key 145 engaged with the shutoff valve actuator 180. Some embodiments may use one or more clamps to tie the valve shutoff device 100 and the fluid supply line 170 together. FIG. 3 is a schematic front view of a pair of clamps that are used to tie an automatic valve shutoff device as a retrofit on a fluid supply line, according to various aspects of the present disclosure. With reference to FIG. 3, the two clamps 305 and 310 may be connected together by a threaded rod 315.

Each clamp 305 and 310 may include a threaded section 320 that may get engaged with the threaded rod 315. The distance between the clamps 305 and 310 may be adjusted by rotating one or both of the clamps 305 and 310 around the threaded rod 315. Each clamp 305 and 310 may have a pair of jaws 330. The open space 350 between the jaws 330 may be adjusted by a pair of bolts 340.

Figure 4:
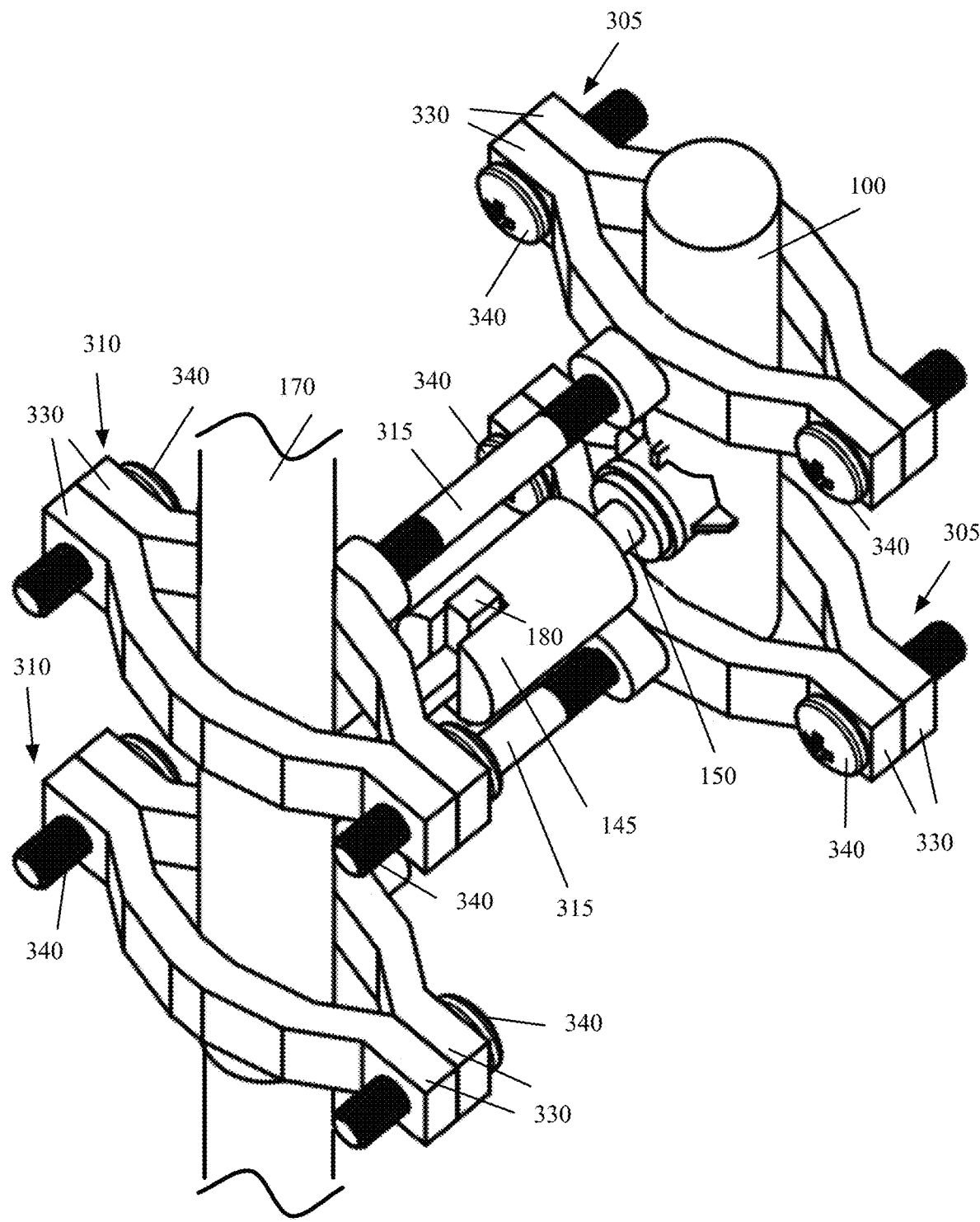
FIG. 4 is a perspective view of an automatic valve shutoff device that is connected, as a retrofit, by several clamps to a fluid supply line, according to various aspects of the present disclosure.

FIG. 4 is a perspective view of an automatic valve shutoff device that is connected, as a retrofit, by several clamps to a fluid supply line, according to various aspects of the present disclosure. With reference to FIG. 4, the valve shutoff device 100 may be installed over the fluid supply line 170 such that the valve coupling key 145 is engaged with the shutoff valve actuator 180.

The threaded rods 315 may be used, as described above with reference to FIG. 3, to adjust the distance between each pair of clamps 305 and 310 prior to the installation of the valve shutoff device 100. The bolts 340 may be used to adjust the space between the jaws 330 in order to tighten the grip of the clamps 305 and 310 around the valve shutoff device 100 and the fluid supply line 170, respectively.

Figure 5:
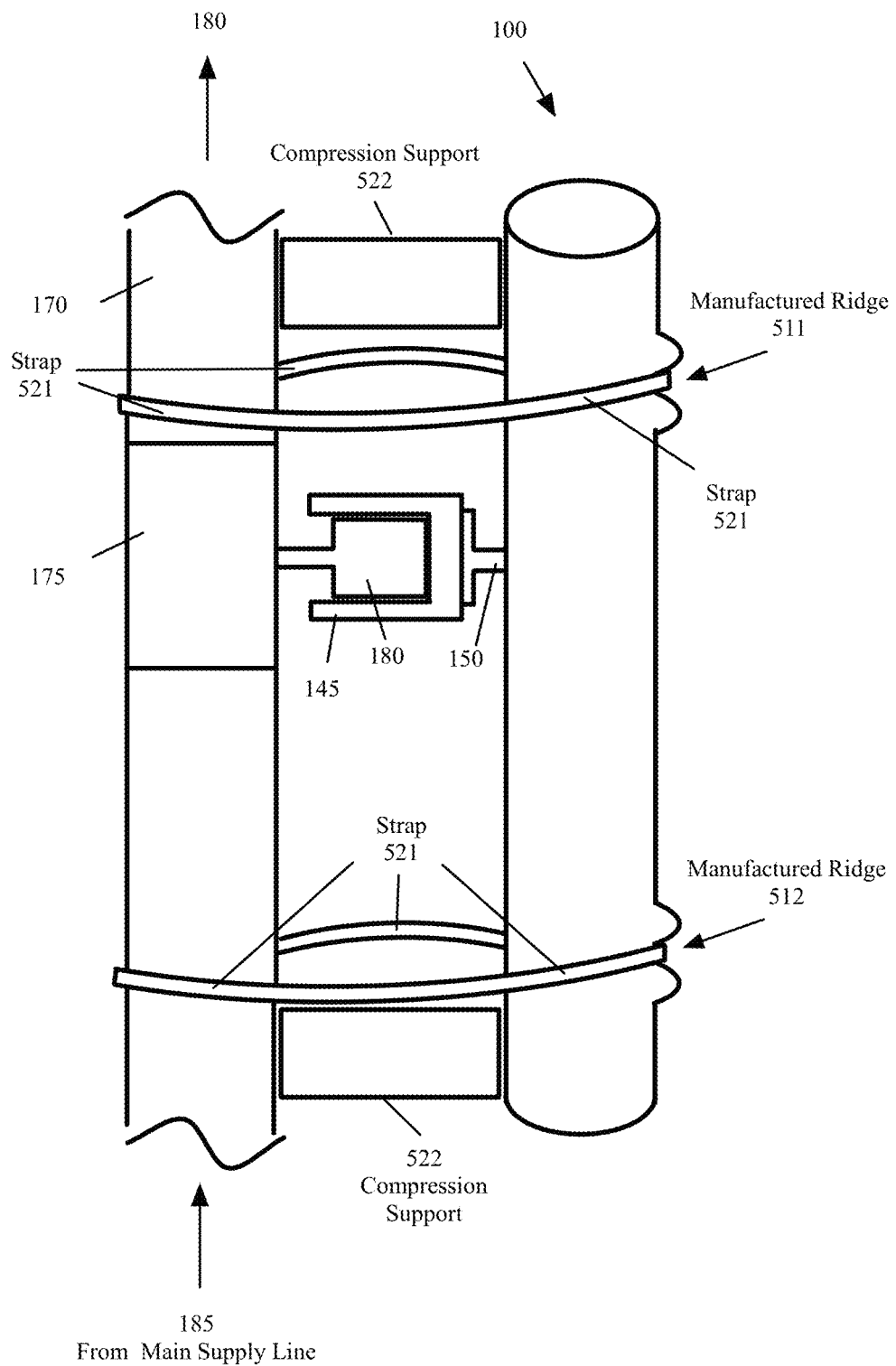
FIG. 5 is a schematic front view of an automatic valve shutoff device that is installed and tied as a retrofit on a fluid supply line, according to various aspects of the present disclosure.

FIG. 5 is a schematic front view of an automatic valve shutoff device that is installed and tied as a retrofit on a fluid supply line, according to various aspects of the present disclosure. With reference to FIG. 5, the valve shutoff device 100 may be installed over the fluid supply line 170 such that the valve coupling key 145 is engaged with the shutoff valve actuator 180.

The valve shutoff device 100 may be tied to the fluid supply line 170 with one or more straps (e.g., steel or other types of metal cables, metal wires, plastic, nylon, leather, etc.) 521. The strap 521, in some embodiments, may be a cable tie (or a zip tie) with teeth that engages with a pawl to form a ratchet such that when the free end of the cable tie is pulled, the cable tie tightens and does not come undone. The straps 521, in some embodiments, may be a cable or a wire. Some of the present embodiments may include one or more compression supports 522 between the valve shutoff device 100 and the fluid supply line 170. The compression supports 522 in some embodiments are rigid bodies that may keep the valve shutoff device 100 and the fluid supply line 170 separated at a desired distance. In some aspects of the present embodiments, the compression supports' length may be adjustable.

As shown in the examples of FIGS. 4 and 5, the valve shutoff device 100 may be installed as a retrofit without a need to cutoff the fluid supply line 170. The valve shutoff device 100 may be installed by a consumer without the need for a specialist to turn off the fluid supply and/or without the need to cut the fluid supply line 170.

Figure 6A:
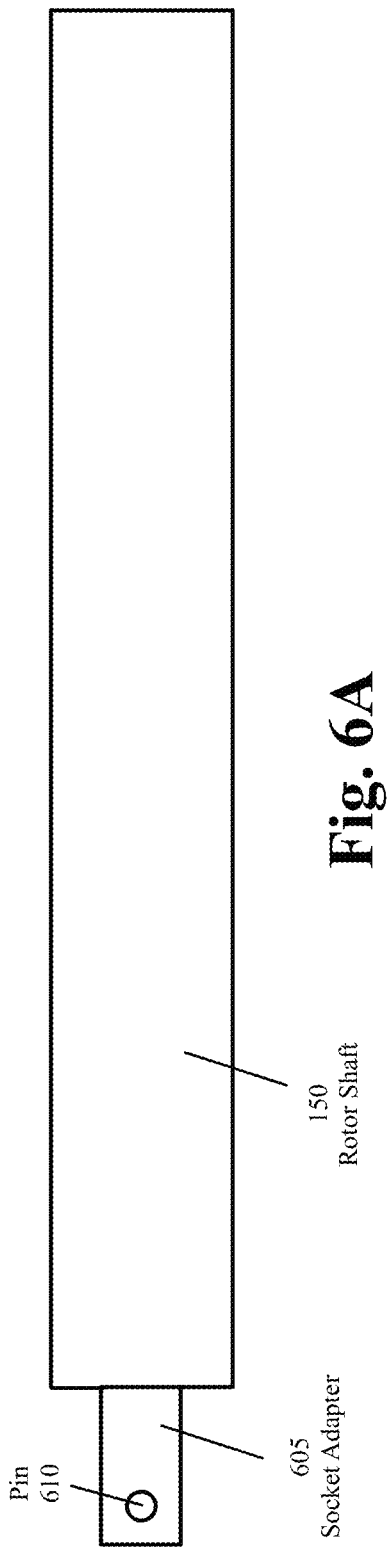
FIG. 6A is a schematic side view of the rotor shaft of a valve shutoff device, according to various aspects of the present disclosure.
Figure 6B:
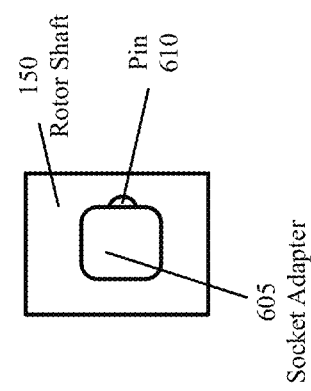
FIG. 6B is a schematic front view of the rotor shaft of FIG. 6A, according to various aspects of the present disclosure.

In some of the present embodiments, the rotor shaft 150 may have a socket adapter in order to fit into a socket at the base of the valve coupling key 145. FIG. 6A is a schematic side view of the rotor shaft of a valve shutoff device, according to various aspects of the present disclosure. FIG. 6B is a schematic front view of the rotor shaft of FIG. 6A, according to various aspects of the present disclosure.

With reference to FIGS. 6A-6B, the rotor shaft 150 may have a socket adapter 605 at one end in order to fit into a socket of different replaceable valve coupling keys as described below with reference to FIGS. 7A-7C, 9A-9C, and 11A-11C. The socket adapter 605 may have a spring action pin 610 to secure the socket adapter 605 into the socket of a valve coupling key.

Figure 7A:
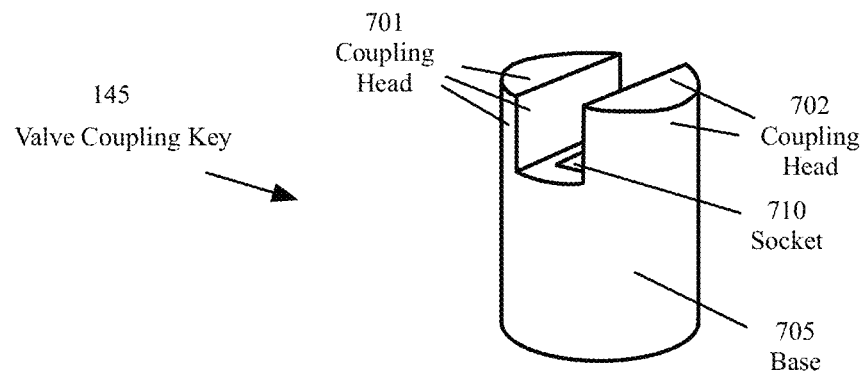
FIG. 7A is a perspective view of a valve coupling key, according to various aspects of the present disclosure.
Figure 7B:
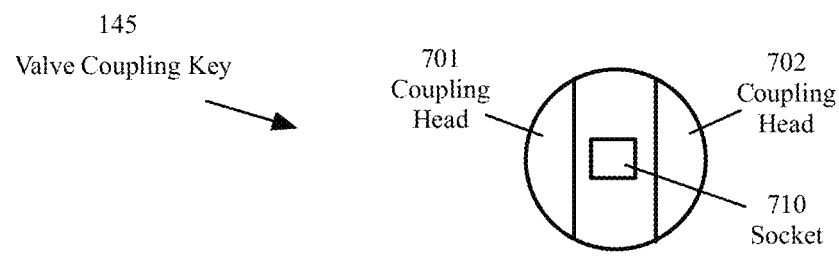
FIG. 7B is a schematic top view of the valve coupling key of FIG. 7A, according to various aspects of the present disclosure.
Figure 7C:
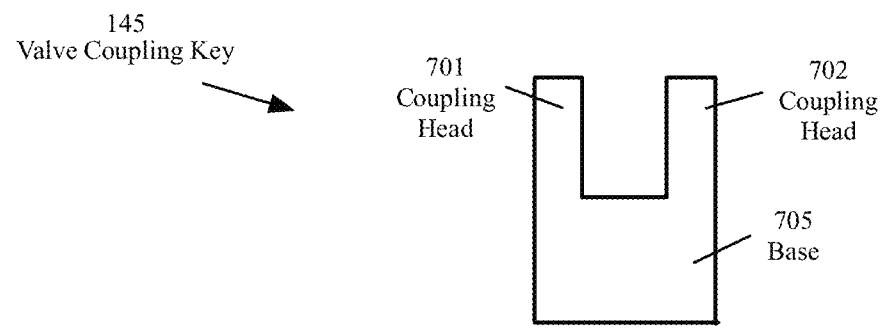
FIG. 7C is a schematic front view of the valve coupling key of FIG. 7A, according to various aspects of the present disclosure.

FIG. 7A is a perspective view of a valve coupling key, according to various aspects of the present disclosure. FIG. 7B is a schematic top view of the valve coupling key of FIG. 7A, according to various aspects of the present disclosure. FIG. 7C is a schematic front view of the valve coupling key of FIG. 7A, according to various aspects of the present disclosure.

With reference to FIGS. 7A-7C, the valve coupling key 145 may include the coupling heads 701 and 702 that protrude from a base 705. The coupling heads 701 and 702 may be made to have different shapes and sizes and the distance between the coupling heads 701 and 702 may be adjusted at manufacture time to match the shutoff valve actuators for different applications. The socket 710 may be used to attach the valve coupling key 700 to the socket adapter 605 (FIG. 6) at the end of the rotor shaft 150.

Figure 10:
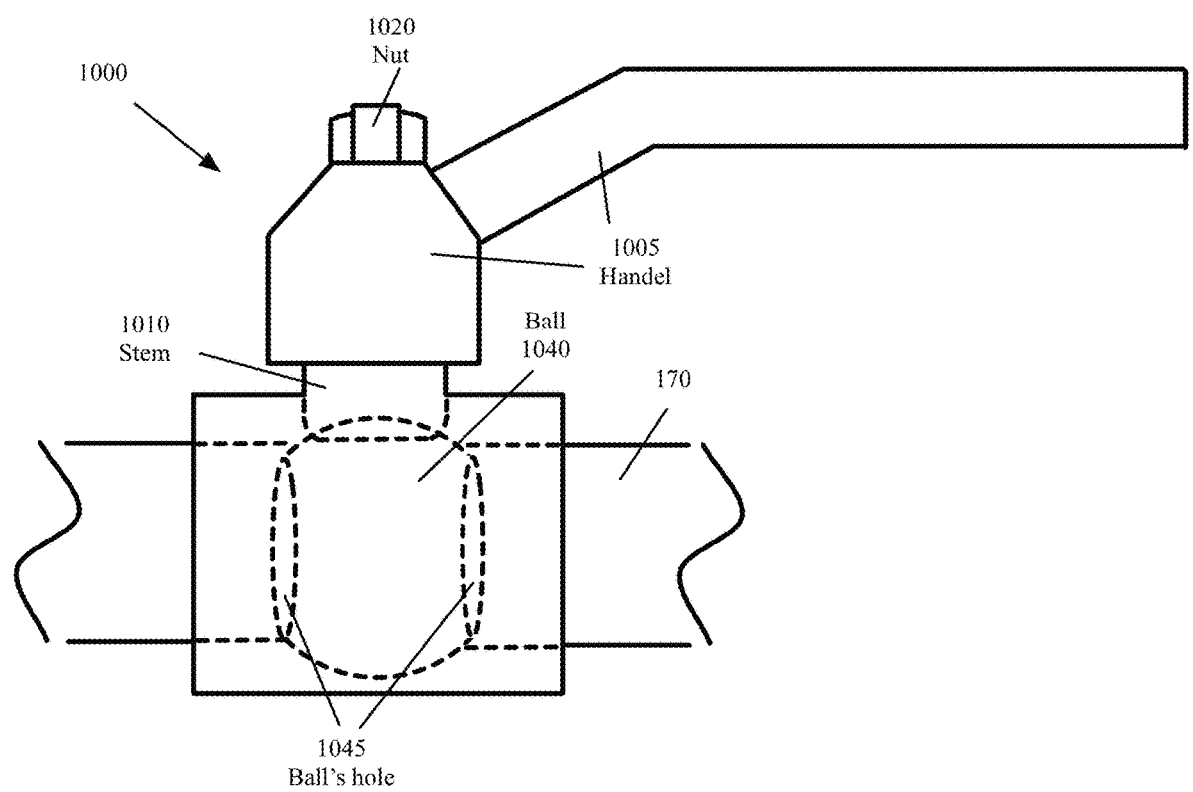
FIG. 10 is a schematic front view of a ball valve that includes a handle for opening and closing of the valve, according to prior art.

In the example of FIGS. 7A-7C, the coupling heads 701 and 702 may be designed to engage the shutoff valve actuator 180 of FIGS. 1A-1B, and 2-5. These examples show that the manual shutoff valve 175 on the fluid supply line includes a shutoff valve lever to open or close the flow of the fluid in the fluid supply line 170. As shown in the examples of FIGS. 8 and 10, other manual shutoff valves may include other mechanisms for opening or closing the flow of the fluid in the fluid supply line.

Figure 8:
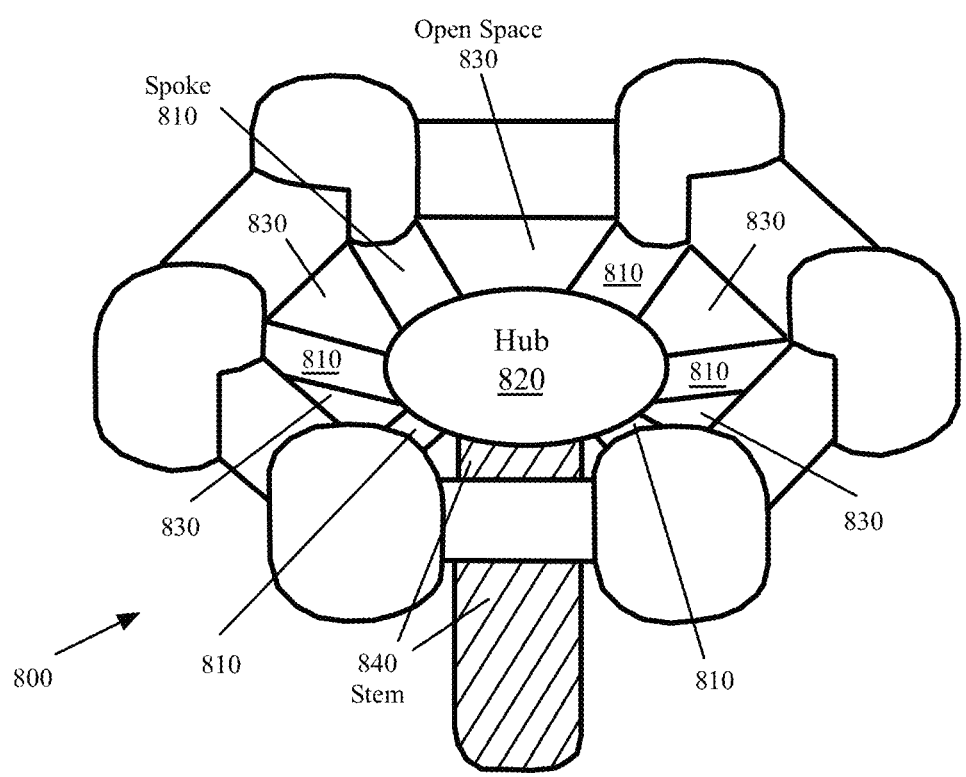
FIG. 8 is a perspective view of a portion of a gate valve's handwheel, according to prior art.

FIG. 8 is a perspective view of a gate valve's handwheel, according to prior art. With reference to FIG. 8, the gate valve handwheel 800 includes several spokes 810 that are connected to a hub (or wheel) 820. The hub 820 may be connected to the stem 840. There are several open spaces 830 between the spokes 810. The gate valve handwheel 800 may be used, for example and without any limitations, to open or close the flow of a liquid such as water or petroleum-based liquid in a supply line.

Figure 9A:
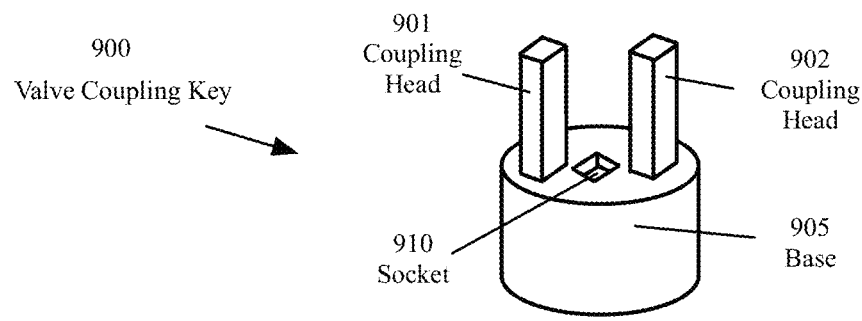
FIG. 9A is a perspective view of a valve coupling key that may be used to rotate a handwheel of a gate valve, according to various aspects of the present disclosure.
Figure 9B:
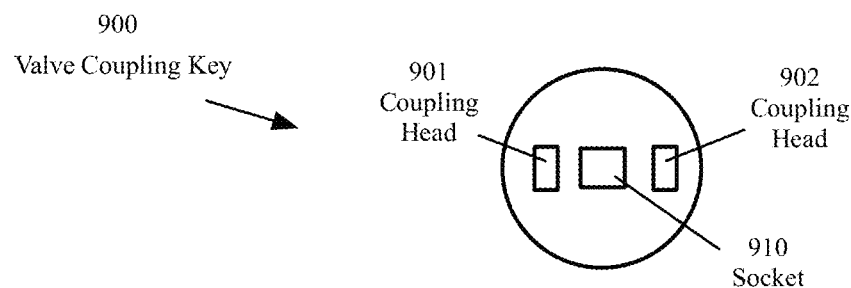
FIG. 9B is a schematic top view of the valve coupling key of FIG. 9A, according to various aspects of the present disclosure.
Figure 9C:
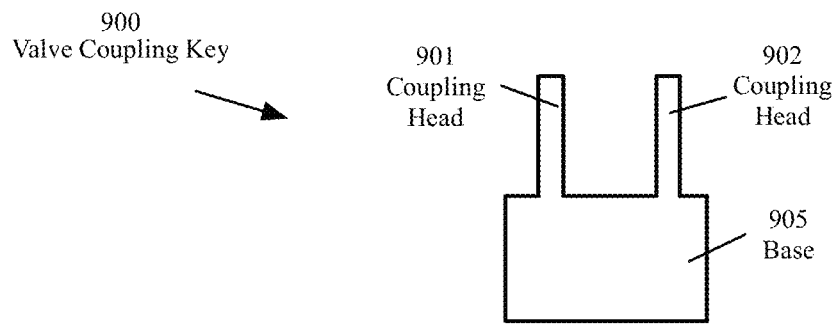
FIG. 9C is a schematic front view of the valve coupling key of FIG. 9A, according to various aspects of the present disclosure.

FIG. 9A is a perspective view of a valve coupling key that may be used to rotate a handwheel of a gate valve, according to various aspects of the present disclosure. FIG. 9B is a schematic top view of the valve coupling key of FIG. 9A, according to various aspects of the present disclosure. FIG. 9C is a schematic front view of the valve coupling key of FIG. 9A, according to various aspects of the present disclosure.

With reference to FIGS. 9A-9C, the valve coupling key 900 may be used to automatically rotate a handwheel such as the handwheel 800 of FIG. 8. The valve coupling key 900 may, for example, be attached to the rotor shaft 150 of FIGS. 1A-1B, and 2-5, instead of the valve coupling key 145, to engage the handwheel 800 of a gate shutoff valve.

With further reference to FIGS. 9A-9C, the valve coupling key 900 may include the coupling heads 901 and 902 that protrude from a base 905. The coupling heads 901 and 902 may be made to have different shapes and sizes and the distance between the coupling heads 901 and 902 may be adjusted at manufacture time to match the open spaces 830 between the spokes 810 of the handwheel 800 of FIG. 8. The valve coupling key 900 may have any number of coupling heads 901 (e.g., 1, 2, 3, 4, etc.) to match the open spaces between the spokes of different handwheels. The socket 910 may be used to attach the valve coupling key 900 to the socket adapter 605 (FIG. 6) at the end of the rotor shaft 150.

FIG. 10 is a schematic front view of a ball valve that includes a handle for opening and closing the valve, according to prior art. With reference to FIG. 10, the ball valve 1000 includes a handle 1305 that is used to rotate the stem 1010 to open or close the flow of fluid in the fluid supply line 170. The handle 1005 may be connected to the stem 1010 by a nut 1020.

The stem 1010 is connected to a ball 1040, which has a hole 1050. The valve 1000 is open and the fluid may flow in the fluid supply line 170 when the ball's hole 1050 is in line with the flow. The valve 1000 is closed when the handle 1005 is rotated such that the ball's hole is not facing the flow.

In the example of FIG. 10, the ball's hole is facing the flow and the valve 1000 is open. The ball valve 1000 is typically open when the handle is parallel to the fluid supply line 170 (as shown in FIG. 10) and is closed when the handle is perpendicular to the fluid supply line 170. The ball valve 1000 may be used, for example and without any limitations, to open or close the flow of a fluid such as water or gas in a fluid supply line.

Figure 11A:
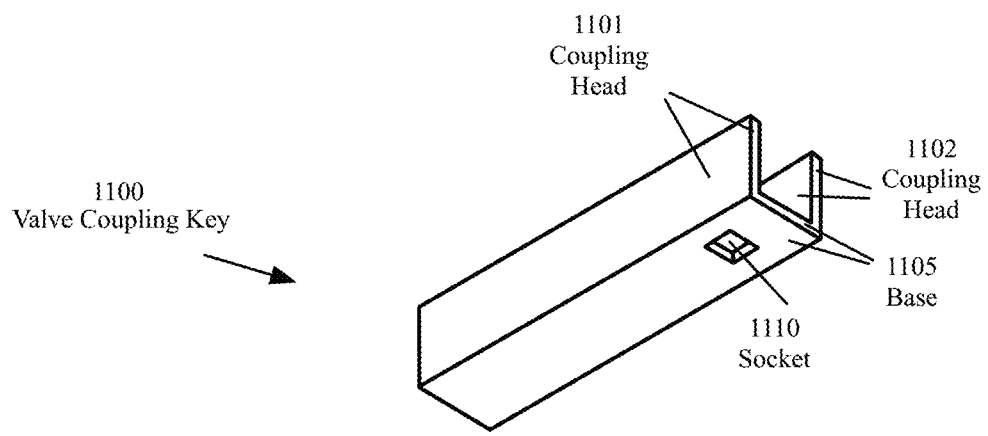
FIG. 11A is a perspective view of a valve coupling key that may be used to rotate the handle of a ball valve, according to various aspects of the present disclosure.
Figure 11B:
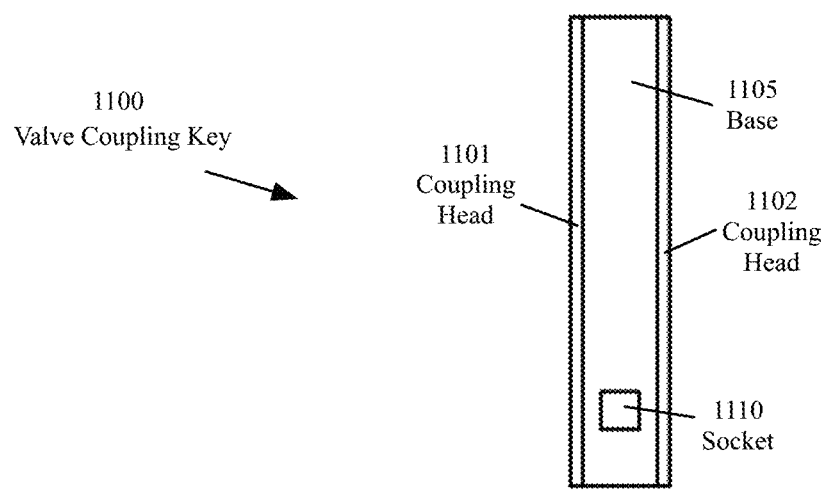
FIG. 11B is a schematic top view of the valve coupling key of FIG. 11A, according to various aspects of the present disclosure.
Figure 11C:
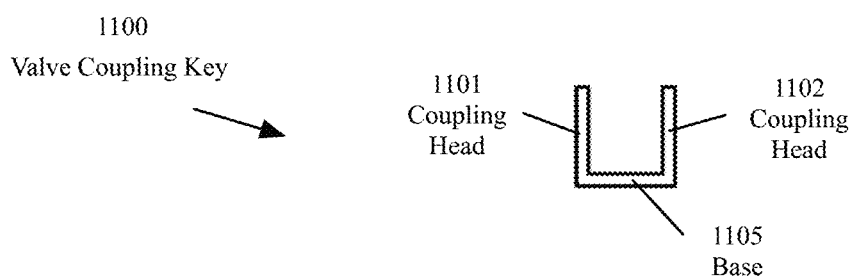
FIG. 11C is a schematic front view of the valve coupling key of FIG. 11A, according to various aspects of the present disclosure.

FIG. 11A is a perspective view of a valve coupling key that may be used to rotate the handle of a ball valve, according to various aspects of the present disclosure. FIG. 11B is a schematic top view of the valve coupling key of FIG. 11A, according to various aspects of the present disclosure. FIG. 11C is a schematic front view of the valve coupling key of FIG. 11A, according to various aspects of the present disclosure.

With reference to FIGS. 11A-11C, the valve coupling key 1100 may be used to automatically rotate the handle 1005 of the ball valve 1000 of FIG. 10. The valve coupling key 1100 may, for example, be attached to the rotor shaft 150 of FIGS. 1A-1B, and 2-5, instead of the valve coupling key 145, to engage the handle 1005 of the shutoff valve 1000.

With further reference to FIGS. 11A-11C, the valve coupling key 1100 may include the coupling heads 1101 and 1102 that protrude from a base 1105. The distance between the coupling heads 1101 and 1102 may be adjusted at manufacture time to match the handle 1005 of a ball valve such as the ball valve 1000 of FIG. 10. The socket 1110 may be used to attach the valve coupling key 1100 to the socket adapter 605 (FIG. 6) at the end of the rotor shaft 150.

Different embodiments may use different types of motors, limit detectors, and/or valve coupling keys to open and close different types of shutoff valves. Several examples of these components are described below. The invention is, however, not limited to the specific combination of components described in the following examples.

Figure 12A:
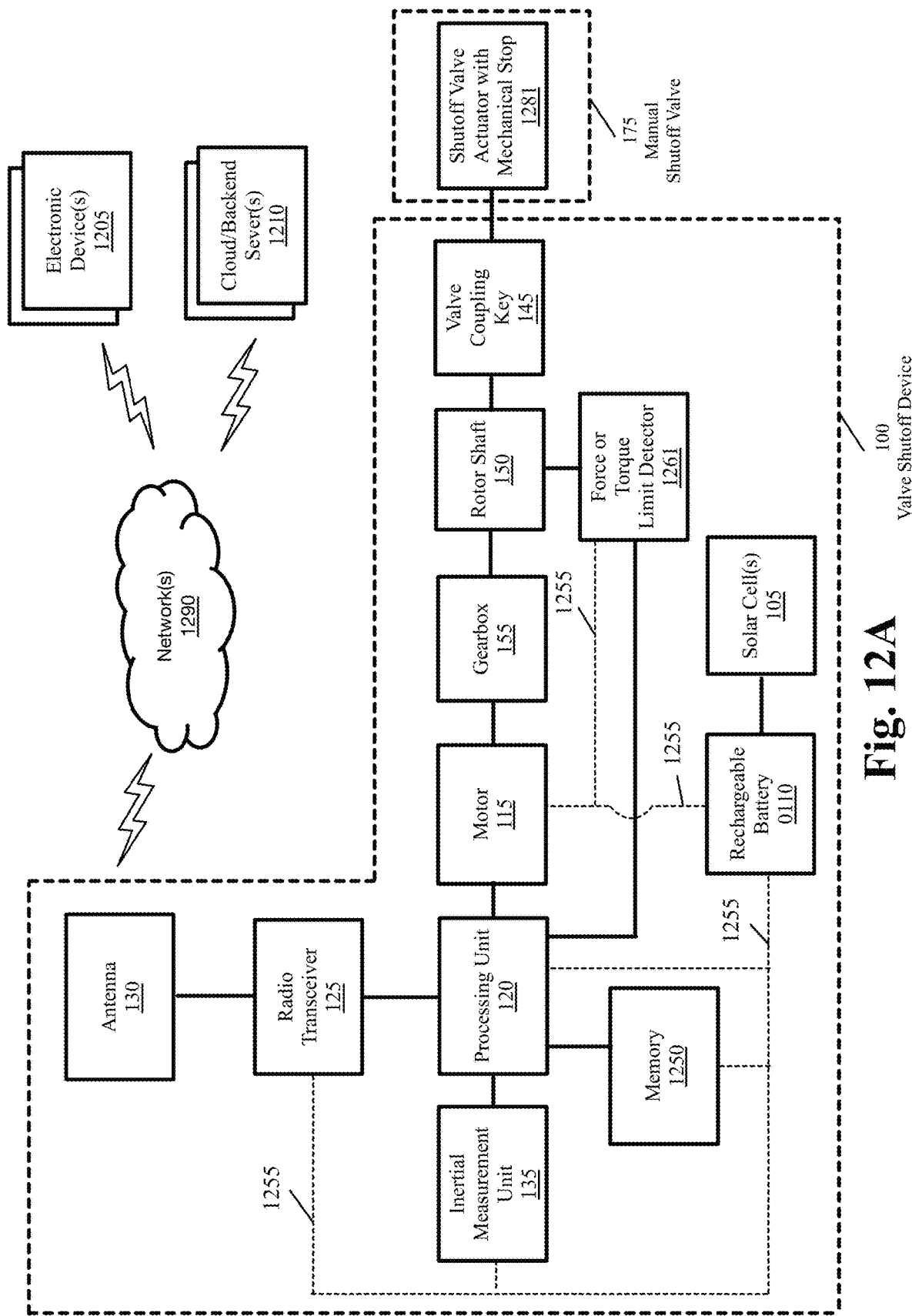
FIG. 12A is a functional block diagram illustrating an example system for an automatic valve shutoff device that includes a force or torque limit detector, according to various aspects of the present disclosure.

FIG. 12A is a functional block diagram illustrating an example system for an automatic valve shutoff device that includes a force or torque limit detector, according to various aspects of the present disclosure. With reference to FIG. 12A, the valve shutoff device 100 may be similar to the valve shutoff device 100 of FIGS. 1A and 1B and may include a rechargeable battery 110, one or more solar cell(s) 105, a motor 115, a processing unit 120, a radio transceiver 125, an antenna 130, an IMU 135, a valve coupling key 145, a coupling shaft 150, a gearbox 155, a valve coupling key 145, and a limit detector 1261.

The manual shutoff valve 175 may be similar to the shutoff valve 175 of FIGS. 1A and 1B and may include a shutoff valve actuator 1281 with mechanical stop. The mechanical stop may prevent the shutoff valve actuator 1281 to freely rotate around a center and may stop the actuator from rotating after a certain numbers (or a certain fraction) of a turn. For example, the mechanical stop may allow the shutoff valve actuator 1281 to only make a quarter turn (or 90 degrees) in one direction to open and to make a quarter turn (or 90 degrees) in the opposite direction to close.

The rechargeable battery 110 may be recharged, in addition to, or in lieu of, the solar cell(s) 105 from a wired connection (not shown). Although FIG. 12A and several other examples in the present disclosure shows only one rechargeable battery 110, some of the present embodiments may include several rechargeable batteries 110. The rechargeable battery 110 may provide electrical power (as shown by lines 1255) to different components of the automatic valve shutoff device 100.

With further reference to FIG. 12A, the processing unit 120 may determine whether or not to rotate the rotor shaft 150 to close or open the shutoff valve 175 based on feedbacks from the IMU 135 and/or based on one or more signals (or commands) from one or more electronic devices 1205 and/or cloud/backend servers 1210. The IMU 135 may measure one or more parameters of seismic waves such as, without limitations, primary waves (P-waves), secondary waves (S-waves), and surface waves.

The IMU 135 may send the measured parameters to the processing unit 120. The processing unit 120 may use the seismic wave parameters and one or more algorithms to determine the intensity of the seismic waves. If the processing unit 120 determines that the intensity of the seismic waves is above a threshold, the processing unit 120 may send one or more signals (or commands) to the motor 115 to rotate the rotor shaft 150 (e.g., through the gearbox 155) to turn the valve coupling key 145 that is engaged with the shutoff valve actuator 780 in order to close the shutoff valve 175.

The processing unit 120 may receive one or more signals (or commands) through the antenna 130 from one or more electronic devices 1205 and/or one or more cloud/backend servers 1210 to close (or open) the manual shutoff valve 175. The electronic device(s) may be client device(s) of person(s) associated with the valve shutoff device 100. The cloud or backend server(s) 1210 may be computing devices associated with one or more government agencies and/or utility companies such as, without limitations, firefighting departments, civil defense, gas companies, water companies, etc. The electronic device(s) 1205 and the cloud/backend server(s) 130 may communicate with the valve shutoff device 100 through one or more networks 1290 such as the Internet, the cellular network, etc. The processing unit 120 may send one or more signals (or commands) to the motor 115 to rotate the rotor shaft 150 after the processing unit 120 determines that the requesting electronic device(s) and/or server(s) has/have authorization to request the shutoff valve to be opened or closed.

Regardless of whether the processing unit 120 starts the motor 115 based on the analysis of seismic waves parameters or in response to receiving signals or commands from external devices, the processing unit 120 may need to know whether the shutoff valve actuator 1281 is stopped by the mechanical stop (e.g., after the valve is opened or closed), in order to send another set of commands (or signals) to the motor 115 to stop. One indication that may be used by the processing unit 120 is the amount of force (or torque) excreted by the motor to the rotor shaft 150. When the shutoff valve actuator 1281 is stopped by the mechanical stop, the force (or torque) excreted by the motor increases. The processing unit 120 may compare the force (or torque) excreted by the motor with a threshold to determine whether the shutoff valve actuator 1281 is stopped by the mechanical stop and the motor is to be stopped.

Figures 13A, 13B:
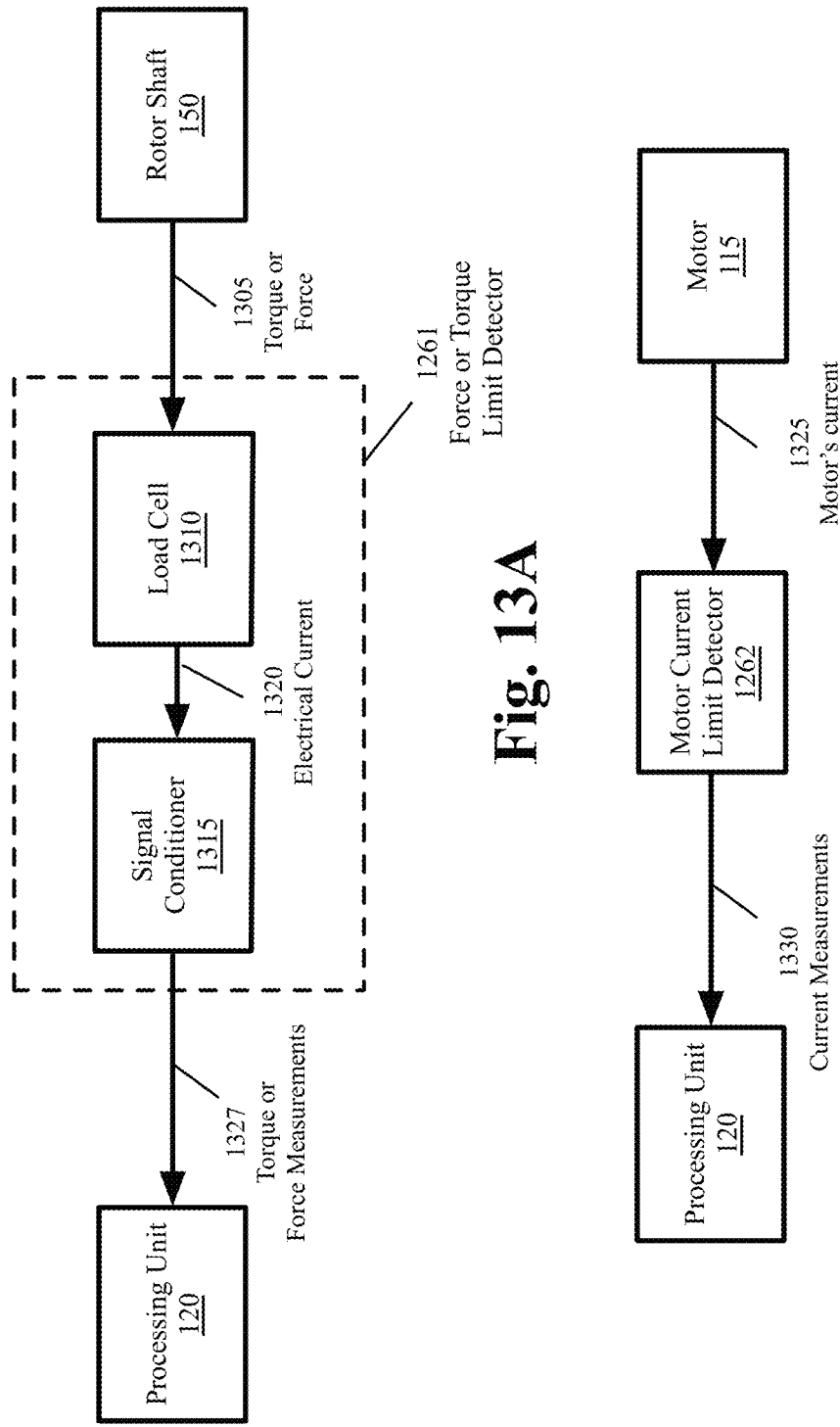
FIG. 13A is a functional diagram showing a force or torque limit detector, according to various aspects of the present disclosure.
FIG. 13B is a functional diagram showing motor current limit detector, according to various aspects of the present disclosure.

The limit detector 1261 in the example of FIG. 12A is a force or torque limit detector, which may provide measurements of the force (or torque) that is applied to the rotor shaft 150 to the processing unit 120. FIG. 13A is a functional diagram showing a force or torque limit detector, according to various aspects of the present disclosure. With reference to FIG. 13A, the force or torque limit detector 1261 may include a load cell 1310 (e.g., a torsion load cell) and a signal conditioner 1315. The load cell 1310 is a transducer that generates an electrical signal 1320 with a magnitude that is proportional with a force or torque that is generated by the rotor shaft 150.

When the rotor shaft 150 rotates, the shutoff valve actuator with mechanical stop 1281 of FIG. 12A comes to a point where the actuator is stopped by the mechanical stop. At this point, the rotor shaft 150 exerts more force (or torque) on the actuator 1281. With reference to FIG. 13A, the load cell measures the force (or torque) generated by the rotor shaft 150 and sends the electrical signal 1320 that is proportional to the force (or torque) to the signal conditioner 1315. The signal conditioner 1315 may amplify and/or rectify the electrical signal 1320 and send the force or torque measurement 1327 as one or more signals to the processing unit 120. The processing unit 120 may compare the force or torque measurement with a threshold and may send one or more signals or commands to the motor 115 to stop the motor 115 when the force or torque measurements exceed the threshold.

With further reference to FIG. 12A, the processing unit 120 may receive and/or store data and health status from different components of the valve shutoff device 100. For example, and without any limitations, the processing unit 120 may receive the current position of the shutoff valve actuator 1281, and therefore, the current position of the shutoff valve 175 (e.g., open, close, partially open, etc.), the level of voltage generated by the battery 110, the health status of the IMU 135, the health status of the radio transceiver 125, the health status of the limit detector 160, the health status of the solar cell(s) 105, etc.

The processing unit 120 may store the data and/or the health status in the memory 1250. The processing unit 120 may send the data and/or the health status to the radio transceiver 125 to transmit through the network(s) 1290 to one or more of the electronic devices 1205 and/or one or more cloud/backend servers 130 either upon request or as a push transfer. The valve shutoff device 100 may connect to and exchange signals and data as an IoT device with external electronic devices through the network(s) 1290.

Figure 12B:
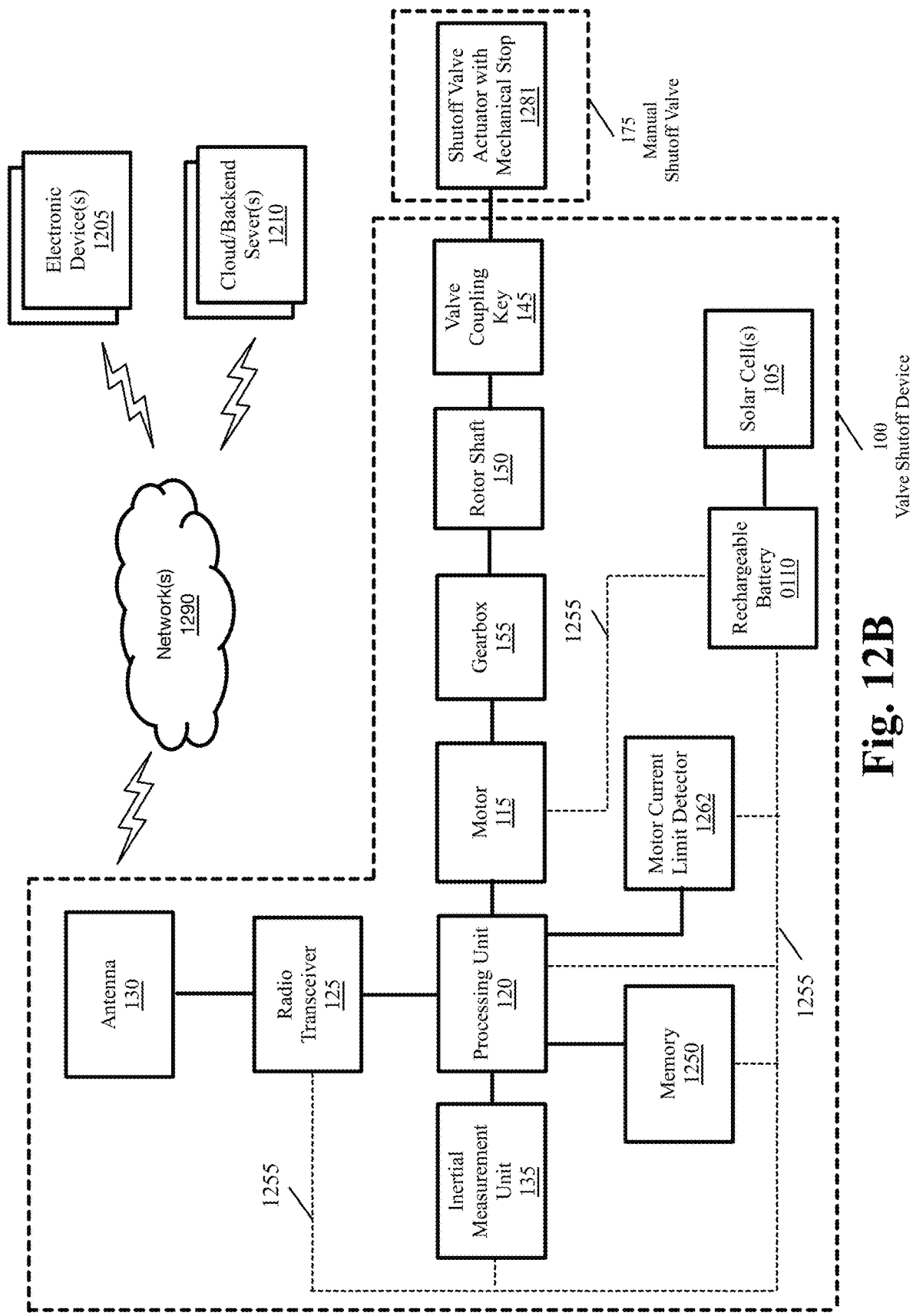
FIG. 12B is a functional block diagram illustrating an example system for an automatic valve shutoff device that includes a motor current limit detector, according to various aspects of the present disclosure.

Using the force or torque limit detector 1261 is one way for the processing unit 120 to receive feedback to determine whether or not to stop the motor 115. FIG. 12B is a functional block diagram illustrating an example system for an automatic valve shutoff device that includes a motor current limit detector, according to various aspects of the present disclosure. FIG. 12B may include similar components as FIG. 12A with the difference that the valve shutoff device 100 in the example of FIG. 12B includes a motor current limit detector 1262. The motor current limit detector 1262 may provide measurements of the current used by the motor 115.

FIG. 13B is a functional diagram showing a motor current limit detector, according to various aspects of the present disclosure. With reference to FIG. 13B, the motor current limit detector 1262 may receive and measure the motor's current 1325. The motor current limit detector 1262 may send the current measurements 1330 to the processing unit 120.

When the rotor shaft 150 rotates, the shutoff valve actuator with mechanical stop 1281 of FIG. 12B comes to a point where the actuator is stopped by the mechanical stop. At this point, the motor 115 may use more current in order to exerts more force (or torque) on the actuator 1281. The processing unit 120 may compare the current measurements 1330 with a threshold and may send one or more commands or signals to the motor 115 to stop the motor 115 when the current measurements exceed the threshold.

Figure 12C:
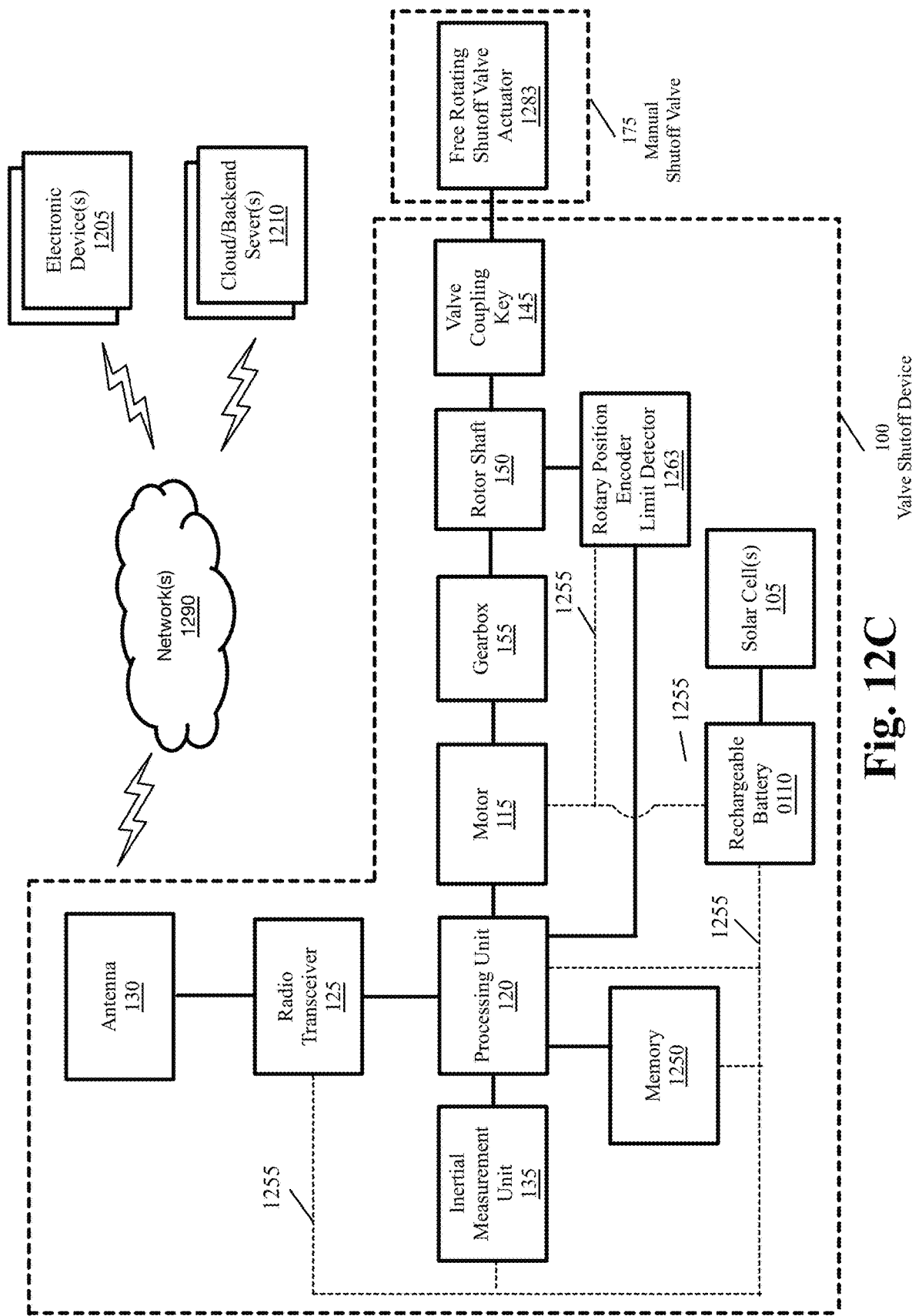
FIG. 12C is a functional block diagram illustrating an example system for an automatic valve shutoff device that includes a rotary position encoder limit detector, according to various aspects of the present disclosure.

FIG. 12C is a functional block diagram illustrating an example system for an automatic valve shutoff device that includes a rotary position encoder limit detector, according to various aspects of the present disclosure. With reference to FIG. 12C, the manual shutoff valve 175 includes a free rotating shutoff valve actuator 1283, instead of the shutoff valve actuator with mechanical stop 1281 of FIGS. 12A and 12B. The valve shutoff device 100 in the example of FIG. 12C includes a rotary position encoder limit detector to determine the angle or rotation and/or the speed of the rotor shaft 150. Other components of FIG. 12C are similar to the components of FIG. 12A.

Figure 13C:
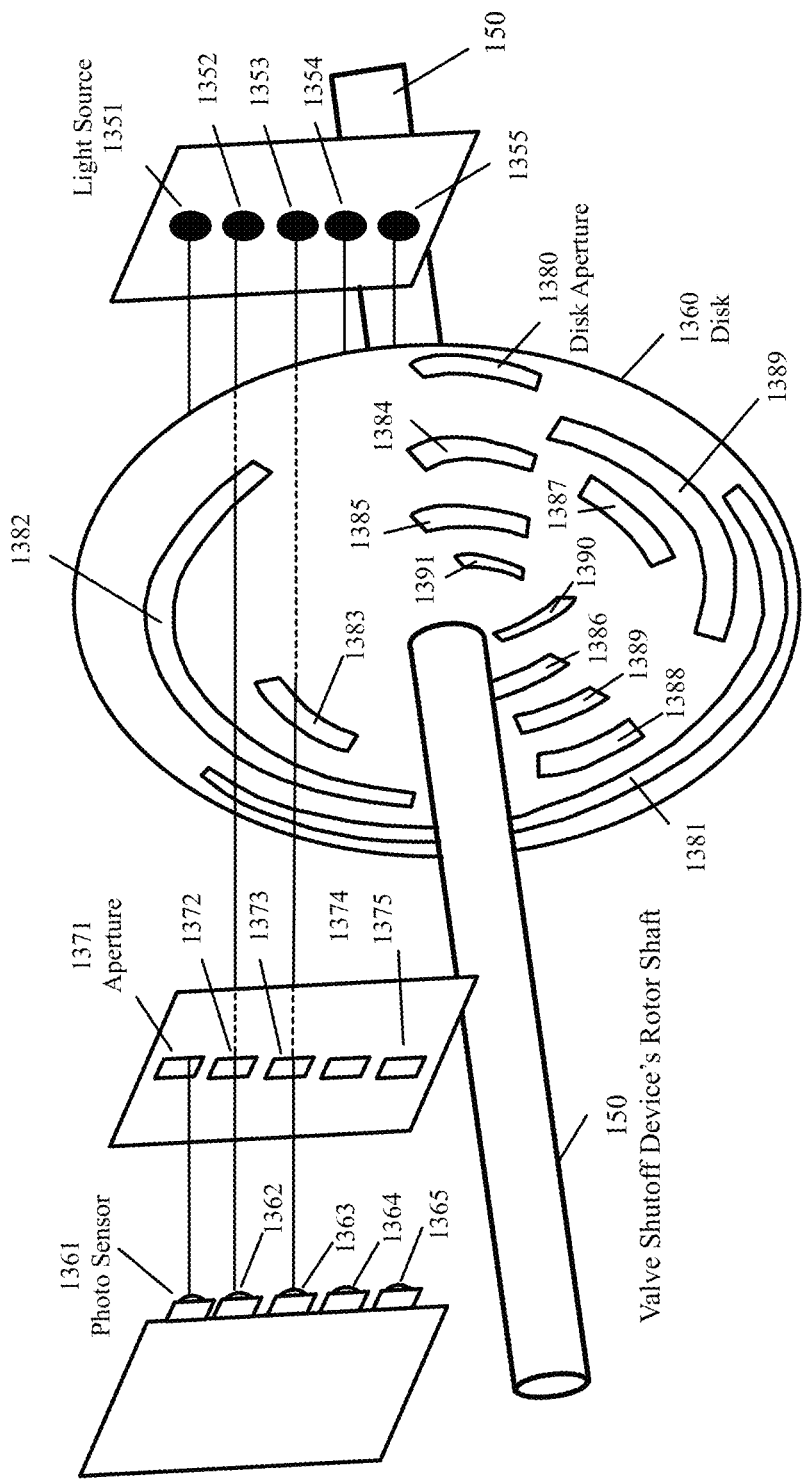
FIG. 13C is a perspective view of an optical rotary position encoder installed on the rotor shaft of the valve shutoff device, according to various aspects of the present disclosure.

The rotary position encoder 1263 may be an optical rotary position encoder or a magnetic rotary position encoder. FIG. 13C is a perspective view of an optical rotary position encoder installed on the rotor shaft of the valve shutoff device, according to various aspects of the present disclosure. With reference to FIG. 13C, the optical rotary position encoder may include a disk 1360 that is installed on the rotor shaft 150 (e.g., the rotor shaft 150 of FIG. 12C), several light sources 1381-1385, several apertures 1371, and several photo sensors 1361.

The optical rotary position encoder is an electro-mechanical device that converts the angular position of the rotation of the rotor shaft 150 to a digitized output signal (e.g., a series of pulses). The encoder's disk 1360 includes a group of tracks, which are arranged concentrically around the rotor shaft 150. Each track may one or more apertures 1380-1391 for allowing light to pass through the disk 1360. For simplicity, only a subset of the apertures are shown in FIG. 13C.

In the example of FIG. 13C, the encoder's disk 1360 has five concentric tracks. For example, the aperture 1381 is on the first track, the aperture 1388 is on the second track, the aperture 1389 is on the third track, the aperture 1386 is on the fourth track, and the aperture 1390 is on the fifth track. The number of concentric tracks determines the number of output bits generated by the optical rotary position encoder. The optical encoder in the example of FIG. 13C has five concentric tracks and, therefore, generates five bits of output. In other embodiments, the optical encoder may have fewer or more bits to satisfy a desired resolution. For an n bit encoder, the encoder resolution is shown by Equation 1:

$$\frac{360 \text{ degress}}{(2^n)} \qquad \text{Eq. (1)}$$

The number of light sources 1351-1355, apertures 1371-1375, and photo sensors 1361-1365 may be the same as the number of concentric tracks of the disk 1360. The light sources 1351-1354 may be, for example and without limitations, LED lights. Each light source 1351-1355 may pass light through a corresponding aperture 1371-1375. The light passed through each aperture 1371-1375 may be captured by a corresponding photo sensor 1361-1365. The light emitted by each light source 1351-1355 may reach the corresponding aperture 1371-1375 only if it passes through one of the apertures 1380-1391 on the disk 1360. Otherwise, the emitted light may be blocked by the opaque portion of the disk 1360 (i.e., the portion that has no aperture 1380-1391). Accordingly, as the disk 1360 rotates, the light is either transmitted through or blocked by the disk 1360 according to the pattern of the apertures 1380-1391 on the disk 1360.

The received light provides an n bit word (in the example of FIG. 13C a five-bit word) that indicates the position of the rotor shaft 150. The optical rotary position encoder may include a signal conditioner (not shown) that generates signals (e.g., a series of pluses) to encode the n-bit word output of the encoder. The output may be received by the processing unit 120. The processing unit may use the encoder's output to determine whether the shutoff valve is open or close and/or to determine the current position of the rotor shaft, for example, as described below with reference to FIGS. 26-28.

Figure 13D:
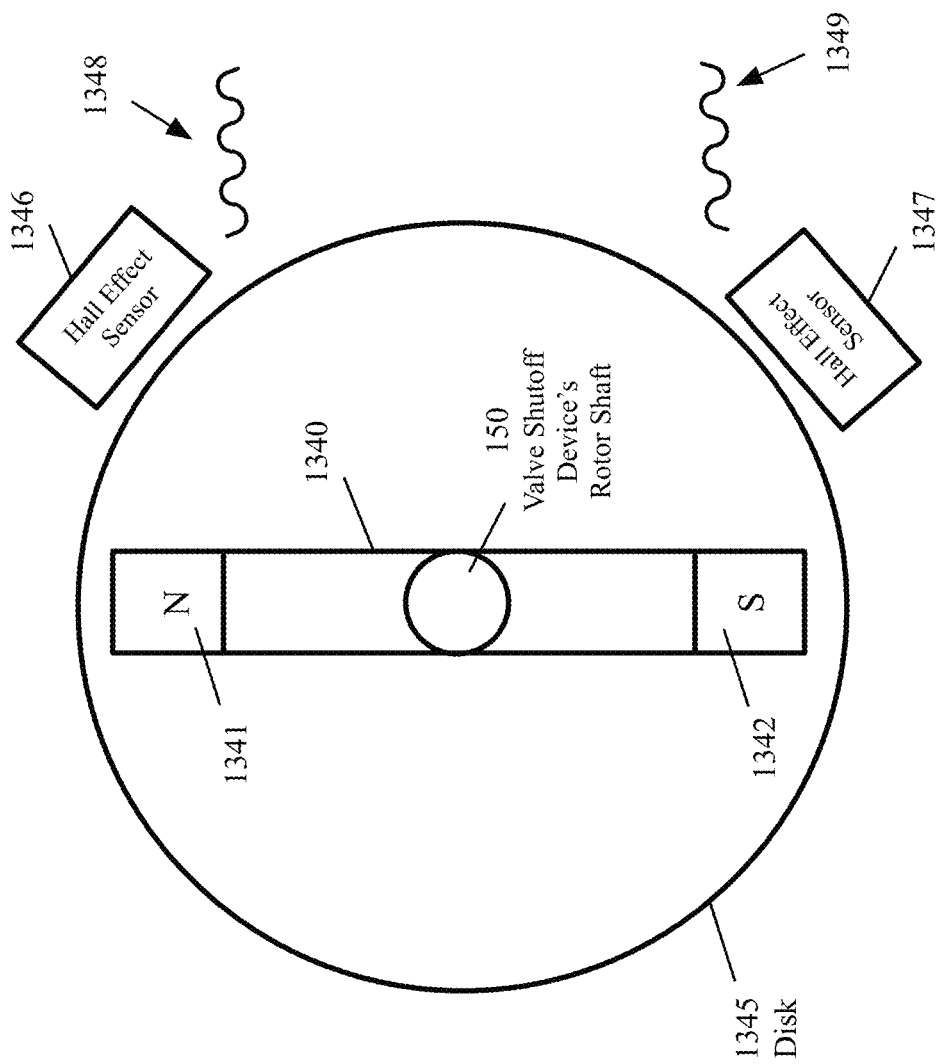
FIG. 13D is a schematic front view of a magnetic rotary position encoder installed on the rotor shaft of the valve shutoff device, according to various aspects of the present disclosure.

FIG. 13D is a schematic front view of a magnetic rotary position encoder installed on the rotor shaft of the valve shutoff device, according to various aspects of the present disclosure. With reference to FIG. 13C, the rotor shaft 150 may be similar to the rotor shaft 150 of FIG. 12C. The magnetic rotary position encoder includes a disk 1345, one or more magnets 1340, and one or more hall effect sensors 1346 and 1347. In the example of FIG. 13D, only one magnet 1340 and two hall effect sensors 0446 and 1347 are shown.

The magnet 1340 has a north pole 1341 and a south pole 1342. Higher precisions may be achieved by increasing the number of magnetic poles 1341-1342 and hall effect sensors 1346-1347. Each hall effect sensor measures the magnitude of a magnetic field and generates an output voltage that is directly proportional to the magnetic field strength going through the sensor. As the rotor shaft 150 rotates, each hall effect sensor 1346-1347 generates a sinusoidal wave 1348-1349, respectively. In the example of FIG. 13D, each sinusoidal wave 1348-1349 has a frequency that is equal to the rotational speed of the rotor shaft 150.

The hall effect sensor 1347 may be set 90 degrees apart from the hall effect sensor 1346 such that the hall effect sensor 1346 may generate a sine wave 1348 and the hall effect sensor 1347 may generate a cosine wave 1349. The sine wave 1348 and the cosine wave 1349 may be used to determine the direction of rotation of the rotor shaft 150. The sine wave 1348 and the cosine wave 1349 may be interpolated to determine the absolute position of the rotor shaft 150. The precision of the absolute position is increased by increasing the number of the magnetic poles 1341-1342 and the number of hall effect sensors 1346-1347.

The magnetic rotary position encoder may include a signal conditioner (not shown) that generates signals to encode the n-bit word output of the encoder. The output may be received by the processing unit 120. The processing unit may use the encoder's output to determine whether the shutoff valve is open or close and/or to determine the current position of the rotor shaft, for example, as described below with reference to FIGS. 26-28.

Although the shutoff valve actuator 1283 is free rotating, the rotary position encoder limit detector 1263 may be used to provide feedback to the motor 115 for turning the shutoff valve actuator with mechanical stop 1281 of FIGS. 12A-12B. For example, the rotary position encoder limit detector 1263 may be used to measure that the angular speed of the rotor shaft and the processing unit 120 may determine that the shutoff valve actuator has reached the machinal stop when the angular speed of the rotor shaft 150 becomes zero.

Figure 14:
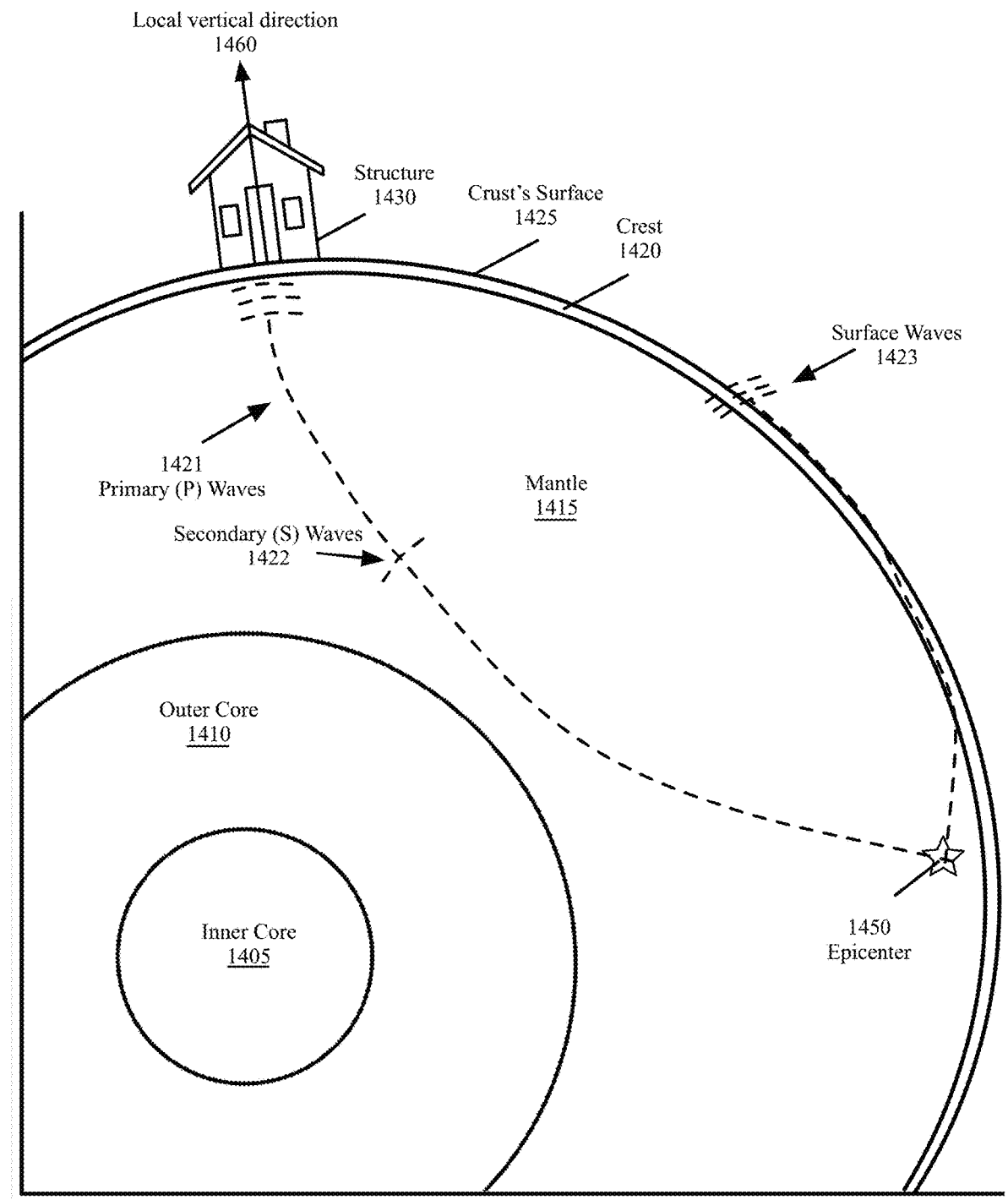
FIG. 14 is a functional diagram showing different types of seismic waves, according to prior art.

Some embodiments may use the seismic waves parameters measured by one or more sensors such as the IMU 135 (FIGS. 1A-1B and 12A-12C) to identify and determine the intensity of seismic activities. FIG. 14 is a functional diagram showing different types of seismic waves, according to prior art. With reference to FIG. 14, the seismic waves may include primary waves 1421 (or P waves), secondary waves 1422 (or S waves), and surface waves 1423. The seismic waves 1421-1423 may originate from an epicenter 1450 (e.g., an earthquake epicenter, an explosion epicenter, etc.) and may travel through different parts of Earth to reach a structure 1430.

The simplified view of Earth's structure in FIG. 14 shows the inner core 1405, the outer core 1410, the mantle 1415, and the crest 1420. The P-waves 1421 are the fastest seismic waves and are the first to reach a location (such as the structure 1430) after a seismic event. The P-waves 1421 are mostly compression waves and arrive at a substantially vertical angle when they reach the crust's surface 1425 as opposed to the S-waves 1422 and the surface waves 1422 that are substantially shear type waves that may arrive in all three dimensions.

The S-waves 1422 start from the epicenter 1450 at the same time as the P-waves 1421 and travel at about half the speed of the primary waves 1421. The P-waves 1410 and the S-waves 1422 may travel through the interior of Earth until they reach the crust's surface 1425. The P-wave 1421 and the S-wave 1422 are referred to as body waves.

The surface waves 1423 travel only through the crust 290 and the crest's surface 1425. The surface waves 1423 may have lower frequencies than the body waves 1421-1422 and are the most destructive of the seismic waves and may make the ground shake side by side or roll up and down.

The surface waves 1423 that move the ground from side to side are referred to as Love waves (named after the mathematician who first derived the mathematical model for these waves). The Love waves are the faster of the two surface waves. The surface waves 1423 that roll the ground up or down (similar to waves in an ocean) as well as side by side are referred to as Rayleigh waves (named after the mathematician who first predicted their existence). Most of the shaking caused by seismic activities are typically caused by Rayleigh waves.

In some of the present embodiments, the processing unit 120 of the valve shutoff device 100 may use an algorithm that distinguishes seismic waves caused by seismic activities from man-made vibrations and shuts off a shutoff valve on a fluid line when the seismic activities exceed a threshold. The algorithm may include an initial setup and a main loop.

The initial setup may be performed upon installation, power up, and/or reset where the valve shutoff device may be self-calibrated and self-oriented. The valve shutoff device may then enter the main loop that implements a state machine and moves between one of the following states: a no seismic activity state, an alert state, an armed state, and an end state. The state machine remains in the no seismic activity state when none of the P, S, or surface waves related to seismic activity is detected.

The state machine enters the alert state when the P-waves are detected and there is an expectation of further seismic activities. The state machine may move from the alert state into the armed state when the S-waves are detected after the P-waves. The state machine may move from the armed state into the end state when the magnitude of the seismic activities exceeds a threshold. The state machine may move from either the alert state or the armed state into the no seismic activity state if no seismic activities are detected for a threshold time period. In the end state, the valve shutoff device may close the shutoff valve on the fluid supply pipe to prevent a fluid leak in case the pipe ruptures during seismic activities. Further details of the operations performed for the identification and determination of the intensity of seismic activities are described below with reference to FIGS. 17-22.

In order to be able to differentiate the compression-type waves (e.g., P-waves) from the shear-type waves (e.g., the S or surface waves), the valve shutoff device may automatically learn/determine the orientation of the coordinate systems during installation, power up, or reset. In some embodiments, the IMU is in a chip such as a MEMS chip with miniaturized mechanical and electro-mechanical elements. The accelerometer of the IMU measures the acceleration parameters and the magnetometer of the IMU measures the magnetic field parameters in a coordinate system that is relative to the orientation of the IMU chip. When the valve shutoff device is installed on a fluid supply line 170 (FIG. 1B), the IMU chip may not be in the same orientation as the local coordinate system.

The valve shutoff device, therefore, requires translating the coordinate system used by the IMU into the local coordinate system, for example and without any limitations, to identify the local z-coordinate (i.e., the local vertical or up and down direction) in order to determine whether the parameters measured by the IMU are related to the P-waves 1421 (FIG. 14), which are compression waves that arrive substantially in the local vertical direction 1460.

The orientation may be determined by detecting the local vertical direction, z, by calculating the direction of gravity vector (g) using the 3D accelerometer and making the required coordinate transformation to differentiate the z direction from the x-y plane. The local vertical direction is in opposite direction of the gravity and always has a constant acceleration of gravity (g=−9.81 meters per square seconds, $m/s^2$) which is reported from three acceleration components, measured by the accelerometer.

Figure 15A:
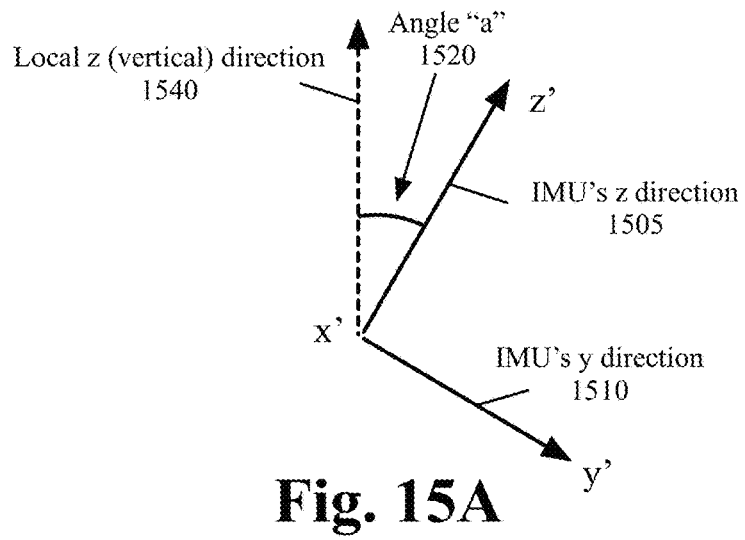
FIGS. 15A and 15B are functional diagrams illustrating the orientation of local coordinates versus the coordinates used by an accelerometer of a valve shutoff device, according to various aspects of the present disclosure.
Figure 15B:
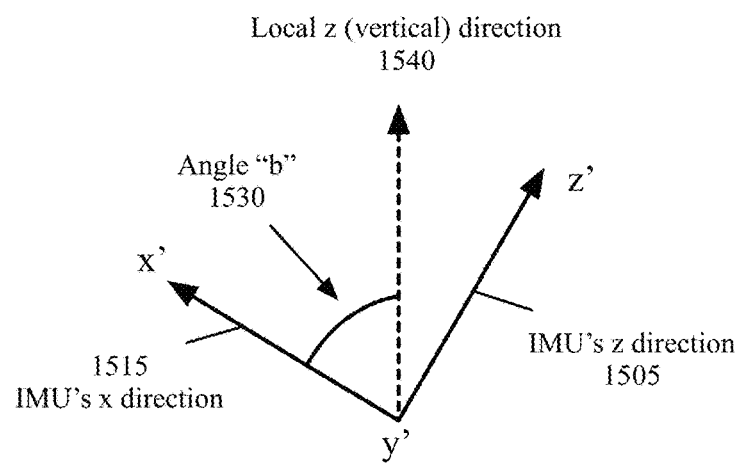

FIGS. 15A and 15B are functional diagrams illustrating the orientation of local coordinates versus the coordinates used by an accelerometer of a valve shutoff device, according to various aspects of the present disclosure. With reference to FIGS. 15A and 15B, the accelerometer may be a MEMS sensor that is using the coordinates 1505-1515 that are determined based on the orientation of a corresponding IC chip. For example, if the IC chip is in the shape of a rectangular box, the coordinates x' 1515 and y' 1510 used by the accelerometer may be parallel to the perpendicular sides of one of the box's surfaces and the coordinate z' 1505 may be perpendicular to the x' and y'.

With further reference to FIGS. 15A and 15B, the direction of gravity 1540 may be determined from the values of a three dimensional acceleration vector measured by the accelerometer. For example, the direction of gravity (which is always up in the local coordinates) may be determined from one or more values derived from the three dimensional acceleration vector.

The accelerometer may measure the rotational angle "a" 1520 and the rotational angle "b" 1530 with respect to the gravity direction, which is along the local z (or vertical) direction 1540. The angles "a" 1520 and "b" 1530 represent the tilting of the IMU's vertical coordinate, z', with respect the direction of gravity, which is the local vertical direction, z.

Figure 16:
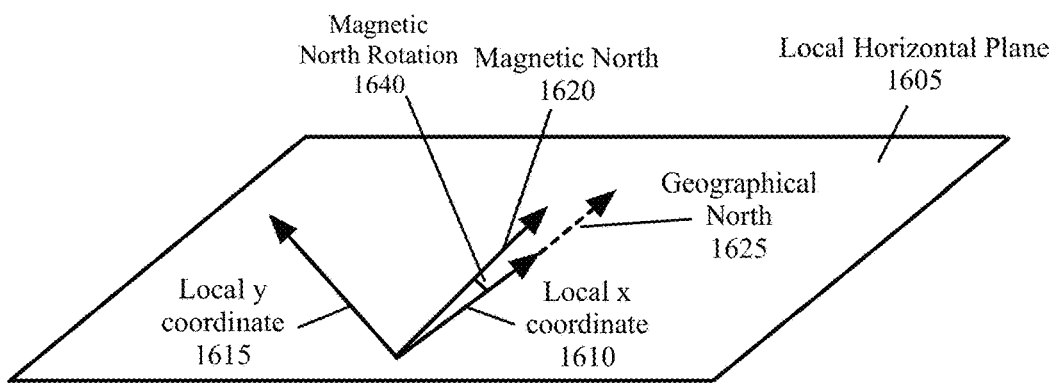
FIG. 16 is a functional diagram illustrating the rotation between the geographical north and the magnetic north at an exemplary location where a valve shutoff device is installed, according to various aspects of the present disclosure.

When the IMU 135 (FIGS. 1A-1B), in addition to a 3D accelerometer, is equipped with a 3D magnetometer, the two local horizontal directions x and y (which may not be the same x and y directions used by the IMU) may be resolved based on the detection of the local magnetic north. FIG. 16 is a functional diagram illustrating the rotation angle between the geographical north and the magnetic north at an exemplary location where a valve shutoff device is installed, according to various aspects of the present disclosure.

With reference to FIG. 16, the magnetometer may detect the local magnetic north 1620. The 3D magnetometer may measure the three components of magnetic field vector and may determine the magnetic north direction as the direction of the highest field.

Since the angle 1640 between the magnetic north 1620 and the geographical north 1625 is typically a small amount, some of the present embodiments may set the geographical north 1625 direction to the magnetic north direction 1620. In other embodiments, the valve shutoff device may be provisioned to receive the local magnetic declination (also referred to as magnetic variation). The magnetic declination at each point, is the angle on the horizontal plane between magnetic north (the direction the north end of a magnetized compass needle points, corresponding to the direction of the Earth's magnetic field lines) and true north (the direction along a meridian towards the geographic north.

The magnetic declination at each point on Earth may be available from a set of databases such as for example, and without limitation, the National Oceanic and Atmospheric Administration (NOAA) magnetic declination database. As described below with reference to FIGS. 25 and 54, an application program may be used in some embodiments to provision a valve shutoff device (or controller device). The application program may, in some embodiments, use one or more other application programs running on the client device and/or one or more services provided the client device such as navigation applications, compass, GPS, etc., to determine the geographical coordinates of the location where the valve shutoff device is located. For example, during the provisioning, a user may be instructed to make sure the client device is in the vicinity of the valve shutoff device (e.g., within tens of miles) such that the geographical coordinates of the client device may be used as the geographical coordinates of the valve shutoff device. In some embodiments, the user may be prompted to enter the physical address of where the valve shutoff device. In other embodiments, the valve shutoff device may include GPS that may be used to determine the local geographical coordinates of the valve shutoff device.

The application program may then connect to an external server such as, for example, and without limitation, the NOAA's declination database to receive the magnetic declination that corresponds to the coordinates (or the physical address) of where the valve shutoff device is being installed. The external servers, for example, and without limitations, may calculate the declination for different placed on Earth using the most recent World Magnetic Model (WMM) or the International Geomagnetic Reference Field (IGRF) and may tabulate the results based on the geographical coordinates and/or physical addresses.

Once the local magnetic declination is determined, the geographical coordinates of the IMU (or the accelerometer) may be determined. The IMU's (or the accelerometer's) x', y', and z' coordination (FIGS. 15A and 15B) may be mapped to the true geographical coordinates. As described below, by being able to map the IMU's (or the accelerometer's) x', y', and z' coordination to the true geographical coordinates, the valve shutoff devices of the present embodiments provide the technical advantage of being able to self-orient wherever the valve shutoff device is installed. The valve shutoff devices of the present embodiments do not require being leveled and/or being installed at a known orientation.

As discussed above, in some of the present embodiments, the processing unit 120 and the IMU 135 may be in a SIP. In some of these embodiments, the SIP may include firmware and/or software that implements a motion engine. The motion engine may include digital signal processing firmware or software that may receive raw motion data from the MEMS sensors (e.g., the accelerometer and/or the magnetometer) and may translate the raw data into motion information.

For example, and without limitations, some of the present embodiments may use a SIP such as BNO080 or BNO085 SIP developed by Hillcrest Labs. The BNO080 or BNO085 SIPs include a firmware "motion engine", which may perform coordinate rotation operations. For example, the BNO080 or BNO085 SIPs may include a "tare" function that uses quaternion mathematics to perform coordinate rotation from the IMU's frame of reference (x', y', z') to the local coordinate (x, y, z). This function, which may be invoked by the processing unit, may remove the burden of computational resources from the processing unit by performing the computations with firmware. The quaternion is a number system that extends the complex numbers. Quaternions are represented in the form of a+bi+cj+d k, where a, b, c, and d are real numbers and i, j, and k are the symbols that can be interpreted as unit-vectors pointing along the three spatial axes. The "taring" allows the SIP to be mounted in the valve shutoff device 100 in an arbitrary manner and invoking the tare function may determine the orientation that needs to be applied to the outputs to align with the local coordinates (e.g., up, north, east) frame of reference. This orientation may then be applied to all motion outputs.

Although the examples of FIGS. 15A-15B were described with reference to an accelerometer and a magnetometer that are part of an IMU, in some of the present embodiments, the accelerometer and the magnetometer may be separate components (e.g., the accelerometer and the magnetometer may be in one IC chip, or each may be in a separate IC chip) and not part of an IMU. In these embodiments, the accelerometer and the magnetometer may make their corresponding measurements based on the accelerometer or their own x direction, y direction, z direction, and tilting angles.

In the embodiments that the accelerometer and the magnetometer are in one IC chip, the mapping of the local coordinates of the chip that includes the accelerometer and the magnetometer into the geographical coordinates is done similar to what is described herein for mapping the local coordinates of the IMU into the geographical coordinates. In some of the embodiments that the accelerometer and the magnetometer are on separate IC chip, the printed circuit board is designed such that the accelerometer and the magnetometer chips have the same local coordinate systems (i.e., the local coordinates corresponding to x', y', and z' shown in FIGS. 15A-16 for both chips are the same). The mapping the local coordinates into the geographical coordinates may then be performed for one of the IC chips, which may be applicable to the other IC chip.

In some of the embodiments that the accelerometer and the magnetometer are on separate IC chip, the difference between the local coordinate systems of the accelerometer and the magnetometer may be measured in the manufacture time (e.g., when the printed board(s) for the valve controller device is/are fabricated) and the difference is programmed into the valve controller device's software/firmware. The mapping the local coordinates into the geographical coordinates may then be performed for one of the IC chips and may be translated by software for the other IC chip.

In the example of FIG. 16, the local horizontal plane 1605 is perpendicular to the local z direction (or the opposite direction of gravity). The local x coordinate 1610 is in the local horizontal plane 1605 and, in this example, is set along the geographical north 1625. In the embodiments that set the magnetic north rotation 1640 to 0, the local x coordinate 1610 is set along the magnetic north direction 1620. In the embodiments that provision the local magnetic declination for the valve shutoff device, the local coordinates are determined based on the local magnetic declination as described above.

The local y coordinate 1615 is set in the local horizontal plane 1605 at 90 degrees to the local x coordinate 1610. The horizontal x 1610 and y 1615 directions, in some embodiments, may be used in reporting or recording the direction of propagation of incoming seismic waves and reporting the direction to the cloud/backend server(s) 1210 (FIGS. 12A-12C) to help in global studies and analysis.

Details of the operations performed for the identification and determination of the intensity of seismic activities are described below with reference to FIGS. 17-22. As described below, one of the key features of the algorithm to determine whether the shutoff valve is to be closed due to seismic activities is avoiding false-positive triggers, without unnecessarily increasing the threshold used for the detection of the surface waves 1423 (FIG. 14), which are the most destructive of the seismic waves.

The algorithm may identify and distinguish various components of seismic activities in order to eliminate false positives and to close the valve when the intensity of the seismic waves exceed a threshold. The algorithm attempts to differentiate between seismic waves and man-made vibratory noises, such as without any limitations, a sudden jerk (e.g., an object, like a ball or a toy, accidentally hitting the valve shutoff device and/or the associated pipes), vibrations (e.g., a truck moving near the valve shutoff device), or bursty vibrations (e.g., a jackhammer operating in the neighborhood, and thus vibrating the ground and the pipes).

This differentiation, in some of the present embodiments, may be made based on the known features of the seismic waves such as the frequency content (spectrum), the duration and the shape of the wave envelope (much like the amplitude modulation (AM) wave detection in radio communication systems), or calculating a "power" ratio of various vibration components.

Figure 17:
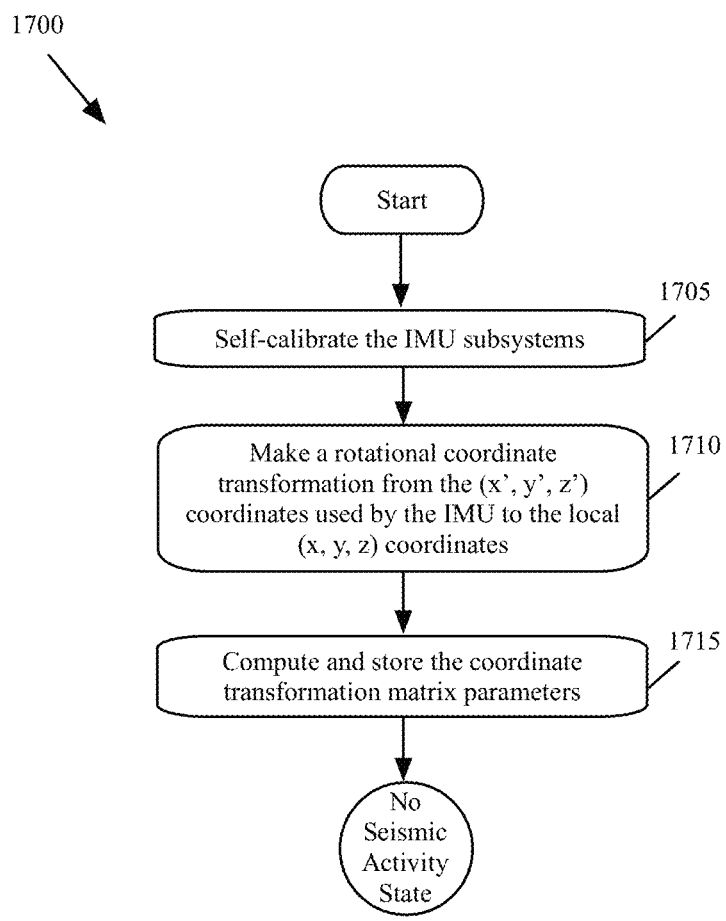
FIG. 17 is a flowchart illustrating an example process for performing an initial setup for identification and determination of the intensity of seismic activities, according to various aspects of the present disclosure.

FIG. 17 is a flowchart illustrating an example process 1700 for performing an initial setup for identification and determination of the intensity of seismic activities, according to various aspects of the present disclosure. The process 1700, in some of the present embodiments, may be performed by the processing unit 120 (FIGS. 12A-12C, FIGS. 42, 46, 48), and/or by the firmware of a valve shutoff device/valve controller device, during installation, power up, and/or reset of the valve shutoff device/valve controller device.

With reference to FIG. 17, the subsystems of the IMU may be self-calibrated (at block 1710) as needed. For example, the IMU MEMS chip in some embodiments may have built-in self-calibration. In these embodiments, the processing unit 120 may send a signal to the IMU 125 to perform self-calibration.

Next, a rotational coordinate transformation may be made (at block 1710) from the (x', y', z') coordinates used by the IMU (or by the accelerometer in the embodiments that use an accelerometer that is not part of an IMU) to the local coordinates (x, y, z). The x and y may be in the two local horizontal directions 1610 and 1615 (FIG. 16) (e.g., east-west and north-south directions) and z may be in the local vertical direction (e.g., direction of the local zenith). The coordinate transformation matrix parameters may be computed and stored (at block 1715). The processing may then proceed to the "no seismic activity" state, which is described below with reference to FIG. 19.

Mapping the IMU's (or the accelerometer's) x', y', and z' coordination to the true geographical coordinates provides the technical advantage that the valve shutoff device of the present embodiments is capable of self-orienting wherever the valve shutoff device is installed. The valve shutoff devices of the present embodiments do not require being leveled and/or being installed at a known orientation.

The specific operations of the process 1700 may not be performed in the exact order shown and described. Furthermore, the specific operations described with reference to FIG. 17 may not be performed in one continuous series of operations in some embodiments, and different specific operations may be performed in different embodiments. For example, in some aspects of the present embodiments, the rotational coordinate transformation from the (x', y', z') coordinates used by the IMU (or by the accelerometer) to the local coordinates (x, y, z) may be made (at block 1710) by performing a process such as process 1800 described below with reference to FIG. 18.

In other embodiments, the rotational coordinate transformation from the (x', y', z') coordinates used by the IMU (or by the accelerometer) to the local coordinates (x, y, z) may be made (at block 1710), for example and without any limitations, by the processing unit and/or by firmware by performing a predefined function of a motion engine such as the tare function described above. In some aspects of the present embodiments, the coordinate transformation matrix parameters may be computed and stored (at block 1715) by the processing unit 120 and/or by firmware.

Figure 18:
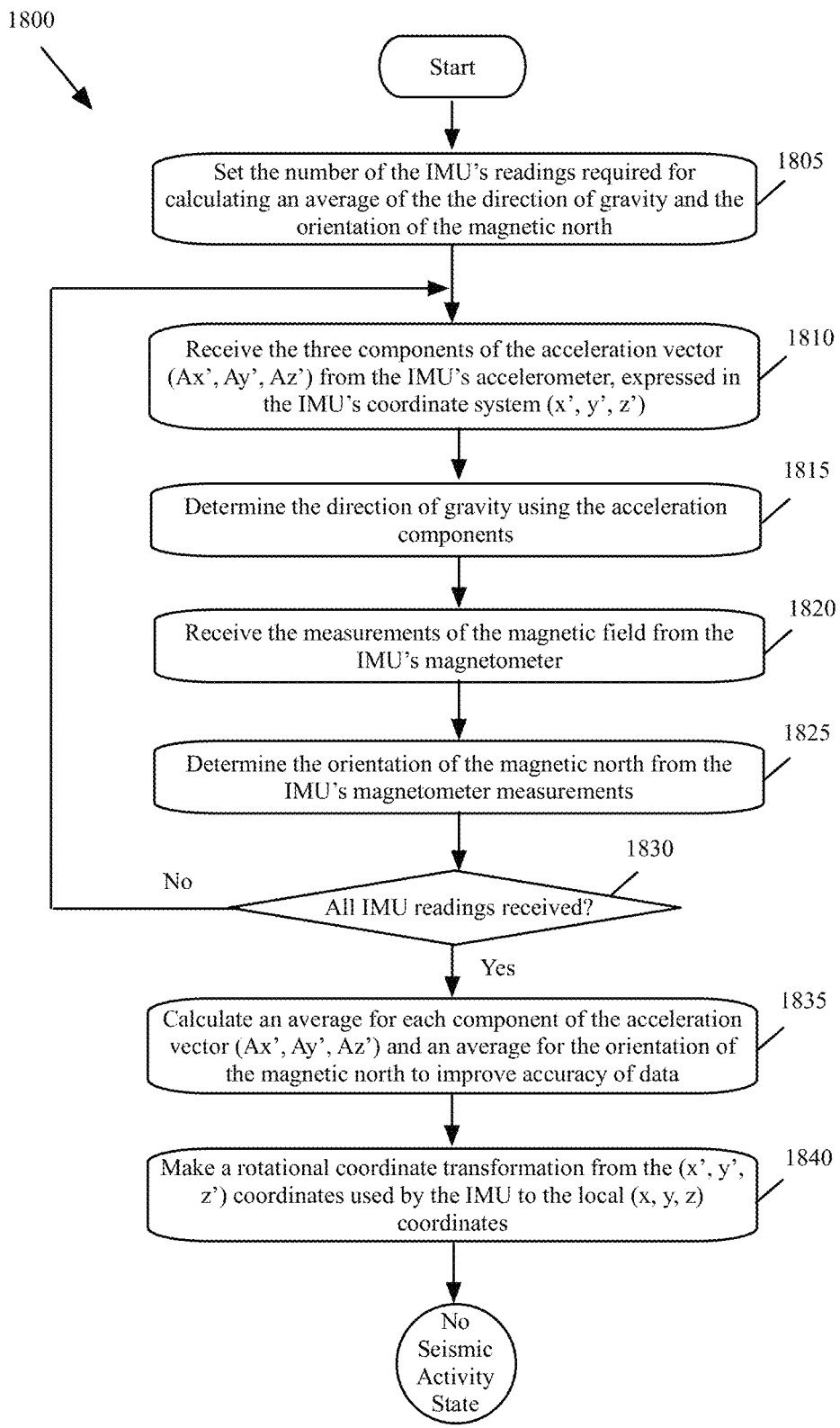
FIG. 18 is a flowchart illustrating an example process for performing the rotational coordinate transformation from the (x', y', z') coordinates used by the IMU (or by the accelerometer) to the local coordinates (x, y, z), according to various aspects of the present disclosure.

FIG. 18 is a flowchart illustrating an example process 1800 for performing the rotational coordinate transformation from the (x', y', z') coordinates used by the IMU (or by the accelerometer) to the local coordinates (x, y, z), according to various aspects of the present disclosure. The process 1800, in some of the present embodiments, may be performed by the processing unit 120 (FIGS. 12A-12C, 42, 46, 48), and/or by the firmware of a valve shutoff device/valve controller device, during installation, power up, and/or reset of the valve shutoff device/valve controller device. The process 1800, in some of the present embodiments, provides details of block 1710 of FIG. 17. Although the process 1800 is described by referring to an IMU, for the embodiments that use a separate accelerometer, and/or magnetometer (e.g., the embodiments that may not include an IMU), the process 1800 is applicable to an accelerometer and/or a magnetometer of a valve shutoff device that are not part of an IMU.

With reference to FIG. 18, the number of the IMU's orientation readings used for getting an average orientation reading may be set (at block 1805). The number of the IMU's orientation readings is denoted as N in the following equations. This number, which may be an integer greater or equal to 1, may be a predetermined value, may be set during the provisioning of the valve shutoff device (e.g., through the client device 2535 of FIGS. 25, 31, and 39), or may be provided by the cloud/backend servers 1210 (FIGS. 12A-12C and 36) over the network(s) 1290.

In some embodiments, any other constants used by the processes of FIGS. 18-22 may be a predetermined value, may be set during the provisioning of the valve shutoff device, or may be provided by the cloud/backend servers 1210. Some of the present embodiments may not get an average of orientation readings. In these embodiments, the value of N is set to 1. With reference to FIG. 18, a loop with N iterations may be performed through blocks 1810-1830.

The three components of the acceleration vector ($A_x'$, $A_y'$, $A_z'$) may be received (at block 1810) from the IMU's accelerometer, expressed in the IMU's coordinate system (x', y', z'). The direction of gravity may be determined (at block 1815) using the acceleration vector's parameters. For example, the direction of gravity may be determined as described above with reference to FIGS. 15A-15B.

Next, the measurements of the magnetic field may be received (at block 1820) from the IMU's magnetometer. The orientation of the magnetic north may be determined (at block 1825) from the parameters measured by IMU's magnetometer. For example, the orientation of magnetic north may be determined as described above with reference to FIG. 16. Next, a determination may be made (at block 1830) whether all N IMU's readings are received. If not, the processing may proceed to block 1810, which was described above.

Otherwise, an average for each component of the acceleration vector ($A_x'$, $A_y'$, $A_z'$) and an average for the orientation of the magnetic north may be calculated (at block 1835), for example to improve the accuracy of data. In the embodiments that N is set to 1, the blocks 1830 and 1835 may be skipped. Next, a rotational coordinate transformation may be made (at block 1840) from the (x', y', z') coordinates used by the IMU to the local coordinates (x, y, z). The x and y may be in the two local horizontal directions 1610 and 1615 (FIG. 16) (e.g., east-west and north-south directions) and z may be in the local vertical direction (e.g., direction of the local zenith). The processing may then end.

Figure 19:
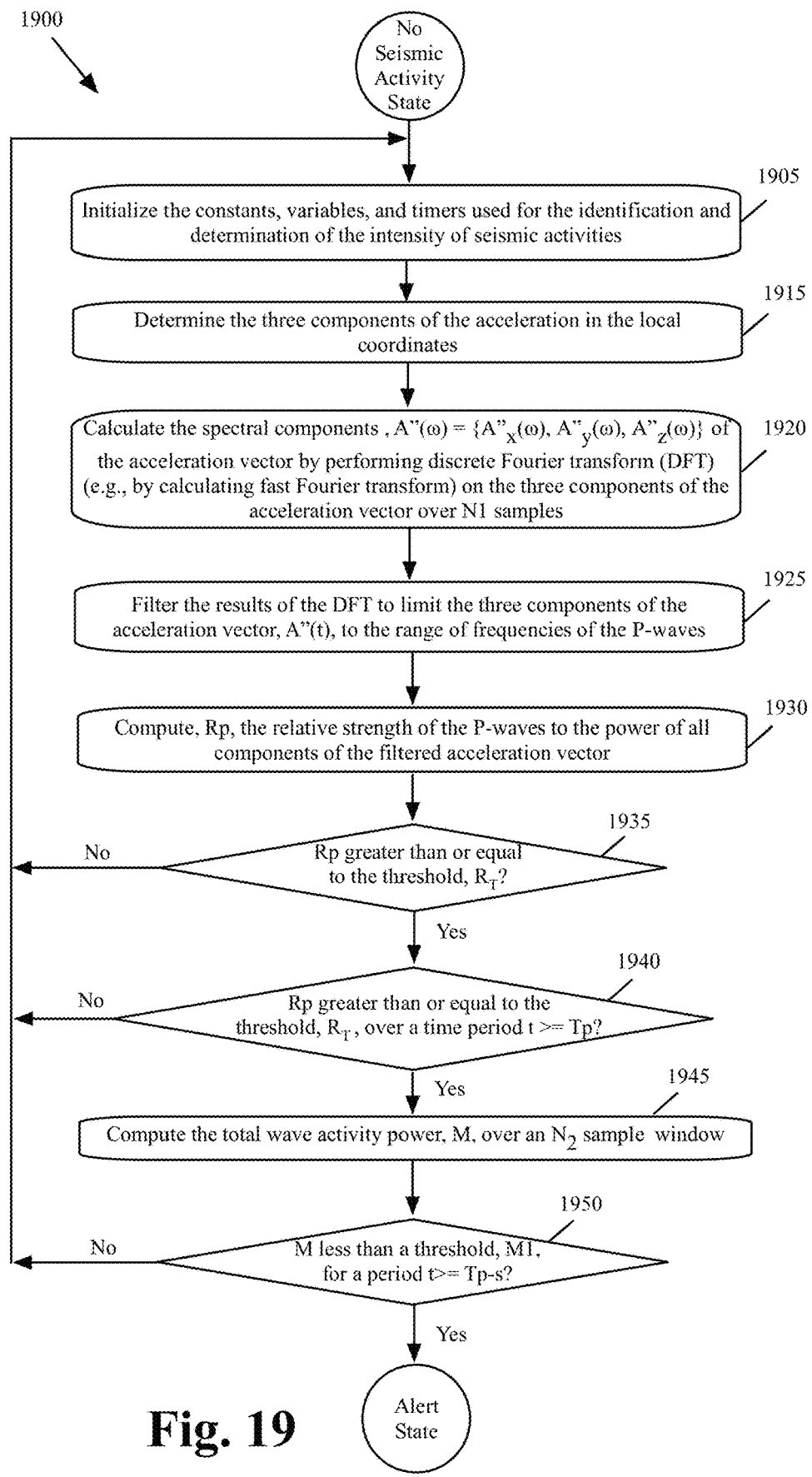
FIG. 19 is a flowchart illustrating an example process for identifying P-waves related to seismic activities, according to various aspects of the present disclosure.

FIG. 19 is a flowchart illustrating an example process 1900 for identifying P-waves related to seismic activities, according to various aspects of the present disclosure. The process 1900, in some of the present embodiments, may be performed by the processing unit 120 (FIGS. 12A-12C, 42, 46, 48), and/or by the firmware of a valve shutoff device/valve controller device. Although the process 1900 is described by referring to an IMU, for the embodiments that use a separate accelerometer, and/or magnetometer (e.g., the embodiments that may not include an IMU), the process 1900 is applicable to an accelerometer and/or a magnetometer of a valve shutoff device that are not part of an IMU.

With reference to FIG. 19, the constants, variables, timers and variables used for the identification and determination of the intensity of seismic activities may be initialized (at block 1905). The followings are an exemplary list of the constants, variables, and timers that may be used in some of the present embodiments.

N1: The number of samples (or time) used for discrete Fourier transformation (DFT)

RT: The threshold value for the ratio of the power of P-wave (the vertical component of the acceleration vector) to the total power of all components of the acceleration vector Tp: The minimum duration threshold of the P-wave activity Tp-s: The minimum quiet period between P and S waves Ts: The minimum expected duration of the S wave activity T3: The time threshold for the surface waves magnitude for executing the shutoff procedure N2: The number of samples for measuring the P-waves power ratio N3: The number of samples for measuring the S-waves power N4: The number of samples for measuring the surface waves power M1: The low activity threshold M2: The magnitude threshold for the armed state M3: The shut-off magnitude threshold Lt: The loop timer Tout-1: The timeout value for detecting the S-waves Tout-2: The timeout value for detecting the surface waves With further reference to FIG. 19, the three components of the acceleration vector in the local coordinates may be determined (at block 1915). In some of the present embodiments, the three components of the acceleration vector in the local coordinates may be computed by firmware (e.g., the firmware associated with a motion engine). For example, the firmware may perform a coordinate rotations from the (x', y', z') coordinates used by the IMU to the local coordinates (x, y, z). The gravity may in some embodiments be subtracted from the z acceleration components.

In other embodiments, the processing unit 120 may compute he three components of the acceleration vector in the local coordinates. For example, the processing unit 120 may the three components of the acceleration vector ($A_x'$, $A_y'$, $A_z'$) may be received (at block 1915) from the IMU's accelerometer. The processing unit 120 may perform a coordinate rotation (transformation) to compute the acceleration vector relative to the local coordinate system (x, y, z). The coordinate rotation (transformation) may be performed by using the parameters received in the initial setup state (FIG. 17) for identifying the directions of gravity and the local magnetic north. The processing unit 120 may subtract gravity from the z acceleration components.

At block 1920, discrete Fourier transform may be performed on the three components of the acceleration vector, $A(t)=\{A_x(t), A_y(t), A_z(t)\}$ over N1 samples in order to obtain the spectral components, $A''(\omega)=\{A''_x(\omega), A''_y(\omega), A''_z(\omega)\}$ of the acceleration vector. For example, some embodiments may perform a fast Fourier transform (FFT) algorithm to compute the discrete Fourier transform of the components of the acceleration vector, $A''(\omega)$. In order to distinguish seismic waves from man-made vibrations, some embodiments may filter the parameters received from the IMU to limit the data to the frequencies of the seismic waves. Performing the DFT (or FFT) converts the normalized (re-oriented) IMU measurements to a function of frequency, allowing the measurements to be filtered by their frequencies as described below.

Next, the results of the DFT is filtered (at block 1925) to limit the three components of the acceleration vector to the range of frequencies of the P-waves. In some of the present embodiments, the three components of the acceleration vector may be filtered to components with frequencies in the range of frequencies of the P-waves to eliminate the components (e.g., the components caused by man-made activities) that are not related to the P-waves. Eliminating these components are similar to applying a band pass filter in the range of frequencies of the P-waves to the parameters received from the IMU. The band limited acceleration vector, as a function of time, is referred herein as $A''(t)=\{A''_x(t), A''_y(t), A''_z(t)\}$.

Next, the relative power of the P-waves to the power of all components of the acceleration vector may be computed (at block 1930). Since the P-waves are mostly compression waves and propagate from below the surface of the earth, the P-waves arrive substantially in the vertical direction. The P-waves may, therefore, be identified by analyzing the vertical component of the acceleration vector, i.e., the z component, $A''_z(t)$, of the band-limited acceleration vector, $A''(t)$ with respect to the local coordinate system.

The relative power of the P-waves, in some embodiments, may be computed as the ratio, $R_p$, of the magnitude of the envelope of the normalized (and band-limited) vertical component of the acceleration to the normalized horizontal component. In other embodiments, the ratio of the magnitude of power (under the curve) of the vertical component to the total seismic vector power magnitude ($A''^2$) is computed as shown in Equation (2) and the result is compared with the threshold value $R_T$. When the P-waves arrive, the ratio of the vertical power to the total power increases above a threshold value and may then slowly decrease.

The relative strength of the P-wave to the total vector power ratio is given in Equation (2):

$$R_p = \frac{\sum_{t=1}^{N1} A''^2_z(t)}{\sum_{t=1}^{N1}\left(A''^2_x(t) + A''^2_y(y) + A''^2_z(t)\right)} \quad \text{Eq. (2)}$$

where, $A''_x(t)$, $A''_y(t)$, $A''_z(t)$ are instantaneous acceleration components along each local coordinate axes after filtering, and $R_P$ is the ratio of the vertical vibrations' power to the total vibrations' power in the three directions.

With further reference to FIG. 19, a determination may be made (at block 1935) whether the relative strength of the P-wave to the total vector power ratio is greater than or equal to a threshold, $R_T$. If not, the P-waves are not detected and the processing may proceed to block 1905, which was described above.

Otherwise, a determination may be made (at block 1940) whether the P-waves bursts have lasted for a time period, $T_p$. The valve of $R_p$ may be monitored and if for a period $t>=T_p$, the value is greater than or equal to the threshold, $R_T$, the processing may proceed to block 1945, which is described below. Otherwise, the P-waves are not detected and the processing may proceed to block 1905, which was described above. In some embodiments, the determination of whether the P-waves bursts have lasted for a time period is optional. These embodiments may skip block 1940.

At block 1945, the total wave activity power magnitude over an $N_2$ sample window may be computed as shown by Equation (3):

$$M = \sum_{t=1}^{N2}\left(A''^2_x(t) + A''^2_y(t) + A''^2_z(t)\right) \quad \text{Eq. (3)}$$

Since the P-waves travel faster than the S-waves, the detection of the P-waves may be followed by a period of relatively low activity, $T_{p-s}$. At block 1950, a determination may be made whether M is less than the threshold $M_1$ for a time period $t>=T_{p-s}$. If not, the P-waves are not detected and the processing may proceed to block 1905, which was described above. Otherwise, the detection of the P-waves is conformed and the processing may proceed to the alert state, which is described below with reference to FIG. 20.

When the epicenter of the seismic waves is close to where the valve shutoff device is installed, the S-waves may arrive in a relatively short time period after the P-waves. In some of the present embodiments, the valve of $T_{p-s}$ may be set to a small value (e.g., less than 5 seconds, less then 1 second, less than a fraction of a second, etc.) to account for the situations where the epicenter may be close to the location of the valve shutoff device. Some of the present embodiments may set the $T_{p-s}$ to 0. These embodiments may skip blocks 1945 and 1950.

Some of the present embodiments may close the shutoff valve after detecting the P-waves and without waiting for the S-waves or surface waves to be detected. In these embodiments, after the P-waves are detected, the processing may proceed to the end state (instead of the alert state), described below with reference to FIG. 22, to close the shutoff valve.

Figure 20:
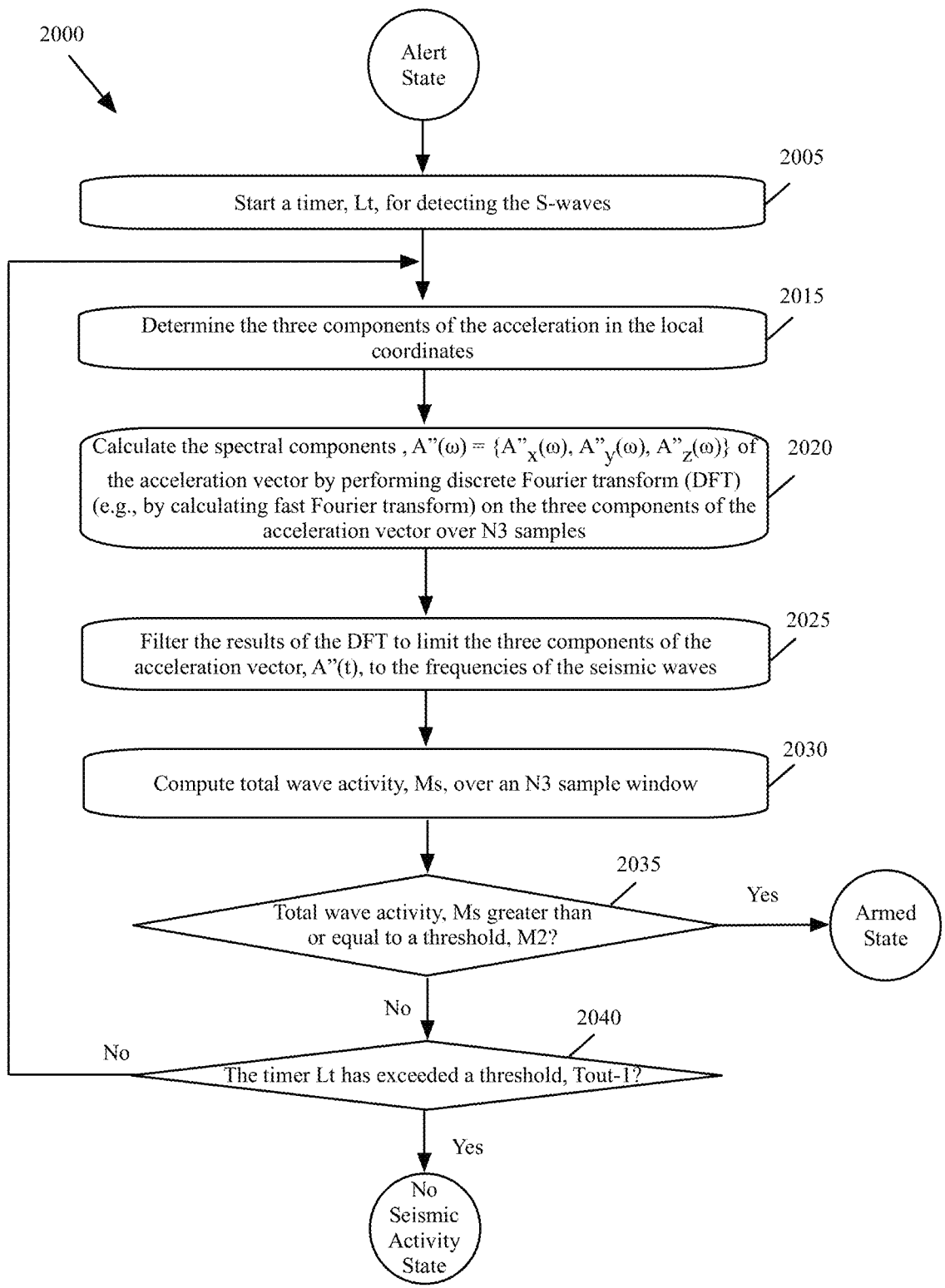
FIG. 20 is a flowchart illustrating an example process for identifying the S-waves related to seismic activities, according to various aspects of the present disclosure.

FIG. 20 is a flowchart illustrating an example process 2000 for identifying the S-waves related to seismic activities, according to various aspects of the present disclosure. The process 2000, in some of the present embodiments, may be performed by the processing unit 120 (FIGS. 12A-12C, 42, 46, 48), and/or by the firmware of a valve shutoff device/valve controller device. Although the process 2000 is described by referring to an IMU, for the embodiments that use a separate accelerometer, and/or magnetometer (e.g., the embodiments that may not include an IMU), the process 2000 is applicable to an accelerometer and/or a magnetometer of a valve shutoff device that are not part of an IMU.

With reference to FIG. 20, a timer, Lt, may be started (at block 2005) for detecting S-waves. Next, the three components of the acceleration vector in the local coordinates may be determined (at block 2015). In some of the present embodiments, the three components of the acceleration vector in the local coordinates may be computed by firmware (e.g., the firmware associated with a motion engine). For example, the firmware may perform a coordinate rotations from the (x', y', z') coordinates used by the IMU to the local coordinates (x, y, z). The gravity may in some embodiments be subtracted from the z acceleration components.

In other embodiments, the processing unit 120 may compute he three components of the acceleration vector in the local coordinates. For example, the processing unit 120 may the three components of the acceleration vector $(A_x', A_y', A_z')$ may be received (at block 2015) from the IMU's accelerometer. The processing unit 120 may perform a coordinate rotation (transformation) to compute the acceleration vector relative to the local coordinate system (x, y, z). The coordinate rotation (transformation) may be performed by using the parameters received in the initial setup state (FIG. 17) for identifying the directions of gravidity and the local magnetic north. The processing unit 120 may subtract gravity from the z acceleration components.

At block 2020, discrete Fourier transform may be used on the three components of the acceleration vector, $A(t)=\{A_x(t), A_y(t), A_z(t)\}$ over $N_3$ samples to obtain $A''(\omega)=\{A''_x(\omega), A''_y(\omega), A''_z(\omega)\}$. For example, some embodiments may perform a fast Fourier transform (FFT) algorithm to compute the discrete Fourier transform of the components of the acceleration vector, $A(t)$.

Next, the results of the DFT may be filtered (at block 2025) to band-limit the three components of the acceleration vector, $A''(\omega)$, to the range of frequencies of the seismic waves. For example, the three components of the acceleration vector, $A(t)$, may be filtered to components with frequencies of the seismic waves to eliminate the components (e.g., the components caused by man-made activities) that are not related to the seismic waves. Eliminating these components are similar to applying a band pass filter in the range of the seismic waves to the parameters received from the IMU after coordinate transformation from the IMU's coordinates into the local coordinates (e.g., by performing a "taring" function as described above). The band-limited acceleration vector, in time-domain, is referred herein as $A''(t)=\{A''_x(t), A''_y(t), A''_z(t)\}$. During the alert state, the range of frequencies that are considered may be different than the range of frequencies considered for the detection of the P-waves during the "no seismic activity" state.

With further reference to FIG. 20, the total wave activity power magnitude over an $N_3$ sample window may be computed (at block 2030) as shown in Equation (4):

$$M_S = \sum_{t=1}^{N3} \left( A''^2_x(t) + A''^2_y(t) + A''^2_z(t) \right) \qquad \text{Eq. (4)}$$

where, $A''_x(t), A''_y(t), A''_z(t)$ are the instantaneous band-limited acceleration components along each local coordinate axes. Since the S-waves may have any polarization, Equation (4) computes the total vector magnitude (power) of the seismic waves.

Next, a determination may be made (at block 2035) whether the total wave activity power magnitude over an $N_3$ sample window exceeds a threshold, $M_2$. If yes, S-waves are detected and the processing may proceed to the armed state, which is described below with reference to FIG. 21. Otherwise, a determination may be made (at block 2040) whether the timer Lt has exceeded a threshold, Tout-1. If not, the processing may proceed to block 2010, which was described above. Otherwise, the time period for expecting the S-waves is expired and the processing may proceed to the "no seismic activity" state, which was described with reference to FIG. 17.

Some of the present embodiments may close the shutoff valve after detecting the S-waves and without waiting for the surface waves to be detected. In these embodiments, when the determination is made (at block 2035) that the total wave activity power magnitude over an $N_3$ sample window exceeds a threshold, $M_2$ (i.e., when the S-waves are detected), the processing may proceed to the end state (instead of the armed state), described below with reference to FIG. 22, to close the shutoff valve.

Figure 21:
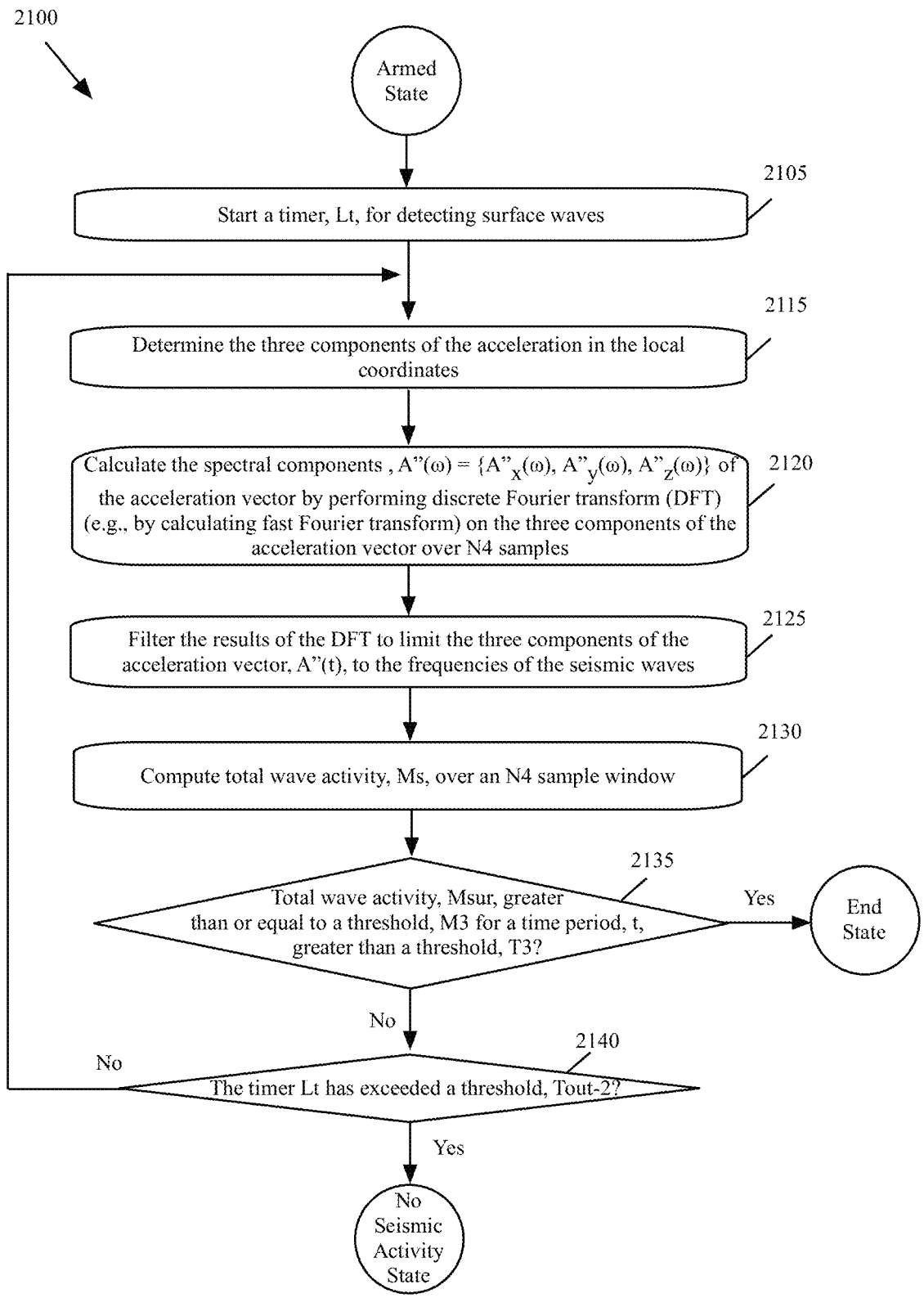
FIG. 21 is a flowchart illustrating an example process for identifying the surface waves related to seismic activities, according to various aspects of the present disclosure.

FIG. 21 is a flowchart illustrating an example process 2100 for identifying the surface waves related to seismic activities, according to various aspects of the present disclosure. The process 2100, in some of the present embodiments, may be performed by the processing unit 120 (FIGS. 12A-12C, 42, 46, 48), and/or by the firmware of a valve shutoff device/valve controller device. Although the process 2100 is described by referring to an IMU, for the embodiments that use a separate accelerometer, and/or magnetometer (e.g., the embodiments that may not include an IMU), the process 2100 is applicable to an accelerometer and/or a magnetometer of a valve shutoff device that are not part of an IMU.

With reference to FIG. 21, a timer, Lt, may be started (at block 2105) for detecting the surface waves. As described above with reference to FIG. 14, the surface waves 1423 may include the Love waves and the Rayleigh waves.

Next, the three components of the acceleration vector in the local coordinates may be determined (at block 2115). In some of the present embodiments, the three components of the acceleration vector in the local coordinates may be computed by firmware (e.g., the firmware associated with a motion engine). For example, the firmware may perform a coordinate rotations from the (x', y', z') coordinates used by the IMU to the local coordinates (x, y, z). The gravity may in some embodiments be subtracted from the z acceleration components.

In other embodiments, the processing unit 120 may compute he three components of the acceleration vector in the local coordinates. For example, the processing unit 120 may the three components of the acceleration vector $(A_x', A_y', A_z')$ may be received (at block 2115) from the IMU's accelerometer. The processing unit 120 may perform a coordinate rotation (transformation) to compute the acceleration vector relative to the local coordinate system (x, y, z). The coordinate rotation (transformation) may be performed by using the parameters received in the initial setup state (FIG. 17) for identifying the directions of gravidity and the local magnetic north. The processing unit 120 may subtract gravity from the z acceleration components.

At block 2120, discrete Fourier transform may be used on the three components of the acceleration vector, $A(t)=\{A_x(t), A_y(t), A_z(t)\}$ over N4 samples to obtain the frequency-domain vector $A(\omega)=\{A_x(\omega), A_y(\omega), A_z(\omega)\}$. For example, some embodiments may perform a fast Fourier transform (FFT) algorithm to compute the discrete Fourier transform of the components of the acceleration vector, $A''(\omega)$.

Next, the results of the DFT may be filtered (at block 2125) to band-limit the three components of the acceleration vector, $A''(t)$, to the range of frequencies of the seismic waves. The three components of the acceleration vector, $A(t)$, may be filtered to components in the range of frequencies of the seismic waves to eliminate the components that are not related to the seismic waves (e.g., the components caused by man-made activities). Eliminating these components are similar to applying a band pass filter in the range of frequencies of the seismic waves to the parameters received from the IMU. The band-limited acceleration vector is referred herein as $A''(t)=\{A''_x(t), A''_y(t), A''_z(t)\}$. In some of the present embodiments, the range of frequencies that are considered during the armed state may be similar to the range of frequencies considered during the alert state, which may be wider than the range of frequencies considered for the detection of the P-waves during the "no seismic activity" state.

With further reference to FIG. 21, the total wave activity power magnitude over an $N_4$ sample window may be computed (at block 2130) as shown in Equation (5):

$$M_{Sur} = \sum_{t=1}^{N4}\left(A_x''^2(t) + A_y''^2(t) + A_z''^2(t)\right) \quad \text{Eq. (5)}$$

where, $A''_x(t)$, $A''_y(t)$, $A''_z(t)$ are instantaneous band-limited acceleration components along each local coordinate axes. Equation (5) in some embodiments is similar to Equation (4) used for detecting the S-waves.

Next, a determination may be made (at block 2135) whether the total wave activity power magnitude over an $N_4$ sample window, Msur, exceeds a threshold, $M_3$ over a time period t greater than a threshold, T3. In the armed state, the Love and Rayleigh seismic activity components are expected. These waves are characterized by high intensity acceleration in all three directions. Therefore, the magnitude of the acceleration vector may be used to identify an occurrence of a severe earthquake and its severity or intensity. The threshold $M_3$ may be higher than the threshold $M_2$ used above for detecting the S-waves.

When the total wave activity power magnitude over an $N_4$ sample window, Msur, is determined (at block 2135) to exceed the threshold, $M_3$ over the time period t greater than a threshold, T3, the surface waves are detected and the processing may proceed to the end state, which is described below with reference to FIG. 22. Otherwise, a determination may be made (at block 2140) whether the timer Lt has exceeded a threshold, Tout-2. If not, the processing may proceed to block 2110, which was described above. Otherwise, the time period for expecting the surface waves is expired and the processing may proceed to the "no seismic activity" state, which was described with reference to FIG. 17.

Figure 22:
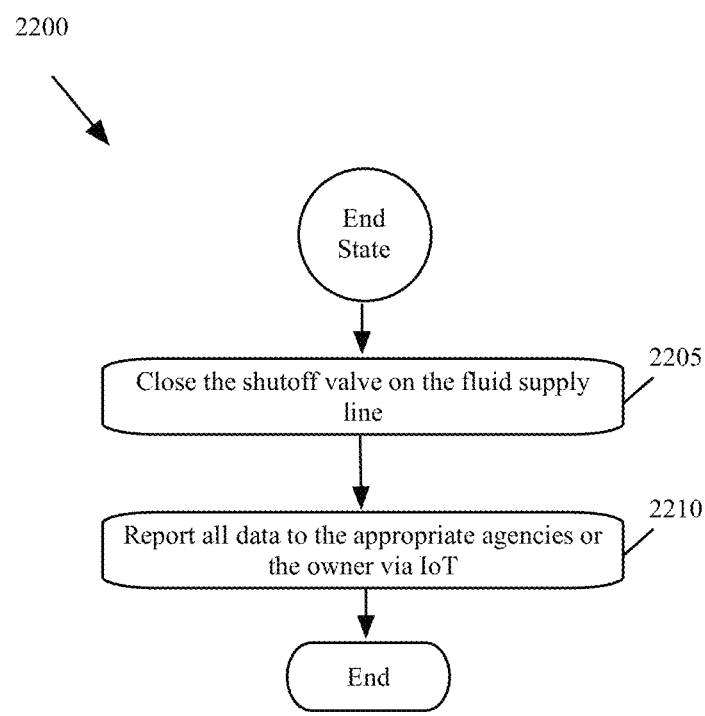
FIG. 22 is a flowchart illustrating an example process for closing a shutoff valve on a fluid supply line after the surface waves related to seismic activities exceed a threshold, according to various aspects of the present disclosure.

FIG. 22 is a flowchart illustrating an example process 2200 for closing a shutoff valve on a fluid supply line after the surface waves related to seismic activities exceed a threshold, according to various aspects of the present disclosure. The process 2200, in some of the present embodiments, may be performed by the processing unit 120 (FIGS. 12A-12C) of a valve shutoff device 100.

With reference to FIG. 22, the shutoff valve on the fluid supply line may be closed (at block 2205). For example, the processing unit 120 (FIG. 1B) may send a signal to the motor 115 to turn the rotor shaft 150 and the valve coupling key 145 in order to turn the shutoff valve actuator 180 and close the shutoff valve 175. Several examples of processes for closing the shutoff valve are described below with reference to FIGS. 23-24 and 27-28.

With further reference to FIG. 22, one or more data items related to the seismic activities may be sent (at block 2210) to one or more electronic devices. The examples of the data items sent to the one or more electronic devices may include without limitations, the status of the shutoff valve (e.g., open or close), the parameters received from the accelerometer, the parameters received from the magnetometer, the calculations related to the power and/or the duration of the P-waves, the calculations related to the power and/or the duration of the S-waves, the calculations related to the power and/or the duration of the surface waves, the time period between the detection of the P-waves and S-waves, the time period between the detection of the S-waves and surface-waves, the location of the valve shutoff device, etc.

The data items may be sent by the processing unit 120 (FIGS. 12A-12C) through the radio transceiver 125, the antenna 135, and the network(s) 1280 to one or more of the electronic devices 1205 and/or one or more of the cloud/backend servers 1210. The processing may then end. In some of the present embodiments, the valve shutoff device may include a global positioning system (GPS) chip. In these embodiments, the location of the valve shutoff device may be determined through the GPS.

In some of the present embodiments, the location of the shutoff valve (e.g., a physical address and/or the geographic coordinates (e.g., the longitude and the latitude) of the location where the shutoff valve is installed may be entered through a client device 2535 (FIG. 25) during the provisioning of the valve shutoff device. Some of the present embodiments may not send any data. These embodiments may skip block 2210.

Figure 23:
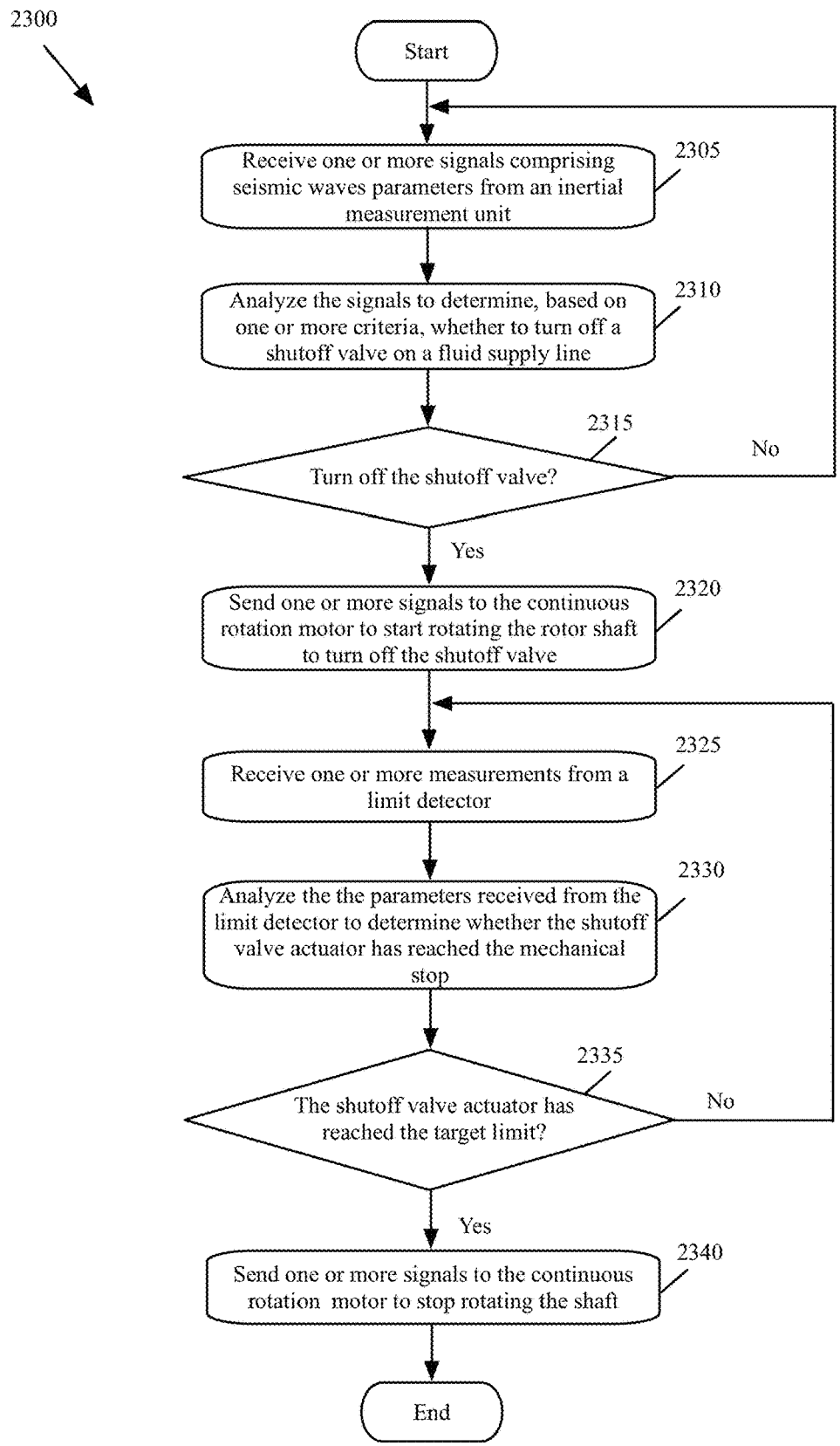
FIG. 23 is a flowchart illustrating an example process for turning of a shutoff valve, which has a mechanical stop, by a processing unit based on the analysis of seismic waves, according to various aspects of the present disclosure.

FIG. 23 is a flowchart illustrating an example process 2300 for turning off a shutoff valve that has a mechanical stop, by a continuous rotation motor, according to various aspects of the present disclosure. A continuous rotation motor may be a motor without a feedback loop. The continuous rotation motor may be a motor that lacks a feedback loop or may be a servomotor that is modified to offer open-loop position control instead of the usual closed-loop position control. A continuous rotation motor may need to receive a set of one or more signals to start rotating and another set of one or more signals to stop rotating. In some of the present embodiments, the process 2300 may be performed by the processing unit 120 (FIGS. 1A-1B and 12A-12C).

With reference to FIG. 23, one or more signals comprising seismic waves parameters may be received (at block 2305) from an IMU. For example, the processing unit 120 (FIG. 12A) may receive one or more parameters related to seismic waves 1421-1423 of FIG. 14 from the IMU 135.

With further reference to FIG. 23, the signals 2310 may be analyzed (at block 2310) to determine, based on one or more criteria, whether to turn off a shutoff valve on a fluid supply line. For example, the processing unit 120 (FIG. 12A) may analyze the seismic waves parameters as described above with reference to FIGS. 17-22 to determine whether the seismic activities are above a threshold (e.g., a threshold to ensure the seismic activities, when translated into the Richter scale, are above a predetermined limit such as for example and without limitations, 5.2 level, 5.3 level, 5.4 level, etc.)

Next, a determination may be made (at block 2315) whether to turn off the shutoff valve. For example, the processing unit 120 may determine whether to turn off the shutoff valve based on the analysis. The details of blocks 2305-2315 were described above with reference to FIGS. 17-22. When it is determined (at block 2315) that the shutoff value is not to be turned off, the processing may return to block 2305, which was described above. Otherwise, one or more signals may be sent (at block 2320) to the continuous rotation motor to start rotating the rotor shaft to turn off the shutoff valve. For example, the processing unit 120 may send a signal to the motor 150 (FIGS. 1A-1B and 12A-12C) to start rotating the rotor shaft 150 to turn off the shutoff valve 175.

At block 2325, one or more parameters from a limit detector may be received. Since the motor in the example of process 2300 is a continuous rotation motor and the shutoff valve actuator 1281 has a mechanical stop, the processing unit 120 has to know when the shutoff valve actuator is no longer rotating in order to turn off the motor.

The limit detector, in some of the present embodiments, may be a force or torque limit detector 1261 (FIGS. 12A and 13A) and the parameters received from the limit detector 1261 may include measurements of force and/or torque exerted on the rotor shaft 150. The limit detector in some embodiments may be a motor current limit detector 1262 (FIGS. 12B and 13B) and the parameters received from the limit detector 1262 may include measurements of electrical current used by the motor 115. The limit detector in some embodiments may be a rotary position encoder 1263 such as the optical rotary position encoder of FIG. 13C or the magnetic rotary position encoder of FIG. 13D and the measurements may include the position and/or the speed of the rotor shaft 150.

With further reference to FIG. 23, the parameters received from the limit detector may be analyzed (at block 2330) to determine whether the shutoff valve actuator has reached the mechanical stop. For example, if the limit detector is a force or torque limit detector, the processing unit 120 may determine whether the force or torque exerted on the rotor shaft 150 has exceeded a limit. If the limit detector is a motor current limit detector, the processing unit 120 may determine that the current used by the motor 115 has exceeded a limit. If the limit detector is a rotary encoder, the processing unit 120 may determine that the rotational speed of the rotor shaft 150 has reached zero and/or whether the angular position of the rotor shaft 150 has reached a predetermined angle.

At block 2335, a determination may be made whether the shutoff valve actuator has reached the target limit (e.g., a mechanical stop). If not, the processing may proceed to block 2325, which was described above. Otherwise, one or more signals may be sent (at block 2340) to the continuous rotation motor to stop rotating the shaft. The processing may then end.

Figure 24:
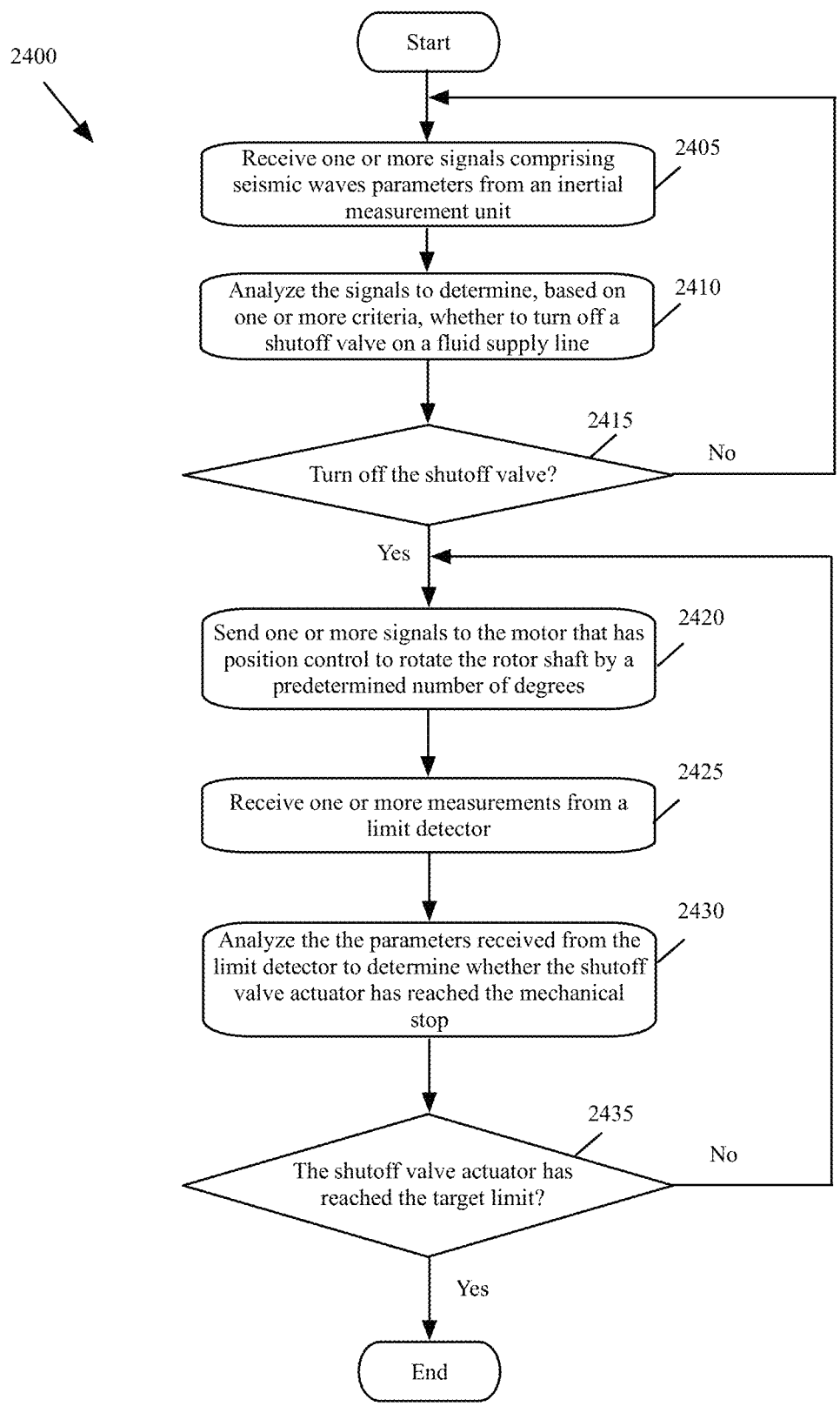
FIG. 24 is a flowchart illustrating an example process for turning off a shutoff valve, which has a mechanical stop, by a motor that has position control, according to various aspects of the present disclosure.

FIG. 24 is a flowchart illustrating an example process 2400 for turning off a shutoff valve, which has a mechanical stop, by a motor that has position control, according to various aspects of the present disclosure. In some of the present embodiments, the process 2400 may be performed by the processing unit 120 (FIGS. 12A-12C).

A motor with position control may be a servomotor that is a motor with a feedback circuitry, for example, and without any limitations, a potentiometer, and a control circuit. As the servomotor rotates, the potentiometer's resistance may change and the control circuit may precisely control how much movement is made by the servomotor and in which direction. The processing unit 120 of the automatic valve shutoff device 100 may send one or more signals and/or commands to the control circuit of the servomotor to rotate the rotor shaft 150 by a certain amount.

A motor with position control may be a stepper motor (or step motor). A stepper motor divides a full rotation into a number of equal steps. The motor's position may then be controlled by sending signals to the motor to move and hold at one of these steps.

With reference to FIG. 24, blocks 2405-2415 are similar to blocks 2305-2315 of FIG. 23, respectively. The details of blocks 2305-2315 and 2405-2415 were described above with reference to FIGS. 17-22. At block 2420, one or more signals may be sent to the motor that has position control to rotate the rotor shaft by a predetermined number of degrees (or number of turns). For example, the processing unit 120 may send a signal or command to the motor 115 to turn the rotor shaft 150 by a number of degrees. The rotor shaft 150 may be connected to the valve coupling key 145, which in turn may be engaged with the shutoff valve level 180.

The shutoff valve actuator 180 may, for example, be the shutoff valve lever 180 (FIG. 2) or the ball valve handle 1005 (FIG. 10) that typically turns 90 degrees from open to close. The processing unit may not know whether the shutoff valve is currently open, closed, or partially closed. The shutoff valve actuator 180 may, for example, be the gate valve handwheel 800 (FIG. 8) that may need to be turned around several times in order to be closed. The processing unit may not know the current position of the handwheel and/or how many turns the handwheel 800 has be turned to close. The processing unit may, therefore, send one or more signals or commands to the motor (at block 2420) to turn the rotor shaft 150 in a direction that closes the valve and check one or more parameters to make sure the shutoff valve actuator 180, the handle 1005, or the handwheel 800 have reached the mechanical stop and the valve is closed.

With further reference to FIG. 24, one or more measurements may be received (at block 2425) from a limit detector. The limit detector may be one of the limit detectors described above with reference to block 2325 of FIG. 23. The limit detector may be external to or an integral part of the servomotor. For example, the limit detector may be a potentiometer that is integral to the motor.

With continued reference to FIG. 24, the parameters received from the limit detector may be analyzed (at block

2430) to determine whether the shutoff valve actuator has reached the mechanical stop. For example, if the limit detector is a force or torque limit detector, the processing unit 120 may determine whether the force or torque exerted on the rotor shaft 150 has exceeded a limit. If the limit detector is a motor current limit detector, the processing unit 120 may determine that the current used by the motor 115 has exceeded a limit. If the limit detector is a rotary encoder, the processing unit 120 may determine that the rotational speed of the rotor shaft 150 has reached zero and/or whether the angular position of the rotor shaft 150 has reached a predetermined angle.

At block 2435, a determination may be made whether the shutoff valve actuator has reached the target limit (e.g., a mechanical stop). If not, the processing may proceed to block 2420, which was described above. Otherwise, the processing may end.

In some aspects of the present embodiments, the shutoff valve actuator 180 (FIG. 2) or the ball valve handle 1005 (FIG. 10) may be free rotating devices. For example, the ball valve connected to the shutoff valve actuator 180 or the ball valve handle 1005 may be free rotating ball valves. The ball valve may open or close the fluid supply line 170 (FIG. 1A) after each 90 degree turns but the valve may not have a mechanical stop and may keep on rotating when a force or torque is applied to it. A ball valve may initially have a mechanical stop that may become worn out over time, causing the ball valve to freely rotate.

In some of the present embodiments, the processing unit may learn the positions of the rotor shaft when the valve is on or off. FIG. 25 is a schematic front view of a client device 2535 that may include an application program for identifying the position of the rotor shaft when the valve is on or off, according to various aspects of the present disclosure. The figure illustrates, through four stages 2501-2504, a client device 2535 using an application program 2520 to identify the position of the rotor shaft when the valve is on or off.

With reference to FIG. 25, stage 2501 shows a graphical user interface (GUI) 2532 displayed on a display (e.g., a touch screen) 2530 of the client device 2535, which may include several selectable user interface (UI) items (e.g., icons) of several applications 2520-2527. As shown, the valve shutoff application 2520 is selected in stage 2501. In response to the selection of the valve shutoff application 2520, the GUI 2532 in stage 2502 may display several options 2540-2557. The valve shutoff application 2520 may be a program that is installed on the client device 2535 to provision, setup, and/or control a valve shutoff device.

The "provision a valve shutoff device" option 2557 may be selected to associate a valve shutoff device with the client device 2535. For example, the client device 2535 may be one of electronic devices 1205 in FIGS. 12A-12C and the client device 2535 and the valve shutoff device 100 may be connected to the network(s) 1290. The client device and the valve shutoff device may discover each other. The valve shutoff device 100 may be provisioned to recognize the client device 2535 as a client device that is authorized to communicate and exchange signals, commands, and data with the valve shutoff device 100.

During the provisioning, one or more data items related to the valve shutoff device may be set. For example, the GUI 2532 may include an option (not shown) for entering the physical address and/or the geographical coordinates (e.g., the latitude and the longitude) of the location where the shutoff valve is being installed. In some of the present embodiments, the valve shutoff device 100 may include a GPS component (e.g., a GPS receiver chip). In these embodiments, the location information (e.g., the geographical coordinates) may be automatically set by the valve shutoff device without the client device intervention. The location information may be used, for example, to send the location of the valve shutoff device to one or more electronic devices as described above with reference to FIG. 22. In the example of FIG. 25, it is assumed that the valve shutoff device is already provisioned using the provision option 2557.

As shown in step 2502, the initial setup option 2555 may be selected. In response to the selection of the initial setup option 2555, the GUI 2532 in stage 2503 may display an incremental forward option 2561, an incremental backward option 2562, an option 2565 to confirm that the valve is placed in the off position, and an option 2595 to exit. The GUI 2532 may display a message 2560 requesting the valve shutoff device to be connected to the manual shutoff valve and the incremental forward 2561 and/or the incremental backward 2562 buttons to be repeatedly selected until the valve is closed.

Each selection of the incremental forward 2561 option may cause the client device 3335 to send a signal to the valve shutoff device 100 to rotate the rotor shaft 150 by a number of degrees in a direction (e.g., in clockwise or counter clockwise direction). Each selection of the incremental backward 2562 option may cause the client device 2535 to send a signal to the valve shutoff device 100 to rotate the rotor shaft 150 by a number of degrees in the opposite direction (e.g., in counter clockwise or clockwise direction).

In stage 2503, the option 2565 is selected (e.g., after the shutoff valve is turned off by selecting options 25361 and/or 2562 one or more times). As described below with reference to FIG. 26, the client device 2535 may send a signal to the processing unit 120 to measure and store the current position of the rotor shaft 150 as the position corresponding to the shutoff valve being turned off.

In response to the selection of the option 2565, the GUI 2532 in stage 2504 may display a message 2570 requesting the incremental forward 2561 and/or the incremental backward 2562 buttons to be repeatedly selected until the valve is opened. The GUI 2532, in stage 2504, may provide the incremental forward option 2561, the incremental backward option 2562, an option 2575 to confirm the valve is placed in the on position, and an option 2580 to exit. In stage 2504, the option 2575 is selected (e.g., after the shutoff valve is turned on by selecting options 25361 and/or 2562 one or more times). As described below with reference to FIG. 26, the client device 2535 may send a signal to the processing unit to measure and store the current position of the rotor shaft 150 as the position corresponding to the shutoff valve being turned on.

Figure 26:
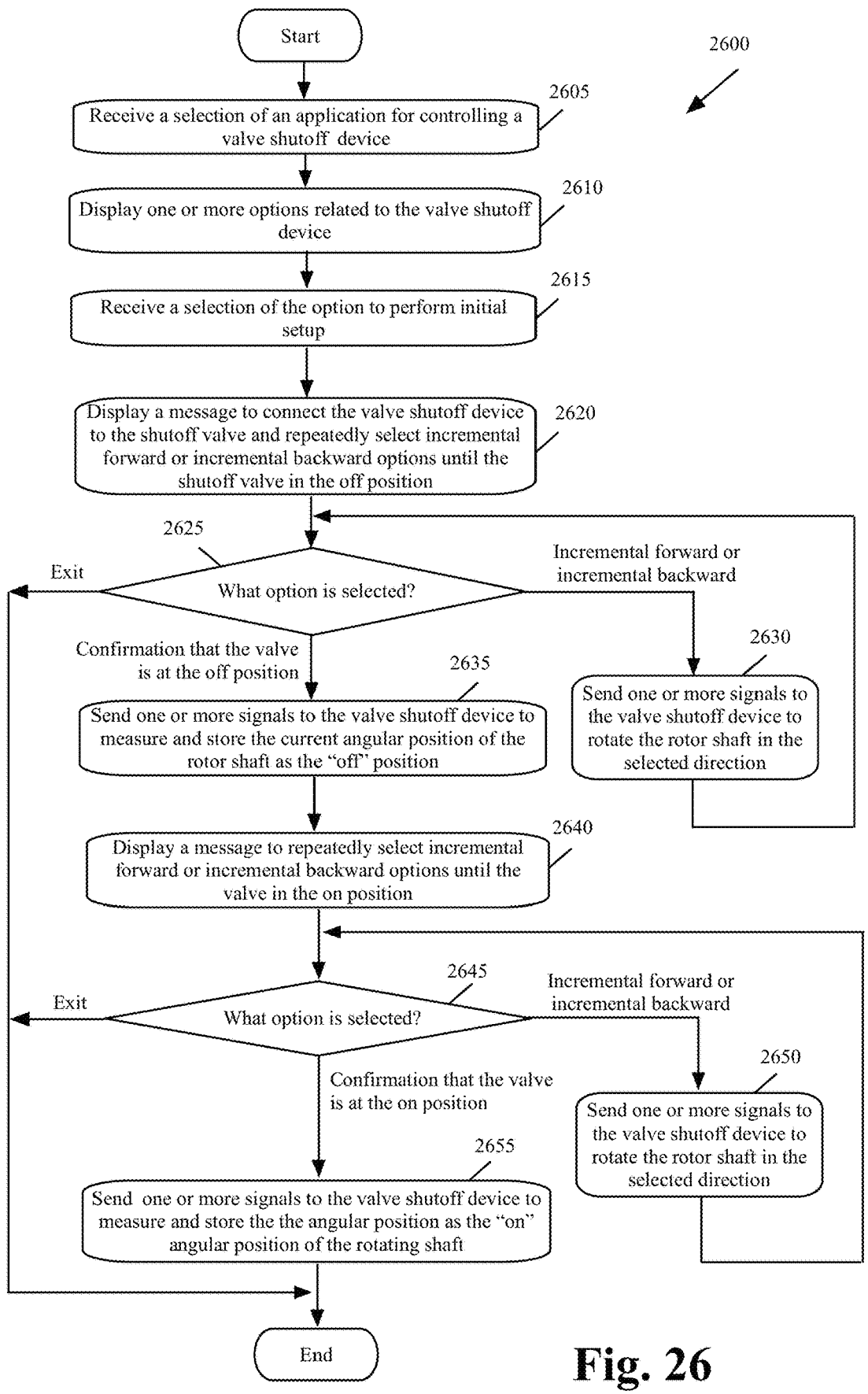
FIG. 26 is a flowchart illustrating an example process for identifying the on and off positions of a shutoff valve, according to various aspects of the present disclosure.

FIG. 26 is a flowchart illustrating an example process 2600 for identifying the on and off positions of a shutoff valve, according to various aspects of the present disclosure. In some of the present embodiments, the process 2600 may be performed by a processing unit of the client device 2535 of FIG. 25.

With reference to FIG. 26, at block 2605, a selection of an application for controlling a valve shutoff device may be received. For example, a selection of the valve shutoff application 2520 may be received in stage 2501 of FIG. 25. In response to the selection of the application, one or more options related to the valve shutoff device may be displayed (at block 2610). For example, options 2540-2557 may be displayed in stage 2502 of FIG. 26.

At block 2615, a selection of the option to perform initial setup may be received. For example, a selection of the initial setup option 2555 may be received in stage 2502 of FIG. 25. In response to the selection of the initial setup option, a message may be displayed (at block 2520) to connect the valve shutoff device to the shutoff valve and repeatedly select an incremental forward option and/or an incremental backward option until the shutoff valve is closed. For example, the client device 2535 may display the message 2560 of stage 2503 (FIG. 25).

Next, the option selected may be determined (at block 2625). When the selected option is the incremental forward or the incremental backward, one or more signals may be sent (at block 2630) to the valve shutoff device to rotate the rotor shaft in the selected direction. For example, the client device 2535 (FIG. 25) or an electronic device 1205 (FIGS. 12A-12C) may send one or more signals to the valve shutoff device 100 to rotate the rotor shaft 150 by a predetermined number of degrees (or turns, fraction of turn, etc.) in either clockwise or counter clockwise direction based on which one of the incremental forward or the incremental backward options is selected. The processing may then return to block 2625, which was described above.

With reference to FIG. 26, when the selected option at block 2625 is exit, the processing may end. For example, when the option 2595 of FIG. 25 is selected, the valve shutoff application 2520 may be terminated. With further reference to FIG. 26, when the selected option is the confirmation that the shutoff valve 175 is in the off position, one or more signals may be sent (at block 2635) to the valve shutoff device to measure and store the current angular position of the rotor shaft as the "off" position. The signals may cause the processing unit 120 of the valve shutoff device 100 to use, for example, the measurements provided by a rotary position encoder (FIGS. 13C-13D) while the rotor shaft 150 was rotating to determine the position of the rotor shaft 150 when the motor stops.

Next, a message may be displayed (at block 2540) to repeatedly select the incremental forward option and/or the incremental backward option until the valve is opened. For example, the client device 2535 may display the message 2570 of stage 2504 (FIG. 25). Next, the option selected may be determined (at block 2645). When the selected option is the incremental forward or the incremental backward, one or more signals may be sent (at block 2650) to the valve shutoff device to rotate the rotor shaft in the selected direction. For example, the client device 2535 (FIG. 25) or an electronic device 1205 (FIGS. 12A-12C) may send one or more signals to the valve shutoff device 100 to rotate the rotor shaft 150 by a predetermined number of degrees (or turns, fraction of turn, etc.) in either clockwise or counter clockwise direction based on which one of the incremental forward or the incremental backward options is selected. The processing may then return to block 2645, which was described above.

With reference to FIG. 26, when the selected option is exit, the processing may end. For example, when the option 2580 of FIG. 25 is selected, the valve shutoff application 2520 may be terminated. With reference to FIG. 26, when the selected option is the confirmation that the shutoff valve 175 is in the on position, one or more signals may be sent (at block 2655) to the valve shutoff device to measure and store the current angular position of the rotor shaft as the "on" position. The signals may cause the processing unit 120 of the valve shutoff device 100 to use, for example, the measurements provided by a rotary position encoder (FIGS. 13C-13D) while the rotor shaft 150 was rotating to determine the position of the rotor shaft 150 when the motor stops. The processing may then end.

Figure 27:
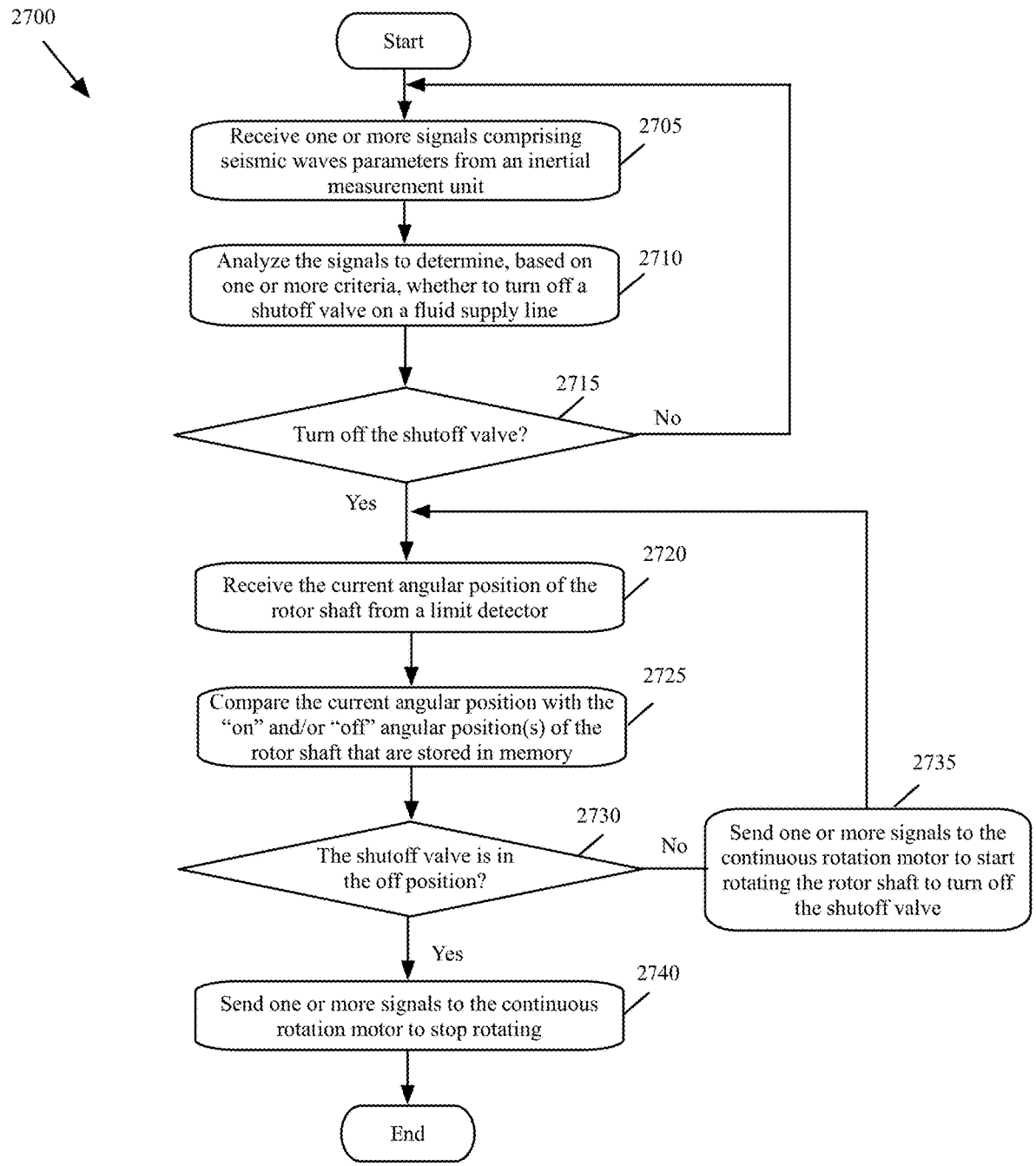
FIG. 27 is a flowchart illustrating an example process for turning off a shutoff valve by a continuous rotation motor using the stored angular positions of the rotor shaft that correspond to the "on" and/or "off" positions of the shutoff valve, according to various aspects of the present disclosure.

After the angular positions of the rotor shaft that correspond to the "on" and "off" positions of the shutoff valve are measured and stored by the valve shutoff device, these positions may be used to move the rotor shaft to open or close the shutoff valve. FIG. 27 is a flowchart illustrating an example process 2700 for turning off a shutoff valve by a continuous rotation motor using the stored angular positions of the rotor shaft that correspond to the "on" and/or "off" positions of the shutoff valve, according to various aspects of the present disclosure. In some of the present embodiments, the process 2700 may be performed by a processing unit 120 of a valve shutoff device 100 (FIG. 12C).

With reference to FIG. 27, blocks 2705-2715 are similar to blocks 2305-2315 of FIG. 23, respectively. The details of blocks 2305-2315 and 2705-2715 were described above with reference to FIGS. 17-22. At block 2720, the current angular position of the rotor shaft may be received. For example, the processing unit 120 of FIG. 12C may receive the angular position of the rotor shaft 150 from the rotary encoder limit detector 1263.

The current angular position of the rotor shaft may then be compared (at block 2725) with the "on" and/or the "off" angular positions of the rotor shaft that are stored in memory. For example, the processing unit 120 may compare the current angular position of the rotor shaft with the on" and/or the "off" angular positions of the rotor shaft that were stored by the valve shutoff device during the initial setup using process 2600 (FIG. 26).

At block 2730 it may be determined whether the shutoff valve is in the off position based on the comparison. When the shutoff valve is not in the off position, one or more signals may be sent (at block 2735) to the continuous rotation motor to start rotating the rotor shaft to turn off the shutoff valve. For example, the processing unit 120 may send one or more signals to the motor 115 to start rotating the rotor shaft 150 in the direction to close the shutoff valve. The processing may proceed back to block 2720, which was described above. Otherwise, when the shutoff valve is in the off position one or more signals may be sent (at block 2740) to the continuous rotation motor to stop rotating. The processing may then end.

Figure 28:
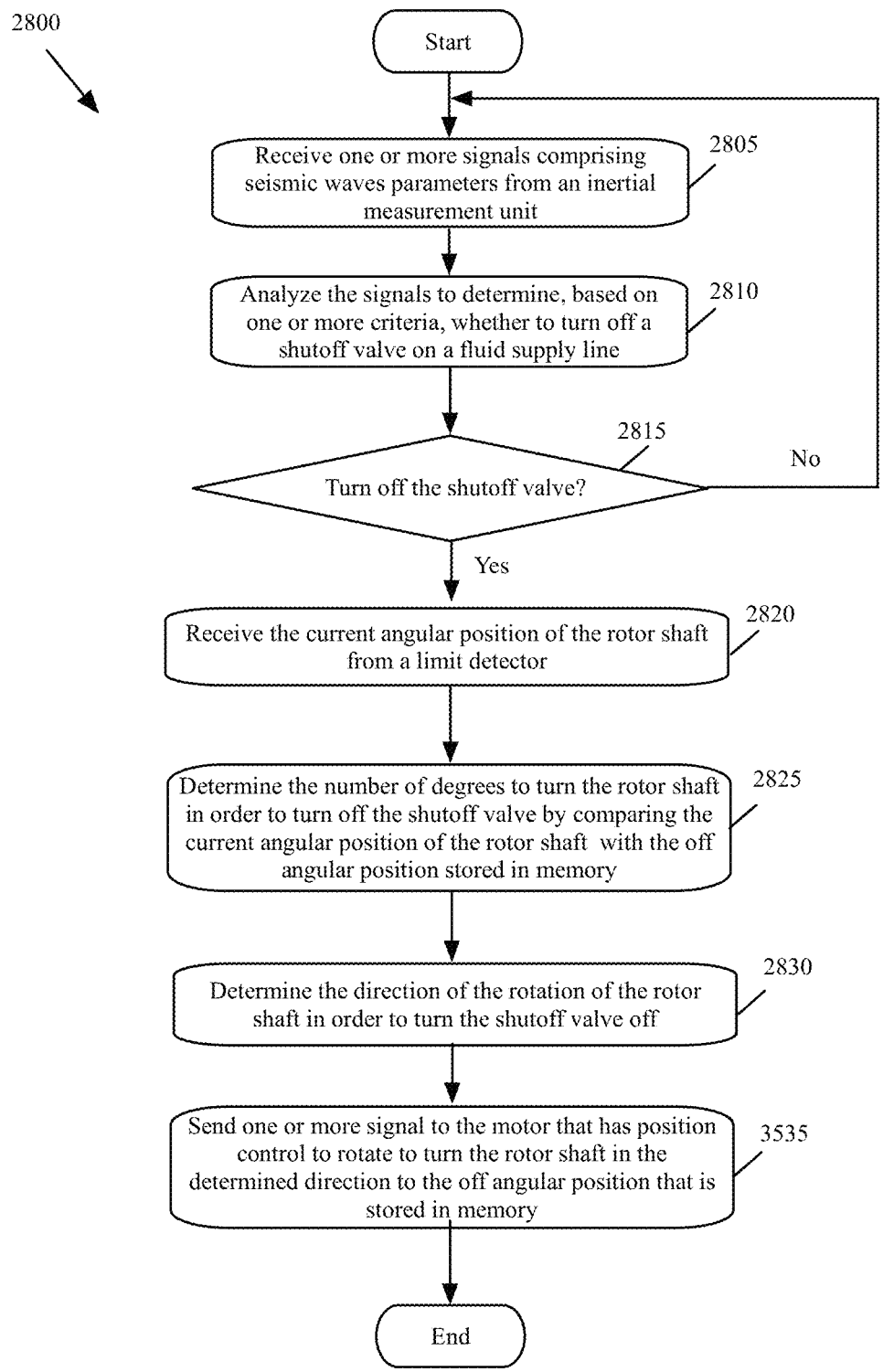
FIG. 28 is a flowchart illustrating an example process for turning off a shutoff valve by a motor that has position control using the stored angular positions of the rotor shaft that correspond to the "on" and/or "off" positions of the shutoff valve, according to various aspects of the present disclosure.

FIG. 28 is a flowchart illustrating an example process 2800 for turning off a shutoff valve by a motor that has position control using the stored angular positions of the rotor shaft that correspond to the "on" and/or "off" positions of the shutoff valve, according to various aspects of the present disclosure. In some of the present embodiments, the process 2800 may be performed by a processing unit 120 of a valve shutoff device 100 (FIG. 12C).

With reference to FIG. 28, blocks 2805-2815 are similar to blocks 2305-2315 of FIG. 23, respectively. The details of blocks 2305-2315 and 2805-2815 were described above with reference to FIGS. 17-22. At block 2820, the current angular position of the rotor shaft may be received. For example, the processing unit 120 of FIG. 12C may receive the angular position of the rotor shaft 150 from the rotary encoder limit detector 1263. The processing unit 120 may, for example, use the rotary position encoder limit detector (e.g., the optical rotary position encoder of FIG. 13C or the magnetic rotary position encoder of FIG. 13D) to determine and store the angular position of rotor shaft 150 each time the motor comes to a stop.

With further reference to FIG. 28, the number of degrees to turn the rotor shaft in order to turn off the shutoff valve may be determined (at block 2825) by comparing the current angular position of the rotor shaft with the off angular position of the rotor shaft stored in memory. The off angular position of the rotor shaft may be stored by the processing unit 120 during the initial setup using process 2600 (FIG. 26).

Next, the direction of the rotation of the rotor shaft may be determined (at block 2830). For example, the direction to turn off the shutoff valve may be clockwise (or counter clockwise direction depending on the valve design). Next, one or more signals may be sent (at block 2835) to the motor that has position control to rotate to turn the rotor shaft in the determined direction to the "off" position that is stored in memory. Since the motor has position control, the motor does not require receiving separate signals to stop. The processing may then end.

Figure 29:
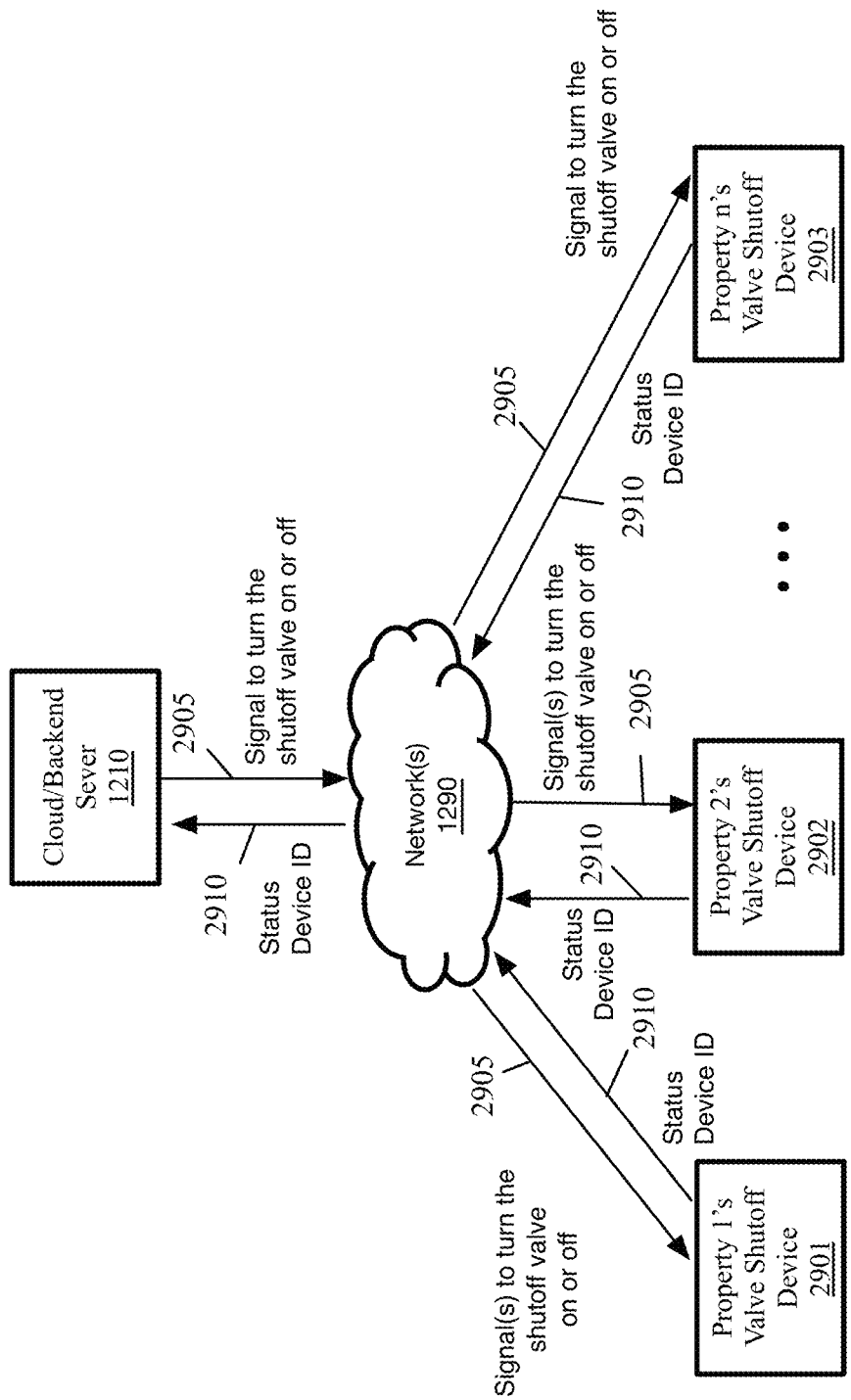
FIG. 29 is a functional block diagram illustrating a system for remotely turning a shutoff valve on or off by a cloud or backend server using a valve shutoff device, according to various aspects of the present disclosure.

In addition to turning off a shutoff valve based on the analysis of seismic waves, some of the present embodiments may turn the shutoff valve on or off based on signals that are received from authorized remote devices. The valve shutoff device, in these embodiments may operate as an IoT device. FIG. 29 is a functional block diagram illustrating a system for remotely turning a shutoff valve on or off by a cloud or backend server using a valve shutoff device, according to various aspects of the present disclosure.

With reference to FIG. 29, a cloud or backend server 130 may send one or more signals 2905 to one or more valve shutoff devices 2901-2903 to turn the shutoff valve(s) on or off. The cloud or backend server 1210 may be associated with one or more government agencies and/or utility companies such as, without limitations, firefighting department, civil defense, gas company, water company, etc. The shutoff valves devices 2901-2903 may be installed in different properties. The cloud or backend server 1210 may send the signal(s) 2905 to many valve shutoff devices 2901-2903 during an emergency event such as an earthquake, fire, war, explosion, landslide, etc., to turn off the associated shutoff valves. The cloud or backend server 1210 may send the signal(s) 2905 to an individual valve shutoff device to turn the corresponding shutoff valve on or off, for example when a utility subscriber takes possession or leaves a premise where the shutoff valve is installed (e.g., a utility company may remotely shutoff the gas shutoff valve of a property when a utility company's customer informs the utility company that the customer no longer lives in the premise.

With reference to FIG. 29, the signal(s) 2905 may go through the network(s) 1290 and may be received by the valve shutoff devices 2901-2903 that may be associated with different properties. The valve shutoff devices 2901-2903 may determine that the cloud/backend server 1210 is authorized to send the signal(s), and may turn the associated shutoff valves on or off based on the received signals. The valve shutoff devices 2901-2903 may send their status and device identification 2910 to the cloud or backend server 1210. The status may include an indication that the shutoff valve has or has not been successfully turned on or off.

Figure 30:
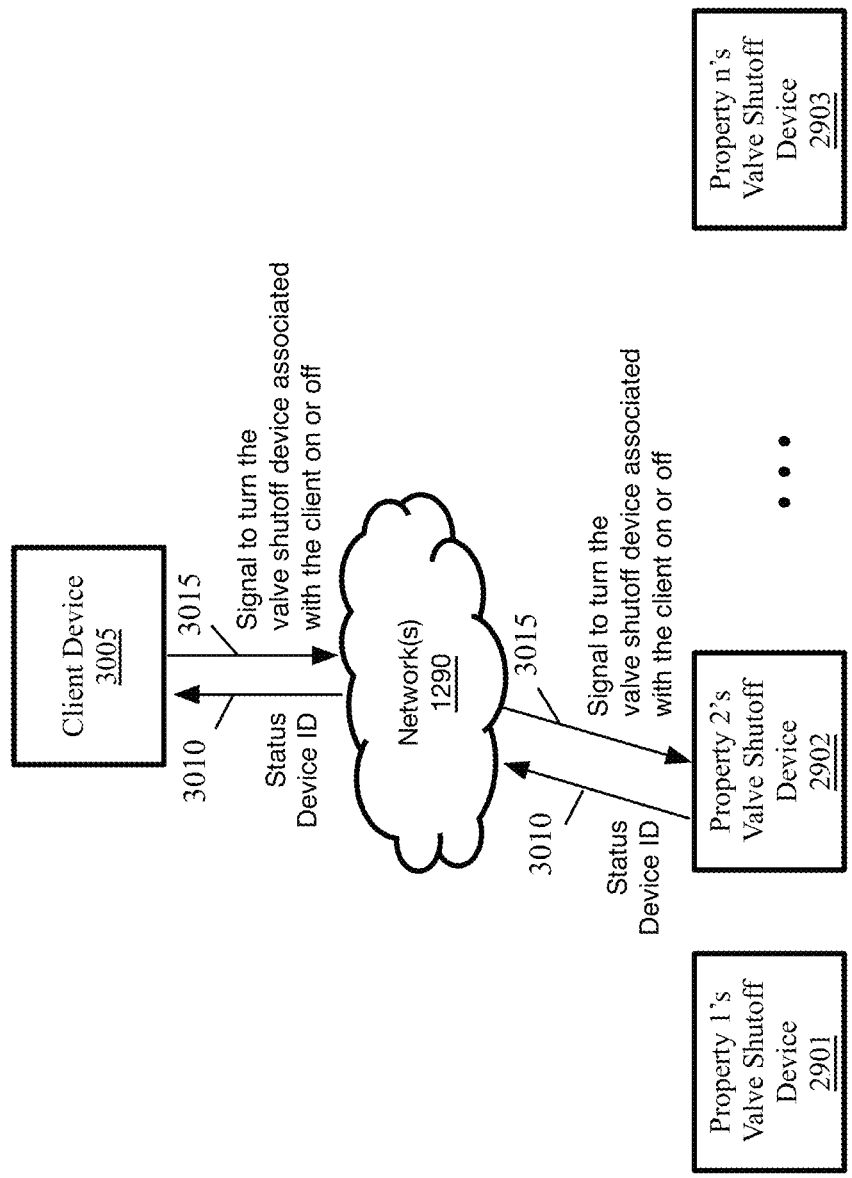
FIG. 30 is a functional block diagram illustrating a system for remotely turning a shutoff valve on or off by a client device using a valve shutoff device, according to various aspects of the present disclosure.

FIG. 30 is a functional block diagram illustrating a system for remotely turning a shutoff valve on or off by a client device using a valve shutoff device, according to various aspects of the present disclosure. The client device 3005 may be a client device such as the client device 2535 associated with a particular valve shutoff device. In the example of FIG. 30, the valve shutoff device 2902 is provisioned to be associated with the client device 3005.

With reference to FIG. 30, the client device 3005 may send one or more signals 3015 to turn the valve shutoff device 2902 associated with the client device on or off. For example, the user of the client device my wish to turn off the valve shutoff before going to a trip or turn on the valve shutoff after coming back from the trip. The user may, for example, be away from the property where the shutoff valve is installed and may wish to turn off the shutoff valve after hearing news about an earthquake, fire, or other emergency or disaster events.

With further reference to FIG. 30, the signal(s) 3015 may go through the network(s) 1290 and may be received by the valve shutoff device 2902 that may be associated with the client device. The valve shutoff device 2902 may determine that the client device 3005 is authorized to send the signal(s) to the valve shutoff device 2902, and may turn the associated shutoff valve on or off (based on the received signals). The valve shutoff 2902 may send its status and device identification 3010 to the client device 3005. The status may include an indication that the shutoff valve has or has not been successfully turned on or off. The other valve shutoff devices 2901 or 2903 that are not associated with the client device 3005 may ignore the signal(s) 3015 even if the valve shutoff devices 2901 or 2903 receive the signal(s) 3015 from the client device 3005 through the network(s) 1290.

Figure 31:
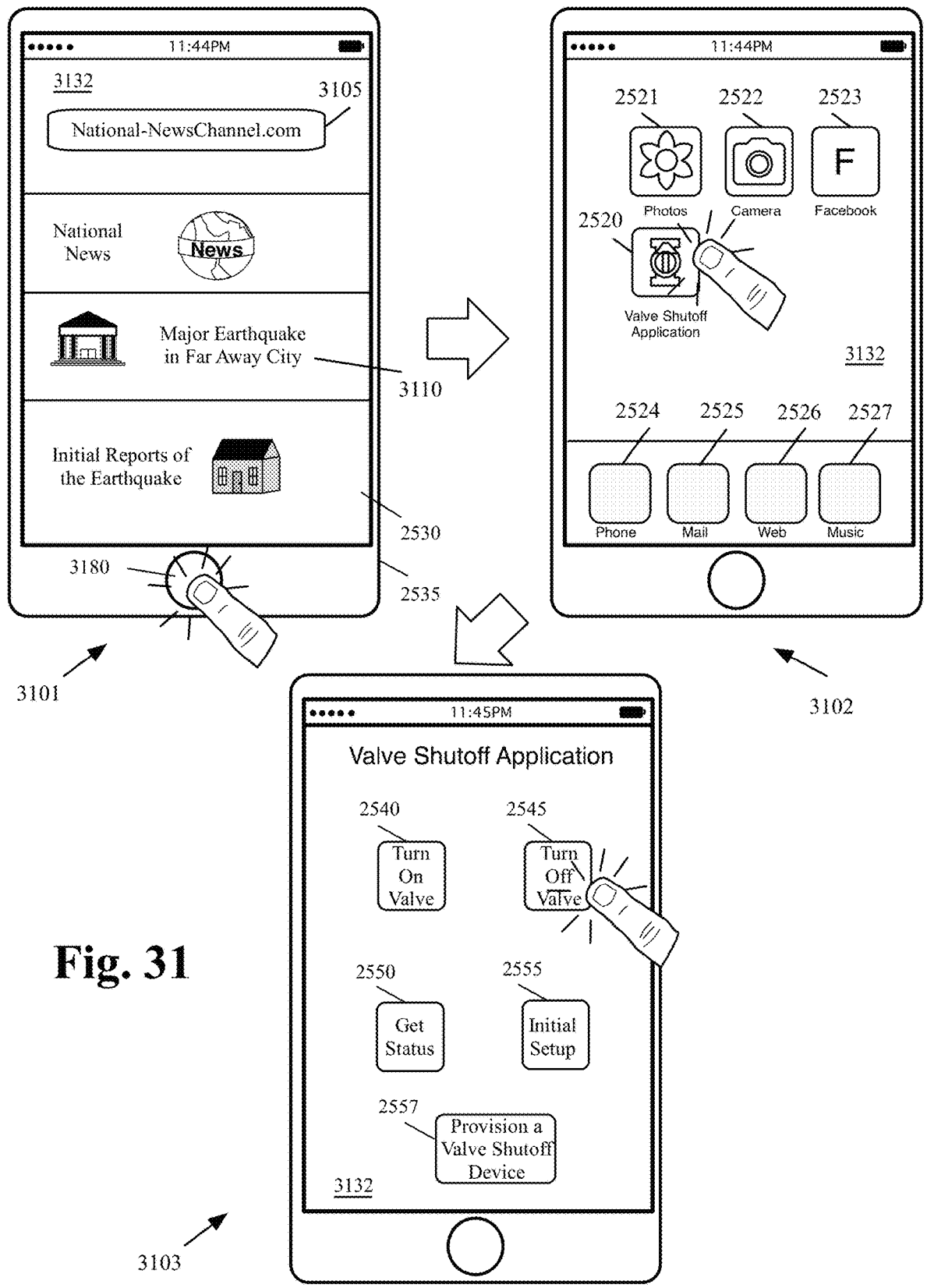
FIG. 31 is a schematic front view of a client device that may include an application program for remotely turning a shutoff valve on or off, according to various aspects of the present disclosure.

FIG. 31 is a schematic front view of a client device that may include an application program for remotely turning a shutoff valve on or off, according to various aspects of the present disclosure. The figure illustrates, through three stages 3101-3103, a client device 2535 using an application program 2520 to remotely turn a shutoff valve on or off.

With reference to FIG. 31, stage 3101 shows a graphical user interface (GUI) 3132 displayed on a display (e.g., a touch screen) 2530 of the client device 2535. In the example of FIG. 31, the client device 2535 in stage 3101 is displaying a news channel 3105 that is unrelated to the valve shutoff application 2520. As shown in this example, the news channel 3105 may display news 3110 regarding an earthquake in a city near the property where a shutoff valve associated with the client device 2535 is installed.

As shown in stage 3101, a control button 3180 is selected to exit the news channel. In response to the selection of the control button 3180, the GUI 3132 may display a list of applications 2520-2527 in stage 2502. As shown, the valve shutoff application 2520 may be selected in stage 3102. In response to the selection of the valve shutoff application 2520, the GUI 3132 in stage 3103 may display several options 2540-2557. In the example of FIG. 31, it is assumed that the valve shutoff device is already provisioned using the provision option 2557.

As shown in step 3103, the turn off valve option 2545 may be selected. As described below with reference to FIG. 32, the client device 2535 may send one or more signals to the processing unit 120 (FIGS. 12A-12C) of the valve shutoff device 100 to turn off the shutoff valve 175. Similarly, a selection of the option 2540 may cause the client device 2535 to send one or more signal to the processing unit 120 of the valve shutoff device 100 to turn on the shutoff valve 175.

Figure 32:
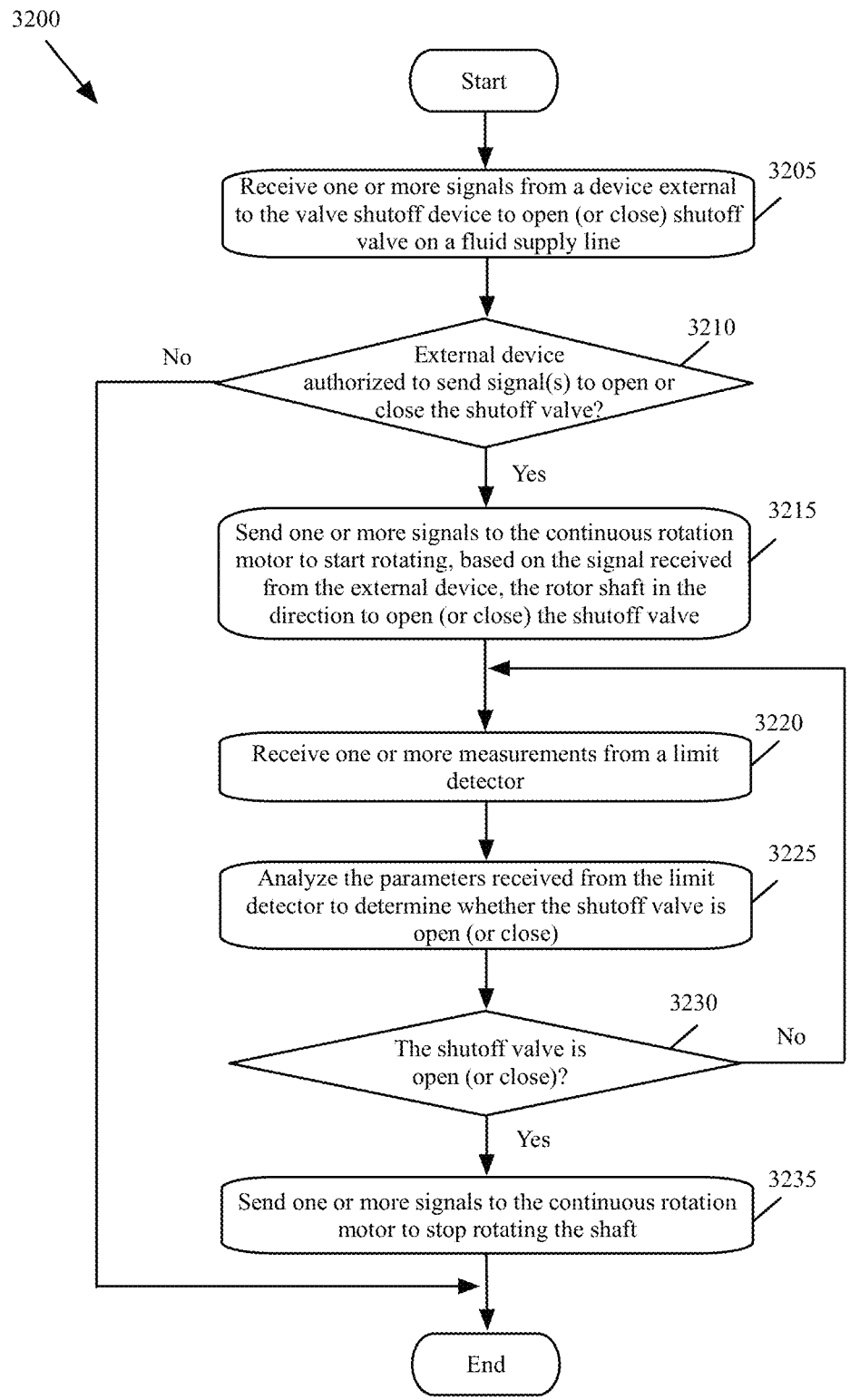
FIG. 32 is a flowchart illustrating an example process for using a continuous rotation motor to open or close a shutoff valve that has a mechanical stop, in response to receiving a signal from a remote device, according to various aspects of the present disclosure.

FIG. 32 is a flowchart illustrating an example process 3200 for using a continuous rotation motor to open or close a shutoff valve that has a mechanical stop, in response to receiving a signal from a remote device, according to various aspects of the present disclosure. A continuous rotation motor may be a motor without an internal feedback loop to control the position of the motor's rotor shaft. In some of the present embodiments, the process 3200 may be performed by the processing unit 120 (FIGS. 12A-12C).

With reference to FIG. 32, one or more signals may be received (at block 3205) from a device external to the valve shutoff device to open (or close) a shutoff valve on a fluid supply line. For example, the processing unit 120 (FIGS.

12A-12C) may receive a signal from the client device 2535 (FIG. 31) after one of the options 2540 or 2545 is selected in stage 3103.

With further reference to FIG. 32, a determination may be made (at block) 3210 whether the external device is authorized to request to open or close the shutoff valve. For example, the processing unit 120 of the valve shutoff device 100 may determine whether the external device is authorized to turn the shutoff valve on or off as a part of the provisioning of the valve shutoff device 100. The valve shutoff device 100 may be provisioned to be associated with one or more electronic devices 1205 (FIGS. 12A-12C) such as the client device 2535 (FIG. 25) that are authorized to send signals (e.g., to request for health status and data, request to turn the shutoff valve on or off, perform initial setup, etc.) to the valve shutoff device 100. The valve shutoff device 100 may be provisioned to be associated with one or more cloud or backend servers 1210 (FIGS. 12A-12C) that are authorized to send signals (e.g., to request for health status and data, request to turn the shutoff valve on or off, etc.) to the valve shutoff device 100.

With reference to FIG. 32, when the external device is not authorized to send the signal(s) to turn the shutoff valve on or off, the processing may end. Otherwise, one or more signals may be sent (at block 3215) to the continuous rotation motor to start rotating the rotor shaft in the direction to open (or close) the valve. For example, the processing unit 120 (FIGS. 12A-12B) may send a signal to the motor 150 to start rotating the rotor shaft in to turn off the shutoff valve 175.

At block 3220, one or more parameters from a limit detector may be received. Since the motor in the example of process 3200 is a continuous rotation motor and the shutoff valve actuator 1281 has a mechanical stop, the processing unit 120 has to know when the shutoff valve actuator is no longer rotating in order to turn off the motor. The limit detector, in some of the present embodiments, may be a force or torque limit detector 1261 (FIGS. 12A and 13A) and the parameters received from the limit detector 1261 may include measurements of force and/or torque exerted on the rotor shaft 150.

The limit detector in some embodiments may be a motor current limit detector 1262 (FIGS. 12B, 13B) and the parameters received from the limit detector 1262 may include measurements of electrical current used by the motor 115. The limit detector in some embodiments may be a rotary position encoder 1263 such as the optical rotary position encoder of FIG. 13C or the magnetic rotary position encoder of FIG. 13D and the measurements may include the position and/or the speed of the rotor shaft 150.

With further reference to FIG. 32, the parameters received from the limit detector may be analyzed (at block 3225) to determine whether the shutoff valve actuator has reached the mechanical stop and the shutoff valve is turned on or off. For example, if the limit detector is a force or torque limit detector, the processing unit 120 may determine whether the force or torque exerted on the rotor shaft 150 has exceeded a limit. If the limit detector is a motor current limit detector, the processing unit 120 may determine that the current used by the motor 115 has exceeded a limit. If the limit detector is a rotary encoder, the processing unit 120 may determine that the rotational speed of the rotor shaft 150 has reached zero and/or whether the angular position of the rotor shaft 150 has reached a predetermined angle.

At block 3230, a determination may be made whether the shutoff valve is open (or close). For example, a determination may be made whether shutoff valve actuator 180 has reached the mechanical stop. If not, the processing may proceed to block 3220, which was described above. Otherwise, one or more signals may be sent (at block 3235) to the continuous rotation motor to stop rotating the shaft. The processing may then end.

Figure 33:
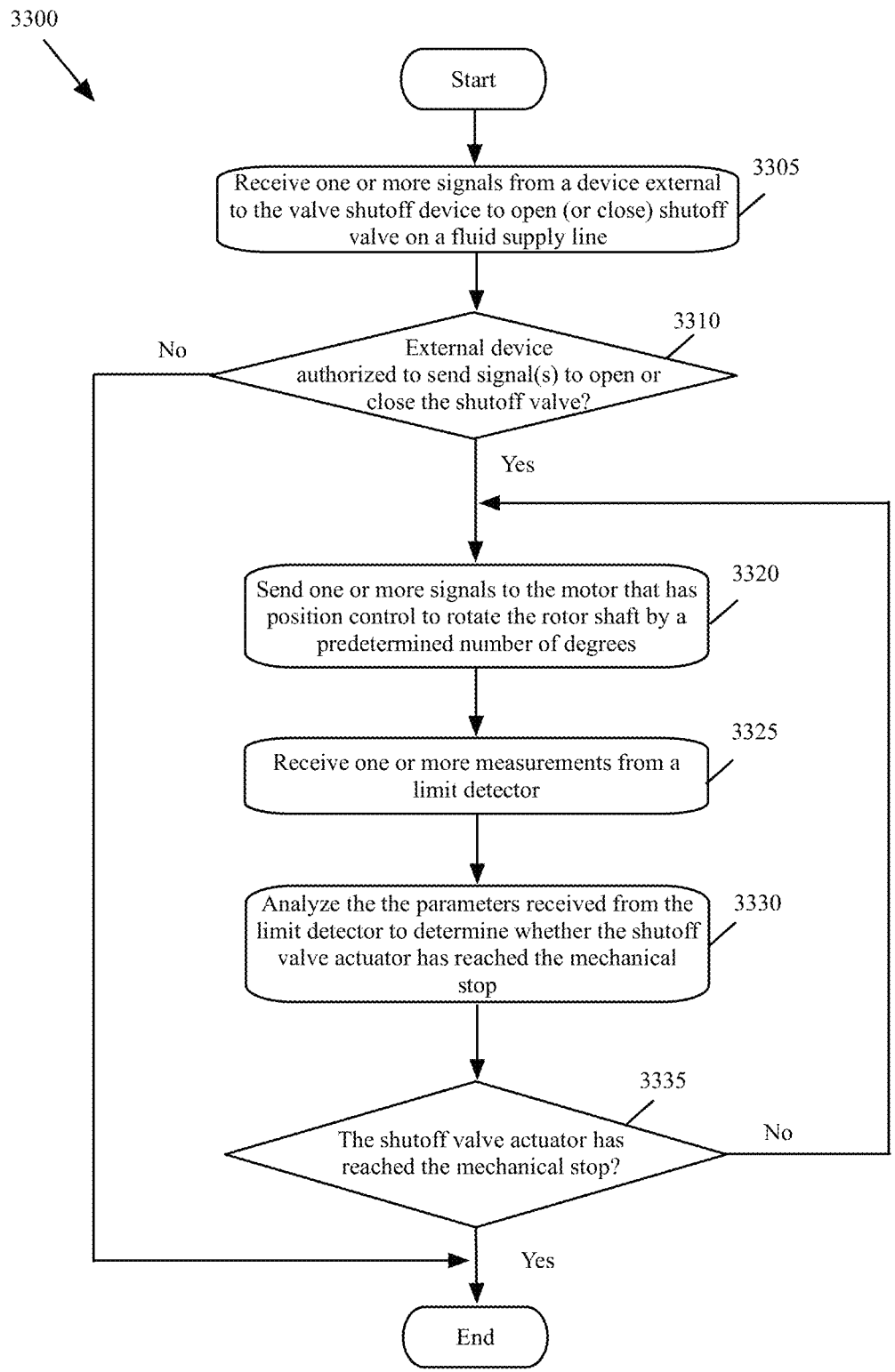
FIG. 33 is a flowchart illustrating an example process for using a motor that has position control to turn a shutoff valve that has a mechanical stop on or off, in response to receiving a signal from a remote device, according to various aspects of the present disclosure.

FIG. 33 is a flowchart illustrating an example process 3300 for using a motor that has position control to turn a shutoff valve that has a mechanical stop on or off, in response to receiving a signal from a remote device, according to various aspects of the present disclosure. In some of the present embodiments, the process 3300 may be performed by the processing unit 120 (FIGS. 12A-12C).

With reference to FIG. 33, blocks 3305-3310 are similar to blocks 3205-3210 of FIG. 32 respectively, which were described above. At block 3320, one or more signals may be sent to the motor that has position control to rotate the rotor shaft by a predetermined number of degrees (or number of turns). For example, the processing unit 120 may send one or more signals or commands to the motor 115 to turn the rotor shaft 150 by a number of degrees. The rotor shaft 150 may be connected to the valve coupling key 145, which in turn may be engaged with the shutoff valve level 180.

The shutoff valve actuator 180 may, for example, be the shutoff valve lever 180 (FIG. 2) or the ball valve handle 1005 (FIG. 10) that typically turns 90 degrees from open to close. The processing unit 120 may not know whether the shutoff valve is currently open, closed, or partially closed. The shutoff valve actuator 180 may, for example, be the gate valve handwheel 800 (FIG. 8) that may need to be turned around several times in order to be closed. The processing unit 120 may not know the current position of the handwheel and/or how many turns the handwheel 800 has be turned to close. The processing unit may, therefore, send one or more signals or commands to the motor (at block 3320) to turn the rotor shaft 150 in a direction that closes the valve and check one or more parameters to make sure the shutoff valve actuator 180, the handle 1005, or the handwheel 800 have reached the mechanical stop and the valve is closed.

With further reference to FIG. 33, one or more measurements may be received (at block 3325) from a limit detector. The limit detector may be one of the limit detectors described above with reference to block 2325 of FIG. 23. The limit detector may be external to or an integral part of the motor. For example, the limit detector may be a potentiometer that is integral to the motor.

With continued reference to FIG. 33, the parameters received from the limit detector may be analyzed (at block 3330) to determine whether the shutoff valve actuator has reached the mechanical stop. For example, if the limit detector is a force or torque limit detector, the processing unit 120 may determine whether the force or torque exerted on the rotor shaft 150 has exceeded a limit. If the limit detector is a motor current limit detector, the processing unit 120 may determine that the current used by the motor 115 has exceeded a limit. If the limit detector is a rotary encoder, the processing unit 120 may determine that the rotational speed of the rotor shaft 150 has reached zero and/or whether the angular position of the rotor shaft 150 has reached a predetermined angle.

At block 3335, a determination may be made whether the shutoff valve actuator has reached the mechanical stop. If not, the processing may proceed to block 3320, which was described above. Otherwise, the processing may end.

Figure 34:
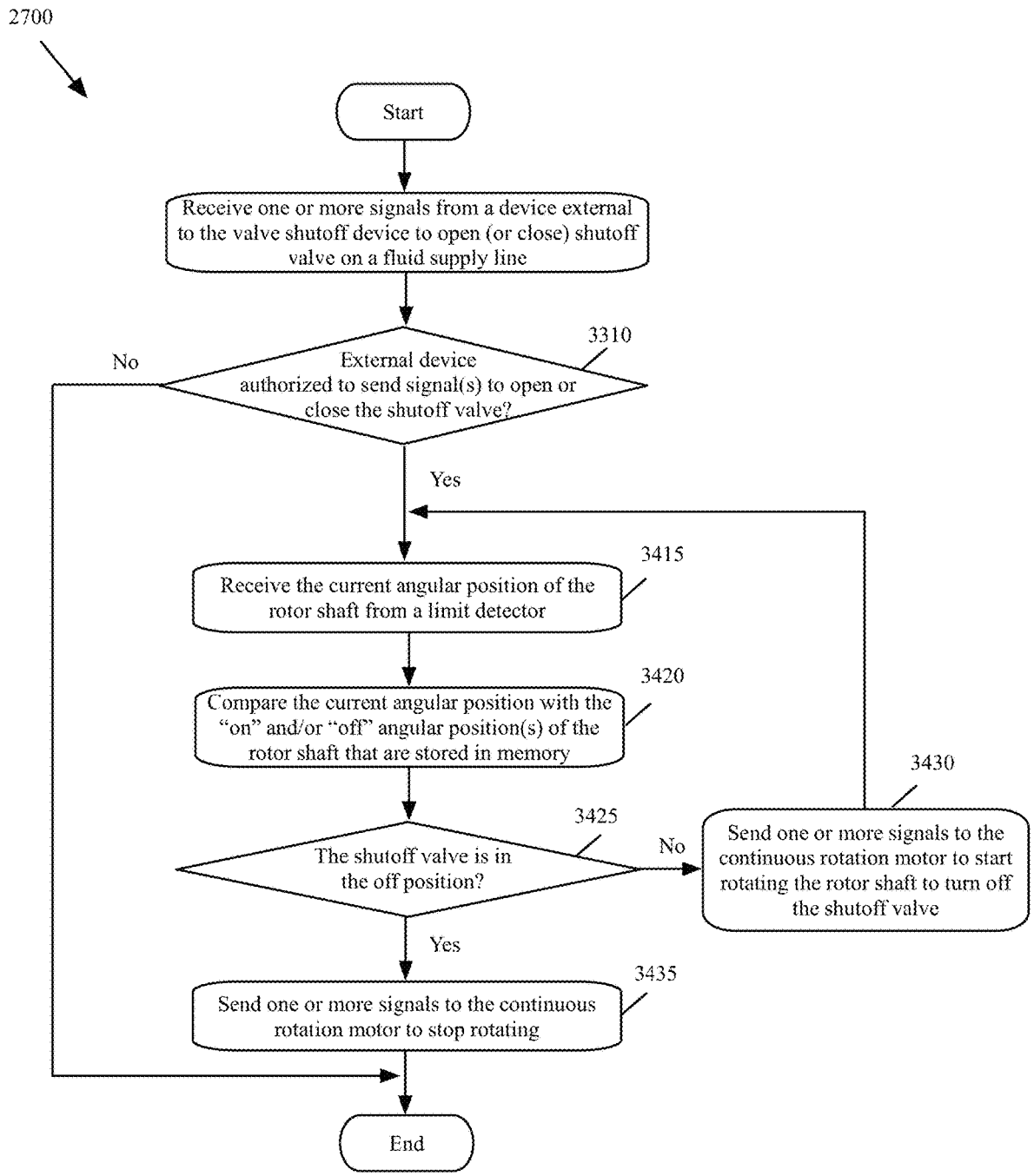
FIG. 34 is a flowchart illustrating an example process for opening or closing a shutoff valve by a continuous rotation motor using the stored angular positions of the rotor shaft that correspond to the open or close positions of the shutoff valve, in response to receiving a signal from a remote device, according to various aspects of the present disclosure.

FIG. 34 is a flowchart illustrating an example process 3400 for opening or closing a shutoff valve by a continuous rotation motor using the stored angular positions of the rotor shaft that correspond to the open or close positions of the shutoff valve, in response to receiving a signal from a remote device, according to various aspects of the present disclosure. In some of the present embodiments, the process 3400 may be performed by a processing unit 120 of a valve shutoff device 100 (FIG. 12C).

With reference to FIG. 34, blocks 3405-3410 are similar to blocks 3205-3210 of FIG. 32, respectively. At block 3415, the current angular position of the rotor shaft may be received. For example, the processing unit 120 of FIG. 12C may receive the angular position of the rotor shaft 150 from the rotary encoder limit detector 1263.

The current angular position of the rotor shaft may then be compared (at block 3420) with the "on" and/or the "off" angular positions of the rotor shaft that are stored in memory. For example, the processing unit 120 may compare the current angular position of the rotor shaft with the on" and/or the "off" angular positions of the rotor shaft that were stored by the valve shutoff device during the initial setup using process 2600 (FIG. 26).

At block 3425 it may be determined whether the shutoff valve is in the off position based on the comparison. When the shutoff valve is not in the off position, one or more signals may be sent (at block 3430) to the continuous rotation motor to start rotating the rotor shaft to turn off the shutoff valve. For example, the processing unit 120 may send one or more signals to the motor 115 to start rotating the rotor shaft 150 in the direction to close the shutoff valve. The processing may proceed back to block 3415 which was described above. Otherwise, when the shutoff valve is in the off position one or more signals may be sent (at block 3435) to the continuous rotation motor to stop rotating. The processing may then end.

Figure 35:
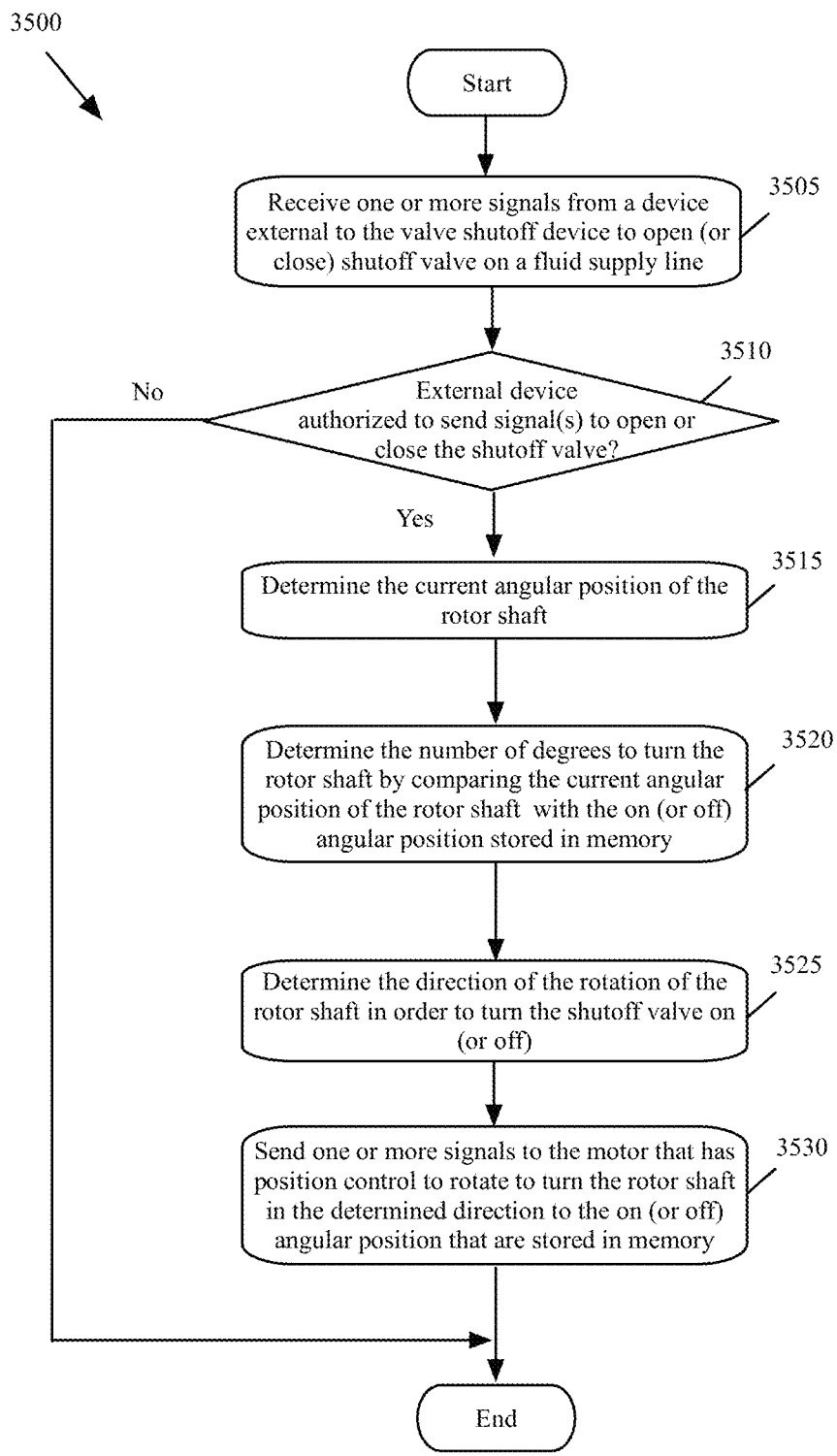
FIG. 35 is a flowchart illustrating an example process for opening or closing a shutoff valve by a motor that has position control using the stored angular positions of the rotor shaft that correspond to the open or close positions of the shutoff valve, in response to receiving a signal from a remote device, according to various aspects of the present disclosure.

FIG. 35 is a flowchart illustrating an example process 3500 for opening or closing a shutoff valve by a motor that has position control using the stored angular positions of the rotor shaft that correspond to the open or close positions of the shutoff valve, in response to receiving a signal from a remote device, according to various aspects of the present disclosure. In some of the present embodiments, the process 3500 may be performed by the processing unit 120 (FIGS. 12A-12C).

With reference to FIG. 35, blocks 3505-3510 are similar to blocks 3205-3210 of FIG. 32 respectively, which were described above. At block 3515, the current angular position of the rotor shaft may be determined. For example, the processing unit 120 in FIG. 12C may use a rotary position encoder limit detector (such as the optical rotary position encoder of FIG. 13C or the magnetic rotary position encoder of FIG. 13D) to determine and store the angular position of rotor shaft 150 each time the motor comes to a stop.

With further reference to FIG. 35, the number of degrees to turn the rotor shaft may be determined (at block 3520) by comparing the current angular position of the rotor shaft with the on (or off) angular position of the rotor shaft stored in memory. Next, the direction of the rotation of the rotor shaft may be determined (at block 3525). For example, if the request from the external device is for turning the shutoff valve off, the direction of rotation may be clockwise (or counter clockwise direction depending on the valve design). If the request from the external device is for turning the shutoff valve on, the direction of rotation may be in the opposite direction counter clockwise (or clockwise direction depending on the valve design).

Next, one or more signals may be sent (at block 3530) to the motor that has position control to rotate to turn the rotor shaft in the determined direction to the "on" (or "off") position that are stored in memory. For example, if the signal received from the external device is for turning off the shutoff valve, the signal(s) sent (at block 3530) to the motor may rotate the rotor shaft by a number of degrees in the direction to turn the shutoff valve off. If the signal received from the external device is for turning on the shutoff valve, the signal) sent (at block 3530) to the motor may rotate the rotor shaft by a number of degrees in the direction to turn the shutoff valve on. The processing may then end.

The valve shutoff devices in some of the present embodiments are compatible with the IoT specification. With the advent of the IoT, it is desirable to collect health status and data by an automatic valve shutoff device and report the health status and data to one or more external devices. The IoT is the extension of the Internet connectivity into physical devices. In some of the present embodiments, the valve shutoff device 100 (FIGS. 12A-12C) may include one or more sensors to collect data from different components of the valve shutoff device 100.

The processing unit 120 of a valve shutoff device 100 may receive and/or store the sensor data. The processing unit 120 may receive and/or store data from different components. The processing unit 120 may measure and/or store voltage and/or current levels received from different components. The processing unit 120 may compare the received and/or stored data with different thresholds to determine the health status of different components. The processing unit 120 may send the health status and/or data to one or more authorized external devices either on a pull basis upon receiving a request or on a push basis after detecting an event such as a component failure, major seismic activities, and/or on a push basis as a periodic report.

Figure 36:
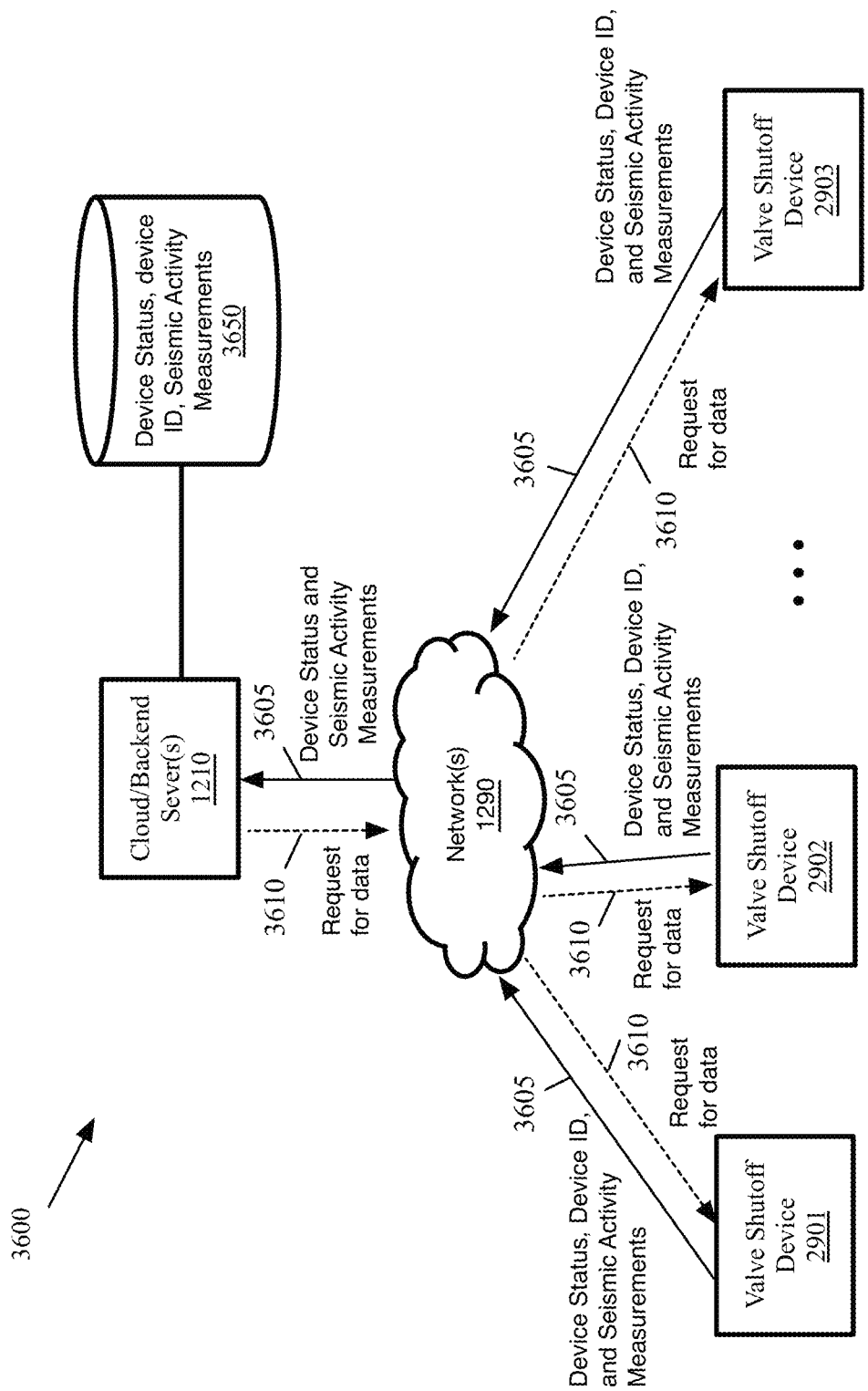
FIG. 36 is a functional block diagram illustrating a system for reporting health status and data by one or more valve shutoff devices to one or more external devices, according to various aspects of the present disclosure.

FIG. 36 is a functional block diagram illustrating a system 3600 for reporting health status and data by one or more valve shutoff devices to one or more external devices, according to various aspects of the present disclosure. With reference to FIG. 36, one or more valve shutoff devices 2901-2903 may collect device status and/or seismic activity measurements. The valve shutoff devices 2901-2903 may be installed at different properties. The valve shutoff devices 2901-2903 may send (as shown by 3605) the device status, seismic activity measurements, and/or device identification to one or more cloud or backend servers 1210.

The cloud or backend servers 1210 may store the device status, seismic activity measurements, and/or device IDs in a database 3650. The cloud or backend servers 1210 may use the collected information to estimate the intensity of seismic activities in specific areas (e.g., where one or more of the valve shutoff devices 2901-2903 are located, may assess the health status of the valve shutoff devices 2901-2903, etc.

Sending of the device status, device ID, and/or seismic activity measurements may be done on a pull basis, e.g., when the cloud or back end server(s) 1210 send(s) (as shown by 3610) a request for data. Sending of the device status, device ID, and/or seismic activity measurements may be done on a push basis after detecting an event such as a component failure, major seismic activities, and/or on a push basis as a periodic report.

Figure 37:
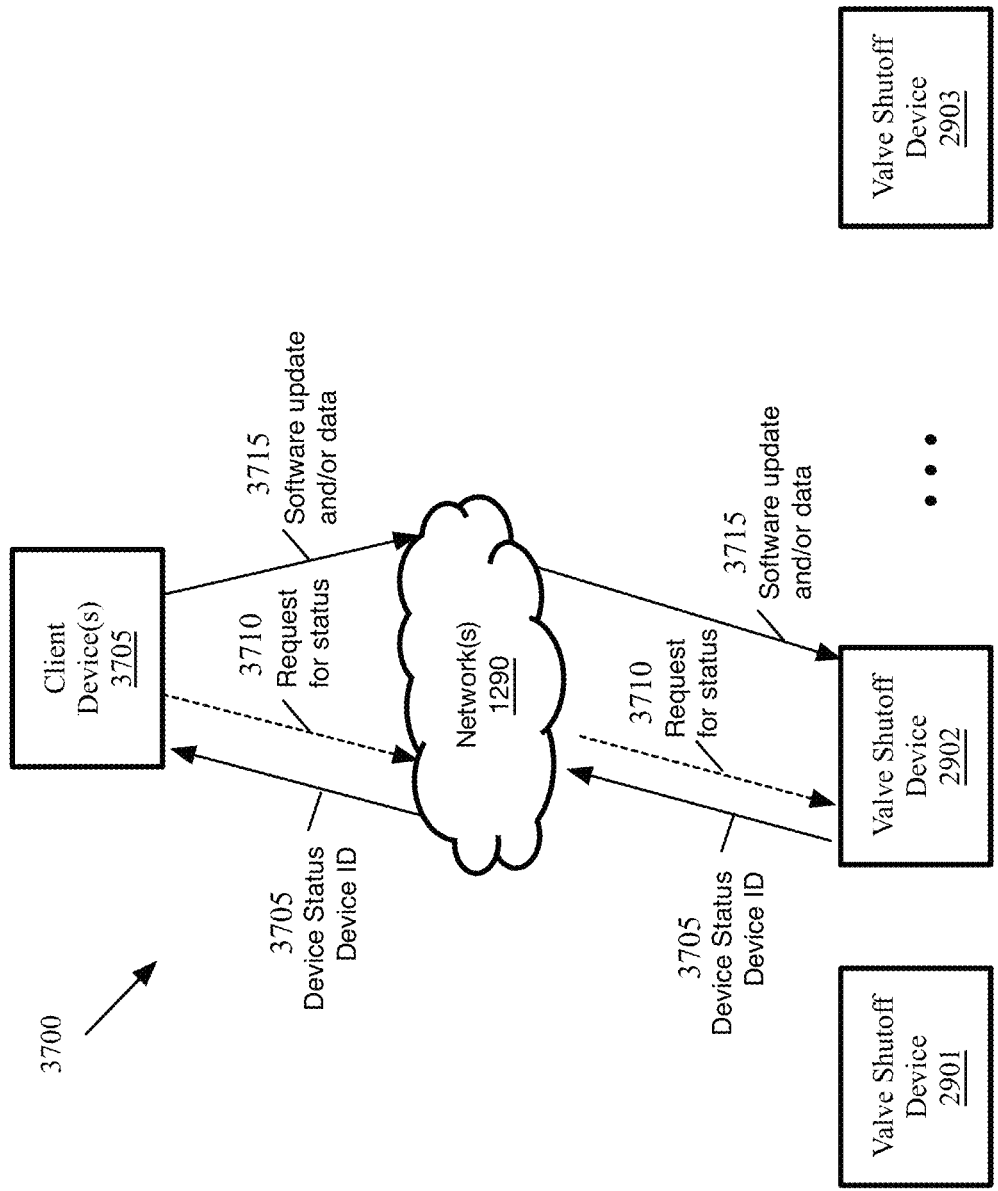
FIG. 37 is a functional block diagram illustrating a system for reporting health status and data by a valve shutoff device to one or more client devices associated with the valve shutoff device, according to various aspects of the present disclosure.

FIG. 37 is a functional block diagram illustrating a system 3700 for reporting health status and data by a valve shutoff device to one or more client devices associated with the valve shutoff device, according to various aspects of the present disclosure. With reference to FIG. 37, a valve shutoff device 2902 may collect device status. The valve shutoff device 2902 may send (as shown by 3725) the device status and/or device identification to one or more client devices 3705.

The client device(s) 3705 may store the device status and/or device ID. The client device(s) 3705 may display the device status and/or device ID on the display of the client device(s), for example, as described below with reference to FIG. 39.

Sending of the device status and/or device ID may be done on a pull basis, e.g., when the client device(s) 3705 send(s) (as shown by 3710) a request for data. Sending of the device status and/or device may be done on a push basis after detecting an event such as a component failure, major seismic activities, and/or on a push basis as a periodic report.

The client device(s) 3705 may send software updates and/or data 3715 to the valve shutoff device 2902. For example, and without limitations, the client device may send software updates for the processing unit 120 (FIGS. 12A-12C). The client device may send data, for example, and without limitations, as described above with reference to FIG. 25, the physical address and/or the geographical coordinates of the location where the valve shutoff device is installed. The client device may send different parameters of the algorithm used for the identification and determination of the intensity of the seismic waves (as described above with reference to FIGS. 17-22) either as a single data item or as a part of a software update.

Figure 38:
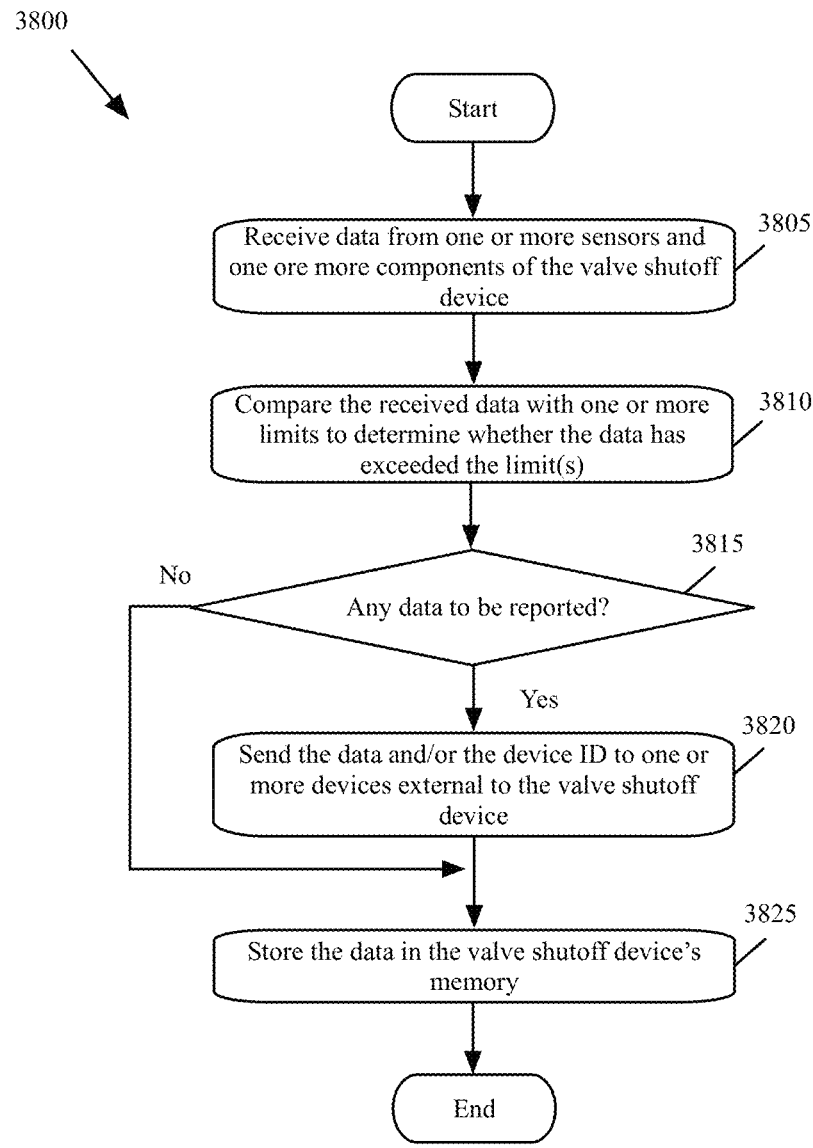
FIG. 38 is a flowchart illustrating an example process for collecting health status and data by a valve shutoff device and reporting the health status and data to one or more external devices, according to various aspects of the present disclosure.

FIG. 38 is a flowchart illustrating an example process 3800 for collecting health status and data by a valve shutoff device and reporting the health status and data to one or more external devices, according to various aspects of the present disclosure. In some of the present embodiments, the process 3800 may be performed by the processing unit 120 (FIGS. 12A-12C).

With reference to FIG. 38, data from one or more sensors and one or more components of the valve shutoff device may be received (at block 3805). The sensor and/or component data may include, without any limitations, one or more of the battery charge level, the health status of the processing unit 120 (FIGS. 12A-12C), the health status of the IMU, the health status of the radio transceiver, the health status of the limit detector, the current position of the shutoff valve (determined, for example, from the current angular position of the rotor shaft or from the last time the shutoff valve was automatically turned on or off by the valve shutoff device 100).

The processing unit 120 may, for example, measure the current and/or voltage received from the battery to determine the charge level of the battery. The processing unit 120 may receive internal health status from the IMU, radio transceiver, limit detector circuitry, etc. The processing unit 120 may check its own health status. The processing unit 120 may check the health status of the battery 150 and may determine that the battery has to be replaced. The processing unit 120 may also analyze the parameters received from the IMU and may determine the intensity of seismic activity as a data item to be stored and/or reported.

With further reference to FIG. 38, the received data may be compared (at block 3810) with one or more limits to determine whether the data has exceeded the limit(s). Next, a determination may be made (at block 3815) whether the data has to be reported. If the valve shutoff device data reporting is on a pull basis, the determination (at block 3815) to report data may be based on whether a request for data or status is received from an external device such as an authorized client device or an authorized could or backend server. If the valve shutoff device data reporting is on a pull basis, the determination (at block 3815) to report data may be based on a determination that the received data has exceeded the one or more limits and/or whether a time for a periodic report has reached.

When the determination is made (at block 3815) not to report the data, the processing may proceed to block 3825, which is described below. Otherwise, the data and/or the device ID may be sent (at block 3820) to one or more devices external to the valve shutoff device. The data may be stored (at block 3825) in the valve shutoff device's memory. The processing may then end.

FIG. 39 is a schematic front view of a client device that may include an application program for displaying health and status data collected by a shutoff valve on or off, according to various aspects of the present disclosure. The figure illustrates, through three stages 3901-3903, a client device 2535 using an application program 2520 to display health status and data received from the shutoff valve device.

With reference to FIG. 39, stage 3901 shows a graphical user interface (GUI) 3932 displayed on a display (e.g., a touch screen) 2530 of the client device 2535. The GUI 3932 may display a list of applications 2520-2527. As shown, the valve shutoff application 2520 may be selected in stage 3901. In response to the selection of the valve shutoff application 2520, the GUI 3932 in stage 3902 may display several options 2540-2557. In the example of FIG. 39, it is assumed that the valve shutoff device is already provisioned using the provision option 2557.

As shown in step 3902, the get status option 2550 may be selected. In response to the selection of the get status option 2550, the GUI 3932 may display health and status data received from the valve shutoff device 100 in stage 3903. In the example of FIG. 39, the health and status data may include one or more of the valve position 3911, the battery level 3912, the health status 3913 of the processing unit, the health status 3914 of the IMU (displayed as seismic waves measurement unit), the health status 3915 of the radio transceiver, the health status 3915 of the limit detector (displayed as motor feedback circuitry).

The GUI 3932 may provide a scroll down option 3991 and a scroll up option 3992 to display additional health status and data (if any). The GUI 3932 may provide an option 3985 to return to the previous stage.

Figure 40:
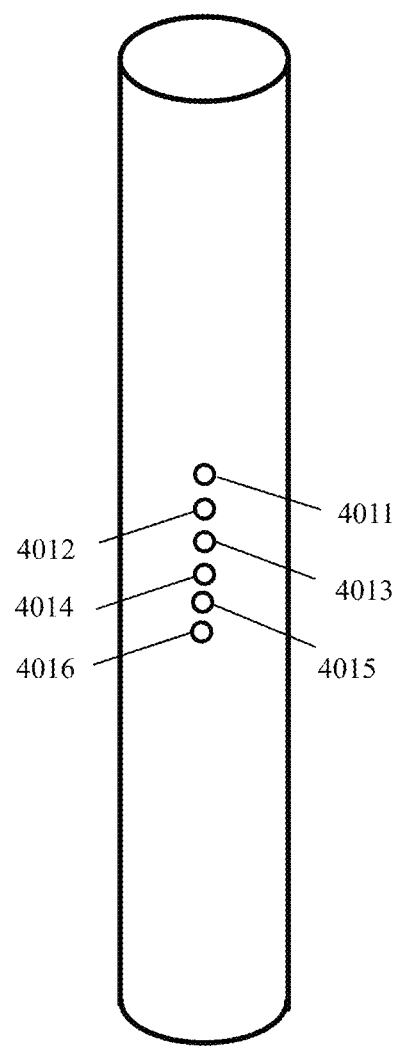
FIG. 40 is a schematic front view of a light panel of an automatic valve shutoff device, according to various aspects of the present disclosure.

In some of the present embodiments, the valve shutoff device 100 may include one or more lights (e.g., one or more LED lights for display the status of different components of the valve shutoff device 100. FIG. 40 is a schematic front view of a set of status lights of an automatic valve shutoff device, according to various aspects of the present disclosure. The lights may, for example be emitted from LED lights that are visible through corresponding holes or glass windows on the automatic valve shutoff device housing 140 (FIGS. 1A-1B).

As shown, the lights may show the status of different components of the valve shutoff device and/or the valve. The lights may, for example be turned on by the processing unit 120 of the automatic valve shutoff device when the corresponding component has failed a health check or alternatively the lights may be turned on when the corresponding component is healthy. A light may also show whether the shutoff valve is automatically opened or closed by the automatic valve shutoff device.

In the example of FIG. 40, the lights may include one or more of the following lights. A light 4011 to show the valve position, a light 4012 to indicate whether the battery level is low, a light 4013 to indicate the health status of the processing unit, a light 4014 to indicate the health status of the IMU, a light 4015 to indicate the health status of the radio transceiver, a light 4016 to indicate the health status of the limit detector.

In some of the present embodiments, the automatic valve shutoff device may have a display and keyboard panel (e.g., a touchscreen or a screen and a separate set of buttons). The display may be used to provision, to perform initial setup, to turn on or off, and/or to display the health status of the automatic valve shutoff device. The display and the keyboard panel may function similar to the functions performed by the client device 2535 in stages 2502-2504 (FIG. 25), stage 3103 (FIG. 31), and/or stages 3902-3903 (FIG. 39).

II. Solenoid Valve Controller Devices

In some of the present embodiments, the valve controller device may control one or more solenoid valves and/or one or more electrical circuit breakers. The processing unit may determine the occurrence and the intensity of different types of seismic waves and may send one or more signals to close one or more solenoid valve(s) and/or to open the circuit breaker(s). The valve controller device, in some embodiments, may control a circuit breaker with an associated relay. The valve controller device, in some embodiments, may be connected to the solenoid valves and/or the relay(s) through low voltage wires.

In the embodiments that one valve controller device is used to control only one solenoid valve, the valve controller device and the solenoid valve may be included in the same enclosure. In the embodiments that one valve controller device is used to control only relay, the valve controller device and the relay may be included in the same enclosure.

In some embodiments, the valve controller device may include a transmitter and may wirelessly send the signals to one or more valve-unit controllers that each has a receiver. Each valve-unit controller may be connected to a corresponding solenoid valve by wires (or the valve-unit controller may be incorporated in the valve). The valve-unit controller may receive the signals from the valve controller device to close the corresponding solenoid valve and may send one or more signals to the solenoid valve to close the solenoid valve.

Figure 41:
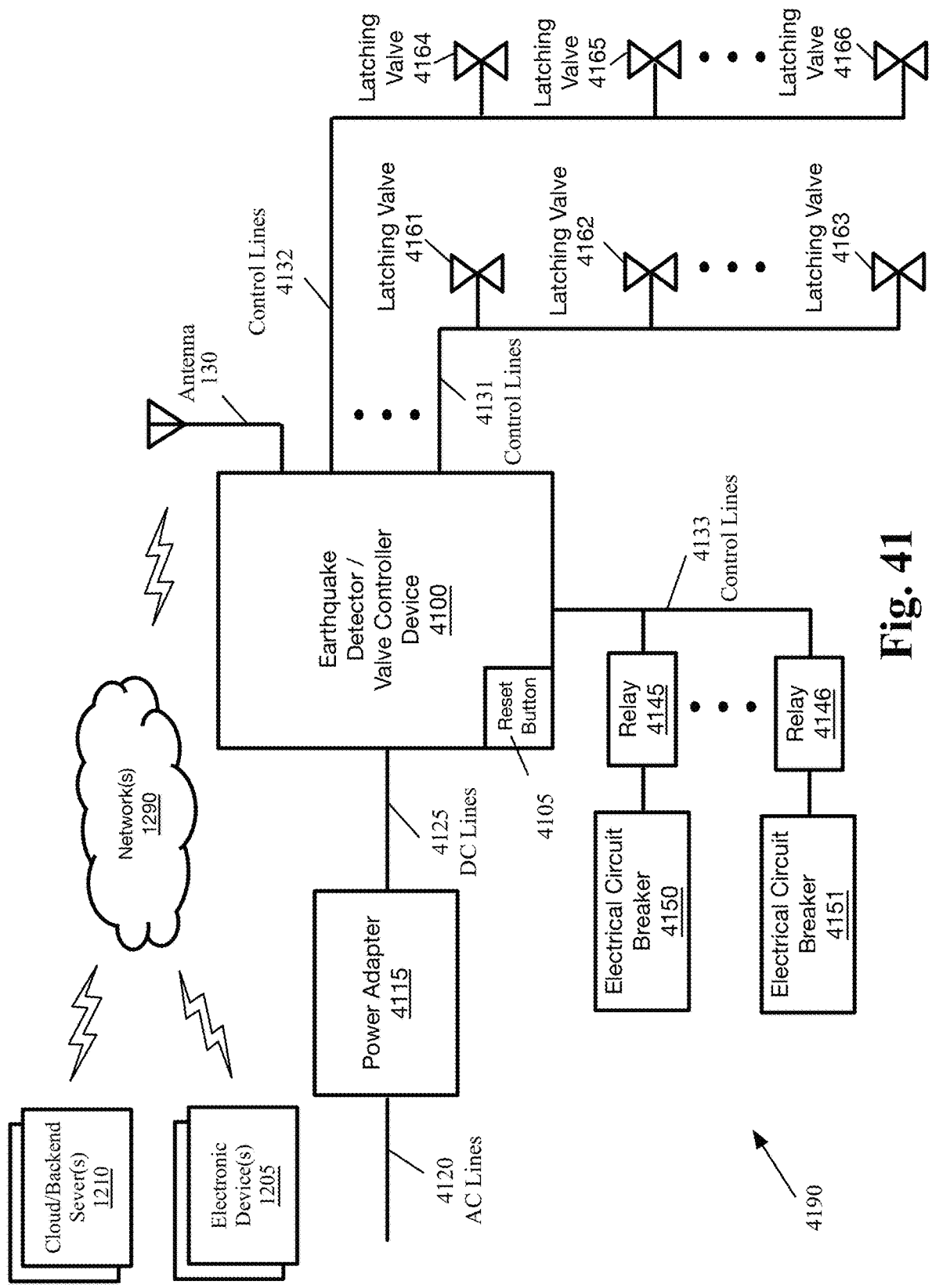
FIG. 41 is a functional block diagram illustrating an example system for an earthquake detector and valve controller device that controls one or more solenoid valves and/or one or more circuit breakers through low voltage wires, according to various aspects of the present disclosure.

FIG. 41 is a functional block diagram illustrating an example system 4190 for an earthquake detector and valve controller device 4100 that controls one or more solenoid valves and/or one or more circuit breakers through low voltage wires, according to various aspects of the present disclosure. With reference to FIG. 41, the earthquake detector and valve controller device (referred hereinafter as the valve controller device or the controller device) 4100 may be connected to a power adapter 4115. The power adapter may, for example, convert alternative current (AC) power direct current (DC) power. In some embodiments, the power adapter 4115 may be a component of the valve controller device 4100.

The power adapter 4115 may be connected to an AC power source (e.g., and without limitations, 110 volts AC or 220 volts AC) through the AC lines 4120 and may convert the AC power into the DC power (e.g., and without limitations, 3-30 volts DC). The DC power output of the power adapter 4115 may be connected to the power input of the valve controller device 4100 by the DC lines 4125.

The valve controller device 4100 may be connected to one or more valves 4161-4166 by the control lines 4131-4132 (e.g., low voltage lines and without limitations, 3-30 volts DC or AC lines). The valve(s) 4161-4166 may be solenoid valves. In the example of FIG. 41, the valves 4161-4166 may be latching valves.

A latching solenoid valve may utilize an electrical current pulse and an internal permanent magnet to maintain a set position (e.g., either closed or open) without the need for a constant application of power. The latching solenoid valves are also referred to as bistable solenoid valves because the solenoid may have two stable positions. As described below with reference to FIG. 53, the valves 4161-4166 (as well as the solenoid valves described below with reference to e.g., FIGS. 42, 44, 46, 47, 49) in some of the present embodiments, may be non-latching normally open or normally closed valves.

The latching solenoid valves typically require DC voltage on the control lines (e.g., and without limitations, a voltage and/or current pulse as described below with reference to FIGS. 51A-51C and 52). The non-latching solenoid valves may be normally open or normally closed and may require a permanent AC or DC power source (e.g., and without limitations, as described below with reference to FIG. 53).

With reference to FIG. 41, the valves 4161-4166 may be on several different zones and each zone may be controlled by a different set of control lines 4131-4132. For example, the valve controller 4100 may only control one valve 4161 one control line 4131, several valves 4161-4165 on one control line 4131, several valves 4161 and 4164, each by a separate control line, and/or multiple valves 4161-4163 and 4164-4166 on separate control line 4131 and 30132, respectively. Although two control lines are shown for controlling the valves, a valve controller may control valves on any number of one or more control lines.

With further reference to FIG. 41, in addition to, or in lieu of, controlling the valves 4161-4166, the controller device 4100 may control one or more electrical circuit breakers 4150-4151. An electrical circuit breaker may, for example, and without limitations, be the main circuit breaker of an electrical panel or may be associated with an electrical switch. In some embodiments, the controller device 4100 may control each electrical circuit breaker 4150 by a corresponding relay 4145-4146. Although the relays 4145 are shown on separate control lines 4133 than the valves 4161-4166, any number of valves and/or relays may be controlled by a control line 4131-4133.

The controller device 4100 may determine the occurrence and the intensity of different types of seismic waves and may send one or more signals to close the solenoid valves 4161-4166 and/or to open the electrical circuit breakers 4150-4151 (and thereby opening the associated circuit breakers to turn off the electricity). The controller device 4100, in some of the present embodiments, may be compatible with IoT and may perform as an IoT device. The controller device 4100 may optionally include an antenna 4110 to communicate with one or more external electronic devices 1205 and/or one or more cloud/backend servers 1210. The electronic device(s) may be, for example, and without limitations, client devices/computing such as cellular phones, desktop computers, laptop computers, tablets, etc.

The cloud/backend server(s) may also be electronic device(s)/computing device(s) associated with one or more government agencies, academic agencies, and/or utility companies such as, without limitations, USGS, NOAA, firefighting departments, civil defense, utility companies (e.g., gas companies, water companies, and/or electricity companies), academic institutions, early responders, etc. The network(s) 1290 may include, for example, and without limitations, one or more of the Internet, cellular networks, home networks, etc. Although FIG. 41 shows wireless connections through the antenna 130 to the network(s) 1290, any of the connections to/from the earthquake detector/valve controller devices of the present embodiments, the electronic devices 1205, and/or the cloud/backend servers 1210 to the network(s) 1290 may be through wired and/or wireless connections.

In addition to, or in lieu of, determining the occurrence and the intensity of different types of seismic waves, the controller device 4100, in some embodiments, may receive information regarding the occurrence of earthquakes from one or more external devices such as the cloud/backend server(s) 1210 and/or the electronic device(s) 1205. For example, the external device may be related to USGS, an academic institution, etc., that may have access to sensors in many different areas. The external device may have access to the sensors that may be close to the epicenter of an earthquake and may have detected the earthquake. The external device may send one or more signals to the valve controller devices in certain areas that may be affected by the earthquake in order for the valve controller devices to close the associated valve(s) and/or to open the associated circuit breaker(s).

In response, the controller device 4100 may turn off the valves 4161-4166 and/or open the electrical circuit breakers 4150-4151 if the controller device 4100 verifies the authenticity of the external electronic device. Since the electronic signals travel faster than the seismic waves, if the external device and/or the sensors that detect the earthquake are closer to the earthquake epicenter than the valve controller device 4100, the valve controller device may receive the signal(s) from the server before the arrival of the seismic waves to the location where the valve controller device is installed.

The valve controller devices of some embodiments may, therefore, provide the technical advantage of using two separate methods of detecting earthquakes. The first method is that the valve controller device may use an algorithm, as described herein with reference to FIGS. 17-21 and 55, to detect an earthquake on their own. The second method is the valve controller device may receive a signal from an external device that may have access to the sensors that may be closer to the earthquake epicenter and may have detected the occurrence of the earthquake prior to the arrival of the seismic waves to the location where the valve controller deice is installed.

The first method may be useful when the valve controller device is close to the epicenter of the earthquake and/or when there may be no communication with the outside networks (e.g., either due to the damage to the communication infrastructure by the earthquake or if the valve controller device is in a remote location without a reliable connection to an outside network). The second method may be useful when the external device (e.g., a USGS server) may have access to sensors in a wide geographic area and some of the sensors may be closer to the epicenter of, and may detect, an earthquake faster than the valve controller device.

The valve controller device 4100, in some embodiments, may collect data related to the seismic waves. The valve controller device 4100, in some embodiments, may collect data related to the health and/or status of different components of the system 4190. The controller device 4100 may send the collected data to one or more authorized external electronic devices on a pull basis (e.g., after receiving a request to provide data from an authorized external device) and/or on a push basis (e.g., on a periodic basis and/or after an event such as major seismic activity, a health check failure, a low battery level, etc., is detected). The valve controller devices of the present embodiments may, therefore, provide the technical advantage of being a part of the network of the sensors that may detect earthquakes and may report the occurrence of an earthquake and/or the parameters related to different types of seismic waves to a central location such as the USGS.

The controller device 4100, in some embodiments, may optionally include (or may optionally be connected to) a reset button 4105. The reset button may send a signal when the reset button is activated (e.g., when a person pushes the button). In response, the controller device 4100 may turn on the valves 4161-4166 and/or close the electrical circuit breakers 4150-4151. The reset button 4105 may be used, for example, when a person manually inspects a building after an earthquake and ensures that there is no damage to the utility lines in and around the building. The person may then press the reset button 4105 to use the valve controller device 4100 to turn on the valves(s) 4161-4166 and/or to close the breakers 4150-4151.

Figure 42:
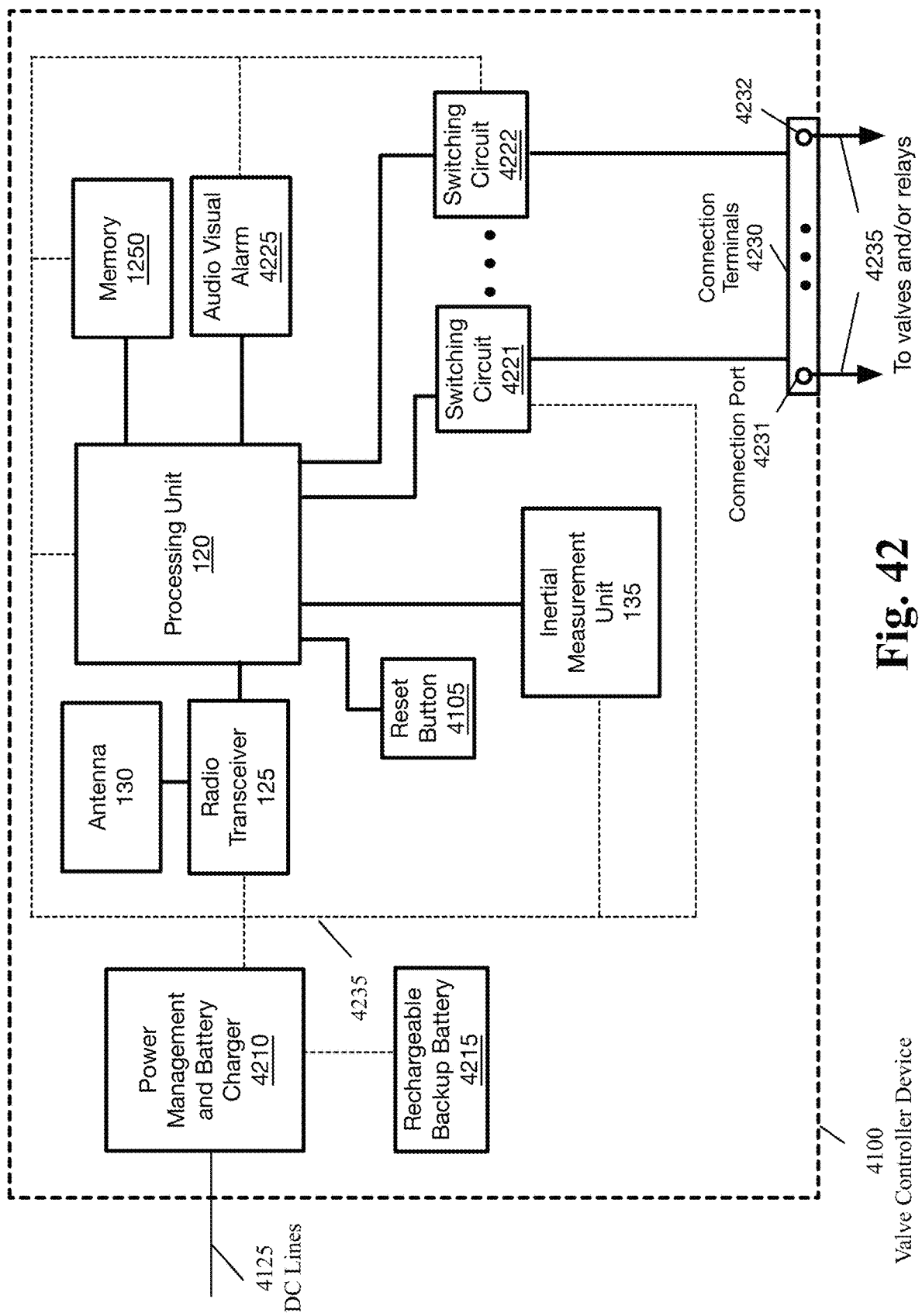
FIG. 42 is a functional block diagram illustrating different components of the controller device of FIG. 41, according to various aspects of the present disclosure.

FIG. 42 is a functional block diagram illustrating different components of the controller device 4100 of FIG. 41, according to various aspects of the present disclosure. With reference to FIG. 42, the valve controller device 4100 may include a processing unit 120, an IMU 135, a power management and battery charger 4210, a rechargeable backup battery 4215, a memory 1250, an audio visual alarm 4225, one or more switching circuits 4221-4222, a reset button 4105, a radio transceiver 125, an antenna 130, and/or one or more connection terminals 4230.

The rechargeable backup battery 4215 may be recharged by the power management and battery charger 4210. The rechargeable backup battery 4215 may be, for example, and without limitations, a lithium polymer (LiPo) or lithium ion (Li-ion) battery. The power management and battery charger battery 4210 may use the power stored in the rechargeable backup battery 4215 if the power coming from the AC lines 4120 (FIG. 41) is turned off (e.g., and without limitations, during power outage resulting from an earthquake). Although FIG. 42 and several other examples in the present disclosure show only one rechargeable battery 4215, some of the present embodiments may include several rechargeable batteries 4215.

The power management and battery charger battery 4210 may provide electrical power (as shown by the dashed lines 4235) to different components of the controller device 4100. When some or all of the valves 4161-4166 (FIG. 41) and/or the relays 4145-4146 require AC control lines (e.g., 3-30 volts AC), the power management and battery charger battery 4210 may provide the AC power to the valves through an AC line (not shown).

In some embodiments, a contractor or a plumber may be able to install the solenoid valves and may run one pair of low voltage wires 4130 (e.g., and without limitations, a pair of sprinkler-type wire that may be 18-gauge wire or thicker) from the valve controller device 4100 to the valves. In other embodiments, the solenoid valves may have a separate source of power, for example, and without limitations, an AC to DC adapter connected to an AC line as well as a rechargeable battery backup (similar to the power adapter 4115 of FIG. 41 and the rechargeable battery 4215 of FIG. 42).

With further reference to FIG. 42, the processing unit 120 may determine whether or not to turn off the solenoid valves 4161-4166 (FIG. 41) and/or to open the electrical circuit breakers 4150-4151 based on feedbacks from the IMU 135 (e.g., as described with reference to FIGS. 17-21 and 55) and/or based on one or more signals received from one or more external electronic devices and/or cloud/backend servers (e.g., as described below with reference to FIG. 60). As described above, some of the present embodiments may not include an IMU. In these embodiments, the valve controller device may include an accelerometer and a magnetometer that may be in one IC chip, or each may be in a separate IC chip. All references to IMU throughout this disclosure are equally applicable to the embodiments that include an accelerometer and/or a magnetometer that is/are not part of an IMU.

The IMU 135 may be similar to the IMU 135 described above with reference to FIG. 41A. The IMU 135 may measure one or more parameters of seismic waves such as, without limitations, primary waves (P-waves), secondary waves (S-waves), and surface waves. The IMU 135 may send the measured parameters to the processing unit 120. The processing unit 120 may use the seismic wave parameters and one or more algorithms to determine the intensity of the seismic waves. If the processing unit 120 determines that the intensity of the seismic waves is above a threshold, the processing unit 120 may send one or more signals (or commands) to turn off the valves 4161-4166 and/or to open the electrical circuit breakers 4150-4151.

With reference to FIGS. 41 and 42, the processing unit 120 may receive and/or store data and health status from different components of the system 4190. For example, and without any limitations, the processing unit 120 may receive the current status (e.g., open or closed) status of the valves 4161-4166, the current status of the relays 4145-4146 (and therefore, the current position of the associated electrical circuit breakers 4150, e.g., open or closed), the level of voltage generated by the battery 4215, the health status of the IMU 135, the health status of the power management and battery charger 4210, the health status of the radio transceiver 125, and/or the health status of the switching circuits 4221-4222, etc.

The processing unit 120 may store the data and/or the health status in the memory 1250. The memory may be similar to the memory 120 described above with reference to FIG. 12A. The processing unit 120 may send the data and/or the health status to the radio transceiver 125 to transmit to one or more of external electronic devices and/or one or more cloud/backend servers either upon request or as a push transfer. Although the example of FIG. 42 shows the processing unit 120, the radio transceiver 125, and the antenna 130 as separate units, in some of the present embodiments, the processing unit 120, the radio transceiver 125, and the antenna 130 may be on a single "system on a chip" IC.

The valve controller device 4100 may include an audio visual (or an audio) alarm 4225. When the processing unit 120 determines that an earthquake is eminent (e.g., either by using the algorithms described herein and/or by receiving signals from an external devices), the processing unit 120 may trigger the audio visual alarm 4225 to sound an audible alarm (e.g., a siren) and/or to generate a visual alarm (e.g., flashing or strobing a light) to alert any person in the vicinity of the audio visual alarm 4225 of the possibility of an earthquake. Although the audio visual alarm 4225 is shown in several examples as being a part of the valve controller device, in some embodiments, the audio visual alarm 4225 may be external to and communicatively coupled (e.g., by wires or wirelessly) to the valve controller device.

In order to control the valves 4161-4166 and/or the relays 4145-4146, the valve controller device 4100 may include the switching circuits 4221-4222. For example, each switching circuit may control one of the control lines 4131-4133. Examples of different switching circuits are described below with reference to FIGS. 51, 52, and 53. The switching circuits 4221-4222, in some embodiments, may connect to the 4161-4166 and/or the relays 4145-4146 through the connection terminals 4230.

The connection terminals 4230 may be, for example, and without limitations, one or more terminal block connectors. The ports 4231-4232 (only two ports are shown for simplicity) may be used to connect the switching circuits 4221-4222 to the control lines 4131-4133 (FIG. 41). Each set of control lines 4131-4133 may have, for example, one, two, or three control lines, depending on the type of the valves and/or relays that are connected to the lines. The valve controller device 4100, in some embodiments, may optionally include a reset button 4105 to manually open the valves 4161-4166 and/or to close the relays 4145-4146, as described above with reference to FIG. 41.

With further reference to FIGS. 41-42, the valves 4161-4166, in some embodiments, may be latching (or bistable) valves. In other embodiments, the valves 4161-4166 be normally open or normally closed valves The valves 4161-4166 may be connected to the valve controller device 4100 by the control line 4131-4132. The control line 4131-4132 may be, for example, and without limitations, 3 to 30 volts DC or AC lines. In some embodiments, the valves 4161-4166 and/or the relays 4145-4146 may be off-the-shelf devices. In other embodiments, (e.g., when one controller device controls one valve or one controller device controls one relay), the controller device and the valve or the relay may be placed together in the same enclosure.

Figure 43:
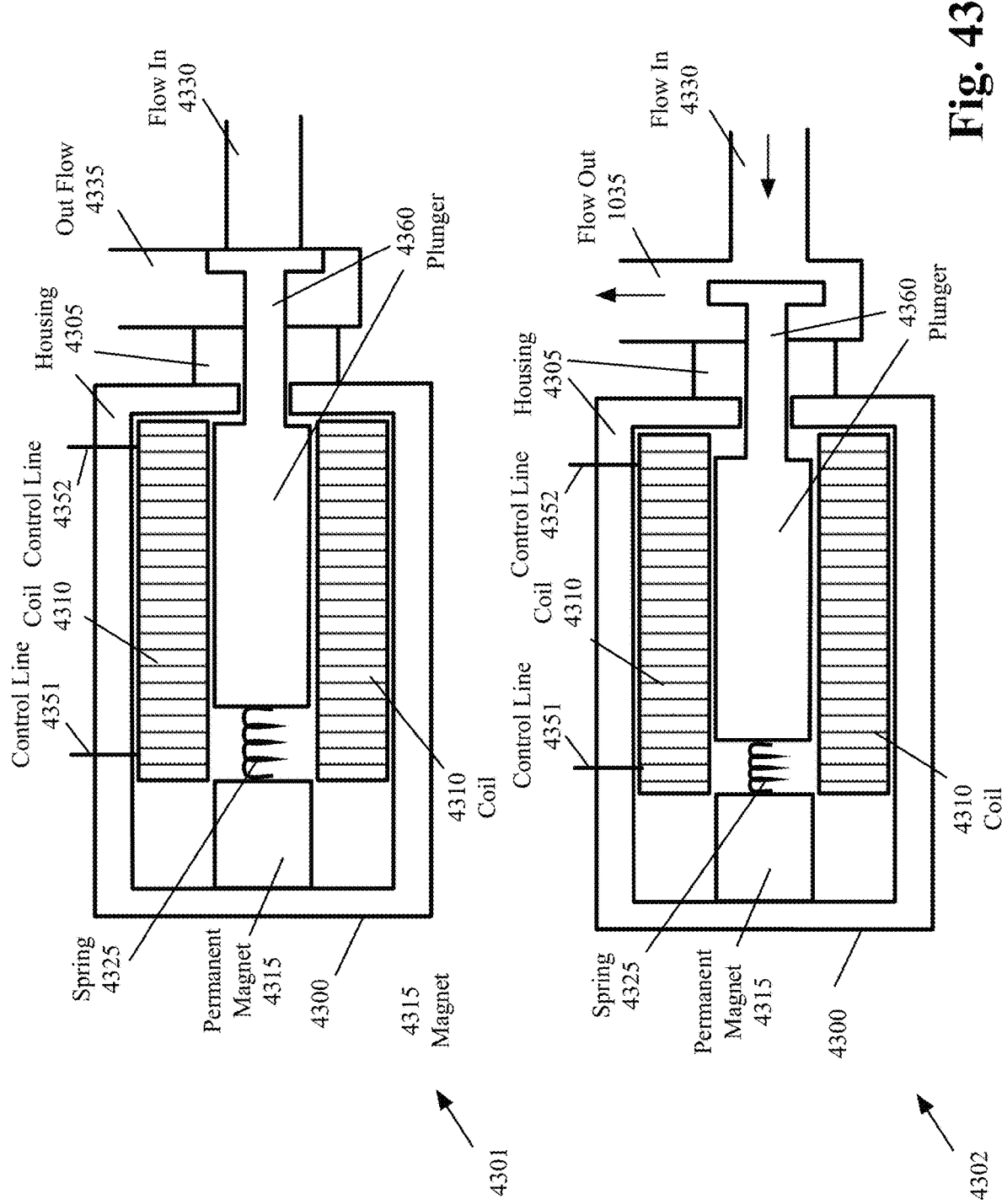
FIG. 43 is a schematic front elevation cross-section view of a solenoid valve, according to various aspects of the present disclosure.

FIG. 43 is a schematic front elevation cross-section view of a solenoid valve 4300, according to various aspects of the present disclosure. The solenoid valve in the example of FIG. 43 is a 2-wire latching solenoid valve that requires two control lines 4351-4352 to operate. The solenoid valve 4300 may include a housing 4305, a coil 4310, a magnet 4315, a spring 4325, and a plunger 4360. The solenoid valve 4300 may include two openings 4330 and 4335 for fluid to flow in and out of the valve 4300, respectively. The solenoid valve 4300 may be connected to the control lines 4351-4352, which may apply DC voltage and/or current to the coil 4310.

With reference to FIG. 43, the coil 4310 may go around the plunger 4160 (for clarity, the cross section view of FIG. 43 only shows the portions of the coil that are over and below the plunger 4360). During operation, no permanent voltage is required to be applied to the control lines 4351-4352 in order to maintain a position. Instead, the control lines 4351-4352 may only apply a temporary current or voltage (such as a current or voltage pulse) when the valve is to change from closed to open and vice versa.

FIG. 43, as shown, includes two stages 4301-4302. In stage 4301, the valve 4300 is closed. In this stage, the plunger 4360 has closed the opening 4330 and may prevent the flow of the fluid into the valve 4300. The plunger 4360 may be made of ferromagnetic material such as, for example, and without limitations, iron, nickel, cobalt, or some of their alloys. The magnet 4315 may be a permanent magnet that requires no electric current. However, the magnetic field generated by the magnet 4315 may not be not strong enough to attract the plunger 4360 and to pull the plunger 4360 away from the opening 4330. In this stage, the spring 4325 may keep the plunger 4360 in an extended position.

In stage 4302, a current (or voltage) pulse may be applied to the control lines 4351-4352 such that the magnetic flux generated by the coil 4310 may add to the pulling force excreted by the magnet 4315 on the plunger 4360. The magnetic flux generated by the coil 4310 and the pulling force excreted by the magnet 4315 may be enough for attracting the plunger 4360 towards the magnet 4315. Once the plunger 4360 moves close to the magnet 4315, the magnet attracts and holds the plunger 4360 in place, even after the control lines 4351-4152 receive no more current (or voltage).

As shown in stage 4302, the plunger 4360 has moved close enough to the magnet 4315 to enable the magnet to keep the plunger 4360 in place even after the current (or voltage) is removed from the control lines 4351-4352. Since the plunger 4360 is kept away from the openings 4330 and 4335, the fluid may flow through the valve 4300.

The force applied by the spring 4325 to the plunger 4360 in stage 4302 may not be strong enough by itself to move the plunger 4360 away from the magnet 4315 to close the opening 4330. The plunger 4360 may remain in place as shown in stage 4302 until another pulse with reverse polarity is applied to the control lines 4351 and 4352 to cause a magnetic flux in the coil 4310 opposite to the magnetic force excreted by the magnet 4105 to the plunger 4360. The force excreted by the coil's magnetic flux and the force from the spring 4325 may then be strong enough to move the plunger 4360 away from the magnet 4315 and back to the position shown in stage 4301 to close the valve 4300.

The solenoid valve in the example of FIG. 43 is a 2-wire latching solenoid valve that requires the two control lines 4351-4352 to operate. As described below with reference to FIG. 52, a 3-wire solenoid valve may need three control lines. The solenoid valves, in some embodiments, may be non-latching normally open or normally closed valves and may require a switching circuit similar to the switching circuit described below with reference to FIG. 53. The latching solenoid valves may be advantageous since the valves do not require permanent application of power in order to remain in one position (either open or closed).

Figure 44:
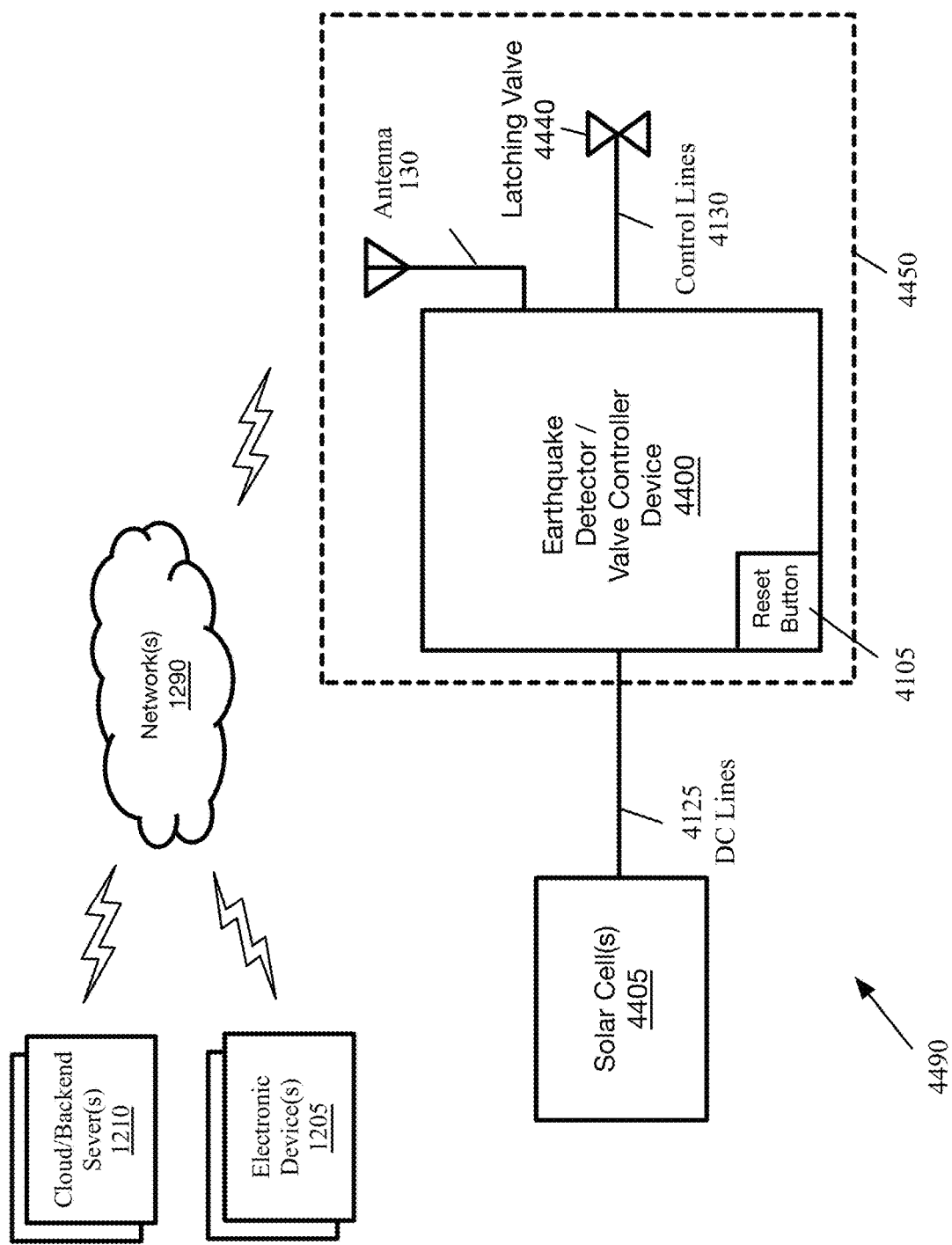
FIG. 44 is a functional block diagram illustrating an example system for an earthquake detector and valve controller device that controls only one solenoid valve and is placed in the same enclosure as the solenoid valve, according to various aspects of the present disclosure.

FIG. 44 is a functional block diagram illustrating an example system 4490 for an earthquake detector and valve controller device 4400 that controls only one solenoid valve and is placed in the same enclosure as the solenoid valve, according to various aspects of the present disclosure. With reference to FIG. 44, the valve controller device 4400 may include an antenna 130 and a reset button 4105. The valve controller device 4400 may have similar functionality as the valve controller device 4100 of FIG. 41, except that the valve controller device 4400 may only control one solenoid valve 4440. The solenoid valve 4440 may be similar to the solenoid valves 4161-4166 of FIG. 41. The controller device 4400 and the valve 4440 may be placed together in the same enclosure 4450 (e.g., the valve controller device and the solenoid valve may be wired together in the factory).

Figure 45:
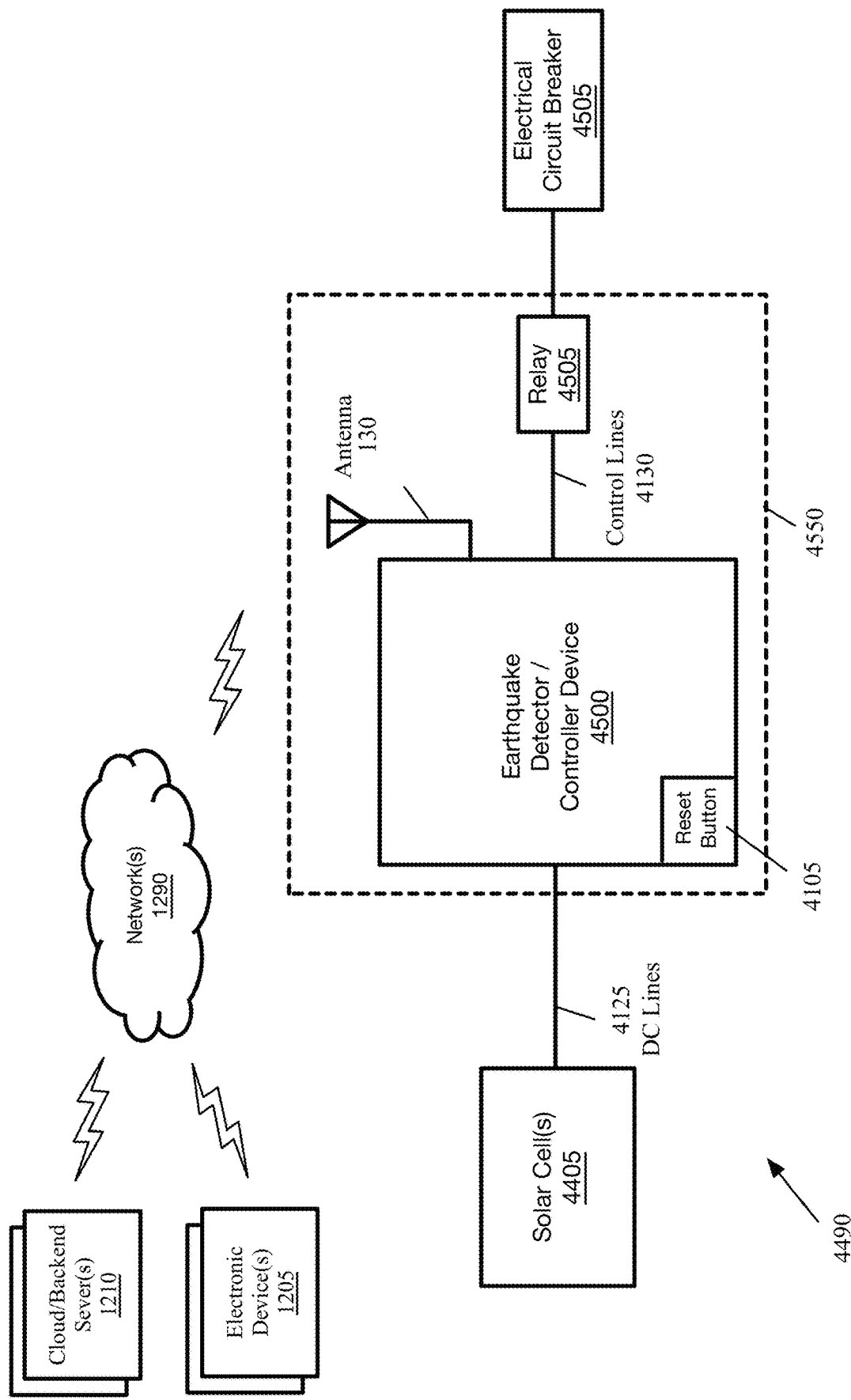
FIG. 45 is a functional block diagram illustrating an example system for a controller device that controls only one relay and is placed in the same enclosure as the relay, according to various aspects of the present disclosure.

FIG. 45 is a functional block diagram illustrating an example system 4590 for a controller device 4500 that controls only one relay and is placed in the same enclosure as the relay, according to various aspects of the present disclosure. With reference to FIG. 45, the controller device 4500 may include an antenna 130 and a reset button 4105. The controller device 4500 may have similar functionality as the valve controller device 4100 of FIG. 41, except that the controller device 4400 may only control one relay 4505. The relay 4505 may be similar to the relays 4145-4146 of FIG. 41. The controller device 4500 and the relay 4440 may be placed together in the same enclosure 4550 (e.g., the controller device and the relay may be wired together in the factory).

With further reference to FIGS. 44 and 45, the controller devices 4400 and 4500, in some embodiments, may receive DC voltage from one or more solar cells 4405 through the DC lines 4125. The solar cells 4405, in some embodiments, may be arranged on one or more solar panels (not shown). In other embodiments, the controller devices 4400 and 4500 may receive power from a power adapter similar to the power adapter 4115 of FIG. 41.

Similar to the controller device 4100, the controller devices 4400 and 4500 may determine the occurrence and the intensity of different types of seismic waves and may send one or more signals to close the corresponding solenoid valve 4440 or relay 5235. The controller devices 4400 and 4500 may communicate with one or more electronic devices 1205 and/or one or more cloud/backend servers 1210, which may be similar to the electronic devices 1205 and the cloud/backend servers 1210 described above with reference to FIG. 41.

Similar to the controller device 4100 of FIG. 41, the controller devices 4400 and/or 4500, in some embodiments, may receive information regarding the occurrence of earthquakes from one or more external electronic devices 1205 and/or cloud/backend servers 1210. In response, the controller devices 4400 and/or 4500 may turn off the corresponding solenoid valve 4440 or may open the corresponding relay 4505 if the valve controller devices verify the authenticity of the external electronic devices.

Figure 46:
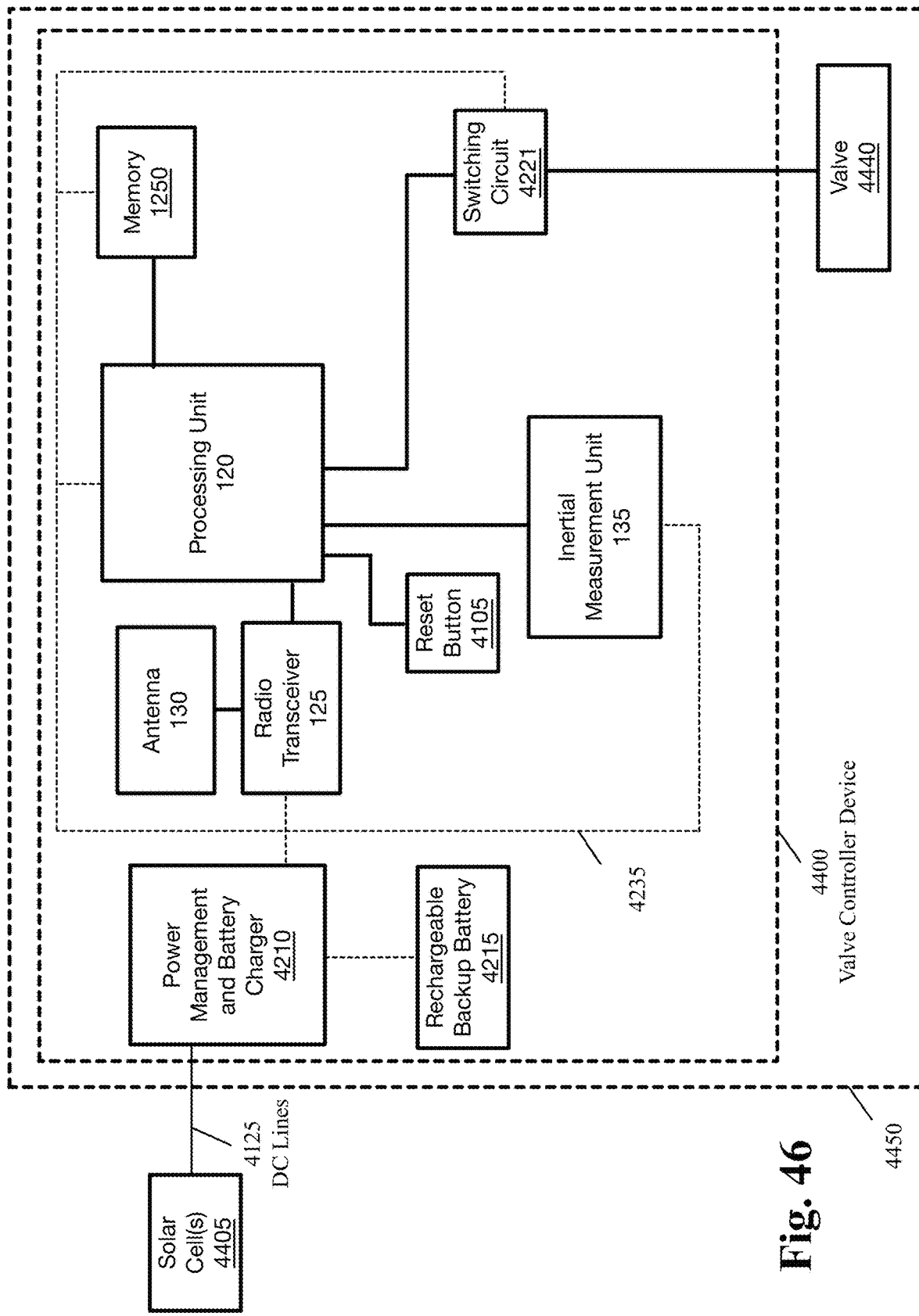
FIG. 46 is a functional block diagram illustrating different components of the controller device of FIG. 44, according to various aspects of the present disclosure.

FIG. 46 is a functional block diagram illustrating different components of the controller device of FIG. 44, according to various aspects of the present disclosure. With reference to FIG. 46, the controller device 4400 may include a processing unit 120, an IMU 135, a power management and battery charger 4210, a rechargeable backup battery 4215, a memory 1250, a switching circuit 4221, a reset button 4105, a radio transceiver 125, and an antenna 130, which may have the same functionality as the corresponding components of FIG. 42.

The valve controller device 4400, in some embodiments, may receive DC voltage from the solar cells 4405 through the DC lines 4125. In other embodiments, the valve controller device 4400 may receive power from a power adapter similar to the power adapter 4115 of FIG. 41. The controller device 4500 of FIG. 45 may have similar components as the controller device 4400 of FIG. 46, except that the controller device 4500 of FIG. 45 may be connected to a relay instead of the valve 4440 of FIG. 46.

Figure 47:
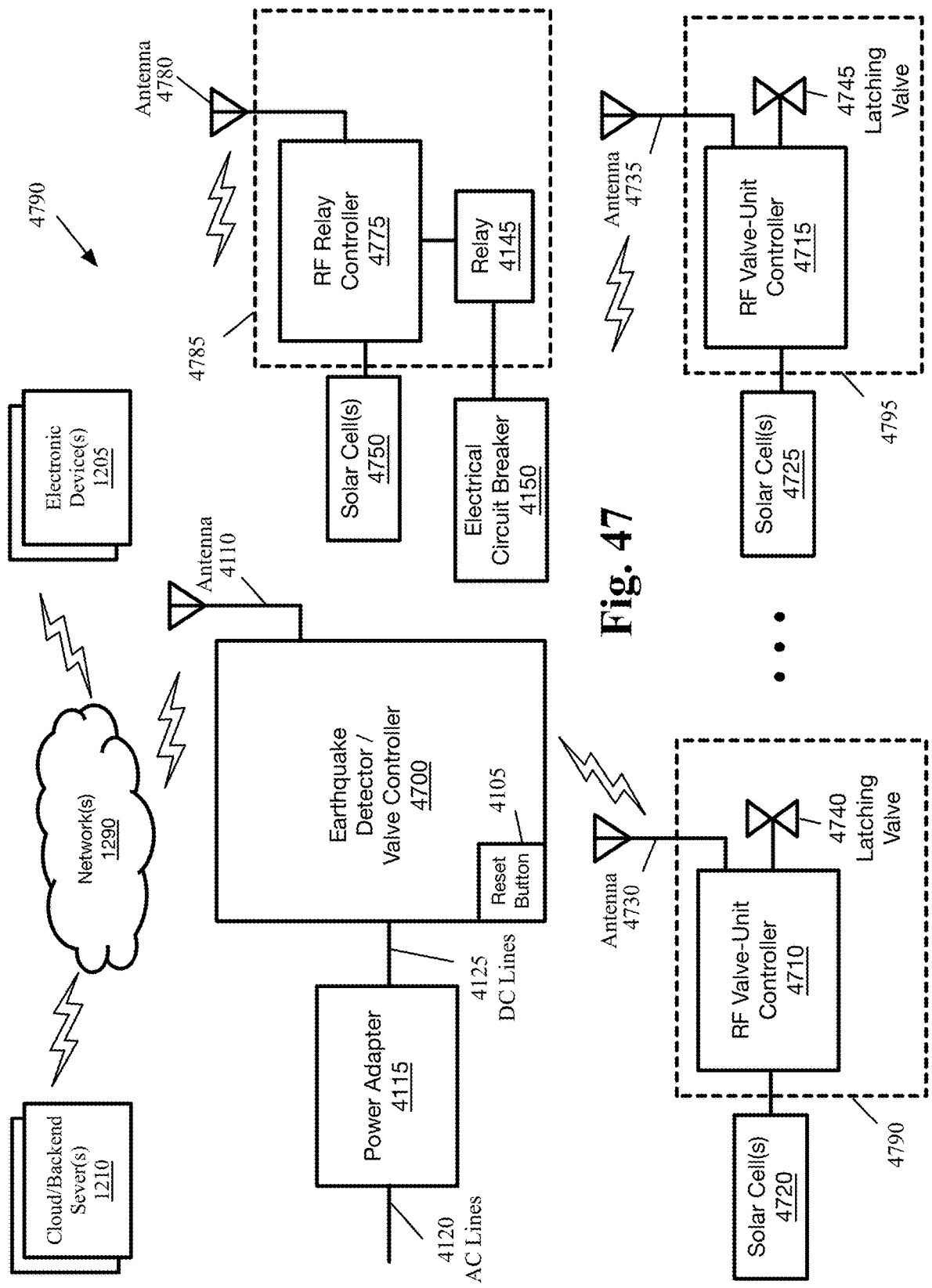
FIG. 47 is a functional block diagram illustrating an example system for an earthquake detector and valve controller device that wirelessly controls one or more solenoid valves and/or one or more circuit breakers, according to various aspects of the present disclosure.

FIG. 47 is a functional block diagram illustrating an example system 4790 for an earthquake detector and valve controller device 4700 that wirelessly controls one or more solenoid valves and/or one or more circuit breakers, according to various aspects of the present disclosure. With reference to FIG. 47, the valve controller device 4700 may wirelessly control one or more solenoid valves 4740-4745 and/or one or more electrical circuit breakers 4150 (only one circuit breaker is shown for simplicity).

The valve controller device 4700 may include an antenna 130 and a reset button 4105, which may be similar to the corresponding components of FIG. 41. Similar to the controller device 4100 of FIG. 41, the controller device 4700 of FIG. 47 may determine the occurrence and the intensity of different types of seismic waves and may send one or more signals to close the solenoid valves 4740-4745 and/or to open the electrical circuit breaker(s) 4150.

Similar to the controller device 4100, the controller device 4700 of FIG. 47 may determine the occurrence and the intensity of different types of seismic waves and may send one or more signals to close the solenoid valves 4740-4745 and/or to open the circuit breaker(s) 4150. The controller device 4700 may communicate with one or more electronic devices 1205 and/or one or more cloud/backend servers 1210, which may be similar to the electronic devices 1205 and the cloud/backend servers 1210 described above with reference to FIG. 41.

Similar to the controller device 4100 of FIG. 41, the controller device 4700 of FIG. 47, in some embodiments, may receive information regarding the occurrence of earthquakes from one or more external electronic devices 1205 and/or cloud/backend servers 1210. In response, the controller device 4700 may turn off the solenoid valves 4740-4745 and/or may open the circuit breaker(s) 4150 if the valve controller device 4700 verifies the authenticity of the electronic devices.

The valve controller device 4700, in some embodiments, may wirelessly communicate with the RF valve-unit controller 4710-4715 and/or with the RF relay controller(s) 4775 to control the associated solenoid valves 4740-4745 and/or the associated relay(s) 4145 and/or the associated electrical circuit breaker(s) 4150. For example, and without limitations, the valve controller device 4700 may establish one or more wireless communication channels with the RF valve-unit controller 4710-4715 and/or with the RF relay controller(s) 4775 to send and receive electronic signals.

The valve controller device 4700, in some embodiments, may use the RF valve-unit controllers 4710-4715 to control the corresponding solenoid valves 4740-4745. The valve controller device 4700, in some embodiments, may use the RF relay controller(s) 4775 to control the electrical circuit breaker(s) 4150 through the corresponding relay(s) 4145. The solenoid valves 4740-4745 may be similar to the solenoid valves 4161-4166 of FIG. 41. The relay(s) 4145 and the electrical circuit breaker(s) 4150 may be similar to the corresponding components of FIG. 41.

The RF valve-unit controllers 4710-4715 may include the antennas 4730-4735, respectively. The RF valve-unit controllers 4710-4715 may receive signals from the valve controller 4700 and may send signals to the corresponding valves 4740-4745 to open or close the valves. The RF relay controller(s) 4775 may include the antenna(s) 4780. The RF relay controller(s) 4775 may receive signals from the valve controller 4700 and may send signals to the corresponding relay(s) 4145 to open or close the electrical circuit breaker(s) 4150.

The valve controller 4700 may be connected to the power adapter 4115, which may be similar to the power adapter 4115 of FIG. 41. The RF valve-unit controllers 4710-4715 and/or the RF relay controller 4775, in some embodiments, may be connected to, and receive DC power from the corresponding solar cells 4720-4725 and 4750. In other embodiments, the RF valve-unit controllers 4710-4715 and the RF relay controller 4775 may be connected to a power adapter, which may be similar to the power adapter 4115.

The RF valve-unit controllers 4710-4715 and the corresponding valves 4740-4745 may be placed together in the same enclosure 4790-4795, respectively (e.g., an RF valve-unit controller and the corresponding solenoid valve may be wired together in the factory). The RF relay controller(s) 4775 and the corresponding relay(s) 4145 may be placed together in the same enclosure 4785 (e.g., an RF relay controller and the corresponding relay may be wired together in the factory).

Figure 48:
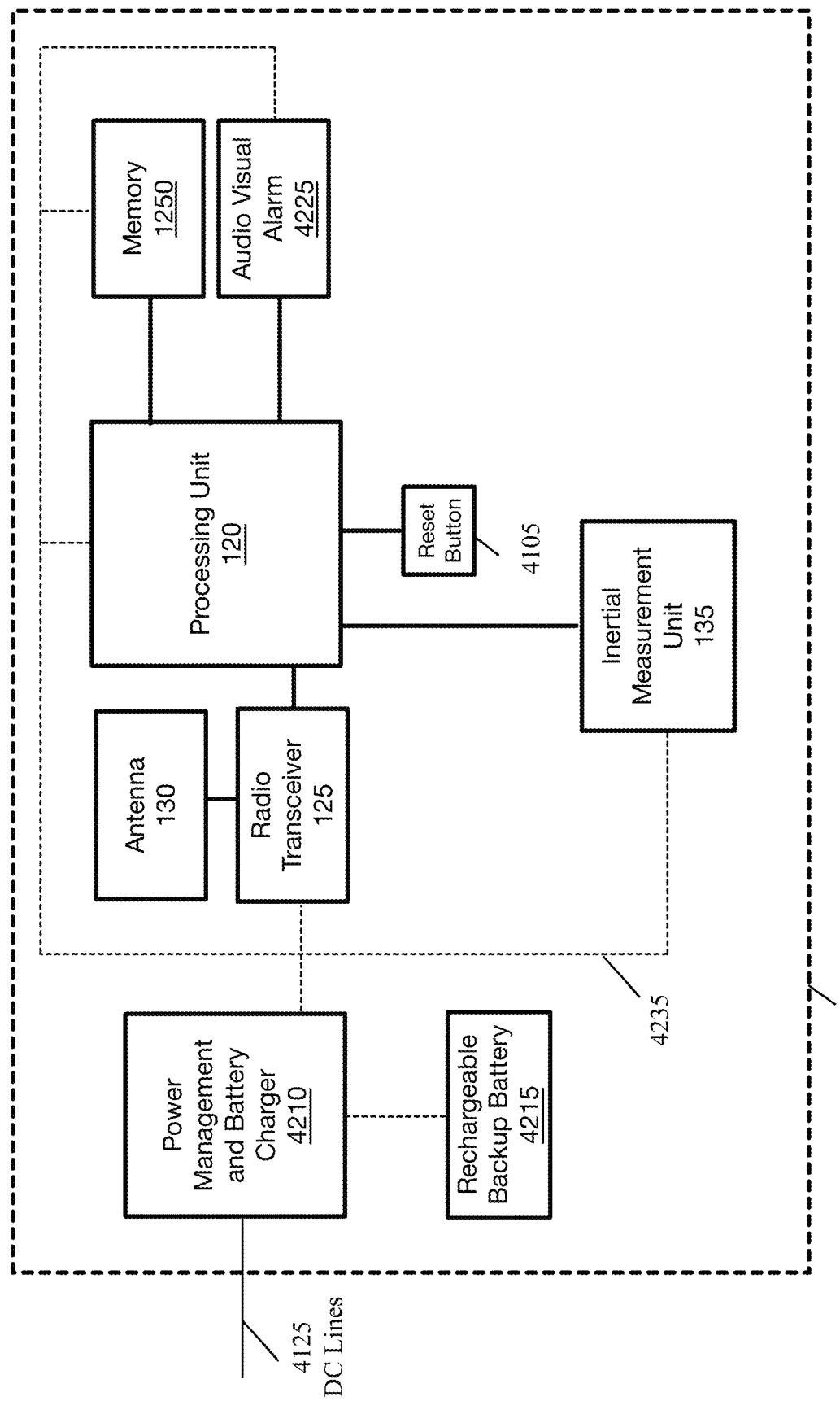
FIG. 48 is a functional block diagram illustrating different components of the controller device of FIG. 47, according to various aspects of the present disclosure.

FIG. 48 is a functional block diagram illustrating different components of the controller device of FIG. 47, according to various aspects of the present disclosure. With reference to FIG. 48, the controller device 4700 may include a processing unit 120, an IMU 135, a power management and battery charger 4210, a rechargeable backup battery 4215, a memory 1250, a reset button 4105, a radio transceiver 125, an antenna 130, and an audio visual (or audio) alarm 4225, which may have the same functionality as the corresponding components of FIG. 42. The controller device 4700 may use the radio transceiver 125 and the antenna 130 to communicate with the RF valve-unit controllers and/or the RF relay controller(s).

Figure 49:
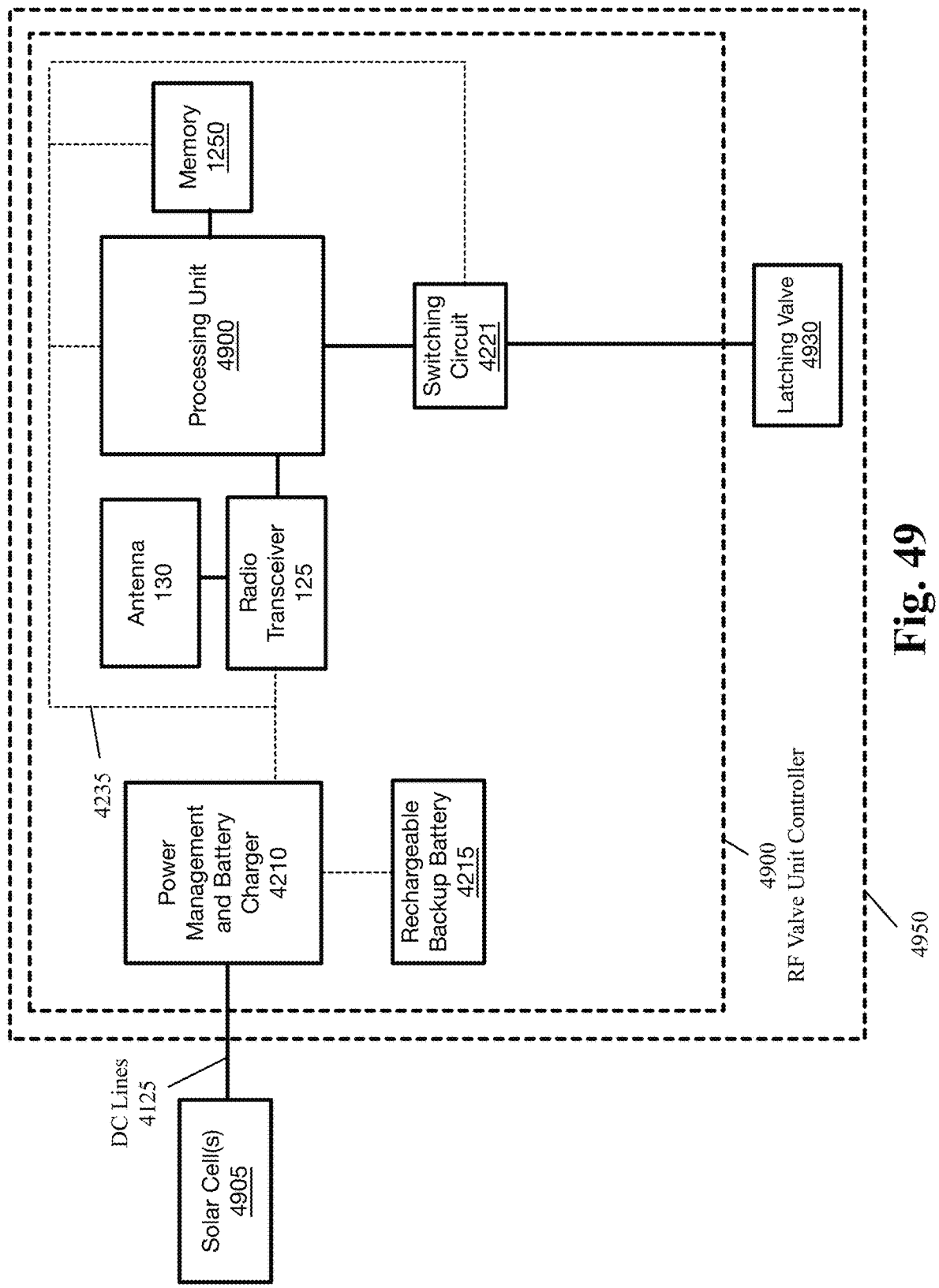
FIG. 49 is a functional block diagram illustrating different components of an RF valve-unit controller of FIG. 47, according to various aspects of the present disclosure.

FIG. 49 is a functional block diagram illustrating different components of an RF valve-unit controller of FIG. 47, according to various aspects of the present disclosure. With reference to FIG. 49, the RF valve-unit controller 4900 may be similar to any of the RF valve-unit controller 4710-4715 of FIG. 47.

The RF valve-unit controller 4900 may include a processing unit 4900. The RF valve-unit controller 4900 may include a power management and battery charger 4210, a rechargeable backup battery 4215, a radio transceiver 125, an antenna 130, a switching circuit 4221, which may be similar to the corresponding components of FIG. 42 or 46. Although the example of FIG. 49 shows the processing unit 4900, the radio transceiver 125, and the antenna 130 as separate units, in some of the present embodiments, the processing unit 4900, the radio transceiver 125, and the antenna 130 may be on a single "system on a chip" IC. The RF unit valve controller 4900 and the solenoid valve 4930 may be placed together in the same enclosure 4950 (e.g., the RF unit valve controller and the solenoid valve may be wired together in the factory).

The processing unit 4900 may wirelessly receive signals (through the radio transceiver 125 and the antenna 130) from the processing unit 120 of FIG. 48 (through the radio transceiver 125 and the antenna 130 of FIG. 48) and may send signals to the switching circuit 4221 to open or close the latching valve 4930. The processing unit 4900, in some embodiments, may collect health and status data from different components of the RF unit valve controller 4900 and/or the latching valve 4930. The processing unit 4900 may store the health and status data in the memory 1250 and/or may wirelessly send the health and status data in either a pull basis a or push basis to the processing unit 120 of FIG. 48.

The RF valve-unit controller 4900 and the latching valve 4930, in some embodiments, may be connected to, and receive DC power from the corresponding solar cells 4905. In other embodiments, RF valve-unit controller 4900 and the latching valve 4930 may be connected to a power adapter, which may be similar to the power adapter 4115.

Figure 50:
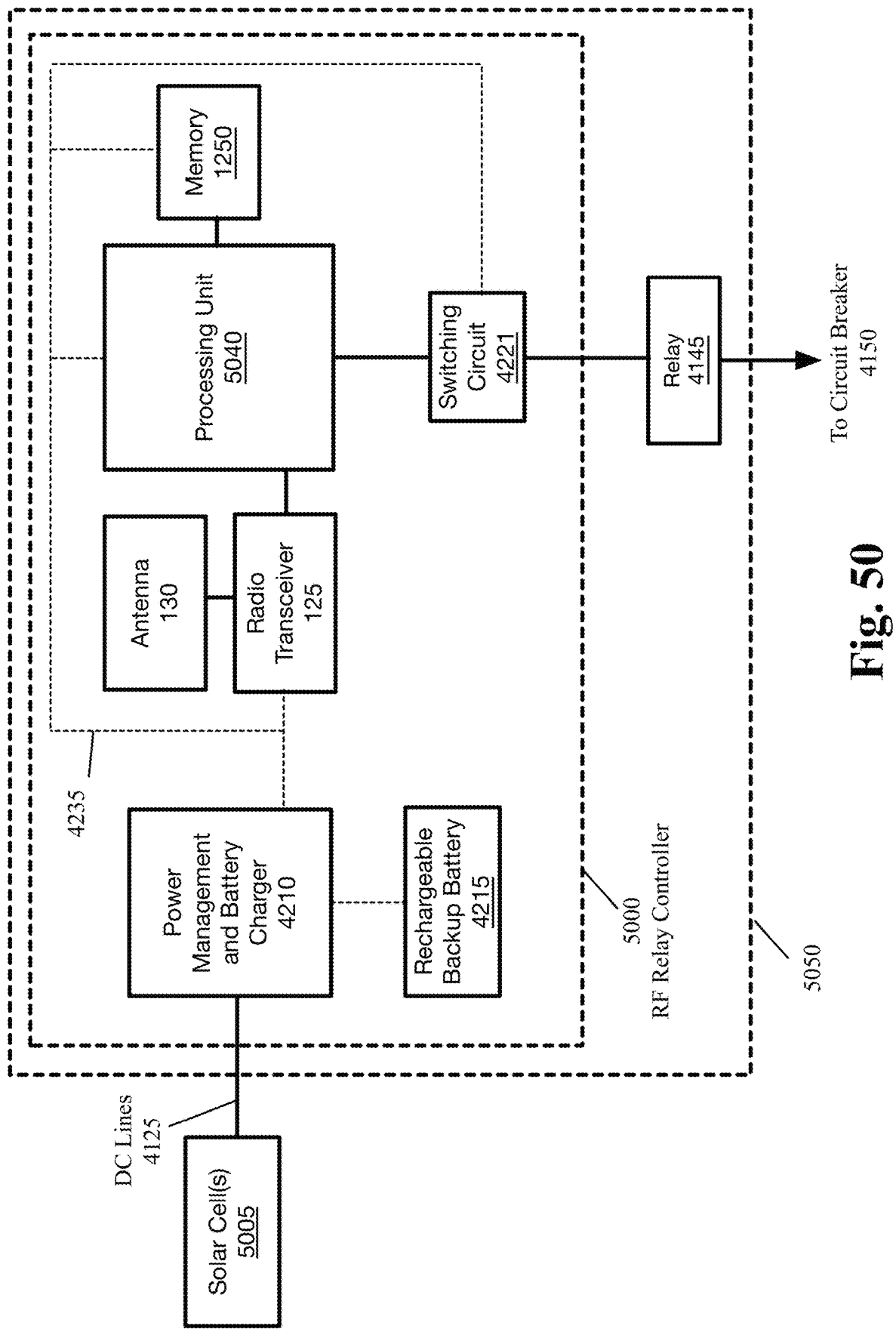
FIG. 50 is a functional block diagram illustrating different components of the RF relay controller of FIG. 47, according to various aspects of the present disclosure.

FIG. 50 is a functional block diagram illustrating different components of the RF relay controller of FIG. 47, according to various aspects of the present disclosure. With reference to FIG. 50, the RF relay controller 5000 may include a processing unit 5040. The RF relay controller 5000 may include a power management and battery charger 4210, a rechargeable backup battery 4215, a switching circuit, a radio transceiver 125, and an antenna 130, which may be similar to the corresponding components of FIG. 49.

Although the example of FIG. 50 shows the processing unit 5040, the radio transceiver 125, and the antenna 130 as separate units, in some of the present embodiments, the processing unit 5040, the radio transceiver 125, and the antenna 130 may be on a single "system on a chip" IC. The RF relay controller 5000 and the relay 4145 may be placed together in the same enclosure 5050 (e.g., the RF relay controller and the solenoid valve may be wired together in the factory).

The processing unit 5040 may wirelessly receive signals (through the radio transceiver 125 and the antenna 130) from the processing unit 120 of FIG. 48 (through the radio transceiver 125 and the antenna 130 of FIG. 48) and may send signals to the relay 4145, through the switching circuit 4221, to open or close. The processing unit 5040, in some embodiments, may collect health and status data from different components of the RF relay controller 5000 and/or the relay 4145. The processing unit 5040 may store the health and status data in the memory 1250 and/or may wirelessly send the health and status data in either a pull basis a or push basis to the processing unit 120 of FIG. 48.

The RF relay controller 5000 and the latching relay 4145, in some embodiments, may be connected to, and receive DC power from the corresponding solar cells 5005. In other embodiments, RF valve-unit controller 5000 and the relay 4145 may be connected to a power adapter, which may be similar to the power adapter 4115.

With reference to FIGS. 41, 44, and 47, the latching solenoid valves 4161-4166, 4440, and/or 4930 may be 2-wire or 3-wire latching valves. An example of a 2-wire latching solenoid valve was described above with reference to FIG. 43. In a 2-wire latching solenoid valve, the movements of the plunger 4360 towards and away from the magnet 4315 may be controlled by applying a signal with a first polarity (e.g., a positive pulse) to the control lines 4351-4352 to move the plunger 4360 in one direction and apply another signal with an opposite polarity (e.g., a negative pulse) to the control lines 4351-4352 to move the plunger 4360 to the different direction.

In order to apply pulses with different polarity to the control lines 4351-4352, some embodiments may use the switching circuit(s) 4221-4222 as shown in FIGS. 42, 46, and 49 to provide pulses of different polarity on the control lines of a latching solenoid valve. One example of such a switching circuit is an H-bridge. An H-bridge is an electronic circuit that may be used to switch the polarity of a voltage applied to a load such as a solenoid.

Figure 51A:
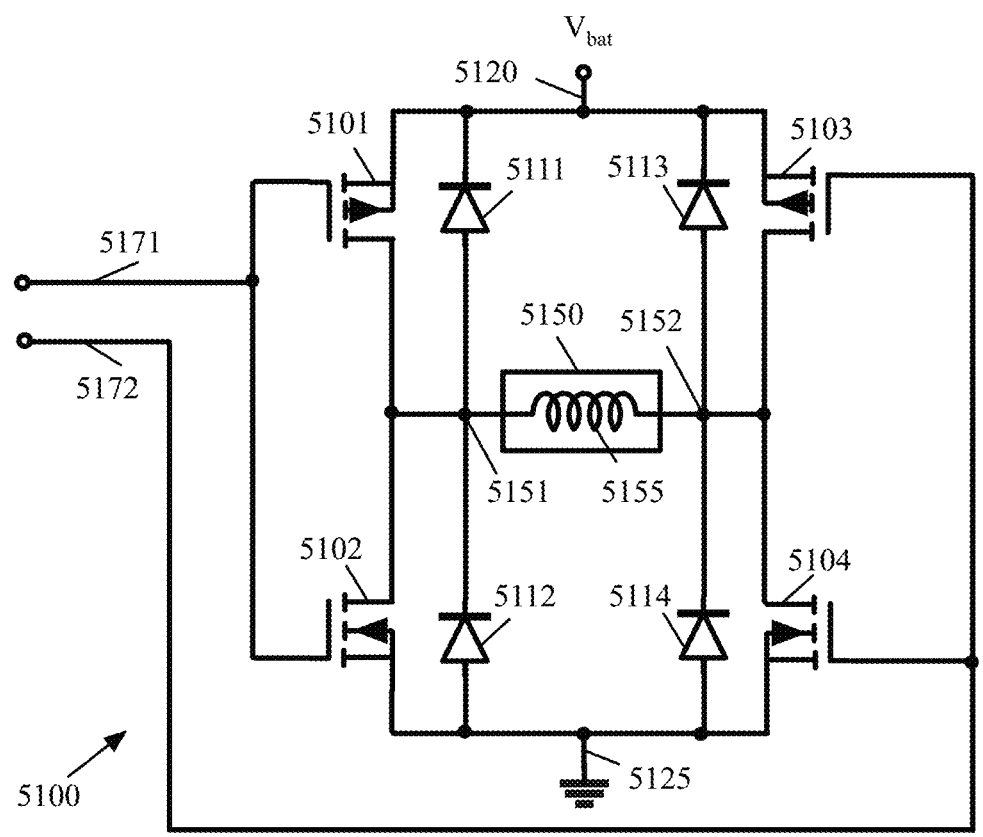
FIGS. 51A-51C illustrate a circuit diagram of an example H-bridge, according to various aspects of the present disclosure.
Figure 51B:
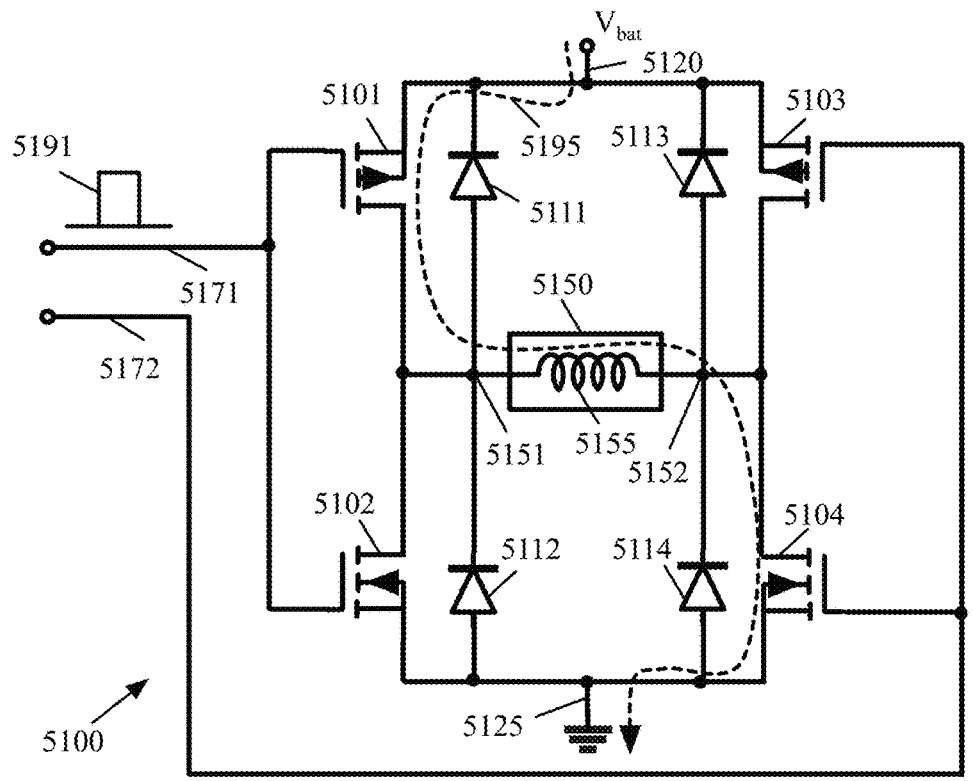
Figure 51C:
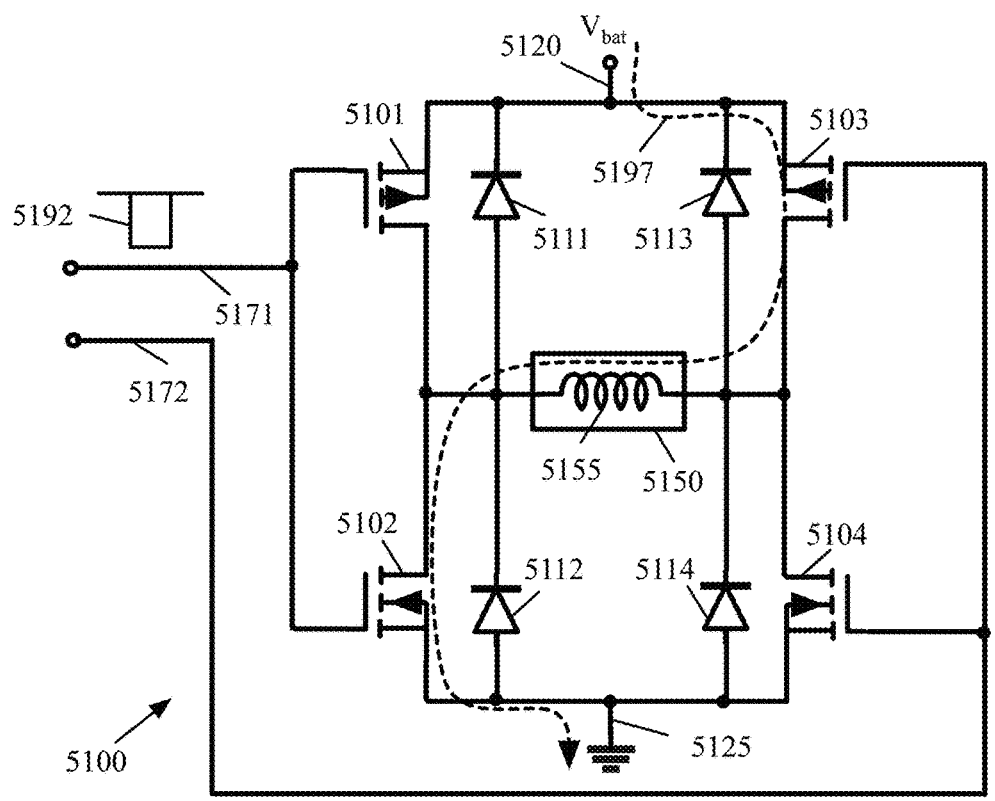

FIGS. 51A-51C illustrate a circuit diagram of an example H-bridge, according to various aspects of the present disclosure. With reference to FIGS. 51A-51C, the H-Bridge 5100 may control a solenoid valve 5150 that may be similar to the solenoid valves 4161-4166, 4440, and/or 4930 of FIGS. 41, 44, and 47. A similar circuit may be used to control a relay, such as the relays 4145-4146 and/or 4505 of FIGS. 41, 45, and 47.

With further reference to FIGS. 51A-51C, the H-Bridge 5100 may include the metal oxide semiconductor field effect transistors (MOSFETs) 5101-5104 and the diodes 5111-5114. The diodes 5111-5114, in some embodiments, may be Schottky diodes. The H-Bridge 5100 may be used to switch the polarity of the voltage applied to the coil 5155 of a solenoid valve 5150. The terminal 5120 may be connected to a power supply and the terminal 5125 may be grounded.

In the example of FIGS. 51A-51C, the MOSFETs 5101 and 5103 may be p-channel enhanced-mode MOSFETs and the MOSFETs 51021 and 5104 may be n-channel enhanced-mode MOSFETs. In FIG. 51A, there is no voltage difference between the control lines 5171 and 5172, all MOSFETs 5101-5104 are off, and no current flows between the positive supply voltage node 5120 and the ground node 5125. As a result, there is no voltage difference between the two ports 5151 and 5152 of the coil 5155.

As shown in FIG. 51B, a short duration pulse 5191 may be applied between the two control lines 5171 and 5172. The signal 5191 may turn on the MOSFETs 5101 and 5104. For the duration of the signal 5191, a current (as shown by the dashed line 5195) may pass through the coil 5155 and may create a voltage difference between the ports 5151 and 5152 of the coil 5155. In FIG. 51B, the port 5151 of the coil 5155 may be connected to the power supply 5120 through the MOSFET 5101 and the port 5152 of the coil 5155 may be connected to the ground 5125 through the MOSFET 5104.

After the duration of the pulse 5191, the MOSFETs 5101 and 5104 may turn off and the circuit may go back to the state discussed above with reference to FIG. 51A. The diodes 5111-5114 may act to provide a low-impedance path for the coil 5155 to discharge the stored magnetic energy and to prevent a high current path through the MOSFETs 5101-5104, preventing possible damage to the MOSFETs 5101-5104.

As shown FIG. 51C, a short duration pulse 5192, with a polarity that is opposite to the pulse 5191, may be applied between the two control lines 5171 and 5172. The signal 5192 may turn on the MOSFETs 5103 and 5102. For the duration of the signal 5192, a current (as shown by the dashed line 5197) may pass through the coil 5155 in the opposite direction of the current 5195. The current 5197 may create a voltage difference between the ports 5151 and 5152 of the coil 5155 that is in the opposite direction of the voltage created between the ports 5151 and 5152 in FIG. 51B. After the duration of the pulse 5192, the MOSFETs 5102 and 5103 may turn off and the circuit may go back to the state discussed above with reference to FIG. 51A.

The diodes 5111-5114 may act to provide a low-impedance path for the coil 5155 to discharge the stored magnetic energy and to prevent a high current path through the MOSFETs 5101-5104, preventing possible damage to the MOSFETs 5101-5104.

With reference to FIG. 43, the solenoid valve 4300 is a 2-wire valve that requires the control lines (or wires) to receives pulses with different polarity to move the valve's plunger in opposite directions. The solenoid valves, in some embodiments, may be 3-wire latching solenoid valves. A 3-wire latching solenoid valve may include two solenoids and three wires (two control lines and a common line) to control the valve. A pulse applied to one of the control lines may apply a momentary pulse to one of the coils and may move the plunger in a direction to close the valve. A pulse with the same polarity applied to the other control line may apply a momentary pulse to the other coil and may move the plunger in the opposite direction to open the valve.

Figure 52:
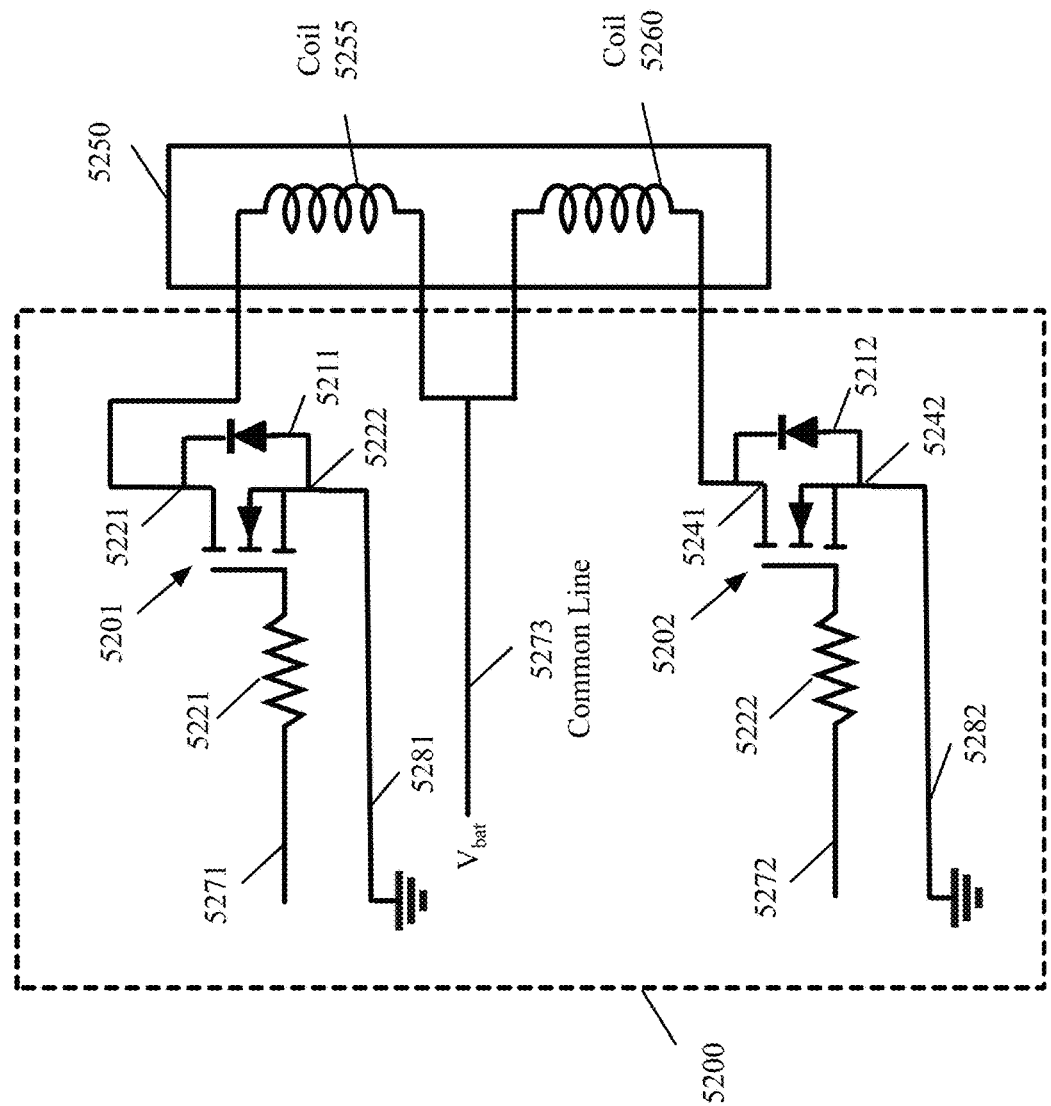
FIG. 52 illustrates a circuit diagram of an example switching circuit for controlling a 3-wire solenoid valve, according to various aspects of the present disclosure.

FIG. 52 illustrates a circuit diagram of an example switching circuit for controlling a 3-wire solenoid valve, according to various aspects of the present disclosure. With reference to FIG. 52, the switching circuit 5200 may be used to control a 3-wire solenoid valve 5250. The solenoid valve 5250 may be similar to the solenoid valves 4161-4166, 4440, and/or 4930 of FIGS. 41, 44, and 47.

With reference to FIG. 52, the switching circuit 5200 may include two MOSFET transistors 5201-5202, two diodes 5211-5212, and two resistors 5221-5222. The switching circuit 5200 may include two control lines 5271-5272 and a common line 5273. The common line 5273 may apply power supply voltage to one port of each coil 5255-5260. The terminals 5281-5282 may be grounded.

In the example of FIG. 52, the MOSFETs 5201 and 5202 may be enhanced-mode n-channel MOSFETs. When no voltage is applied to either control line 5271-5272, both transistors 5201 and 5202 may be off and no current may pass through the coils 5255-5260. When a pulse of voltage is applied to the control line 5271, the MOSFET 5201 may turn on, causing current to pass from the power supply connected to the common line 5273, through the coil 5255, through the channel between the source 5222 and the drain 5221 of the MOSFET 5201, and into the grounded terminal 5281. The magnetic flux through the coil 5255 may move a plunger (not shown) of the solenoid valve 5250 in a first direction (e.g., to close the valve 5250).

After the duration of the pulse, the plunger may maintain its position. The diode 5211 that is connected between the drain 5221 and the source 5222 of the MOSFET 5201 may provide a low-impedance path for the coil 5255 to discharge the stored magnetic energy and to prevent a high current path through the MOSFET 5201, preventing possible damage to the MOSFET. The resistor 5221 may control the current through the MOSFET 5201 when the pulse is applied to the control line 5271.

When a pulse of voltage (with the same polarity as the pulse applied to the control line 5271) is applied to the control line 5272, the MOSFET 5202 may turn on, causing current to pass from the power supply connected to the common line 5273, through the coil 5260, through the channel between the drain 5241 and the source 5242 of the MOSFET 5202, and into the grounded terminal 5282. The magnetic flux through the coil 5260 may move the plunger (not shown) of the solenoid valve 5250 in a second direction, opposite to the first direction (e.g., to open the valve 5250).

After the duration of this pulse, the plunger may maintain its position. The diode 5212 that is connected between the drain 5241 and the source 5242 of the MOSFET 5202 may provide a low-impedance path for the coil 5260 to discharge the stored magnetic energy and to prevent a high current path through the MOSFET 5202, preventing possible damage to the MOSFET. The resistor 5222 may control the current through the MOSFET 5202 when the pulse is applied to the control line 5272.

Although FIGS. 51A-51C and 52 were described above for controlling solenoid valves, the switching circuits similar to the switching circuits 5100 and 5200 may be used to control the relays such as the relays 4145-4146 described above.

With reference to FIGS. 41, 44, and 47, the solenoid valves 4161-4166, 4440, and/or 4740-4745, in some embodiments, may be non-latching normally open or normally closed solenoid valves. In these embodiments, the valves may need a constant source of power by the switching circuits 4221-4222 (FIGS. 42, 46, and 49) to maintain the valve position.

Figure 53:
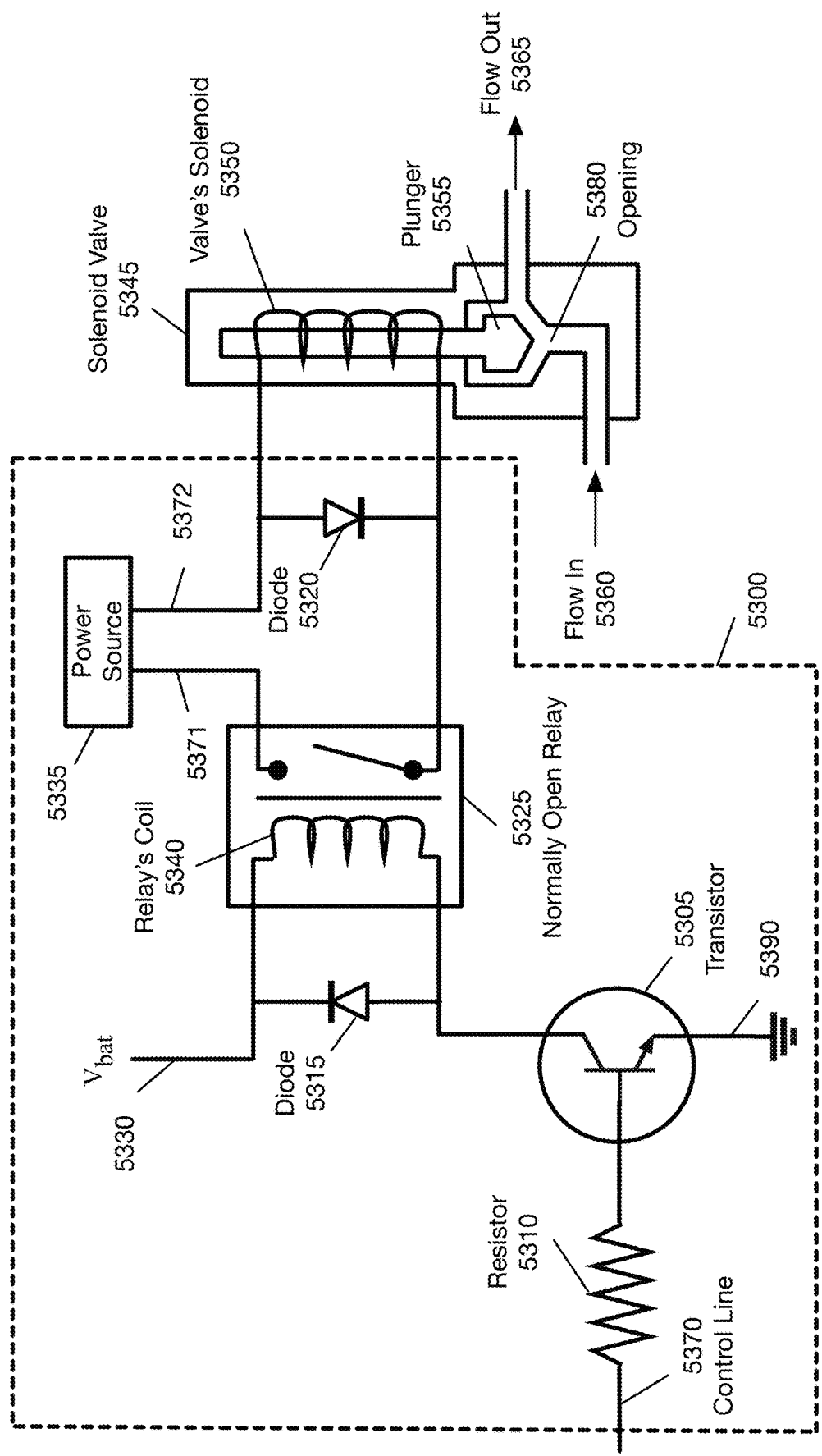
FIG. 53 illustrates a circuit diagram of an example switching circuit for controlling normally open solenoid valve, according to various aspects of the present disclosure.

FIG. 53 illustrates a circuit diagram of an example switching circuit 5300 for controlling a normally open solenoid valve, according to various aspects of the present disclosure. With reference to FIG. 53, the switching circuit 5300 may include a transistor 5305, a resistor 5310, diodes 5315-1120, and a normally open relay 5325. When there is no signal at the control line 5370, the transistor 5305 may be off and the normally open relay 5325 may be open.

When a voltage is applied to the control line 5370, the transistor 5305 may turn on, resulting a current to flow from the power source 5330 (e.g., a without limitation a DC power source) through the relay's coil 5340, through the transistor 5305, into the grounded terminal 5390. As long as the voltage is applied to the control line 31170, the magnetic flux generated by the relay's coil 5340, may keep the relay 5325 closed.

After the relay 5325 closes, a current may pass through the terminal 5371 of the power source 5335, through the relay 5325, through the valve's solenoid 5350, and into the terminal 5372 of the power source 5335. The magnetic flux generated by the valve's solenoid 5350 may move the plunger 5315 away from the opening 5380 and may allow the fluid to pass from the flow in 5360 of the solenoid valve 5345 to the flow out 5365 of the solenoid valve 5345. In some embodiments, the power source 5335 may be a DC power source (e.g., to control solenoid valves that operate with DC power). In other embodiments, the power source 5335 may be an AC power source (e.g., to control solenoid valves that operate with AC power).

When the signal applied to the control line 5370 is removed, the transistor 5305 may open and may turn off the current flow through the relay's coil 5340, resulting in the relay 5325 to open. After the relay 5325 opens, the current flow through the valve's solenoid is turned off and the plunger closes the opening 5380. The diodes 5315-5320 may be Schottky diodes used to provide low-impedance paths for the relay's coil 5340 and the valve's solenoid 5350 to discharge the stored magnetic energy. The diode 5320 may be optional and may not be used, for example, in the embodiments where the power source 5335 is an AC power source. The resistor 5310 may be used to control the current through the transistor 5305 when a voltage is applied to the control line 5370.

Similar to the processing unit 120 of the valve shutoff device 100 described above, the processing unit 120 of the valve controller devices 4100 (FIG. 42), the valve controller devices 4400 (FIG. 46) and the valve controller devices 4700 (FIG. 48) may use a multi-state algorithm that distinguishes seismic waves caused by seismic activities from man-made vibrations and shuts off a shutoff valve on a fluid line when the seismic activities exceed a threshold. The algorithm may include an initial setup and a main loop.

The initial setup may be performed upon installation, power up, and/or reset where the valve controller device 4100, 4400, 4700 may be self-calibrated and self-oriented. The valve controller device may then enter the main loop that implements a state machine and moves between one of the following states: a no seismic activity state, an alert state, an armed state, and an end state. The state machine may remain in the no seismic activity state when none of the P, S, or surface waves related to seismic activity is detected.

The state machine may enter the alert state when the P-waves are detected and there is an expectation of further seismic activities. The state machine may move from the alert state into the armed state when the S-waves are detected after the P-waves. The state machine may move from the armed state into the end state when the magnitude of the seismic activities exceeds a threshold. The state machine may move from either the alert state or the armed state into the no seismic activity state if no seismic activities are detected for a threshold time period. In the end state, the valve controller device may close one or more solenoid valves on the fluid supply pipe(s) to prevent a fluid leak in case the pipe ruptures during seismic activities. Further details of the operations performed for the identification and determination of the intensity of seismic activities were described above with reference to FIGS. 17-21, and with reference to FIG. 55 described below.

In order to be able to differentiate the compression-type waves (e.g., P-waves) from the shear-type waves (e.g., the S or surface waves), the valve controller device may automatically learn/determine the orientation of the coordinate systems during installation, power up, and/or reset. In some embodiments, the IMU is in a chip such as a MEMS chip with miniaturized mechanical and electro-mechanical elements. The accelerometer of the IMU measures the acceleration parameters and the magnetometer of the IMU measures the magnetic field parameters in a coordinate system that is relative to the orientation of the IMU chip. When the valve controller device is installed, the IMU chip (or the accelerometer and the magnetometer for the embodiments that do not include an IMU) may not be in the same orientation as the local coordinate system.

The valve controller device, therefore, requires translating the coordinate system used by the IMU (or by the accelerometer and/or the magnetometer) into the local coordinate system, for example and without any limitations, to identify the local z-coordinate (i.e., the local vertical or up and down direction) in order to, for example, determine whether the parameters measured by the IMU (or by the accelerometer and/or magnetometer) are related to the P-waves 1421 (FIG. 14), which are compression waves that arrive substantially in the local vertical direction 1460.

The orientation may be determined by detecting the local vertical direction, z, by calculating the direction of gravity vector (g) using the 3D accelerometer and making the required coordinate transformation to differentiate the z direction from the x-y plane. The local vertical direction is in opposite direction of the gravity and always has a constant acceleration of gravity (g=−9.81 meters per square seconds, $m/s^2$) which is reported from three acceleration components, measured by the accelerometer.

Figure 54A:
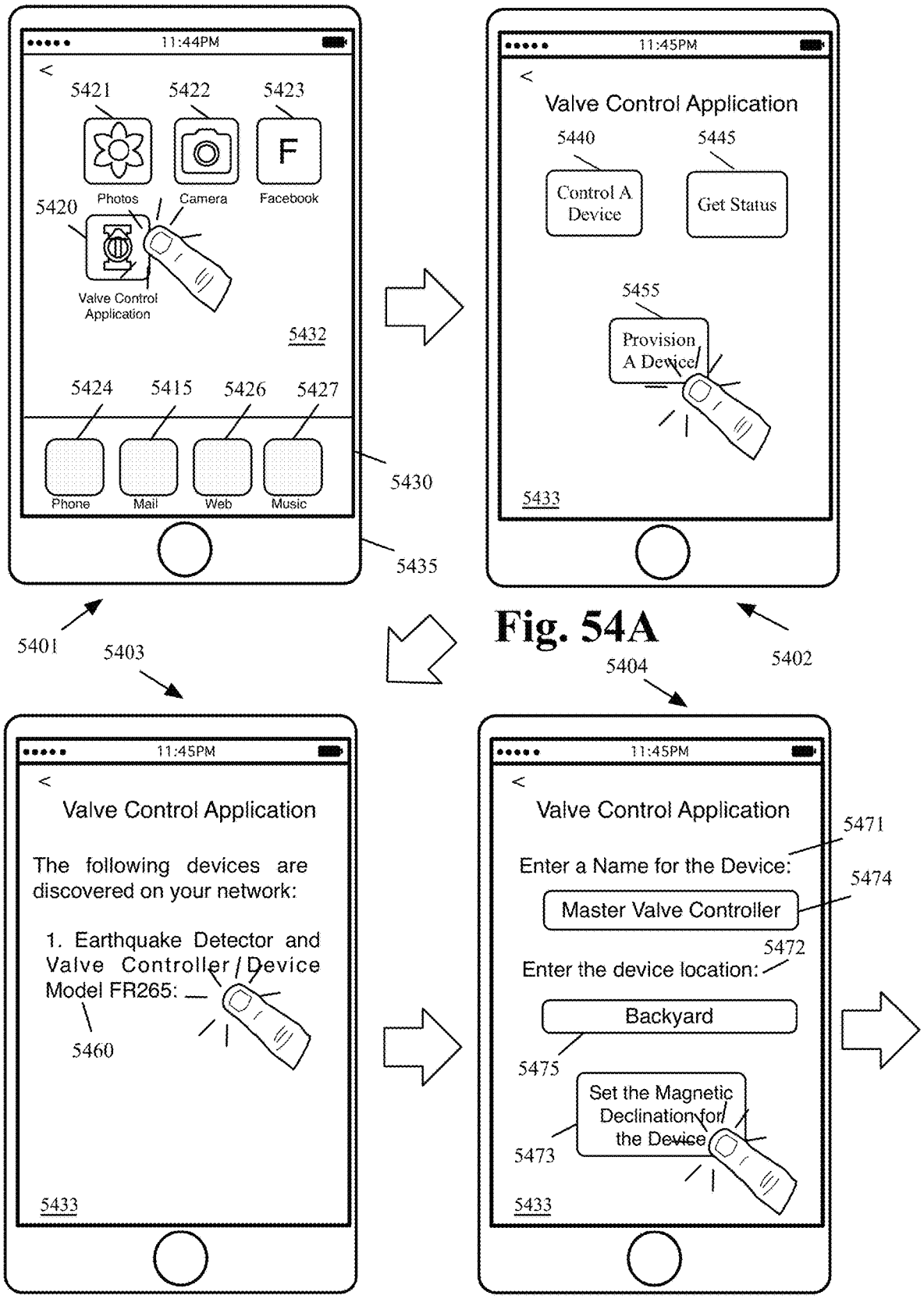
FIGS. 54A-54B illustrate a schematic front view of a client device that may include an application program for controlling one or more valve controller devices, according to various aspects of the present disclosure.
Figure 54B:
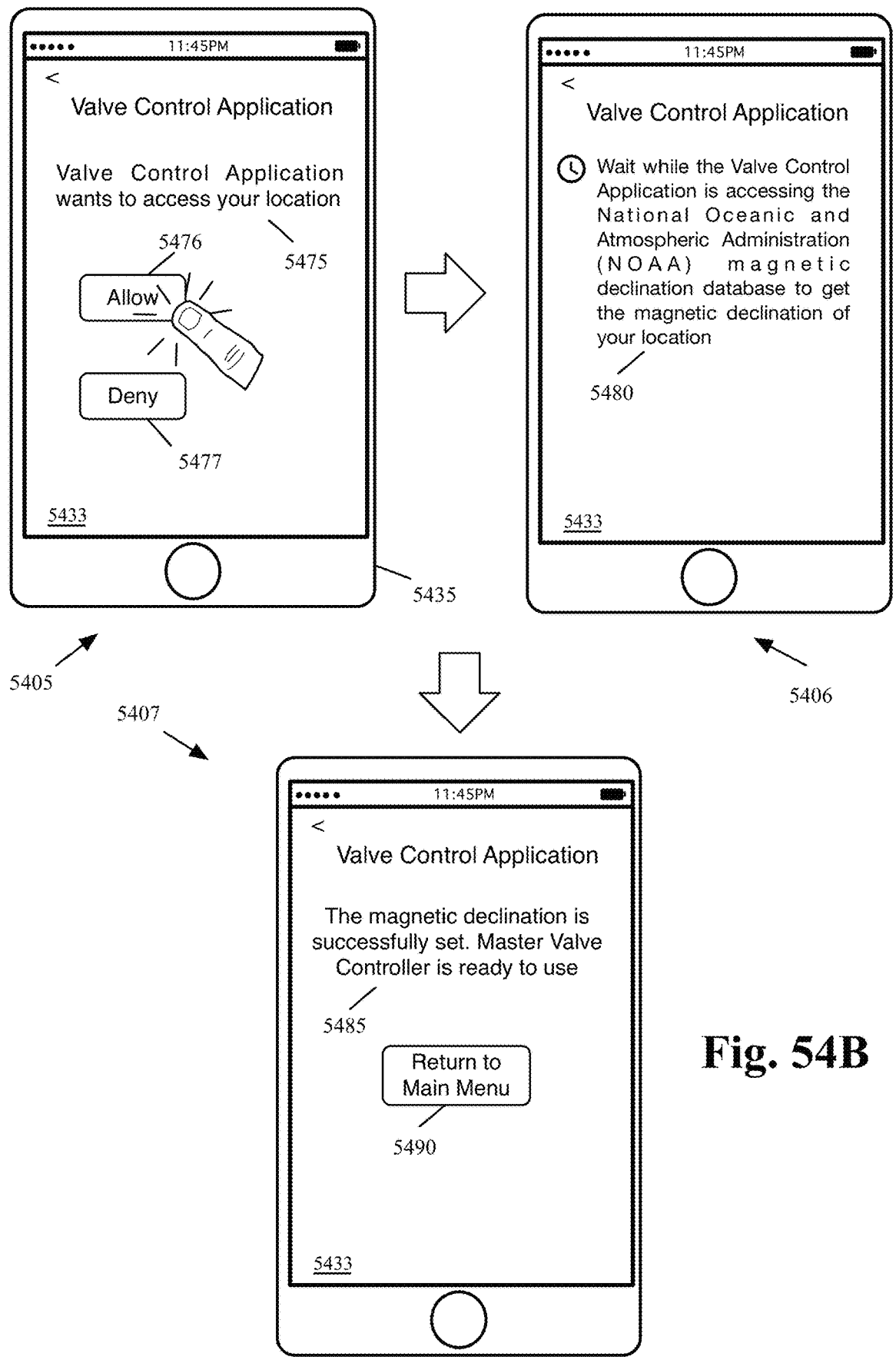

As described above with reference to FIGS. 15A, 15B, and 16, some embodiments may provide an application program to provision a valve controller device. As a part of the provisioning, the application program may set the magnetic declination of the valve controller device. FIGS. 54A-54B illustrate a schematic front view of a client device 5435 that may include an application program for controlling one or more valve controller devices, according to various aspects of the present disclosure. The figure illustrates, through seven stages 5401-5407, a client device 5435 using an application program 5420 to select and provision a valve controller device.

With reference to FIG. 54A, stage 5401 shows a graphical user interface (GUI) 5432 displayed on a display (e.g., a touch screen) 5430 of the client device 5435, which may include several selectable user interface (UI) items (e.g., icons) of several applications 5420-5427. As shown, the valve control application program 5420 may be selected in stage 5401. In response to the selection of the valve control application program 5420, the GUI 5433, in stage 5402, may display several options 5440-5455.

The valve control application 5420 may be a program that is installed on the client device 5435 to provision, set up, and/or control one or more devices (such as the valve controller devices 4100, 41300, and 4700 of FIGS. 41, 44, and 47, respectively), RF unit valve controllers (such as the RF unit valve controllers 4710-4715 of FIG. 47), and/or RF relay controllers (such as the RF unit relay controller 4775 of FIG. 47).

With further reference to FIG. 54A, the "Provision A Device" option 5455 may be selected in stage 5402. In response, the GUI 5433 in stage 5403, may display a list of the devices that the valve control application may discover on the local network. In the example of FIG. 54A, the valve control application program may discover and display a valve controller device 5460 in the network. For example, the client device 5435 may be one of electronic devices 1205 shown in FIGS. 41, 44, and/or 47 and the client device 1205 and the valve controller device 5460 may be connected to one of the network(s) 1290 such as a home network and may be able to discover each other.

The valve control device 5460 may be provisioned to recognize the client device 5435 as a client device that is authorized to communicate and exchange signals, commands, and/or data with the valve control device 5460. The valve control device 5460 may also be provisioned to recognize one or more cloud server/backend servers 1210 of FIGS. 41, 44, and/or 47 as a device that is authorized to communicate and exchange signals, commands, and/or data with the valve control device 5460. The valve controller device 5460 may be provisioned to be assigned a name and a location. As shown, the GUI 5433 may receive a selection of the device 5460 to provision.

In response, the GUI 5433 in stage 5404, may display the prompts 5471 and 5472 to receive a name and a location for the selected device. The GUI 5433 may also display an option 5473 to set the magnetic declination for the device. As shown, the GUI may receive a name 5474 for the valve and a location 5475 in the premises where the valve controller device is installed. The GUI 5433 in stage 5404 may receive a selection of the option 5473 to set the magnetic declination for the device.

In response, the GUI 5433 in stage 5405 shown in FIG. 54B, may display a message 5475 informing that the valve controller application wants to access the location of the client device 5435. The GUI 5433 may also display the option 5476 to allow and the option 5477 to deny accessing the location of the client device. As shown, the GUI 5433 may receive a selection of the allow option 5476.

In response, the valve application program may use one or more applications programs (such as for example, and without limitations, navigation applications, compass, etc.) and/or one or more internal devices of the client device (e.g., and without limitations, a GPS chipset) to determine the location of the client device. The valve application program may instruct (not shown) the user to make sure the client device 5435 is within a distance (e.g., less than a few tens of miles) from the valve controller device such that the location of the client device and the valve controller device may have similar magnetic declinations. In other embodiments, the valve control application may display a prompt (not shown) to request the user to enter an address associated with the location where the valve controller device is installed.

Once the location of the device being provisioned is determined, the valve control application program, in stage 5406, may connect to an external database such as, for example, and without limitations, the NOAA's magnetic declination database to obtain the magnetic declination associated with the location of the client device. The GUI 5433 may display a message 5480 to indicate which database is being accessed.

As shown in stage 5407, the GUI 5433 may display a message 5485 indicating the magnetic declination is successfully set. The GUI 5433 may display an option 5490 to return to the main menu (shown in stage 6202).

The valve controller devices, in some embodiments, may perform a multi-state algorithm to determine the eminent arrival of an earthquake by detecting different types of seismic waves in a predetermined sequence. The detection (or the lack of detection) of each type of seismic wave may change the state of the algorithm. The valve controller devices, in some embodiments, may perform the processes 1700, 1800, 1900, 2000, 2100, and 5500 described in FIGS. 17, 18, 19, 20, 21, and 55, respectively to perform multi-state algorithm to control one or more solenoid valves and/or one or more electrical circuit breakers.

With reference to FIG. 17 described above, the processing units 4200 of the valve controller devices 4100, 4400, and/or 4700 may perform an initial setup for identification and determination of the intensity of seismic activities. With reference to FIG. 18 described above, the processing units 4200 may perform the rotational coordinate transformation from the (x', y', z') coordinates used by the IMU (or the accelerometer and magnetometer) to the local coordinates (x, y, z). With reference to FIG. 19 described above, the processing units 4200 may identify P-waves related to seismic activities. With reference to FIG. 20 described above, the processing units 4200 may identify the S-waves related to seismic activities. With reference to FIG. 21 described above, the processing units 4200 may identify the surface waves related to seismic activities.

Figure 55:
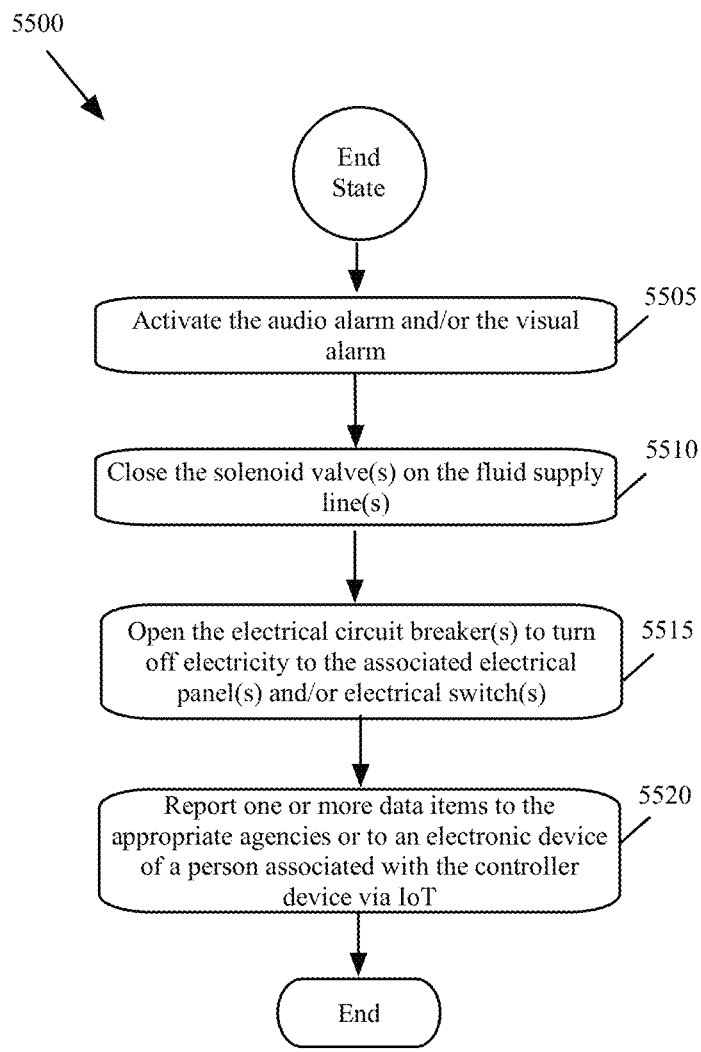
FIG. 55 is a flowchart illustrating an example process for activating an alarm, closing one or more solenoid valves, and/or opening one or more electrical circuit breakers after the surface waves related to seismic activities exceed a threshold, according to various aspects of the present disclosure.

FIG. 55 is a flowchart illustrating an example process 5500 for activating an alarm, closing one or more solenoid valves, and/or opening one or more electrical circuit breakers after the multi-state algorithm indicates that the surface waves related to seismic activities exceed a threshold, according to various aspects of the present disclosure. The process 5500, in some of the present embodiments, may be performed by the processing unit 120 of a valve controller device 4100 (FIG. 42), 4400 (FIG. 46), and/or 4700 (FIG. 48).

With reference to FIG. 55, the process 5500 may activate at block 5505) an audio alarm and/or a visual alarm. For example, the processing unit 120 of the valve controller devices 4100 (FIG. 42) or 4700 (FIG. 48) may send a signal to the corresponding audio visual alarm 4225 to activate an audio and/or a visual alarm.

With further reference to FIG. 55, the process 5500 may close (at block 5510) the solenoid valve(s) on the fluid supply line(s). For example, the processing unit 120 of the valve controller device 4100 (FIG. 42) may send one or more signals to the switching circuits 4221-4222 to close the solenoid valves 4161-4166. As another example, the processing unit 120 of the valve controller device 4400 (FIG. 46) may send one or more signals to the switching circuit 4221 to close the solenoid valve 4440. As another example, the processing unit 120 of the valve controller device 4700 (FIG. 48) may send one or more signals to the RF valve controllers 4710-4715 to close the corresponding solenoid valve 4740-4745.

With further reference to FIG. 55, one or more electrical circuit breakers may be opened (at block 5515) to turn off electricity to the associated electrical panel(s) and/or electrical switch(s). For example, the processing unit 120 of the valve controller device 4100 (FIG. 42) may send one or more signals to the relays 4145-4145 to open the associated electrical circuit breakers 4150-4151 (FIG. 41). As another example, the processing unit 120 of the valve controller device 4500 (FIG. 45) may send one or more signals to the relay 4505 to open the associated electrical circuit breaker 4505 (FIG. 44). As another example, the processing unit 120 of the valve controller device 4700 (FIG. 48) may send one or more signals to the RF relay controller(s) 4775 (FIG. 47) to open the corresponding electrical circuit breaker(s) 4150.

With continued reference to FIG. 55, one or more data items related to the seismic activities may be sent (at block 5520) to one or more electronic devices. The examples of the data items sent to the one or more electronic devices may include, without limitations, the status of the solenoid valve(s) (e.g., open or close), the parameters received from the accelerometer, the parameters received from the magnetometer, the calculations related to the power and/or the duration of the P-waves, the calculations related to the power and/or the duration of the S-waves, the calculations related to the power and/or the duration of the surface waves, the time period between the detection of the P-waves and S-waves, the time period between the detection of the S-waves and surface-waves, the location of the valve controller device, etc.

In some of the present embodiments, the valve controller device may include a GPS chip. In these embodiments, the location of the valve controller device may be determined through the GPS. In some of the present embodiments, the location of the controller valve (e.g., a physical address and/or the geographic coordinates (e.g., the longitude and the latitude) of the location where the controller valve is installed may be obtained through a client device 5435 (FIGS. 54A-54B) during the provisioning of the valve controller device.

The data items may be sent by the processing unit 120 (FIGS. 42, 46, and 48) through the radio transceiver 125, the antenna 135, and the network(s) 1280 (FIGS. 41, 44, 47) to one or more of the electronic devices 1205 and/or one or more of the cloud/backend servers 1210. The processing may then end. The block 5520 may provide the technical advantage of including a valve control device into a network of sensors that reports events related to seismic activities to a center such, for example, and without limitations, the USGS. The reported data may then be used by USGS for detection and reporting of seismic activities over a large geographical area where the valve controller devices of the present embodiments and/or other sensors accessible by the USGS are located.

The specific operations of the process 5500 may not be performed in the exact order shown and described. Furthermore, the specific operations described with reference to FIG. 55 may not be performed in one continuous series of operations in some embodiments, and different specific operations may be performed in different embodiments. For example, some embodiments may not perform one or more of the following operations: activating the audio and/or visual alarm, closing the solenoid valve(s), opening the electrical circuit breaker(s), and/or reporting the data items. In these embodiments, the process 5500 may skip the corresponding blocks 5505, 5510, 5515, and/or 5520, respectively.

In addition to turning off the solenoid valve(s) and/or opening the electrical circuit breaker(s) based on the analysis of seismic waves, the valve controller devices of some of the present embodiments may turn off the solenoid valve(s) and/or open the electrical circuit breaker(s) based on signals that are received from authorized remote devices such as, for example, and without limitations, remote devices that associated with the USGS. The valve controller device, in some of these embodiments may operate as an IoT device.

Figure 56:
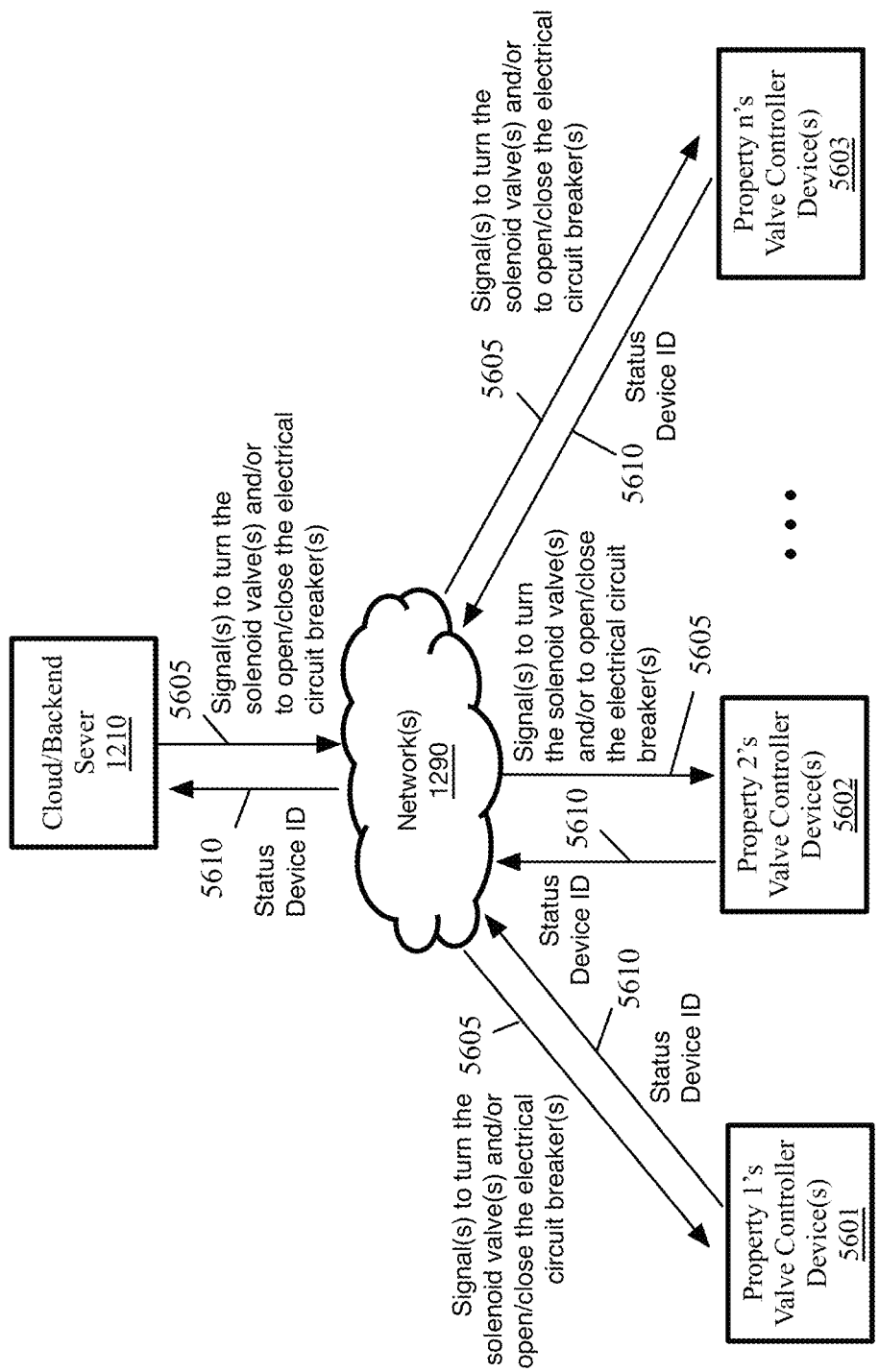
FIG. 56 is a functional block diagram illustrating a system for remotely turning one or more solenoid valves on or off and/or opening or closing one or more electrical circuit breakers by a cloud or backend server using valve controller devices, according to various aspects of the present disclosure.

FIG. 56 is a functional block diagram illustrating a system for remotely turning one or more solenoid valves on or off and/or opening or closing one or more electrical circuit breakers by a cloud or backend server using valve controller devices, according to various aspects of the present disclosure. With reference to FIG. 56, a cloud or backend server 1210 may send one or more signals 5605 to one or more valve controller devices 5601-5603 to turn one or more solenoid valves on or off and/or to open or close one or more electrical circuit breakers. The cloud or backend server 1210 may be similar to the cloud or backend server 1210 of FIG. 41.

As a first example, one or more of these servers may detect an earthquake and may send one or more signals to the valve controller devices in a certain geographical area that may be affected by the earthquake. Since electronic signals travel faster than the seismic waves, if the server that detects the earthquake is closer to the earthquake epicenter than some of the valve controller devices, these valve controller devices may receive the signal(s) from the server before the arrival of the seismic waves to the location where these valve controller devices are installed.

As a second example, one or more of these servers may be associated with a government entity such as a utility company and may be authorized to remotely turn on or off utilities such as gas, water, and/or electricity to different properties. One or more of these servers may send signals to the valve controller devices in different properties to turn different utilities on or off when a subscriber moves in or out of a property.

With further reference to FIG. 56, the valve controller devices 5601-5603 may be installed in different properties. The cloud or backend server 1210 may send the signal(s) 5605 to many valve controller devices 5601-5603 during an emergency event such as an earthquake, fire, war, explosion, landslide, etc., to turn off the associated solenoid valves and/or open the associated electrical circuit breakers. The cloud or backend server 1210 may send the signal(s) 5605 to an individual valve controller device to turn the corresponding solenoid valve(s) on or off, for example when a utility subscriber takes possession or leaves a premise where the solenoid valve(s) is/are installed (e.g., a utility company may remotely shutoff the gas shutoff valve of a property when a utility company's customer informs the utility company that the customer no longer lives in the premise. The cloud or backend server 1210 may send the signal(s) 5605 to an individual valve controller device to open the corresponding electrical circuit breaker(s) to turn of the electricity.

With reference to FIG. 56, the signal(s) 5605 may go through the network(s) 1290 and may be received by the valve controller devices 5601-5603 that may be associated with different properties. The valve controller devices 5601-5603 may determine that the cloud/backend server 1210 is authorized to send the signal(s), and may turn the associated solenoid valve(s) on or off based and/or open or close the associated circuit breaker(s) based on the received signal(s). The valve controller devices 5601-5603 may send their status and device identification 5610 to the cloud or backend server 1210. The status may include an indication that the associated solenoid valve(s) has or has not been successfully turned on or off. The status may include an indication that the associated electrical circuit breaker(s) has or has not been successfully opened or closed.

Figure 57:
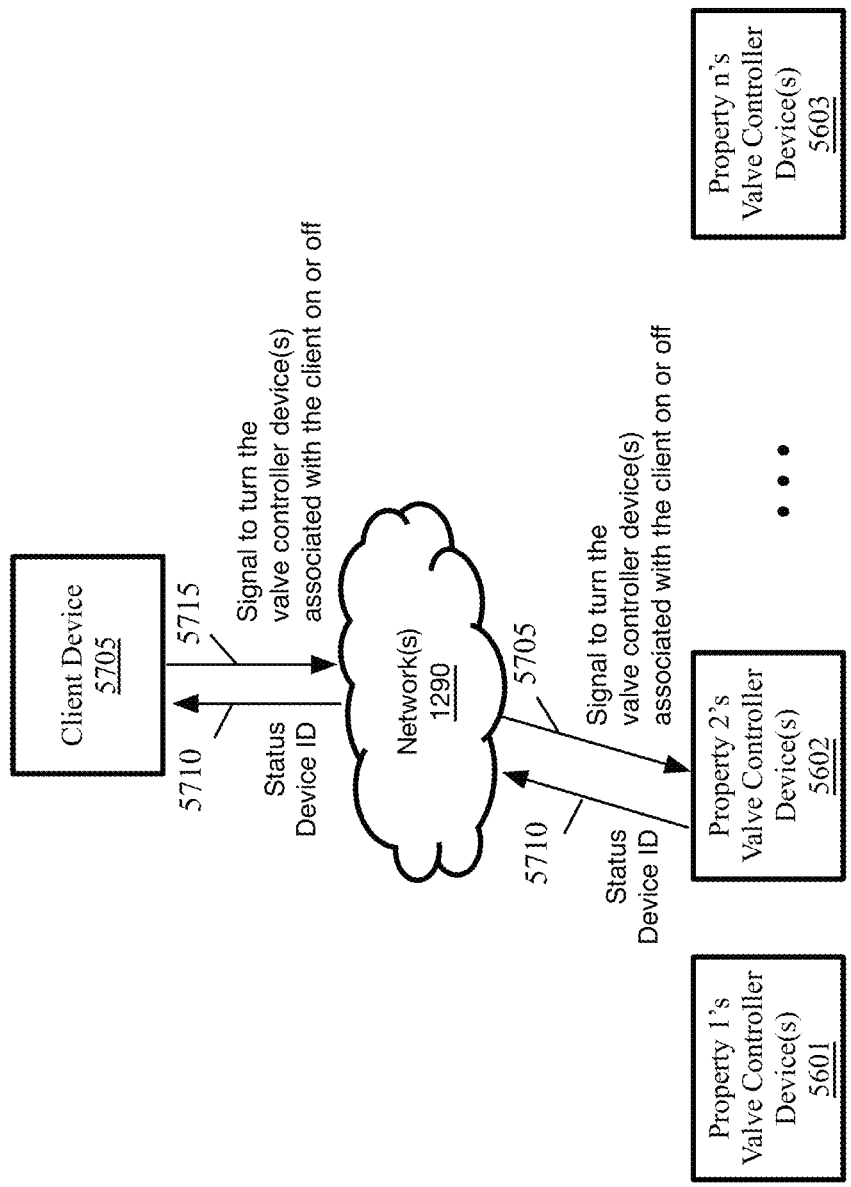
FIG. 57 is a functional block diagram illustrating a system for remotely controlling one or more solenoid valves and/or one or more electrical circuit breakers by a client device using a valve controller device, according to various aspects of the present disclosure.

FIG. 57 is a functional block diagram illustrating a system for remotely controlling one or more solenoid valves and/or one or more electrical circuit breakers by a client device using a valve controller device, according to various aspects of the present disclosure. The client device 5705 may be a client device such as the client device 5435 of FIG. 54A that is associated with a particular valve controller device. In the example of FIG. 57, the valve controller device 5602 may be provisioned to be associated with the client device 5705.

With reference to FIG. 57, the client device 5705 may send one or more signals 5715 to the valve controller device 5602 to turn on or off the solenoid valve(s) and/or to open/close the electrical circuit breaker(s) associated with the valve controller device 5602. For example, the user of the client device 5705 my wish to turn off the gas, water, and/or electricity before going to a trip or turn on the gas, water, and/or electricity after coming back from the trip. The user may, for example, be away from the property where the valve controller device is installed and may wish to turn off the utilities after hearing news about an earthquake, fire, or other emergency or disaster events.

With further reference to FIG. 57, the signal(s) 5715 may go through the network(s) 1290 and may be received by the valve controller device 5602 that may be associated with the client device. The valve controller device 5602 may determine that the client device 5705 is authorized to send the signal(s) to the valve controller device 5602, and may turn the associated solenoid valve(s) on or off and/or open/close the associated circuit breaker(s) based on the received signal(s). The valve control device 5602 may send its status and device identification 5710 to the client device 5705. The status may include an indication that the solenoid valve(s) has or has not been successfully turned on or off and/or the circuit breaker(s) have or have not been successfully opened or closed. The other valve controller devices 5601 or 5603 that are not associated with the client device 5705 may ignore the signal(s) 5715 even if the valve controller devices 5601 or 5603 receive the signal(s) 5715 from the client device 5705 through the network(s) 1290.

Figure 58A:
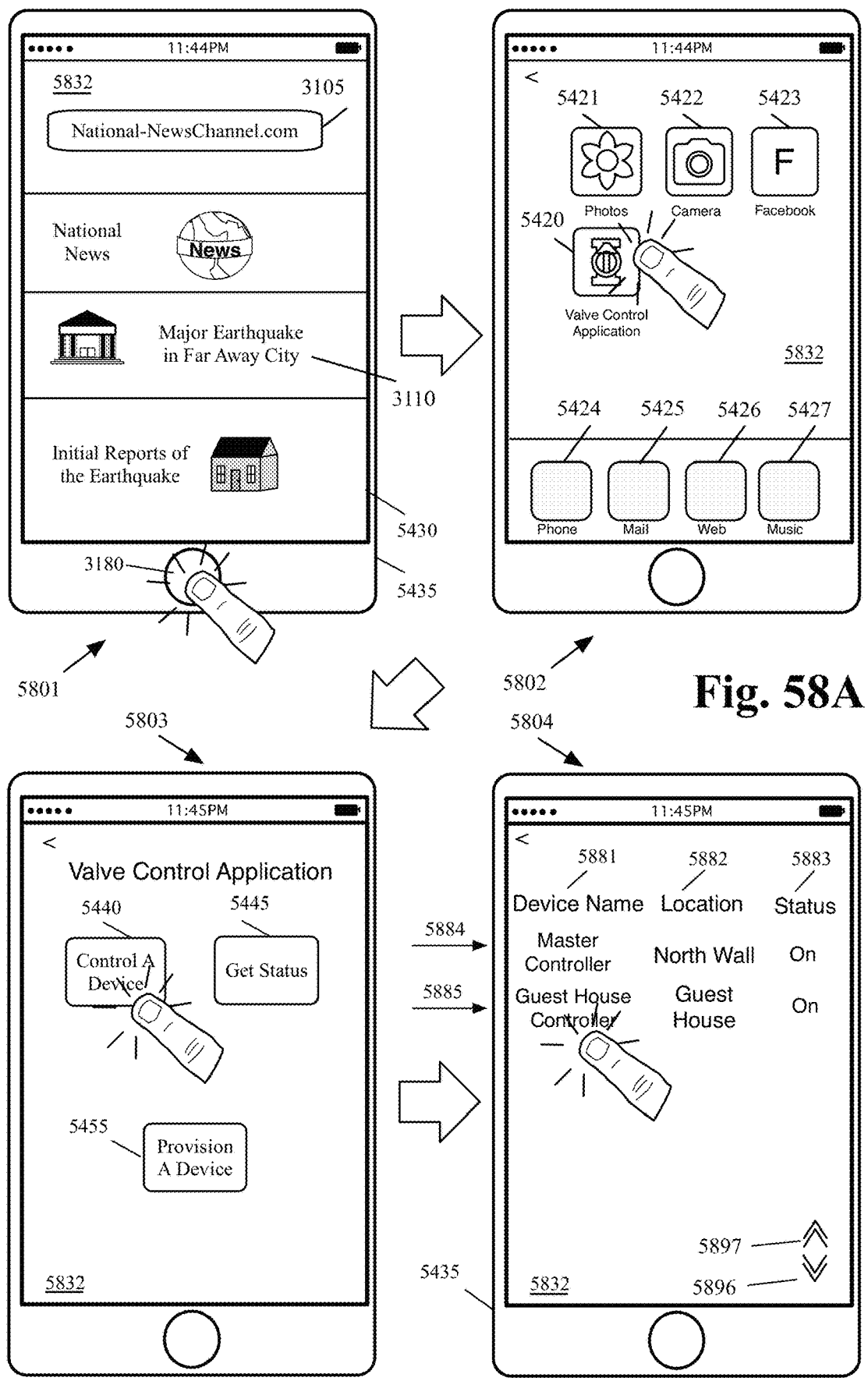
FIGS. 58A-58B illustrate a schematic front view of a client device that may include an application program for remotely controlling one or more solenoid valves and/or one or more electrical circuit breakers, according to various aspects of the present disclosure.
Figure 58B:
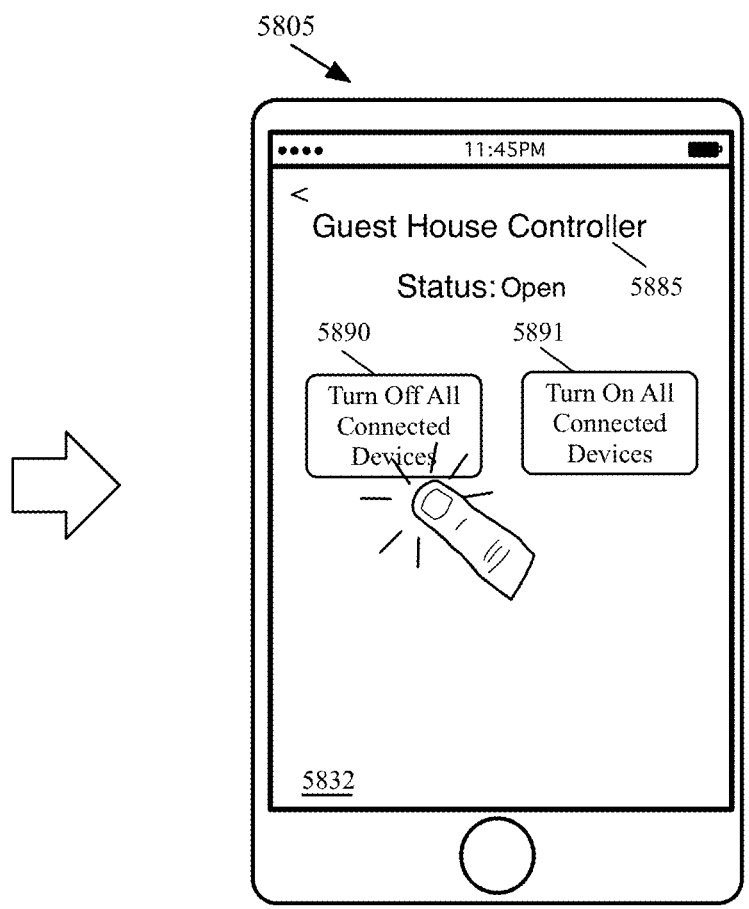

FIGS. 58A-58B illustrate a schematic front view of a client device that may include an application program for remotely controlling one or more solenoid valves and/or one or more electrical circuit breakers, according to various aspects of the present disclosure. The figure illustrates, through five stages 5801-5805, a client device 5435 using an application program 5420 to remotely control one or more solenoid valves and/or one or more electrical circuit breakers.

With reference to FIG. 58A, stage 5801 shows a graphical user interface (GUI) 5832 displayed on a display (e.g., a touch screen) 5430 of the client device 5435. In the example of FIG. 54, the client device 5435 in stage 5801 is displaying a news channel 3105 that is unrelated to the valve control application 5420. As shown in this example, the news channel 3105 may display news 3110 regarding an earthquake in a city near the property where a valve controller device associated with the client device 5435 is installed.

As shown in stage 5801, a control button 3180 is selected to exit the news channel. In response to the selection of the control button 3180, the GUI 5832 may display a list of applications 5420-5427 in stage 5802. As shown, the valve control application 5420 may be selected in stage 5802. In response to the selection of the valve control application 5420, the GUI 5832 in stage 5803 may display several options 5440-5455. In the example of FIG. 58A, it is assumed that the valve controller device is already provisioned using the provision option 5455.

As shown in step 5803, the option 5440 to control a device may be selected. In response, the GUI 5832, in stage 5804, may display the name 5881, the location 5882, and the status 5883 of several devices 5884-5885 (e.g., valve controller devices) that may be controlled by the valve control application program and the client device 5435. The GUI 5832 may provide a scroll down option 5896 and a scroll up option 5897 to display additional devices (if any).

In this example, two valve controller devices 5884-5885 may be associate with the client device 5435. The first device 5884 is named "Master Controller" and is installed on the north wall of the property. The current status 5883 of the device 5884 indicates that all devices (e.g., solenoid valve(s) and/or electrical circuit breaker(s)) controlled by the device 5884 are on. The second device 5885 is named "Guest House Controller" and is installed in the guest house. The current status 5883 of the device 5885 indicates that all devices (e.g., solenoid valve(s) and/or electrical circuit breaker(s)) controlled by the device 5885 are on.

As shown in stage 5804, the device 5885 may be selected. In response, the GUI 5832 may display several options 5890-5891 in stage 5805 (FIG. 58B) for controlling the selected device. In this example, the options are "turn off all connected devices" 5890 and "turn on all connected devices" 5891. As shown, the option 5890 may be selected. As a result, all valves connected to the "Guest House Controller" 5885 may be closed and/or all circuit breakers connected to the "Guest House Controller" 5885 may be opened. As described below with reference to FIG. 60, the client device 5435 may send one or more signals to the processing unit 120 (FIG. 42, 46 or 48) to turn off all solenoid valves and/or to open all electrical circuit breakers associated with the valve controller device 5885.

Figure 59:
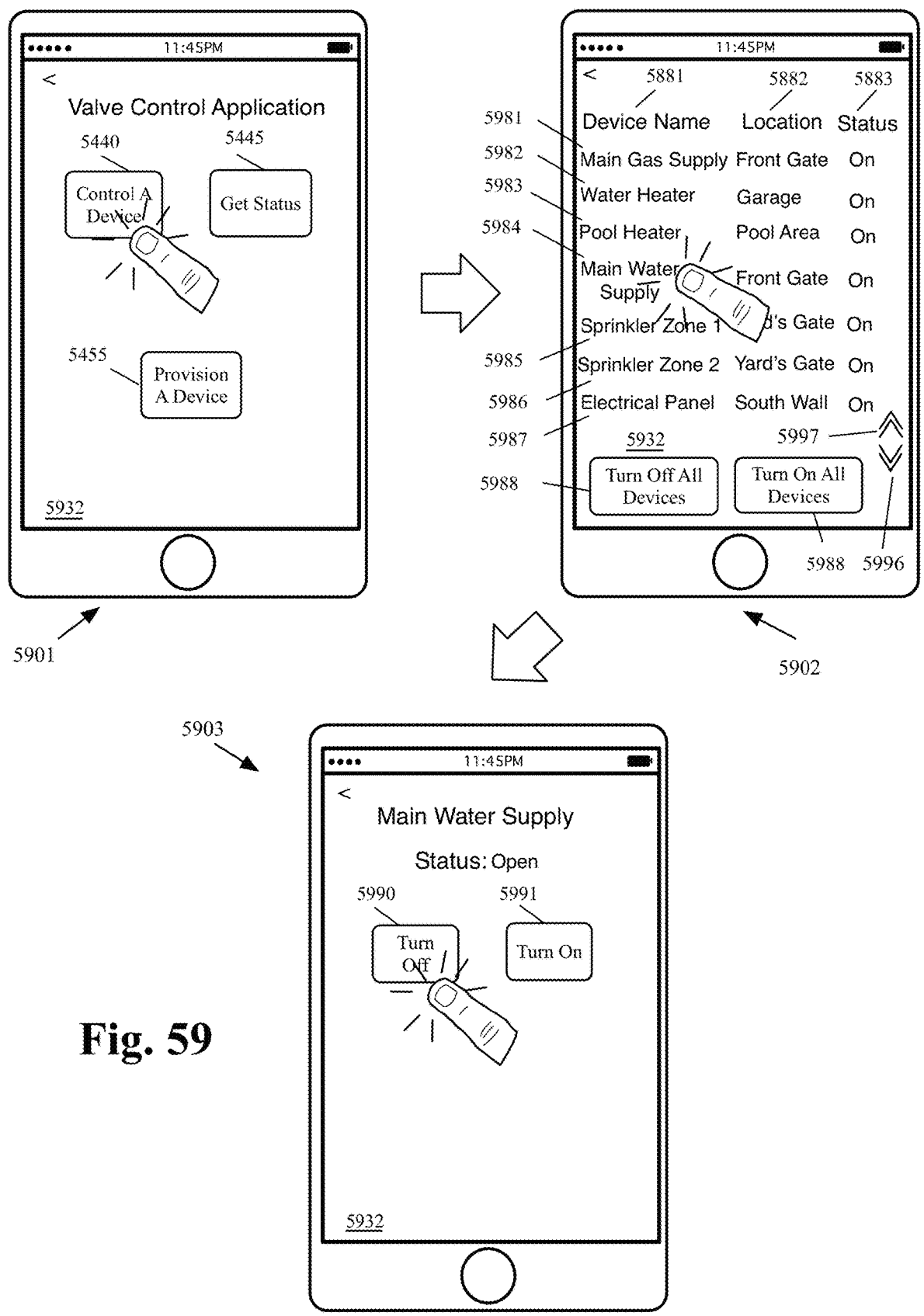
FIG. 59 is a schematic front view of a client device that may include an application program for remotely controlling one or more individual solenoid valves and/or one or more individual electrical circuit breakers, according to various aspects of the present disclosure.

In the embodiments that each valve and/or electrical circuit breaker is controlled individually (e.g., as shown in FIGS. 44-50) the GUI of the valve control application program may provide options to individually control each valve and/or circuit breaker. FIG. 59 is a schematic front view of a client device that may include an application program for remotely controlling one or more individual solenoid valves and/or one or more individual electrical circuit breakers, according to various aspects of the present disclosure. The figure illustrates, through three stages 5901-5903, a client device 5435 using an application program 5420 to remotely control individual solenoid valves and/or individual electrical circuit breakers.

Stage 5901 of FIG. 59 may be similar to stage 5803 of FIG. 58A. With reference to stage 5901 of FIG. 59, the option 5440 to control a device may be selected. In this example, the valves and/or the electrical circuit breakers may be individually controlled (e.g., as described above with reference to FIGS. 44-50). As shown in stage 5902, a list of individual devices 5981-5987 may be displayed. The GUI 5932 may provide a scroll down option 5996 and a scroll up option 5997 to display additional devices (if any). The GUI 5932 may also provide the options 5988-5989 to control all devices at once (e.g., during an emergency and/or to facilitate turning all devices on or off together).

As shown, in stage 5902, the option to control the device 5984 may be selected. In response, the GUI 5932, in stage 5903, may display the options 5990 and 5991 to turn the selected device off or on, respectively. In this example, the option 5990 may be selected. In response, the client device 5435 may send one or more signal to the valve controller device that is associated with the selected device to turn the selected valve (in this example the main water supply solenoid valve) off. As described below with reference to FIG. 60, the client device 5435 may send one or more signals to the processing unit 120 (FIG. 46 or 48) to turn off the selected device 5984.

Figure 60:
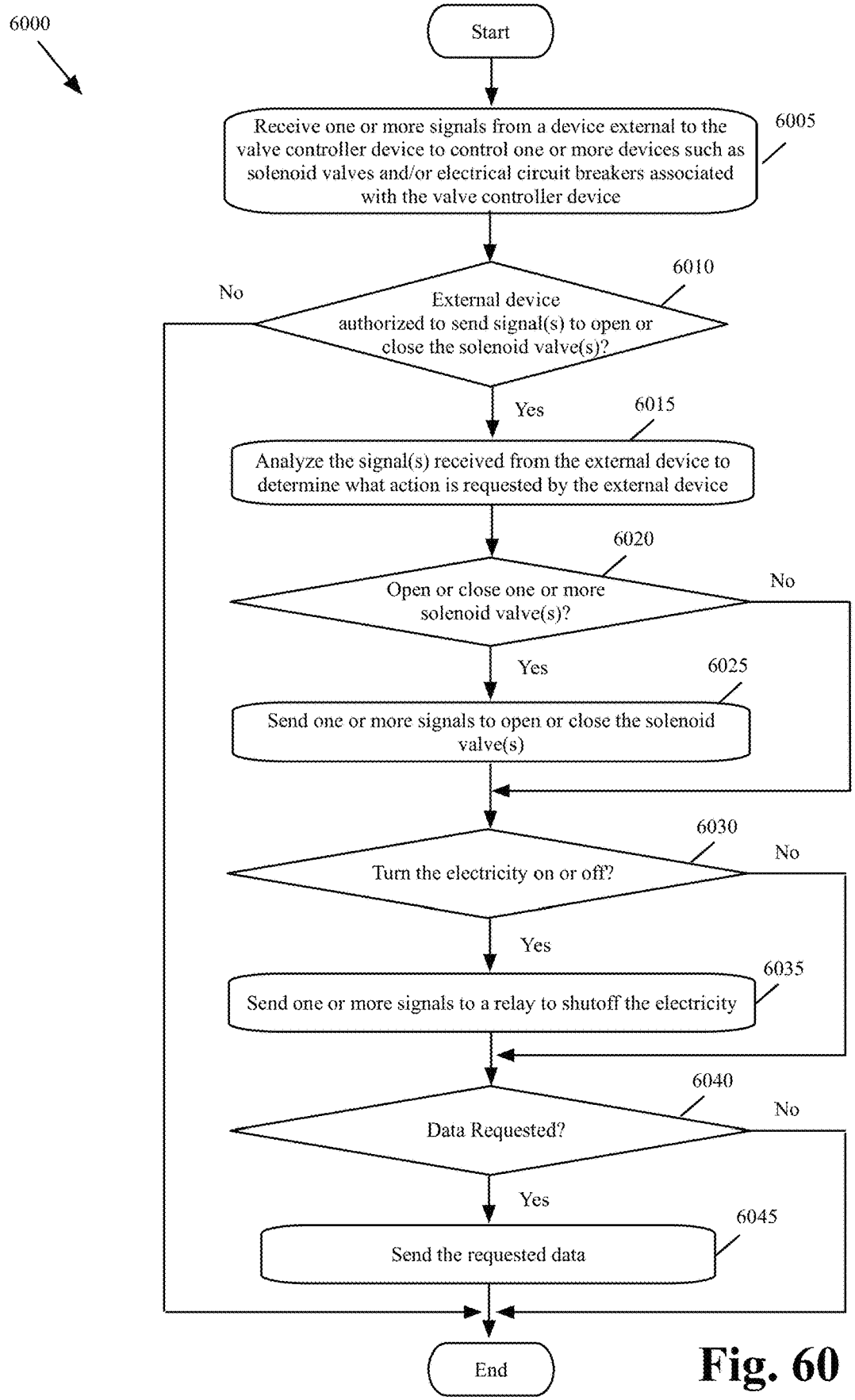
FIG. 60 is a flowchart illustrating an example process for remotely controlling one or more valves and/or one or more electrical circuit breakers in response to receiving a signal from a remote device, according to various aspects of the present disclosure.

FIG. 60 is a flowchart illustrating an example process 6000 for remotely controlling one or more valves and/or one or more electrical circuit breakers in response to receiving a signal from a remote device, according to various aspects of the present disclosure. The process 6000 in some of the present embodiments may be performed by the processing unit 120 of a valve controller device (FIGS. 42, 46, 48).

With reference to FIG. 60, one or more signals may be received (at block 6005) from a device external to the valve controller device to control one or more devices associated with the valve controller device. For example, the processing unit 120 (FIGS. 42, 46, 48) may receive a signal from the client device 5435 (FIGS. 58A, 58B, 59) after one of the options 5890-5891 or 5990-5991 is selected.

With further reference to FIG. 60, a determination may be made (at block) 6010 whether the external device is authorized to communicate with and/or to control one or more devices. For example, in some of the present embodiments, a valve controller device may be provisioned to communicate with and/or to be controlled by one or more external servers such as the cloud/backend servers 120 of FIG. 41. The processing unit 120 of the valve controller device (FIGS. 42, 46, 48) may determine (at block 6010) whether the external device from is authorized to communicate with and/or to control the valve controller device.

With reference to FIG. 60, when the external device is not authorized to communicate and/or to control the valve controller device, the processing may end. Otherwise, the signal(s) received from the external device may be analyzed (at block 6015) to determine the action requested by the external device. Next, a determination may be made (at block 6020) whether the external device has requested that one or more solenoid valve to be opened or closed. For example, the external device may be related to USGS or another institution that may have detected an earthquake and may have sent the one or more signals to close the valve(s). If not, the processing may proceed to block 6030, which is described below.

Otherwise, one or more signals may be sent (at block 6025) to open or close the solenoid valve(s) based on the request from the external device. Next, at block 6030 a determination may be made whether the external device has requested turning the electricity on or off. If not, the processing may proceed to block 6040, which is described below.

Otherwise, one or more signals may be sent (at block 6035) to a relay to turn the electricity on or off, based on the request from the external device. Next, at block 6040 a determination may be made whether the external device has requested one or more data items. For example, the external device may ask for the on or off status of one or more device, the health status of one or more devices, the parameters related to earthquake measured by one or more devices, etc. If not, the processing may end.

Otherwise, the requested data may be sent (at block 6045) to the external device. The processing may then end. The specific operations of the process 6000 may not be performed in the exact order shown and described. Furthermore, the specific operations described with reference to FIG. 60 may not be performed in one continuous series of operations in some embodiments, and different specific operations may be performed in different embodiments. For example, in some embodiments the valves and the electricity may be controlled together. These embodiments may determine (the block 6020) whether the valves and/or the electricity has to be turned on or off. These embodiments may skip block 6030.

Figure 61:
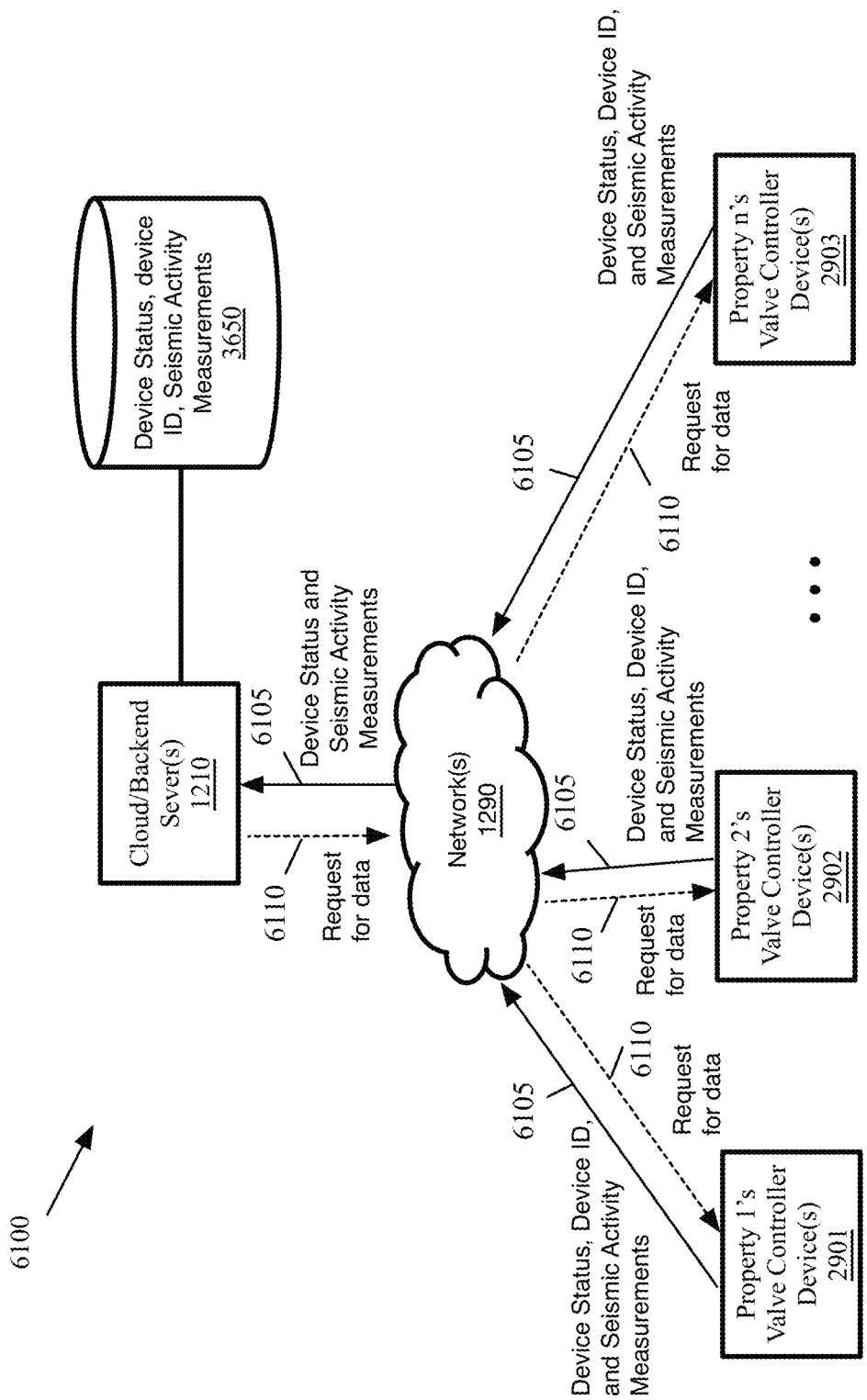
FIG. 61 is a functional block diagram illustrating a system for reporting health status and data by one or more valve controller devices to one or more external devices, according to various aspects of the present disclosure.

FIG. 61 is a functional block diagram illustrating a system 6100 for reporting health status and data by one or more valve controller devices to one or more external devices, according to various aspects of the present disclosure. With reference to FIG. 61, one or more valve controller devices 5601-5603 may collect device status and/or seismic activity measurements. The valve controller devices 5601-5603 may be installed at different properties. The valve controller devices 5601-5603 may send (as shown by 6105) the device status, seismic activity measurements, and/or device identification to one or more cloud or backend servers 1210.

The cloud or backend servers 1210 may store the device status, seismic activity measurements, and/or device IDs in a database 3650. The cloud or backend servers 1210 may use the collected information to estimate the intensity of seismic activities in specific areas (e.g., where one or more of the valve controller devices 5601-5603 are located, may assess the health status of the valve controller devices 5601-5603, etc.

Sending of the device status, device ID, and/or seismic activity measurements may be done on a pull basis, e.g., when the cloud or back end server(s) 1210 send(s) (as shown by 6110) a request for data. Sending of the device status, device ID, and/or seismic activity measurements may be done on a push basis after detecting an event such as a component failure, major seismic activities, and/or on a push basis as a periodic report.

Figure 62:
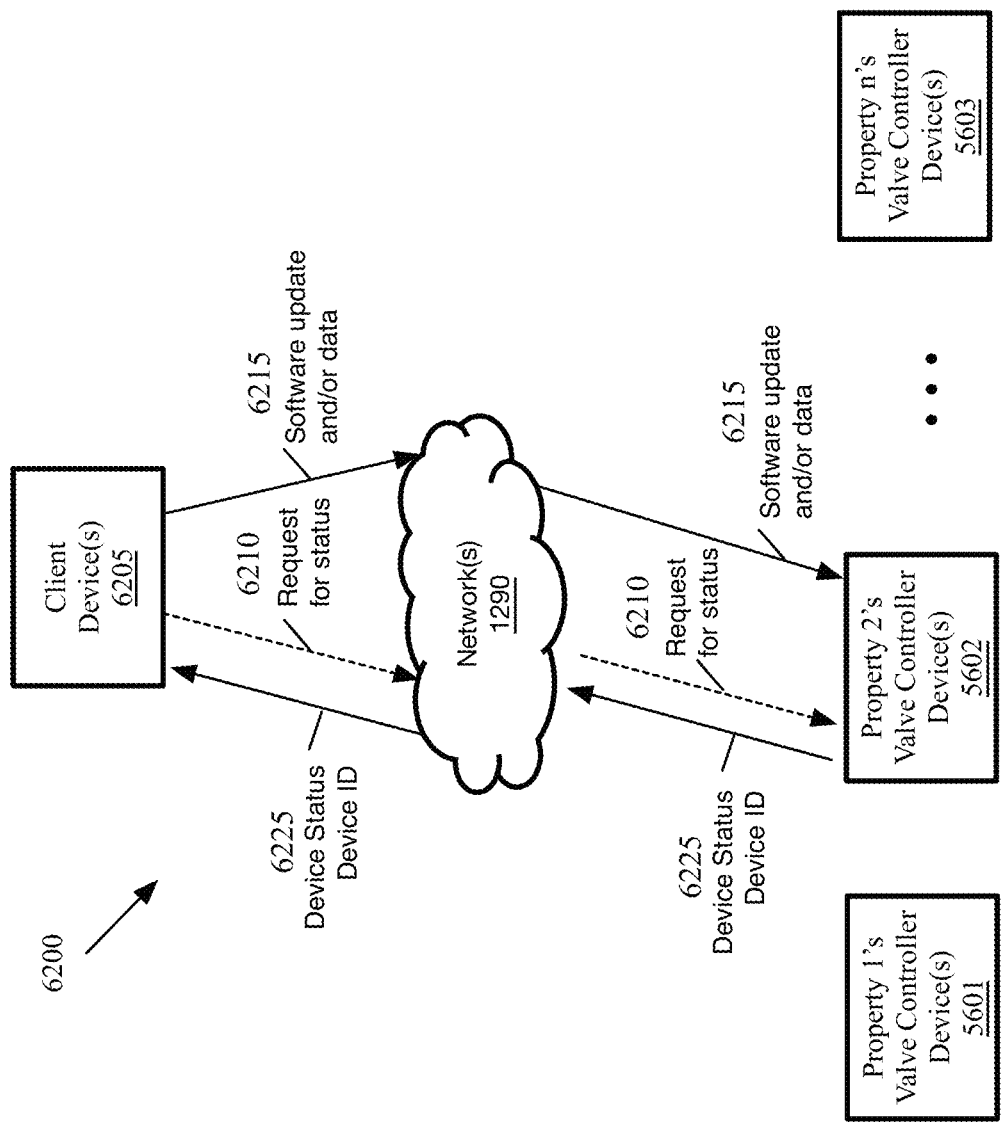
FIG. 62 is a functional block diagram illustrating a system for reporting health status and data by a valve controller device to one or more client devices associated with the valve controller device, according to various aspects of the present disclosure.

FIG. 62 is a functional block diagram illustrating a system 6200 for reporting health status and data by a valve controller device to one or more client devices associated with the valve controller device, according to various aspects of the present disclosure. With reference to FIG. 62, a valve controller device 5602 may collect device status. The valve controller device 5602 may send (as shown by 6225) the device status and/or device identification to one or more client devices 6205.

The client device(s) 6205 may store the device status and/or device ID. The client device(s) 6205 may display the device status and/or device ID on the display of the client device(s), for example, as described below with reference to FIG. 64.

Sending of the device status and/or device ID may be done on a pull basis, e.g., when the client device(s) 3705 send(s) (as shown by 3710) a request for data. Sending of the device status and/or device may be done on a push basis after detecting an event such as a component failure, major seismic activities, and/or on a push basis as a periodic report.

The client device(s) 6205 may send software updates and/or data 6215 to the valve controller device 5602. For example, and without limitations, the client device may send software updates for the processing unit 120 (FIGS. 42, 46, 48). The client device may send data, for example, and without limitations, as described above, the magnetic declination and/or the physical address and/or the geographical coordinates of the location where the valve controller device is installed. The client device may send different parameters of the algorithm used for the identification and determination of the intensity of the seismic waves (as described above with reference to FIGS. 17-21 and 55) either as a single data item or as a part of a software update.

Figure 63:
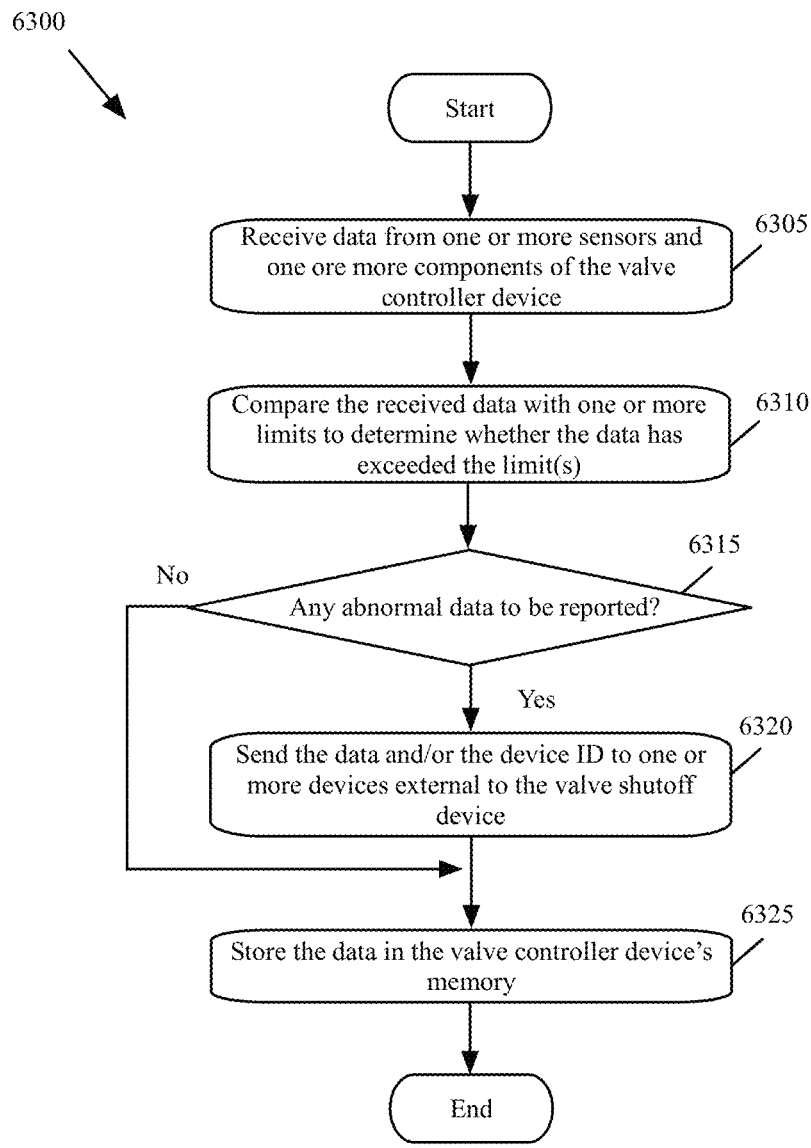
FIG. 63 is a flowchart illustrating an example process for collecting health status and data by a valve controller device and reporting the health status and data to one or more external devices, according to various aspects of the present disclosure.

FIG. 63 is a flowchart illustrating an example process 6300 for collecting health status and data by a valve controller device and reporting the health status and data to one or more external devices, according to various aspects of the present disclosure. In some of the present embodiments, the process 6300 may be performed by a processing unit 120 of a valve controller device (FIGS. 42, 46, 48).

With reference to FIG. 63, data from one or more sensors and one or more components of the valve controller device may be received (at block 6305). The sensor and/or component data may include, without any limitations, one or more of the battery 4215 charge level, the health status of the processing unit 120, the health status of the IMU 135, the health status of the radio transceiver 125, the health status the switching circuit 4221, the health status of the power management and battery 4210, the health status of the RF valve-unit controllers 4710-4715 (FIG. 47), the health status of the RF relay controller(s) 4775, etc.

The processing unit 120 (FIGS. 42, 46, 48) may, for example, measure the current and/or voltage received from the battery 4210 to determine the charge level of the battery. The processing unit 120 may check the health status of the battery 150 and may determine that the battery has to be replaced. The processing unit 120 may receive internal health status from the IMU, radio transceiver, switching circuits, etc. The processing unit 120 may check its own health status. The processing unit 120 may also analyze the parameters received from the IMU and may determine the intensity of seismic activity as a data item to be stored and/or reported.

With further reference to FIG. 63, the received data may be compared (at block 6310) with one or more limits to determine whether the data has exceeded the limit(s). Next, a determination may be made (at block 6315) whether the data has to be reported (e.g., if the data is determined to be out of range or abnormal). If the valve controller device data reporting is on a pull basis, the determination (at block 6315) to report data may be based on whether a request for data or status is received from an external device such as an authorized client device or an authorized could or backend server. If the valve controller device data reporting is on a pull basis, the determination (at block 6315) to report data may be based on a determination that the received data has exceeded the one or more limits and/or whether a time for a periodic report has reached.

When the determination is made (at block 6315) not to report the data, the processing may proceed to block 6325, which is described below. Otherwise, the data and/or the device ID may be sent (at block 6320) to one or more devices external to the valve controller device. The data may be stored (at block 6325) in the valve controller device's memory. The processing may then end.

FIG. 64 is a schematic front view of a client device that may include an application program for displaying health and status data collected by a controller valve on or off, according to various aspects of the present disclosure. The figure illustrates, through three stages 6401-6403, a client device 5435 using an application program 5420 to display health status and data received from controller valve device.

With reference to FIG. 64, stage 6401 shows a graphical user interface (GUI) 3932 displayed on a display (e.g., a touch screen) 2530 of the client device 2535. The GUI 3932 may display a list of applications 2520-2527. As shown, the valve controller application 5420 may be selected in stage 6401. In response to the selection of the valve controller application 5420, the GUI 6432 in stage 6402 may display several options 5440-5455.

As shown in step 6402, the get status option 5445 may be selected. In response to the selection of the get status option 5445, the GUI 6432 in stage 6403 may display health and status data received from the valve controller device.

In the example of FIG. 64, the health and status data may include one or more of the battery level 6411, the health status 6412 of the processing unit, the health status 6413 of the IMU (displayed as seismic waves measurement unit), the health status 6414 of the radio transceiver, the health status 6415 of the power management and battery charger. The GUI 6432 may provide a scroll down option 6491 and a scroll up option 6492 to display additional health status and data (if any). The GUI 6432 may provide an option 6485 to return to the previous stage.

III. System Architecture

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

The electronic devices such as the valve shutoff devices, the valve control devices, the RF valve-unit controller devices, the RF relay controller devices, the electronic devices, the client devices, and/or the servers described above may include memory. The memory 1250 in the above examples may be one or more units of similar or different memories. For example, the electronic devices' memory may include, without any limitations, random access memory (RAM), read-only-memory (ROM), read-only compact discs (CD-ROM), erasable programmable read-only memories (EPROMs), electrically erasable programmable read-only memories (EEPROMs), flash memory (e.g., secured digital (SD) cards, mini-SD cards, micro-SD cards, etc.), magnetic and/or solid state hard drives, ultra-density optical discs, any other optical or magnetic media, and floppy disks.

Electronic devices such as the valve shutoff device, the valve control devices, the RF valve-unit controller devices, the RF relay controller devices, the client devices, and the servers described above may include one or more processing units. For example, the processing unit 120 in above examples may be a single-core processor or a multi-core processor in different embodiments. The electronic devices in some of the present embodiments may store computer program instructions in the memory, which may be a machine-readable or computer-readable medium (alternatively referred to as computer-readable storage medium, machine-readable medium, or machine-readable storage medium). The computer-readable medium may store a program that is executable by at least one processing unit and includes sets of instructions for performing various operations. Examples of programs or computer code include machine code, such as is produced by a compiler, and files including higher-level code that are executed by a computer, an electronic component, or a microprocessor using an interpreter. From these various memory units, the processing unit may retrieve instructions to execute and data to process in order to execute the processes of the present embodiments.

As used in this disclosure and any claims of this disclosure, the terms such as "processing unit," "processor," "controller," "microcontroller," "server", and "memory" all refer to electronic or other technological devices. These terms exclude people or groups of people. For the purposes of this disclosure, the terms display or displaying means displaying on an electronic device. As used in this disclosure and any claims of this disclosure, the terms "computer readable medium," "computer readable media," and "machine readable medium" are entirely restricted to tangible, physical objects that store information in a form that is readable by a processing unit. These terms exclude any wireless signals, wired download signals, and any other ephemeral or transitory signals.

In a first aspect, a valve shutoff device, comprises: a coupling key for coupling with an actuator of a shutoff valve on a fluid supply line; an accelerometer for making acceleration measurements in three directions comprising acceleration measurements in a vertical direction; a motor for rotating the coupling key and the actuator of the shutoff valve; a processing unit for: receiving a first plurality of acceleration measurements made by the accelerometer; using the first plurality of measurements, determining an arrival of seismic primary waves (P-waves) when a ratio of vibrations' power in the vertical direction with respect to a sum of the vibrations' power in the three directions exceeds a first threshold; after determining the arrival of the P-waves, receiving a second plurality of acceleration measurements made by the accelerometer; using the second plurality of measurements, determining an arrival of seismic secondary waves (S-waves) when the sum of the vibrations' power in the three directions exceeds a second threshold; after determining the arrival of the S-waves, receiving a third plurality of acceleration measurements made by the accelerometer; using the third plurality of measurements, determining an arrival of seismic surface waves when the sum of the vibrations' power in the three directions exceeds a third threshold, the third threshold larger than the second threshold; and after determining the arrival of the surface waves, sending a signal to the motor to rotate the coupling key and the actuator of the shutoff valve to close the shutoff valve.

In an embodiment of the first aspect, the processing unit is for determining that the ratio of vibrations' power in the vertical direction with respect to the sum of the vibrations' power in the three directions exceeds the first threshold for a time period prior to determining the arrival of the P-waves.

In another embodiment of the first aspect, the processing unit is for: performing a Fourier transform on the first plurality of acceleration measurements; filtering the acceleration measurements to eliminate acceleration measurements with frequencies that are outside a range of frequencies associated with the P-waves; and determining the ratio of vibrations' power in the vertical direction with respect to the sum of the vibrations' power in the three directions using the filtered acceleration measurements.

In another embodiment of the first aspect, determining the arrival of the P-waves further comprises determining that the sum of the vibrations' power in the three directions is less than a third threshold for a time period after determining that the ratio of the vibrations' power in the vertical direction with respect to the sum of the vibrations' power in the three directions exceeds the first threshold.

In another embodiment of the first aspect, the valve shutoff device further comprises a firmware, the firmware for: receiving the acceleration measurements from the accelerometer relative to a coordinate system used by the accelerometer; and computing the acceleration measurements relative to a coordinate system used by the valve shutoff device by performing a coordinate rotation from the coordinate system used by the accelerometer to the coordinate system used by the valve shutoff device, wherein the first, second, and third plurality of acceleration measurements comprise the acceleration measurements relative to the coordinate system used by the valve shutoff device.

In another embodiment of the first aspect, the processing unit is for: receiving the first, second, and third plurality of acceleration measurements from the accelerometer relative to a coordinate system used by the accelerometer; and performing a coordinate rotation of the acceleration measurements from the coordinate system used by the accelerometer to a coordinate system used by the valve shutoff device.

In another embodiment of the first aspect, the processing unit is for: performing a Fourier transform on the second plurality of acceleration measurements; filtering acceleration measurements to eliminate acceleration measurements with frequencies that are outside a range of frequencies associated with the seismic P-waves, S-waves, and surface waves; and determining the sum of the vibrations' power in the three directions using the filtered acceleration measurements.

In another embodiment of the first aspect, the processing unit is for: performing a Fourier transform on the third plurality of acceleration measurements; filtering acceleration measurements to eliminate acceleration measurements with frequencies that are outside a range of frequencies associated with the seismic P-waves, S-waves, and surface waves; and determining the sum of the vibrations' power in the three directions using the filtered acceleration measurements.

In another embodiment of the first aspect, the valve shutoff device further comprises: a rotor shaft connected to the coupling key, wherein the motor rotates the coupling key by turning the rotor shaft; and a sensor for: measuring one or more parameters associated with the rotor shaft; sending the measured parameters to the processing unit; wherein the processing unit is further for: receiving, after sending the signal to the motor to rotate the coupling key to close the shutoff valve, the parameters associated with the rotor shaft from the sensor; analyzing the parameters associated with the rotor shaft; and sending a signal to the motor to stop rotating the rotor shaft based on the analyses of the parameters.

In another embodiment of the first aspect, the processing unit is for: receiving, after sending the signal to the motor to rotate the coupling key, a level of an electric current used by the motor; and sending a signal to the motor to stop rotating the coupling key when the level of the electric current used by the motor exceeds a threshold.

In a second aspect, a method of closing a shutoff valve of a fluid supply line by a valve shutoff device comprising a coupling key for coupling with an actuator of the shutoff valve is provided, the method comprises: by a processing unit of the valve shutoff device: receiving a first plurality of acceleration measurements made by an accelerometer of the valve shutoff device in three directions comprising a vertical direction; using the first plurality of measurements, determining an arrival of seismic primary waves (P-waves) when a ratio of the vibrations' power in the vertical direction with respect to a sum of the vibrations' power in the three directions exceeds a first threshold; after determining the arrival of the P-waves, receiving a second plurality of acceleration measurements made by the accelerometer; using the second plurality of measurements, determining an arrival of seismic secondary waves (S-waves) when the sum of the vibrations' power in the three directions exceeds a second threshold; after determining the arrival of the S-waves, receiving a third plurality of acceleration measurements made by the accelerometer; using the third plurality of measurements, determining an arrival of seismic surface waves when the sum of the vibrations' power in the three directions exceeds a third threshold, the third threshold larger than the second threshold; and after determining the arrival of the surface waves, sending a signal to a motor of the valve shutoff device to rotate the coupling key and the actuator of the shutoff valve to close the shutoff valve.

An embodiment of the second aspect further comprises: by the processing unit, determining that the ratio of the vibrations' power in the vertical direction with respect to the sum of the vibrations' power in the three directions exceeds the first threshold for a time period prior to determining the arrival of the P-waves.

Another embodiment of the second aspect further comprises: performing a Fourier transform on the first plurality of acceleration measurements; filtering the acceleration measurements to eliminate acceleration measurements with frequencies that are outside a range of frequencies associated with the P-waves; and determining the ratio of the vibrations' power in the vertical direction with respect to a sum of the vibrations' power in the three directions using the filtered acceleration measurements.

In an embodiment of the second aspect, determining the arrival of the P-waves further comprises determining that the sum of the vibrations' power in the three directions is less than a third threshold for a time period after determining that the ratio of the vibrations' power in the vertical direction with respect to the sum of the vibrations' power in the three directions exceeds the first threshold.

Another embodiment of the second aspect further comprises: by a firmware of the valve shutoff device: receiving the acceleration measurements from the accelerometer relative to a coordinate system used by the accelerometer; and computing the acceleration measurements relative to a coordinate system used by the valve shutoff device by performing a coordinate rotation from the coordinate system used by the accelerometer to the coordinate system used by the valve shutoff device, wherein the first, second, and third plurality of acceleration measurements comprise the acceleration measurements relative to the coordinate system used by the valve shutoff device.

Another embodiment of the second aspect further comprises: at the processing unit of the valve shutoff device, receiving the first, second, and third plurality of acceleration measurements from the accelerometer relative to a coordinate system used by the accelerometer; and performing a coordinate rotation of the acceleration measurements from the coordinate system used by the accelerometer to a coordinate system used by the valve shutoff device.

Another embodiment of the second aspect further comprises: performing a Fourier transform on the second plurality of acceleration measurements; filtering acceleration measurements to eliminate acceleration measurements with frequencies that are outside a range of frequencies associated with the seismic P-waves, S-waves, and surface waves; and determining the sum of the vibrations' power in the three directions using the filtered acceleration measurements.

Another embodiment of the second aspect further comprises: performing a Fourier transform on the third plurality of acceleration measurements; filtering acceleration measurements to eliminate acceleration measurements with frequencies that are outside a range of frequencies associated with the seismic P-waves, S-waves, and surface waves; and determining the sum of the vibrations' power in the three directions using the filtered acceleration measurements.

In another embodiment of the second aspect, the valve shutoff device comprises a rotor shaft connected to the coupling key, wherein the motor rotates the coupling key by turning the rotor shaft the method further comprising: by a sensor of the valve shutoff device, measuring one or more parameters associated with the rotor shaft; after sending the signal to the motor to rotate the coupling key to close the shutoff valve, receiving the parameters associated with the rotor shaft at the processing unit from the sensor; by the processing unit, analyzing the parameters associated with the rotor shaft; and sending a signal from the processing unit to the motor to stop rotating the rotor shaft based on the analyses of the parameters.

Another embodiment of the second aspect further comprises: after sending the signal to the motor to rotate the coupling key, receiving a level of an electric current used by the motor at the processing unit; and sending a signal from the processing unit to the motor to stop rotating the coupling key when the level of the electric current used by the motor exceeds a threshold.

In a third aspect, a valve shutoff device, comprises: a coupling key for coupling with an actuator of a shutoff valve on a fluid supply line; an accelerometer for making acceleration measurements in three directions comprising acceleration measurements in a vertical direction; a motor for rotating the coupling key and the actuator of the shutoff valve; a processing unit for: receiving a first plurality of acceleration measurements made by the accelerometer; using the first plurality of measurements, determining an arrival of a first set of seismic waves comprising primary waves (P-waves) when a ratio of the vibrations' power in the vertical direction with respect to a sum of the vibrations' power in the three directions exceeds a first threshold; after determining the arrival of the P-waves, receiving a second plurality of acceleration measurements made by the accelerometer; using the second plurality of measurements, determining an arrival of second set of seismic waves when the sum of the vibrations' power in the three directions exceeds a second threshold; and after determining the arrival of the second set of seismic waves, sending a signal to the motor to rotate the coupling key and the actuator of the shutoff valve to close the shutoff valve.

In an embodiment of the third aspect, the second set of seismic waves comprises secondary waves (S-waves).

In another embodiment of the third aspect, the second set of seismic waves comprises surface waves, the processing unit further for: prior to determining the arrival of the surface waves, receiving a third plurality of acceleration measurements made by the accelerometer; and using the third plurality of measurements, determining an arrival of seismic secondary waves (S-waves) waves when the sum of the vibrations' power in the three directions exceeds a third threshold, the third threshold less than the second threshold.

In a fourth aspect, a valve shutoff device comprises: a coupling key for coupling with an actuator of a shutoff valve on a fluid supply line; an inertial measurement unit for generating one or more signals in response to arrival of seismic waves; a motor for rotating the coupling key and the actuator of the shutoff valve; a radio transceiver; and a processing unit for: receiving the one or more signals from the inertial measurement unit; analyzing the received signals to determine whether to close the shutoff valve; based on the analysis, sending a signal to the motor to rotate the coupling key and the actuator of the shutoff valve to close the shutoff valve; and sending one or more signals through the transceiver to one or more electronic devices external to the valve shutoff device indicating whether the shutoff valve is open or closed.

In an embodiment of the fourth aspect, the processing unit is for: receiving a set of parameters from one or more of the inertial measurement unit, the processing unit, the motor, and the radio transceiver; analyzing the set of parameters; determining a status of the valve shutoff device based on the analysis; and sending, through the radio transceiver, the status to the one or more electronic devices.

In another embodiment of the fourth aspect, the status comprises one or more of a health status of the inertial measurement unit, a health status of the processing unit, a health status of the motor, and a health status of the radio transceiver.

In another embodiment of the fourth aspect, the valve shutoff device further comprises: a battery; and one or more solar cells for recharging the battery; wherein the processing unit is for: receiving one or more parameters from the battery and the solar cells; analyzing the set of parameters received from the battery and the solar cells; determining a health status of the battery and the solar cells based on the analysis; and sending, through the radio transceiver, the health status of the battery and the solar cells to the one or more electronic devices.

In another embodiment of the fourth aspect, the valve shutoff device further comprises: a radio frequency (RF) antenna, wherein the processing unit, the radio transceiver, and the RF antenna are on a system on a chip integrated circuit.

In another embodiment of the fourth aspect, the processing unit is further for: analyzing the signals received from the inertial measurement unit for signs of an earthquake; determining that an earthquake exceeding a predetermined magnitude has occurred based on the analysis; and sending, through the radio transceiver, at least one of the received signals to the one or more electronic devices as parameters related to the earthquake.

In another embodiment of the fourth aspect, the processing unit is further for: receiving a signal from an electronic device external to the valve shutoff device, through the radio transceiver, to close the shutoff valve; determining an authenticity of the received signals based on one or more criteria; and sending a signal to the motor to rotate the coupling key to close the shutoff valve when the received commands are authenticated.

In another embodiment of the fourth aspect, the processing unit is further for: receiving a signal from an electronic device external to the valve shutoff device, through the radio transceiver, to open the shutoff valve; determining an authenticity of the received signals based on one or more criteria; and sending a signal to the motor to rotate the coupling key to open the shutoff valve when the received commands are authenticated.

In a fifth aspect, a valve shutoff device comprises: a coupling key for coupling with an actuator of a shutoff valve on a fluid supply line; an inertial measurement unit for generating one or more signals in response to arrival of seismic waves; a motor for rotating the coupling key and the actuator of the shutoff valve; a processing unit for: receiving the one or more signals from the inertial measurement unit; analyzing the received signals to determine whether to close the shutoff valve; and based on the analysis, sending a signal to the motor to rotate the coupling key and the actuator of the shutoff valve to close the shutoff valve.

In an embodiment of the fifth aspect, the processing unit is for analyzing the signals received from the inertial measurement unit to determine at least one of an amplitude and an arrival time of one or more types of seismic waves.

In another embodiment of the fifth aspect, the detected types of seismic waves comprise one or more of primary waves (P-waves), secondary waves (S-waves), and surface waves.

In another embodiment of the fifth aspect, the valve shutoff device further comprises a rotor shaft connected to the coupling key, wherein the motor rotates the coupling key by turning the rotor shaft.

In another embodiment of the fifth aspect, the valve shutoff device further comprises: a sensor for: measuring one or more parameters associated with the rotor shaft; and sending the measured parameters to the processing unit; wherein the processing unit is further for: receiving, after sending the signal to the motor to rotate the coupling key to close the shutoff valve, the parameters associated with the rotor shaft from the sensor; analyzing the parameters associated with the rotor shaft; and sending a signal to the motor to stop rotating the rotor shaft based on the analyses of the parameters.

In another embodiment of the fifth aspect, the sensor is one of (i) a torsion load cell for measuring a strain that is proportional to one of a torque and a force applied by the motor to the rotor shaft and (ii) a transducer for creating an electrical signal with a magnitude proportional to one of a torque and a force applied by the motor to the rotating shaft.

In another embodiment of the fifth aspect, the valve shutoff device further comprises: a memory; the processing unit for: receiving, prior to sending the signal to the motor to rotate the coupling key to close the shutoff valve, a first value corresponding to an angular position of the rotor shaft when the valve is at an open position and a second value corresponding to an angular position of the rotor shaft when the valve is at a shutoff position; and storing the first and second values in the memory; after sending the signal to the motor to rotate the coupling key to close the shutoff valve, receiving the angular value of the rotor shaft at one or more time intervals; comparing the angular value of the rotor shaft with the first and second values; and sending a signal to the motor to stop rotating the rotor shaft based on the comparison.

In another embodiment of the fifth aspect, the valve shutoff device further comprises: a rotary position encoder for: measuring an angular position of the rotor shaft; converting the angular position into a digital signal; and sending the digital signal to the processing unit; wherein the processing unit is for using the digital signal as the angular value of the rotor for comparing to the first and second values.

In another embodiment of the fifth aspect, the processing unit is for: receiving, after sending the signal to the motor to rotate the coupling key, a level of an electric current used by the motor; and sending a signal to the motor to stop rotating the coupling key when the level of the electric current used by the motor exceeds a threshold.

In another embodiment of the fifth aspect, the motor comprises a rotor shaft, wherein the valve shutoff device further comprises a plurality of gears for transferring a rotational movement of rotor shaft to the coupling key.

In another embodiment of the fifth aspect, the valve shutoff device further comprises: a rechargeable battery for providing power to the motor, the processing unit, and the inertial measurement unit; and one or more solar cells for recharging the battery from one of solar light, ambient light, and a power outlet.

In another embodiment of the fifth aspect, the valve shutoff device is a retrofit device that is externally attachable to the actuator of the shutoff valve.

In another embodiment of the fifth aspect, the fluid in the supply line is one of natural gas, steam, liquid water, and a petroleum-derived liquid, and wherein the motor is one of a continuous rotation motor and a motor with position control.

In another embodiment of the fifth aspect, the inertial measurement unit comprises a three-dimensional (3D) accelerometer for generating said one or more signals in response to detection of seismic waves.

In another embodiment of the fifth aspect, the inertial measurement unit comprises a three-dimensional (3D) accelerometer and a 3D magnetometer, for generating said one or more signals in response to detection of seismic waves.

In another embodiment of the fifth aspect, the inertial measurement unit comprises one or more micro electro-mechanical system (MEMS) sensors.

In another embodiment of the fifth aspect, the valve shutoff device further comprises: an optical rotary position encode comprising: a disk comprising a plurality of apertures connected to the rotating shaft; a light source for passing lights on the disk after the rotor shaft starts rotating; a light sensor for receiving light through the apertures of the disk; and a signal conditioner for converting the light detected by the light sensor into a digital signal and sending the digital signal to the processing unit; wherein the processing unit is for using the digital signal as the angular value of the rotor shaft for comparing to the first and second values.

In another embodiment of the fifth aspect, the processing unit is for: receiving, after sending the one or more signals to the motor to rotate the coupling key, a level of an electric current used by the motor; and sending a signal to the motor to stop rotating the coupling key based on the level of the electric current used by the motor.

In another embodiment of the fifth aspect, the motor comprises a rotor shaft, wherein the valve shutoff device further comprises a plurality of gears for transferring a rotational movement of rotor shaft to the coupling key.

In another embodiment of the fifth aspect, valve shutoff device further comprises a weatherproof housing for covering the motor, the inertial measurement unit, the battery, and the processing unit.

In another embodiment of the fifth aspect, the housing comprises one or more ridges for keeping one or more cable ties for wrapping around the shutoff valve on the fluid supply line and the valve shutoff device.

In another embodiment of the fifth aspect, the valve shutoff device comprises first and second sets of clamps for fastening the valve shutoff device to the fluid supply line, wherein the first set of pipe clamps is connected to a top portion of the housing and the second set of pipe clamps is connected to a bottom portion of the housing.

In another embodiment of the fifth aspect, the housing comprises one or more of a polyvinyl carbonite (PVC) material, a plastic material, and a metal material.

In another embodiment of the fifth aspect, the housing is in a shape of a pipe, wherein a hollow chamber of the pipe houses the motor, the inertial measurement unit, the battery, and the processing unit.

In another embodiment of the fifth aspect, the processing unit is one of a controller, a microcontroller, a processor, and a microprocessor.

In another embodiment of the fifth aspect, the radio transceiver is compatible with an Internet of Things (IoT) specification.

In another embodiment of the fifth aspect, the valve shutoff device further comprises: a display; wherein the processing unit is further for: determining a status of the valve shutoff device and the shutoff valve on the fluid supply line; and displaying the status on the display of the valve shutoff device.

In another embodiment of the fifth aspect, the valve shutoff device further comprises: a set of light emitted diode (LED), lights; wherein the processing unit is further for: determining a status of the valve shutoff device and the shutoff valve on the fluid supply line; and displaying the status using the LED lights.

In a sixth aspect, a valve controller device for controlling a set of one or more solenoid valves is provided. The valve controller device comprises: an accelerometer for making acceleration measurements in three directions comprising acceleration measurements in a vertical direction; a processor configured to: receive a first plurality of acceleration measurements made by the accelerometer; use the first plurality of measurements to determine an arrival of seismic primary waves (P-waves) when a ratio of vibrations' power in the vertical direction with respect to a vector sum of the vibrations' power in the three directions exceeds a first threshold; receive, after determining the arrival of the P-waves, a second plurality of acceleration measurements made by the accelerometer; use the second plurality of measurements to determine an arrival of seismic secondary waves (S-waves) when the vector sum of the vibrations' power in the three directions exceeds a second threshold; receive, after determining the arrival of the S-waves, a third plurality of acceleration measurements made by the accelerometer; use the third plurality of measurements to determine an arrival of seismic surface waves when the vector sum of the vibrations' power in the three directions exceeds a third threshold, the third threshold larger than the second threshold; and after determining the arrival of the surface waves, generate one or more signals to close the set of solenoid valves.

An embodiment of the sixth aspect further comprises an H-bridge circuit communicatively coupled to the processor, the H-bridge circuit connected to a control wire and a reference wire, wherein the set of solenoid valves are latching solenoid valves connected to said control and reference wires, wherein the solenoid valves are configured to open in response to the control wire receiving a transient signal with a first polarity with reference to the reference wire, wherein the solenoid valves are configured to close in response to the control wire receiving a transient signal with a second polarity with reference to the reference wire, wherein the second polarity is opposite of the first polarity, and wherein the processor is configured to send said one or more signals to close the set of solenoid valves to the H-bridge circuit, causing the H-bridge circuit to send a transient signal with the second polarity to the control wire.

Another embodiment of the sixth aspect further comprises a rechargeable battery configured to provide power to the processor, the accelerometer, and the H-bridge circuit.

Another embodiment of the sixth aspect further comprises a reset button connected to the H-bridge circuit, wherein the reset button is configured to generate a signal in response to the reset button being pushed, wherein the H-bridge circuit is configured to send a transient signal with the first polarity to the control wire in response to receiving the signal from the push button.

Another embodiment of the sixth aspect further comprises a radio transceiver, wherein the processor is configured to: receive a signal from an electronic device external to the valve shutoff device, through the radio transceiver, to open or close the set of solenoid valves; determine an authenticity of the received signal based on one or more criteria; and send one or more signals to open the set of solenoid valves when the received signal is authenticated.

In an embodiment of the sixth aspect, the processor is communicatively coupled to a reference wire, a first control wire, and a second control wire; wherein the set of solenoid valves are latching solenoid valves connected to the reference wire and the first and second control wires, wherein the latching solenoid valves are configured to open in response to receiving a transient signal on the first control wire, wherein the latching solenoid valves are configured to close in response to receiving a transient signal on the second control wire, and wherein the processor is configured to send said one or more signals, generated to close the set of solenoid valves, to the second control wire to close the set of solenoid valves.

Another embodiment of the sixth aspect further comprises an audio alarm, wherein the processor is configured to activate the audio alarm after determining the arrival of the P-waves.

Another embodiment of the sixth aspect further comprises an audiovisual alarm, wherein the processor is configured to activate the audiovisual alarm after determining the arrival of the P-waves.

In another embodiment of the sixth aspect, each of the set of solenoid valves is on a corresponding fluid supply line, wherein each fluid supply line is one of a natural gas supply line, a steam supply line, a liquid water supply line, and a petroleum-derived liquid supply line.

In another embodiment of the sixth aspect, the processor is configured to send one or more signals to a relay to close an electrical supply line after determining the arrival of the surface waves.

In another embodiment of the sixth aspect, the processor is configured to determine that the ratio of vibrations' power in the vertical direction with respect to the sum of the vibrations' power in the three directions exceeds the first threshold for a time period prior to determining the arrival of the P-waves.

In another embodiment of the sixth aspect, the processor is configured to: perform a Fourier transform on the first plurality of acceleration measurements; filter the acceleration measurements to eliminate acceleration measurements with frequencies that are outside a range of frequencies associated with the P-waves; and determine the ratio of vibrations' power in the vertical direction with respect to the sum of the vibrations' power in the three directions using the filtered acceleration measurements.

In another embodiment of the sixth aspect, determining the arrival of the P-waves further comprises determining that the sum of the vibrations' power in the three directions is less than a third threshold for a time period after determining that ratio of vibrations' power in the vertical direction with respect to the sum of the vibrations' power in the three directions exceeds the first threshold.

In an embodiment of the sixth aspect, the valve controller device of further comprises a firmware, the firmware configured to: receive the acceleration measurements from the accelerometer relative to a coordinate system used by the accelerometer; and compute the acceleration measurements relative to a coordinate system used by the valve shutoff device by performing a coordinate rotation from the coordinate system used by the accelerometer to the coordinate system used by the valve shutoff device, wherein the first, second, and third plurality of acceleration measurements comprise the acceleration measurements relative to the coordinate system used by the valve shutoff device.

In another embodiment of the sixth aspect, the processor is configured to: receive the first, second, and third plurality of acceleration measurements from accelerometer relative to a coordinate system used by the accelerometer; and perform a coordinate rotation of the acceleration measurements from the coordinate system used by the accelerometer to a coordinate system used by the valve shutoff device.

In another embodiment of the sixth aspect, the processor is configured to perform a Fourier transform on the second plurality of acceleration measurements; filter acceleration measurements to eliminate acceleration measurements with frequencies that are outside a range of frequencies associated with the seismic P-waves, S-waves, and surface waves; and determine the sum of the vibrations' power in the three directions using the filtered acceleration measurements.

In another embodiment of the sixth aspect, the processor is configured to perform a Fourier transform on the third plurality of acceleration measurements; filter acceleration measurements to eliminate acceleration measurements with frequencies that are outside a range of frequencies associated with the seismic P-waves, S-waves, and surface waves; and determine the sum of the vibrations' power in the three directions using the filtered acceleration measurements.

In another embodiment of the sixth aspect, the set of one or more solenoid valves controlled by the valve controller comprises more than solenoid valves.

In another embodiment of the sixth aspect, the set of one or more solenoid valves controlled by the valve controller comprises only one solenoid valve, wherein the valve controller and the solenoid valve are in a same enclosure.

Another embodiment of the sixth aspect further comprises a radio transceiver, wherein the processor is configured to: receive a signal from an electronic device external to the valve controller device, through the radio transceiver, to close the solenoid valve; determine an authenticity of the received signal based on one or more criteria; and send a signal to close the solenoid valve when the received signal is authenticated.

In another embodiment of the sixth aspect, the processor and the radio transceiver are on a system on a chip (SoC) integrated circuit.

Another embodiment of the sixth aspect further comprises a radio transceiver, wherein the processor is configured to send, through the radio transceiver, at least one parameter related to the first, second, and third plurality of acceleration measurements to one or more electronic devices external to the valve controller.

Another embodiment of the sixth aspect further comprises a radio transceiver, wherein the processor is configured to: receive a signal from each solenoid valve in the set of solenoid valves regarding to a closed or open status of the valve; and send, through the radio transceiver, the status to the one or more electronic devices.

In an embodiment of the sixth aspect, the valve controller device is for controlling a set of one or more relays, each relay connected to an associated circuit breaker, each circuit breaker configured to open when the associated relay is opened, and wherein the processor is configured to generate, after determining the arrival of the surface waves, one or more signals to open the set of relays.

In an embodiment of the sixth aspect, the valve controller device is configured to control the set of valves and the set of relays through one or more of a set of two wires, a set of three control wires, and a set of wireless communication channels.

In a seventh aspect, a method of controlling a set of one or more solenoid valves by a valve shutoff device is provided. The method comprises: by a processor of the valve shutoff device: receiving a first plurality of acceleration measurements made by an accelerometer of the valve shutoff device in three directions comprising a vertical direction; using the first plurality of measurements, determining an arrival of seismic primary waves (P-waves) when a ratio of vibrations' power in the vertical direction with respect to a sum of the vibrations' power in the three directions exceeds a first threshold; after determining the arrival of the P-waves, receiving a second plurality of acceleration measurements made by the accelerometer; using the second plurality of measurements, determining an arrival of seismic secondary waves (S-waves) when the sum of the vibrations' power in the three directions exceeds a second threshold; after determining the arrival of the S-waves, receiving a third plurality of acceleration measurements made by the accelerometer; using the third plurality of measurements, determining an arrival of seismic surface waves when the sum of the vibrations' power in the three directions exceeds a third threshold, the third threshold larger than the second threshold; and after determining the arrival of the surface waves, sending one or more signals to close the set of solenoid valves.

The above description presents the best mode contemplated for carrying out the present embodiments, and of the manner and process of practicing them, in such full, clear, concise, and exact terms as to enable any person skilled in the art to which they pertain to practice these embodiments. The present embodiments are, however, susceptible to modifications and alternate constructions from those discussed above that are fully equivalent. Consequently, the present invention is not limited to the particular embodiments disclosed. On the contrary, the present invention covers all modifications and alternate constructions coming within the spirit and scope of the present disclosure. For example, the steps in the processes described herein need not be performed in the same order as they have been presented, and may be performed in any order(s). Further, steps that have been presented as being performed separately may in alternative embodiments be performed concurrently. Likewise, steps that have been presented as being performed concurrently may in alternative embodiments be performed separately.

What is claimed is:

1. A non-transitory machine readable medium storing a program that when executed by a processor of a valve controller device, controls a set of one or more solenoid valves, the program comprising sets of instructions for:
   receiving a first plurality of acceleration measurements made by an accelerometer of the valve controller device in three directions comprising acceleration measurements in a vertical direction;
   determining, based on the first plurality of measurements, an arrival of seismic primary waves (P-waves) when a ratio of vibrations' power in the vertical direction with respect to a vector sum of the vibrations' power in the three directions exceeds a first threshold;
   receiving, after determining the arrival of the P-waves, a second plurality of acceleration measurements made by the accelerometer;
   determining, based on the second plurality of measurements, an arrival of seismic secondary waves (S-waves) when the vector sum of the vibrations' power in the three directions exceeds a second threshold;
   receiving, after determining the arrival of the S-waves, a third plurality of acceleration measurements made by the accelerometer;
   determining, based on the third plurality of measurements, an arrival of seismic surface waves when the vector sum of the vibrations' power in the three directions exceeds a third threshold, the third threshold larger than the second threshold; and after determining the arrival of the surface waves, generating one or more signals to close the set of solenoid valves.

2. The non-transitory machine readable medium of claim 1, wherein the valve controller device further comprises an H-bridge circuit connected to a first control wire and a second control wire, wherein the set of solenoid valves are latching solenoid valves connected to said first and second control wires, wherein the solenoid valves are configured to open in response to the first control wire receiving a transient signal with a first polarity with reference to the second control wire, wherein the solenoid valves are configured to close in response to the first control wire receiving a transient signal with a second polarity with reference to the second control wire, wherein the second polarity is opposite of the first polarity, the program further comprising a set of instructions for sending said one or more signals to the H-bridge circuit to close the set of solenoid valves, causing the H-bridge circuit to send a transient signal with the second polarity to the first control wire.

3. The non-transitory machine readable medium of claim 1, the program further comprising sets of instructions for:
receiving a signal from an electronic device external to the valve controller device, through a radio transceiver of the valve controller device, to open the set of solenoid valves;
determining an authenticity of the received signal based on one or more criteria; and
sending one or more signals to open the set of solenoid valves when the received signal is authenticated.

4. The non-transitory machine readable medium of claim 1, wherein the set of solenoid valves are latching solenoid valves connected to a first control wire, a second control wire, and a common wire connected to a power source, wherein the latching solenoid valves are configured to open in response to receiving a transient signal on the first control wire and to close in response to receiving a transient signal on the second control wire, the program further comprising a set of instructions for:
sending said one or more signals, generated to close the set of solenoid valves, to the second control wire to close the set of solenoid valves.

5. The non-transitory machine readable medium of claim 1, the program further comprising a set of instructions for activating an audio alarm of the valve controller device after determining the arrival of the P-waves.

6. The non-transitory machine readable medium of claim 1, the program further comprising a set of instructions for activating an audiovisual alarm of the valve controller device after determining the arrival of the P-waves.

7. The non-transitory machine readable medium of claim 1, the program further comprising a set of instructions for sending one or more signals to a relay to close an electrical supply line after determining the arrival of the surface waves.

8. The non-transitory machine readable medium of claim 1, the program further comprising a set of instructions for determining that the ratio of vibrations' power in the vertical direction with respect to the vector sum of the vibrations' power in the three directions exceeds the first threshold for a time period prior to determining the arrival of the P-waves.

9. The non-transitory machine readable medium of claim 1, the program further comprising sets of instructions for:
performing a Fourier transform on the first plurality of acceleration measurements;
filtering a result of the Fourier transform of the acceleration measurements to eliminate acceleration measurements with frequencies that are outside a range of frequencies associated with the P-waves; and
determining the ratio of vibrations' power in the vertical direction with respect to the vector sum of the vibrations' power in the three directions using the filtered acceleration measurements.

10. The non-transitory machine readable medium of claim 1, wherein the set of instructions for determining the arrival of the P-waves further comprises a set of instructions for determining that the vector sum of the vibrations' power in the three directions is less than a fourth threshold for a time period after determining that ratio of vibrations' power in the vertical direction with respect to the vector sum of the vibrations' power in the three directions exceeds the first threshold.

11. The non-transitory machine readable medium of claim 1, the program further comprising sets of instructions for:
receiving the first, second, and third plurality of acceleration measurements from the accelerometer relative to a coordinate system used by the accelerometer; and
performing a coordinate rotation of the acceleration measurements from the coordinate system used by the accelerometer to a coordinate system used by the valve shutoff device.

12. The non-transitory machine readable medium of claim 1, the program further comprising sets of instructions for:
performing a Fourier transform on the second plurality of acceleration measurements;
filtering a result of the Fourier transform of acceleration measurements to eliminate acceleration measurements with frequencies that are outside a range of frequencies associated with the seismic P-waves, S-waves, and surface waves; and
determining the vector sum of the vibrations' power in the three directions using the filtered acceleration measurements.

13. The non-transitory machine readable medium of claim 1, the program further comprising sets of instructions for:
performing a Fourier transform on the third plurality of acceleration measurements;
filtering acceleration measurements to eliminate acceleration measurements with frequencies that are outside a range of frequencies associated with the seismic P-waves, S-waves, and surface waves; and
determining the vector sum of the vibrations' power in the three directions using the filtered acceleration measurements.

14. The non-transitory machine readable medium of claim 1, wherein the set of one or more solenoid valves controlled by the program comprises more than one solenoid valve.

15. The non-transitory machine readable medium of claim 1, wherein the set of one or more solenoid valves controlled by the program comprises only one solenoid valve, wherein the valve controller device and the solenoid valve are in a same enclosure.

16. The non-transitory machine readable medium of claim 1, the program further comprising sets of instructions for:
receiving a signal from an electronic device external to the valve controller device, through a radio transceiver, to close the solenoid valve;

determining an authenticity of the received signal based on one or more criteria; and send one or more signals to close the set of solenoid valves when the received signal is authenticated.

17. The non-transitory machine readable medium of claim 1, the program further comprising a set of instructions for sending, through a radio transceiver of the valve controller device, at least one parameter related to the first, second, and third plurality of acceleration measurements to one or more electronic devices external to the valve controller device.

18. The non-transitory machine readable medium of claim 1, the program further comprising sets of instructions for:
receiving a signal from each solenoid valve in the set of solenoid valves regarding to a closed or open status of the valve; and
sending, through a radio transceiver of the valve controller device, the status to the one or more electronic devices.

19. The non-transitory machine readable medium of claim 1, wherein the valve controller device is for controlling a set of one or more relays, each relay connected to an associated circuit breaker, each circuit breaker configured to open when the associated relay is opened, the program further comprising a set of instructions for generating, after determining the arrival of the surface waves, one or more signals to open the set of relays.

20. The non-transitory machine readable medium of claim 19, wherein the set of instructions for generating the one or more signals to open the set of relays comprises a set of instructions for sending the one or more signals to the relays through one or more of a set of two control wires, a set of two control wires and a common wire, and a set of wireless communication channels.

\* \* \* \* \*